US011001715B2

(12) United States Patent
Bongaerts et al.

(10) Patent No.: US 11,001,715 B2
(45) Date of Patent: May 11, 2021

(54) THERMOSETTING POWDER COATING COMPOSITIONS COMPRISING DILAUROYL PEROXIDE

(71) Applicant: DSM IP Assets B.V., Heerlen (NL)

(72) Inventors: Johannes Gertrudis Christianus Bongaerts, Echt (NL); Dragos Popescu, Echt (NL)

(73) Assignee: DSM IP ASSETS B.V., Heerlen (NL)

( * ) Notice: Subject to any disclaimer, the term of this patent is extended or adjusted under 35 U.S.C. 154(b) by 149 days.

(21) Appl. No.: 16/336,179

(22) PCT Filed: Sep. 27, 2017

(86) PCT No.: PCT/EP2017/074539
§ 371 (c)(1),
(2) Date: Mar. 25, 2019

(87) PCT Pub. No.: WO2018/060276
PCT Pub. Date: Apr. 5, 2018

(65) Prior Publication Data
US 2019/0211212 A1 Jul. 11, 2019

(30) Foreign Application Priority Data

Sep. 28, 2016 (EP) .................................... 16191173
Sep. 28, 2016 (EP) .................................... 16191174
Sep. 28, 2016 (EP) .................................... 16191175

(51) Int. Cl.
*C09D 5/03* (2006.01)
*C08G 18/73* (2006.01)
*C08G 18/67* (2006.01)
*C09D 167/06* (2006.01)
*C09D 163/10* (2006.01)
*C09D 169/00* (2006.01)
*C09D 175/16* (2006.01)
*B05D 3/02* (2006.01)
(Continued)

(52) U.S. Cl.
CPC ............ *C09D 5/03* (2013.01); *B05D 3/0254* (2013.01); *B05D 7/24* (2013.01); *B33Y 70/00* (2014.12); *C08G 18/671* (2013.01); *C08G 18/73* (2013.01); *C08G 18/81* (2013.01); *C09D 163/10* (2013.01); *C09D 167/06* (2013.01); *C09D 169/00* (2013.01); *C09D 175/16* (2013.01); *C08G 2150/20* (2013.01); *C09D 177/08* (2013.01); *C09D 177/12* (2013.01)

(58) Field of Classification Search
CPC ..... C09D 5/03; C09D 167/06; C08G 2650/22
See application file for complete search history.

(56) References Cited

U.S. PATENT DOCUMENTS 4,548,617 A * 10/1985 Miyatani .............. C09K 3/1409
264/118

FOREIGN PATENT DOCUMENTS

CN        1533419      9/2004
CN       102884146     1/2013
(Continued)

OTHER PUBLICATIONS

International Search Report for PCT/EP2017/074539, dated Jan. 10, 2018, 6 pages.
(Continued)

*Primary Examiner* — Robert A Vetere
(74) *Attorney, Agent, or Firm* — Nixon & Vanderhye P.C.

(57) ABSTRACT

The invention relates to thermosetting powder coating compositions as these are disclosed herein. The compositions comprise certain unsaturated resins comprising ethylenic unsaturations, curing agents selected from vinyl urethanes, vinyl functionalized urethane resins and mixtures thereof, dilauroyl peroxide as initiator, and a co-initiator selected from the group of onium compounds and sulpho-compounds. The invention further relates to a process for making said thermosetting powder coating compositions and processes for coating an article with said thermosetting powder coating compositions. The invention further relates to cured thermosetting powder coating compositions obtained by curing of the thermosetting powder coating compositions of the invention. The invention further relates to an article having coated thereon said thermosetting powder coating composition as well as to an article having coated and cured thereon said thermosetting powder coating composition. The invention further relates to the use of said thermosetting powder coating compositions, to the use of an article having coated thereon said thermosetting powder coating compositions and to the use of an article having coated and cured thereon said thermosetting powder coating compositions. The invention further relates to various uses of either the thermosetting powder coating compositions of the invention, or the cured thermosetting powder coating compositions of the invention or of articles having coated thereon the thermosetting powder coating composition of the invention, or of articles having coated and cured thereon the thermosetting powder coating composition of the invention. The invention further relates to a method for enabling the fast heat-curing of a thermosetting powder coating composition at low temperature. The invention further relates to a method for enhancing the chemical resistance of a powder coating obtained by heat curing of the thermosetting powder coating composition of the invention at low temperature.

79 Claims, No Drawings

(51) Int. Cl.
B05D 7/24 (2006.01)
C08G 18/81 (2006.01)
B33Y 70/00 (2020.01)
C09D 177/08 (2006.01)
C09D 177/12 (2006.01)

(56) References Cited

FOREIGN PATENT DOCUMENTS

| | | | |
|---|---|---|---|
| CN | 105765001 | 7/2016 | |
| EP | 0 947 254 | 10/1999 | |
| WO | WO 03/008508 | 1/2003 | |
| WO | 2010/052290 | 5/2010 | |
| WO | WO-2010052290 A1 * | 5/2010 | ............... C09D 5/03 |
| WO | WO 2011/138431 | 11/2011 | |
| WO | 2014/173861 | 10/2014 | |
| WO | WO 2015/075186 | 5/2015 | |
| WO | 2015/158587 | 10/2015 | |

OTHER PUBLICATIONS

Written Opinion of the ISA for PCT/EP2017/074539, dated Jan. 10, 2018, 5 pages.

\* cited by examiner

US 11,001,715 B2

THERMOSETTING POWDER COATING COMPOSITIONS COMPRISING DILAUROYL PEROXIDE

This application is the U.S. national phase of International Application No. PCT/EP2017/074539 filed 27 Sep. 2017, which designated the U.S. and claims priority to EP Patent Application No. 16191174.8 filed 28 Sep. 2016, EP Patent Application No. 16191173.0 filed 28 Sep. 2016, and EP Patent Application No. 16191175.5 filed 28 Sep. 2016, the entire contents of each of which are hereby incorporated by reference.

The invention relates to thermosetting powder coating compositions as these are disclosed herein. The invention further relates to a process for making said thermosetting powder coating compositions and processes for coating an article with said thermosetting powder coating compositions. The invention further relates to cured thermosetting powder coating compositions obtained by curing of the thermosetting powder coating compositions of the invention. The invention further relates to an article having coated thereon said thermosetting powder coating composition as well as to an article having coated and cured thereon said thermosetting powder coating composition. The invention further relates to the use of said thermosetting powder coating compositions, to the use of an article having coated thereon said thermosetting powder coating compositions and to the use of an article having coated and cured thereon said thermosetting powder coating compositions. The invention further relates to various uses of either the thermosetting powder coating compositions of the invention, or the cured thermosetting powder coating compositions of the invention or of articles having coated thereon the thermosetting powder coating composition of the invention, or of articles having coated and cured thereon the thermosetting powder coating composition of the invention. The invention further relates to a method for enabling the fast heat-curing of a thermosetting powder coating composition at low temperature. The invention further relates to a method for enhancing the chemical resistance of a powder coating obtained by heat curing of the thermosetting powder coating composition of the invention at low temperature.

Powder coating compositions (commonly referred to as powders) which are dry, finely divided, free flowing, solid materials at room temperature and at atmospheric pressure, have gained considerable popularity in recent years over liquid coating compositions for a number of reasons. For one powder coatings are user and environmentally friendly materials since they are virtually free of harmful volatile organic solvents carriers that are normally present in liquid coating compositions. Therefore, powder coatings give off little, if any, volatile materials to the environment when cured. This eliminates the solvent emission problems associated with liquid coating compositions such as air pollution and dangers to the health of workers employed in coating operations. Powder coating compositions are also clean and convenient to use since they are applied in a clean manner over the substrate because they are in dry solid form. The powders are easily swept up in the event of a spill and do not require special cleaning and spill containment supplies, as do liquid coating compositions. Working hygiene is thus improved. Moreover, powder coating compositions are essentially 100% recyclable since the sprayed powders can be fully reclaimed and recombined with fresh powder feed. Recycling of liquid coatings during application is often not done, which leads to increased waste and hazardous waste disposal costs. In addition, powder coating compositions are ready to use, i.e., no thinning or dilution is required.

Powder coating compositions are typically applied on a substrate via an electrostatic spray process; the powder coating composition is dispersed in an air stream and passed through a corona discharge field where the particles acquire an electrostatic charge. The charged particles are attracted to and deposited on the grounded article to be coated. The article, usually at room temperature, is then placed in an oven where the powder melts and forms a powder coating. A hybrid process based on a combination of high voltage electrostatic charging and fluidized-bed application techniques (electrostatic fluidized bed) has evolved, as well as triboelectric spray application methods. Powder coating compositions and their process of application are the preferred coating compositions and process for coating many familiar items such as lawn and garden equipment, patio and other metal furniture, electrical cabinets, lighting, shelving and store fixtures, and many automotive components. Today, powder coating compositions are widely accepted, with thousands of installations in the factories of original equipment manufacturers (OEMS) and custom coating job shops.

Powder coating compositions can be thermosetting or thermoplastic. The invention relates to the field of thermosetting powder coating compositions. The preparation of thermosetting powder coating compositions is described by Misev in 'Powder Coatings, Chemistry and Technology' (pp. 224-300; 1991, John Wiley & Sons Ltd.).

Despite their many advantages, powder coatings are generally not employed in coating heat sensitive substrates, such as wood and plastics. Heat sensitive substrates demand curing at low temperatures for example heat curing at temperatures as high as 130° C., to avoid significant substrate degradation and/or deformation. For instance when wood composites, e.g. particle board, fiber board and other substrates that comprise a significant amount of wood are heated to the high curing temperatures required for traditional powders (typically temperatures higher than 140° C.), the residual moisture and resinous binders present in the wood composites for substrate integrity caused to invariably evolve from the substrate. Outgassing of the volatiles during curing, results in severe blisters, craters, pinholes and other surface defects in the hardened film finish. Furthermore, overheating causes the wood composites to become brittle, friable, charred and otherwise worsened in physical and chemical properties. This is not acceptable from both a film quality and product viewpoint.

Low temperature UV curable thermosetting powder coating compositions were proposed for coating heat sensitive substrates. UV powders still require exposure to heat, which is above either the glass transition temperature ($T_g$) or melting temperature ($T_m$) to sufficiently melt and flow out the powders into a continuous molten film over the substrate prior to UV-radiation curing which is accomplished by exposing the molten film to UV-radiation and the crosslinking reactions are triggered with UV-radiation rather than heat. Thus, powder coating heat sensitive substrates with UV-radiation curable powders requires a two step process typically comprising the steps of: i) heating the powder coating composition to melt and flow it out onto the substrate in order to form a continuous film, and ii) UV radiate the film formed in order to harden (cure) it. In principle, heat curing of heat sensitive substrates is still desirable and preferred over UV curing; the reason is that heat curing has the advantage that in only a one step process that of heating a powder coating composition without the use of additional equipment, for instance equipment that generates UV light or accelerated electrons, the powder coating composition can be melted and cured onto a substrate.

Heat curing of thermosetting powder coating compositions is further desirable over UV curing because UV curing fails when it comes to powder coat complex three-dimensional articles and heat curing is the only way that powder coating of complex three-dimensional articles can be accomplished.

A drawback of thermosetting powder coating compositions comprising thermal radical initiators and resins comprising unsaturations based on carbon carbon double bonds connected directly to an electron withdrawing group is that due to their generally high reactivity, their physical storage stability is rather limited; this drawback is especially pronounced for prolonged storage such as several weeks; prolonged storage conditions are typically encountered during for example overseas shipping of powders is rather limited; in these conditions, said powders need to be stored at rather low temperatures typically lower than 15° C.; limited/poor physical storage stability apart from adding to the complexity of commercializing such a powder due to special requirements for storage, it is generally undesirable by the paint manufacturer and the end user alike, since limited/poor physical storage stability of powder paints results to block or sinter during storage and/or producing an aesthetically undesirable orange peel finish when cured.

The complexity of the task to develop thermosetting powder coating compositions having high physical storage stability and at the same time said thermosetting powder coating compositions being able to produce upon heat-curing at low temperatures powder coatings having enhanced, preferably significantly enhanced chemical resistance becomes ever more complex once one wishes to also enhance the speed of heat-curing at low temperatures. The faster the heat-curing of a thermosetting powder coating composition at a low temperature, that is the shorter the time a thermosetting powder coating composition requires to produce a powder coating having an acceptable chemical resistance upon said composition been heat-cured at low temperatures, the better it is. The reason being a thermosetting powder coating composition which can heat-cure fast at low temperatures offers to the powder coating applicator fast turn-around time due to the fact that he can handle the coated articles at significant shorter times after coating the articles without risking damaging their coated surfaces and at the same time offers him the opportunity to also coat heat-sensitive articles apart from non-heat-sensitive articles. The complexity of this task becomes even more complex once one wishes that said thermosetting powder coating composition is able to produce upon fast heat-cure at low temperatures powder coatings which have sufficient smoothness. The smoothness concerns the finish of a powder coating and it is particularly important for the aesthetic attractiveness of a powder coated article for the end-consumer.

In recent years, heat curable powder coating compositions that can be cured at low temperatures were proposed in WO 2010/052290, WO 2010/052291, WO 2010/052293, WO 2011/138431, WO 2011/138432, WO 2014/173861, and WO 2015/075186. However, none of those disclosures was able to provide for heat curable thermosetting powder coating compositions which would be able to heat-cure fast at low temperature (as this is defined herein) and none of those disclosures was able to provide for heat curable thermosetting powder coating compositions that upon heat-curing at low temperature would be able to produce powder coatings having at least good, preferably very good, more preferably excellent chemical resistance.

It would thus, be desirable and is, therefore, the primary object of the invention to provide heat curable thermosetting powder coating compositions which are able to heat-cure fast at low temperature and said heat curable thermosetting powder coating compositions upon heat-curing at low temperature are able to produce powder coatings having at least good, preferably very good, more preferably excellent chemical resistance. It would be further desirable and is, therefore another object of the invention to provide heat curable thermosetting powder coating compositions which are able to heat-cure fast at low temperature, have very good physical storage stability and said heat curable thermosetting powder coating compositions upon heat-curing at low temperature are able to produce powder coatings having at least good, preferably very good, more preferably excellent chemical resistance. It would be further desirable and is, therefore a further object of the invention to provide heat curable thermosetting powder coating compositions which are able to heat-cure fast at low temperature, have very good physical storage stability, and said heat curable thermosetting powder coating compositions upon heat-curing at low temperature are able to produce powder coatings having: i) at least good, preferably very good, more preferably excellent chemical resistance, and ii) at least sufficient smoothness.

Therefore, broadly in accordance with the invention there is provided a thermosetting powder coating composition as disclosed herein and as described in the claims. More particularly, the invention is as disclosed herein and as described in the claims.

It was surprisingly found that the thermosetting powder coating composition (TPCC) of the invention are heat curable and are able to heat-cure fast at low temperature and said heat curable thermosetting powder coating compositions upon heat-curing at low temperature are able to produce powder coatings having at least good, preferably very good, more preferably excellent chemical resistance. Thus, the TPCC of the invention meet the primary object of the invention. Preferably, the TPCC of the invention are able to heat-cure fast at low temperature, have very good physical storage stability and said heat curable thermosetting powder coating compositions upon heat-curing at low temperature are able to produce powder coatings having at least good, preferably very good, more preferably excellent chemical resistance. More preferably, the TPCC of the invention are able to heat-cure fast at low temperature, have very good physical storage stability, and said heat curable thermosetting powder coating compositions upon heat-curing at low temperature are able to produce powder coatings having: i) at least good, preferably very good, more preferably excellent chemical resistance, and ii) at least sufficient smoothness. Most preferably the TPCC of the invention are able to heat-cure fast at low temperature, have very good physical storage stability, and said heat curable thermosetting powder coating compositions upon heat-curing at low temperature are able to produce powder coatings having: i) at least good, preferably very good, more preferably excellent chemical resistance, and ii) at least sufficient smoothness; and said heat curable thermosetting powder coating compositions may be also able to heat-cure at very low temperature and upon heat-curing at very low temperature are able to produce powder coatings having: i) at least sufficient, preferably good, more preferably very good, most preferably excellent chemical resistance.

Hence, broadly in accordance with the invention, there is provided a thermosetting powder coating composition as described in the claims and as disclosed herein.

Broadly in accordance with the invention, there is provided a cured composition as described in the claims and as disclosed herein.

Broadly in accordance with the invention, there is provided an article as described in the claims and as disclosed herein.

Broadly in accordance with the invention, there are provided various uses as described in the claims and as disclosed herein.

P1a More particularly broadly in accordance with the invention there is provided a thermosetting powder coating composition comprising the following components A to D:

A: one or more unsaturated resins comprising ethylenic unsaturations (UR) selected from the group consisting of polyester resins, acrylic resins, polyurethanes, epoxy resins, polyamides, polyesteramides, polycarbonates, polyureas and mixtures thereof, and B: one or more curing agents selected from the group consisting of vinyl urethanes, vinyl functionalized urethane resins and mixtures thereof, wherein at least one curing agent is curing agent A which is selected from the group consisting of i), ii) and iii):
  i) one or more crystalline VU-c each of which is a crystalline vinyl urethane having a melting enthalpy $\Delta H_m \geq 35$ J/g, and one or more melting temperatures ($T_m$) wherein any and all of the $T_m$ of the one or more crystalline VU-c are in the region of from and including 30 up to and including 80° C., and
  ii) one or more crystalline VFUR-c each of which is a crystalline vinyl functionalized urethane resin having a melting enthalpy $\Delta H_m \geq 35$ J/g, and one or more melting temperatures ($T_m$) wherein any and all of the $T_m$ of the one or more crystalline VFUR-c are in the region of from and including 30 up to and including 80° C., and
  iii) mixtures of crystalline VU-c and crystalline VFUR-c, wherein the $\Delta H_m$ and $T_m$ is each measured via Differential Scanning calorimetry (DSC) according to the description, and C: one or more thermal radical initiators, wherein at least one thermal radical initiator is dilauroyl peroxide and wherein the dilauroyl peroxide is present in an amount of at least 30 and at most 190 mmol/Kg A and B, and D: one or more co-initiators selected is selected from the group consisting of onium compounds, sulpho-compounds, and mixtures thereof, and wherein the total amount of component D is at least 10 and at most 300 mmol/Kg A and B.

P1b More specifically broadly in accordance with the invention there is provided a thermosetting powder coating composition according to claim 1.

Certain dependent exemplary preferments of the thermosetting powder coating composition according to P1a, P1b, as well as certain further aspects of the invention of the thermosetting powder coating composition according to P1a, P1b, and their preferments include but are not limited to preferments P1 to P101 and aspects A1 to A7, shown below. Many other variations, combinations and embodiments of the invention will be apparent to those skilled in the art and such variations, combinations and embodiments are contemplated within the scope of the claimed invention. The antecedent basis for certain terms shown in the preferments can be found in preceding preferments and/or in any one of P1a and P1b. Any reference to components includes their preferments and preferred ranges as disclosed in the entire application.

P1 The thermosetting powder coating composition according to any one of P1a and P1b, wherein B is present in an amount of at least 4 and at most 90, more preferably in an amount of at least 10 and at most 85, even more preferably in an amount of at least 15 and at most 60, most preferably in an amount of at least 15 and at most 55, especially in an amount of at least 16 and at most 55 pph of A and B.

P2 The thermosetting powder coating composition according to any one of P1a and P1b, or to preferment P1, wherein the curing agent A is present in an amount of at least 5, more preferably at least 10, even more preferably at least 20, most preferably at least 30, especially at least 40, more especially at least 50, most especially at least 60, for example at least 70, for example at least 80, for example at least 90, for example at least 94, for example at least 95, for example at least 96, for example at least 97, for example at least 98, for example at least 99, for example at least 99.1, for example at least 99.2, for example at least 99.3, for example at least 99.4, for example at least 99.5, for example at least 99.6, for example at least 99.7, for example at least 99.8, for example at least 99.9, for example 100 pph of B.

P3 The thermosetting powder coating composition according to any one of P1a and P1b, or to any one of the preferments P1 to P2, wherein B: one or more curing agents selected from the group consisting of vinyl urethanes, vinyl functionalized urethane resins and mixtures thereof, wherein any and all of the curing agents is curing agent A as curing agent A is disclosed in any one of P1a and P1b, or in any one of sections 1.2, 1.2.1 and 1.2.2, including any preferred range and combinations of said preferred ranges.

P4 The thermosetting powder coating composition according to any one of P1a and P1b, or to any one of the preferments P1 to P2, wherein B: one or more curing agents A as curing agent A is disclosed in any one of P1a and P1b, or in any one of sections 1.2, 1.2.1 and 1.2.2, including any preferred range and combinations of said preferred ranges.

P5 The thermosetting powder coating composition according to any one of P1a and P1b, or to any one of the preferments P1 to P4, wherein the thermosetting powder coating composition has a ratio K which is at least 0.3 and at most 9, more preferably at least 0.5 and at most 4, most preferably at least 0.6 and at most 3, especially at least 0.8 and at most 2.8, more especially at least 0.9 and at most 2.6, most especially at least 0.95 and at most 2.5, for example at least 0.95 and at most 3, for example at least 0.8 and at most 2.5, wherein the ratio K is a ratio of the total mol of the ethylenic unsaturations in component B ($Mol_B$) divided by the total mol of the ethylenic unsaturations in component A ($Mol_A$).

P6 The thermosetting powder coating composition according to any one of P1a and P1b, or to any one of the preferments P1 to P5, wherein the total amount of component D is at least 10 and at most 200, more preferably at least 10 and at most 150, even more preferably at least 12 and at most 300, most preferably at least 12 and at most 200, especially at least 12 and at most 150 mmol/Kg A and B.

P7 The thermosetting powder coating composition according to any one of P1a and P1b, or to any one of the preferments P1 to P6, wherein D: one or more co-initiators selected from the group consisting of onium compounds, sulpho compounds, and mixtures thereof, and wherein the total amount of component D is as disclosed in section 1.4 including any preferred range and combinations of said preferred ranges.

P8 The thermosetting powder coating composition according to any one of P1a and P1b, or to any one of the preferments P1 to P6, wherein
D: one or more co-initiators selected from the group consisting of onium compounds, sulpho compounds, and mixtures thereof, wherein the onium compounds are selected from any group consisting of preferments disclosed in section 1.4 and/or 1.4.1 concerning the onium compounds, and the sulpho compounds are selected from any group consisting of preferments disclosed in section 1.4 and/or 1.4.2 concerning the sulpho compounds.

P9 The thermosetting powder coating composition according to any one of P1a and P1b, or to any one of the preferments P1 to P6, wherein
D: one or more co-initiators selected from the group consisting of onium compounds, sulpho compounds, and mixtures thereof, wherein the onium compounds are selected from any group consisting of preferments disclosed in section 1.4 and/or 1.4.1 concerning the onium compounds, and the sulpho compounds are selected from any group consisting of preferments disclosed in section 1.4 and/or 1.4.2 concerning the sulpho compounds, and wherein the total amount of component D is as disclosed in section 1.4 including any preferred range and combinations of said preferred ranges.

P10 The thermosetting powder coating composition according to any one of P1a and P1b, or to any one of the preferments P1 to P6, wherein
D: one or more co-initiators selected from the group consisting of onium compounds, sulpho-compounds, and mixtures thereof, wherein the onium compounds are selected from the group consisting of compounds represented by formula I-X, compounds represented by formula II-X, compounds represented by formula III-X, compounds represented by formula IV-X, compounds represented by formula V-X, compounds represented by formula VI-X, compounds represented by formula VII-X, compounds represented by formula VIII-X, and compounds represented by formula IX-X; and wherein the sulpho-compounds are selected from the group consisting of sulpho-compound-1, sulpho-compound-2, sulpho-compound-3, sulpho-compound-4 and sulpho-compound-5.

P11 The thermosetting powder coating composition according to any one of P1a and P1b, or to any one of the preferments P1 to P6, wherein
D: one or more co-initiators selected from the group consisting of onium compounds, sulpho-compounds, and mixtures thereof, wherein the onium compounds are selected from the group consisting of compounds represented by formula I-X, compounds represented by formula II-X, compounds represented by formula III-X, compounds represented by formula IV-X, compounds represented by formula V-X, compounds represented by formula VI-X, compounds represented by formula VII-X, compounds represented by formula VIII-X, and compounds represented by formula IX-X; and wherein the sulpho-compounds are selected from the group consisting of sulpho-compound-1, sulpho-compound-2, sulpho-compound-3, and sulpho-compound-5.

P12 The thermosetting powder coating composition according to any one of P1a and P1b, or to any one of the preferments P1 to P6, wherein
D: one or more co-initiators selected from the group consisting of onium compounds, sulpho-compounds, and mixtures thereof, wherein the onium compounds are selected from the group consisting of compounds represented by formula I-X, compounds represented by formula II-X, compounds represented by formula III-X, compounds represented by formula IV-X, compounds represented by formula V-X, compounds represented by formula VI-X, compounds represented by formula VII-X, compounds represented by formula VIII-X, and compounds represented by formula IX-X; and wherein the sulpho-compounds are selected from the group consisting of sulpho-compound-1, sulpho-compound-2, and sulpho-compound-3.

P13 The thermosetting powder coating composition according to any one of P1a and P1b, or to any one of the preferments P1 to P6, wherein
D: one or more co-initiators selected from the group consisting of onium compounds, sulpho-compounds, and mixtures thereof, wherein the onium compounds are selected from the group consisting of compounds represented by formula I-X, compounds represented by formula II-X, compounds represented by formula III-X, compounds represented by formula IV-X, compounds represented by formula V-X, compounds represented by formula VI-X, compounds represented by formula VII-X, compounds represented by formula VIII-X, and compounds represented by formula IX-X; and wherein the sulpho-compounds are selected from the group consisting of sulpho-compound-2, and sulpho-compound-3.

P14 The thermosetting powder coating composition according to any one of P1a and P1b, or to any one of the preferments P1 to P6, wherein
D: one or more co-initiators selected from the group consisting of onium compounds, sulpho-compounds, and mixtures thereof, wherein the onium compounds are selected from the group consisting of compounds represented by formula I-X, compounds represented by formula II-X, compounds represented by formula III-X, compounds represented by formula IV-X, compounds represented by formula V-X, compounds represented by formula VI-X, compounds represented by formula VII-X, compounds represented by formula VIII-X, and compounds represented by formula IX-X; and wherein the sulpho-compounds are selected from the group consisting of sulpho-compound-3.

P15 The thermosetting powder coating composition according to any one of P1a and P1b, or to any one of the preferments P1 to P6, wherein
D: one or more co-initiators selected from the group consisting of onium compounds, sulpho-compounds, and mixtures thereof, wherein the onium compounds are selected from the group consisting of compounds represented by formula I-X, compounds represented by formula II-X, compounds represented by formula III-X, compounds represented by formula IV-X, compounds represented by formula V-X, compounds represented by formula VI-X, compounds represented by formula VII-X, and compounds represented by formula VIII-X; and wherein the sulpho-compounds are selected from the group consisting of sulpho-compound-1, sulpho-compound-2, sulpho-compound-3, sulpho-compound-4, and sulpho-compound-5.

P16 The thermosetting powder coating composition according to any one of P1a and P1b, or to any one of the preferments P1 to P6, wherein
D: one or more co-initiators selected from the group consisting of onium compounds, sulpho-compounds, and mixtures thereof, wherein the onium compounds are selected from the group consisting of compounds represented by formula I-X, compounds represented by formula II-X, compounds represented by formula III-X, compounds represented by formula IV-X, compounds represented by formula V-X, compounds represented by formula VI-X, and compounds represented by formula VII-X; and wherein the sulpho-compounds are selected from the group consisting of sulpho-compound-1, sulpho-compound-2, sulpho-compound-3, sulpho-compound-4, and sulpho-compound-5.

P17 The thermosetting powder coating composition according to any one of P1a and P1b, or to any one of the preferments P1 to P6, wherein
D: one or more co-initiators selected from the group consisting of onium compounds, sulpho-compounds, and mixtures thereof, wherein the onium compounds are selected from the group consisting of compounds represented by formula I-X, compounds represented by formula II-X, compounds represented by formula III-X, compounds represented by formula V-X, compounds represented by formula VI-X, and compounds represented by formula VII-X; and wherein the sulpho-compounds are selected from the group consisting of sulpho-compound-1, sulpho-compound-2, sulpho-compound-3, sulpho-compound-4, and sulpho-compound-5.

P18 The thermosetting powder coating composition according to any one of P1a and P1b, or to any one of the preferments P1 to P6, wherein
D: one or more co-initiators selected from the group consisting of onium compounds, sulpho-compounds, and mixtures thereof, wherein the onium compounds are selected from the group consisting of compounds represented by formula I-X, compounds represented by formula II-X, compounds represented by formula V-X, compounds represented by formula VI-X, and compounds represented by formula VII-X; and wherein the sulpho-compounds are selected from the group consisting of sulpho-compound-1, sulpho-compound-2, sulpho-compound-3, sulpho-compound-4 and sulpho-compound-5.

P19 The thermosetting powder coating composition according to any one of P1a and P1b, or to any one of the preferments P1 to P6, wherein
D: one or more co-initiators selected from the group consisting of onium compounds, sulpho-compounds, and mixtures thereof, wherein the onium compounds are selected from the group consisting of compounds represented by formula I-X, compounds represented by formula II-X, compounds represented by formula V-X, compounds represented by formula VI-X; and wherein the sulpho-compounds are selected from the group consisting of sulpho-compound-1, sulpho-compound-2, sulpho-compound-3, sulpho-compound-4 and sulpho-compound-5.

P20 The thermosetting powder coating composition according to any one of P1a and P1b, or to any one of the preferments P1 to P6, wherein
D: one or more co-initiators selected from the group consisting of onium compounds, sulpho-compounds, and mixtures thereof, wherein the onium compounds are selected from the group consisting of compounds represented by formula I-X, compounds represented by formula II-X, compounds represented by formula V-X; and wherein the sulpho-compounds are selected from the group consisting of sulpho-compound-1, sulpho-compound-2, sulpho-compound-3, sulpho-compound-4 and sulpho-compound-5.

P21 The thermosetting powder coating composition according to any one of P1a and P1b, or to any one of the preferments P1 to P6, wherein
D: one or more co-initiators selected from the group consisting of onium compounds, sulpho-compounds, and mixtures thereof, wherein the onium compounds are selected from the group consisting of compounds represented by formula I-X, compounds represented by formula II-X; and wherein the sulpho-compounds are selected from the group consisting of sulpho-compound-1, sulpho-compound-2, sulpho-compound-3, sulpho-compound-4 and sulpho-compound-5.

P22 The thermosetting powder coating composition according to any one of P1a and P1b, or to any one of the preferments P1 to P6, wherein
D: one or more co-initiators selected from the group consisting of onium compounds, sulpho-compounds, and mixtures thereof, wherein the onium compounds are selected from the group consisting of compounds represented by formula II-X; and wherein the sulpho-compounds are selected from the group consisting of sulpho-compound-1, sulpho-compound-2, sulpho-compound-3, sulpho-compound-4 and sulpho-compound-5.

P23 The thermosetting powder coating composition according to any one of P1a and P1b, or to any one of the preferments P1 to P6, wherein
D: one or more co-initiators selected from the group consisting of onium compounds, sulpho-compounds, and mixtures thereof, wherein the onium compounds are selected from the group consisting of compounds represented by formula II-X; and wherein the sulpho-compounds are selected from the group consisting of sulpho-compound-1, sulpho-compound-2, sulpho-compound-3, and sulpho-compound-5.

P24 The thermosetting powder coating composition according to any one of P1a and P1b, or to any one of the preferments P1 to P6, wherein
D: one or more co-initiators selected from the group consisting of onium compounds, sulpho-compounds, and mixtures thereof, wherein the onium compounds are selected from the group consisting of compounds represented by formula I-X, and compounds represented by formula II-X; and wherein the sulpho-compounds are selected from the group consisting of sulpho-compound-1, sulpho-compound-2, and sulpho-compound-3.

P25 The thermosetting powder coating composition according to any one of P1a and P1b, or to any one of the preferments P1 to P6, wherein
D: one or more co-initiators selected from the group consisting of onium compounds, sulpho-compounds, and mixtures thereof, wherein the onium compounds are selected from the group consisting of compounds represented by formula I-X, and compounds represented by formula II-X; and wherein the sulpho-compounds are selected from the group consisting of sulpho-compound-2, and sulpho-compound-3.

P26 The thermosetting powder coating composition according to any one of P1a and P1b, or to any one of the preferments P1 to P6, wherein
D: one or more co-initiators selected from the group consisting of onium compounds, sulpho-compounds, and mixtures thereof, wherein the onium compounds are selected from the group consisting of compounds represented by formula I-X, and compounds represented by formula II-X; and wherein the sulpho-compounds are selected from the group consisting of sulpho-compound-3.

P27 The thermosetting powder coating composition according to any one of P1a and P1b, or to any one of the preferments P1 to P6, wherein
D: one or more co-initiators selected from the group consisting of onium compounds, sulpho-compounds, and mixtures thereof, wherein the onium compounds are selected from the group consisting of compounds represented by formula I-X; and compounds represented by formula II-X.

P28 The thermosetting powder coating composition according to any one of P1a and P1b, or to any one of the preferments P1 to P6, wherein
D: one or more co-initiators selected from the group consisting of onium compounds wherein the onium compounds are selected from the group consisting of compounds represented by formula II-X.

P29 The thermosetting powder coating composition according to any one of P1a and P1b, or to any one of the preferments P1 to P6, wherein
D: one or more co-initiators selected from the group consisting of onium compounds, sulpho-compounds, and mixtures thereof, wherein the onium compounds are selected from the group consisting of compounds represented by formula I-X and compounds represented by formula II-X and wherein the A⁻ in formulae I-X and II-X is selected from the group consisting of halide anions, perhalide anions, phosphate anions, arsenate anions, antimonite anions, sulphonate anions, and borate anions.

P30 The thermosetting powder coating composition according to any one of P1a and P1b, or to any one of the preferments P1 to P6, wherein
D: one or more co-initiators selected from the group consisting of onium compounds, sulpho-compounds, and mixtures thereof, wherein the onium compounds are selected from the group consisting of compounds represented by formula I-X and compounds represented by formula II-X and wherein the A⁻ in formulae I-X and II-X is selected from the group of halide anions, perhalide anions, phosphate anions, sulphonate anions, and borate anions.

P31 The thermosetting powder coating composition according to any one of P1a and P1b, or to any one of the preferments P1 to P6, wherein
D: one or more co-initiators selected from the group consisting of onium compounds, sulpho-compounds, and mixtures thereof, wherein the onium compounds are selected from the group consisting of compounds represented by formula I-X and compounds represented by formula II-X and wherein the A⁻ in formulae I-X and II-X is selected from the group of halide anions.

P32 The thermosetting powder coating composition according to any one of P1a and P1b, or to any one of the preferments P1 to P6, wherein
D: one or more co-initiators selected from the group consisting of bis(4-dodecylphenyl)iodonium hexafluorophosphate, bis(4-dodecylphenyl)iodonium chloride, bis(4-dodecylphenyl)iodonium iodide, bis(4-dodecylphenyl)iodonium p-toluene sulphate, bis(4-tert-butylphenyl)iodonium hexafluorophosphate, bis(4-tert-butylphenyl)iodonium chloride, bis(4-tert-butylphenyl)iodonium iodide, bis(4-tert-butylphenyl)iodonium p-toluene sulphate, (4-methylphenyl)(4-(2-methylpropyl)phenyl)iodonium hexafluorophosphate, (4-methylphenyl)(4-(2-methylpropyl)phenyl)iodonium chloride, (4-methylphenyl)(4-(2-methylpropyl)phenyl)iodonium iodide, (4-methylphenyl)(4-(2-methylpropyl)phenyl)iodonium p-toluene sulphate, diphenyliodonium chloride, diphenyliodonium hexafluorophosphate, diphenyliodonium iodide, diphenyliodonium p-toluene sulphate, N-benzylpyridinium hexafluorophosphate, N-ethoxy-2-methylpyridinium hexafluorophosphate, diethyl(2-oxo-2-phenylethyl)sulfonium hexafluorophosphate, diphenyl(p-tolyl)sulfonium 4-methylbenzenesulfonate, triphenylsulfonium trifluoromethanesulfonate, tri(4-((4-acetylphenyl)thio)phenyl)sulfonium, tetrakis(perfluorophnyl)borate, methyl(diphenyl)sulfonium tetrafluoroborate, triethylsulfonium tetrafluoroborate, 2-(((tert-butylsulfonyl)(diazo)methyl)sulfonyl)-2-methyl-propane, tert-butyl 4-methylbenzenesulfonate, 2-isopropyl-5-methylcyclohexyl 4-methylbenzenesulfonate, 2-methyl-2-[(4-methylphenyl)sulfonyl]-1-[4-(methylthio)phenyl]-1-propanone, pentan-3-one O-tosyl oxime, (E)-3,4-dihydronaphthalen-1(2H)-one O-((4-chlorophenyl)sulfonyl) oxime and mixtures thereof.

P33 The thermosetting powder coating composition according to any one of P1a and P1b, or to any one of the preferments P1 to P6, wherein
D: one or more co-initiators selected from the group consisting of bis(4-dodecylphenyl)iodonium hexafluorophosphate, bis(4-dodecylphenyl)iodonium chloride, bis(4-dodecylphenyl)iodonium iodide, bis(4-dodecylphenyl)iodonium p-toluene sulphate, bis(4-tert-butylphenyl)iodonium hexafluorophosphate, bis(4-tert-butylphenyl)iodonium chloride, bis(4-tert-butylphenyl)iodonium iodide, bis(4-tert-butylphenyl)iodonium p-toluene sulphate, (4-methylphenyl)(4-(2-methylpropyl)phenyl)iodonium hexafluorophosphate, (4-methylphenyl)(4-(2-methylpropyl)phenyl)iodonium chloride, (4-methylphenyl)(4-(2-methylpropyl)phenyl)iodonium iodide, (4-methylphenyl)(4-(2-methylpropyl)phenyl)iodonium p-toluene sulphate, diphenyliodonium chloride, diphenyliodonium hexafluorophosphate, diphenyliodonium iodide, diphenyliodonium p-toluene sulphate, N-benzylpyridinium hexafluorophosphate, N-ethoxy-2-methylpyridinium hexafluorophosphate, diethyl(2-oxo-2-phenylethyl)sulfonium hexafluorophosphate, diphenyl(p-tolyl)sulfonium 4-methylbenzenesulfonate, triphenylsulfonium trifluoromethanesulfonate, tri(4-((4-acetylphenyl)thio)phenyl)sulfonium, tetrakis(perfluorophnyl)borate, methyl(diphenyl)sulfonium tetrafluoroborate, triethylsulfonium tetrafluoroborate, 2-(((tert-butylsulfonyl)(diazo)methyl)sulfonyl)-2-methyl-propane, tert-butyl 4-methylbenzenesulfonate, 2-isopropyl-5-methylcyclohexyl 4-methylbenzenesulfonate, 2-methyl-2-[(4-methylphenyl)sulfonyl]-1-[4-(methylthio)phenyl]-1-propanone, (E)-3,4-dihydronaphthalen-1(2H)-one O-((4-chlorophenyl)sulfonyl) oxime and mixtures thereof.

P34 The thermosetting powder coating composition according to any one of P1a and P1b, or to any one of the preferments P1 to P6, wherein
D: one or more co-initiators selected from the group consisting of bis(4-dodecylphenyl)iodonium hexafluorophosphate, bis(4-dodecylphenyl)iodonium chloride, bis(4-dodecylphenyl)iodonium iodide, bis(4-dodecylphenyl)iodonium p-toluene sulphate, bis(4-tert-butylphenyl)iodonium hexafluorophosphate, bis(4-tert-butylphenyl)iodonium chloride, bis(4-tert-butylphenyl)iodonium iodide, bis(4-tert-butylphenyl)iodonium p-toluene sulphate, (4-methylphenyl)(4-(2-methylpropyl)phenyl)iodonium hexafluorophosphate, (4-methylphenyl)(4-(2-methylpropyl)phenyl)iodonium chloride, (4-methylphenyl)(4-(2-methylpropyl)phenyl)iodonium iodide, (4-methylphenyl)(4-(2-methylpropyl)phenyl)iodonium p-toluene sulphate, diphenyliodonium chloride, diphenyliodonium hexafluorophosphate, diphenyliodonium iodide, diphenyliodonium p-toluene sulphate, N-benzylpyridinium hexafluorophosphate, N-ethoxy-2-methylpyridinium hexafluorophosphate, diethyl(2-oxo-2-phenylethyl)sulfonium hexafluorophosphate, diphenyl(p-tolyl)sulfonium 4-methylbenzenesulfonate, triphenylsulfonium trifluoromethanesulfonate, tri(4-((4-acetylphenyl)thio)phenyl)sulfonium, tetrakis(perfluorophnyl)borate, methyl(diphenyl)sulfonium tetrafluoroborate, triethylsulfonium tetrafluoroborate, 2-(((tert-butylsulfonyl)(diazo)methyl)sulfonyl)-2-methyl-propane, tert-butyl 4-methylbenzenesulfonate, 2-isopropyl-5-methylcyclohexyl 4-methylbenzenesulfonate, 2-methyl-2-

[(4-methylphenyl)sulfonyl]-1-[4-(methylthio)phenyl]-1-propanone, and mixtures thereof.

P35 The thermosetting powder coating composition according to any one of P1a and P1b, or to any one of the preferments P1 to P6, wherein
D: one or more co-initiators selected from the group consisting of bis(4-dodecylphenyl)iodonium hexafluorophosphate, bis(4-dodecylphenyl)iodonium chloride, bis(4-dodecylphenyl)iodonium iodide, bis(4-dodecylphenyl)iodonium p-toluene sulphate, bis(4-tert-butylphenyl)iodonium hexafluorophosphate, bis(4-tert-butylphenyl)iodonium chloride, bis(4-tert-butylphenyl)iodonium iodide, bis(4-tert-butylphenyl)iodonium p-toluene sulphate, (4-methylphenyl)(4-(2-methylpropyl)phenyl)iodonium hexafluorophosphate, (4-methylphenyl)(4-(2-methylpropyl)phenyl)iodonium chloride, (4-methylphenyl)(4-(2-methylpropyl)phenyl)iodonium iodide, (4-methylphenyl)(4-(2-methylpropyl)phenyl)iodonium p-toluene sulphate, diphenyliodonium chloride, diphenyliodonium hexafluorphosphate, diphenyliodonium iodide, diphenyliodonium p-toluene sulphate, N-benzylpyridinium hexafluorophosphate, N-ethoxy-2-methylpyridinium hexafluorophosphate, diethyl(2-oxo-2-phenylethyl)sulfonium hexafluorophosphate, diphenyl(p-tolyl)sulfonium 4-methylbenzenesulfonate, triphenylsulfonium trifluoromethanesulfonate, tri(4-((4-acetylphenyl)thio)phenyl)sulfonium, tetrakis(perfluorophnyl)borate, methyl(diphenyl)sulfonium tetrafluoroborate, 2-(((tert-butylsulfonyl)(diazo)methyl)sulfonyl)-2-methylpropane, tert-butyl 4-methylbenzenesulfonate, 2-isopropyl-5-methylcyclohexyl 4-methylbenzenesulfonate, 2-methyl-2-[(4-methylphenyl)sulfonyl]-1-[4-(methylthio)phenyl]-1-propanone, and mixtures thereof.

P36 The thermosetting powder coating composition according to any one of P1a and P1b, or to any one of the preferments P1 to P6, wherein
D: one or more co-initiators selected from the group consisting of bis(4-dodecylphenyl)iodonium hexafluorophosphate, bis(4-dodecylphenyl)iodonium chloride, bis(4-dodecylphenyl)iodonium iodide, bis(4-dodecylphenyl)iodonium p-toluene sulphate, bis(4-tert-butylphenyl)iodonium hexafluorophosphate, bis(4-tert-butylphenyl)iodonium chloride, bis(4-tert-butylphenyl)iodonium iodide, bis(4-tert-butylphenyl)iodonium p-toluene sulphate, (4-methylphenyl)(4-(2-methylpropyl)phenyl)iodonium hexafluorophosphate, (4-methylphenyl)(4-(2-methylpropyl)phenyl)iodonium chloride, (4-methylphenyl)(4-(2-methylpropyl)phenyl)iodonium iodide, (4-methylphenyl)(4-(2-methylpropyl)phenyl)iodonium p-toluene sulphate, diphenyliodonium chloride, diphenyliodonium hexafluorphosphate, diphenyliodonium iodide, diphenyliodonium p-toluene sulphate, N-benzylpyridinium hexafluorophosphate, N-ethoxy-2-methylpyridinium hexafluorophosphate, diethyl(2-oxo-2-phenylethyl)sulfonium hexafluorophosphate, diphenyl(p-tolyl)sulfonium 4-methylbenzenesulfonate, triphenylsulfonium trifluoromethanesulfonate, tri(4-((4-acetylphenyl)thio)phenyl)sulfonium, tetrakis(perfluorophnyl)borate, 2-(((tert-butylsulfonyl)(diazo)methyl)sulfonyl)-2-methylpropane, tert-butyl 4-methylbenzenesulfonate, 2-isopropyl-5-methylcyclohexyl 4-methylbenzenesulfonate, 2-methyl-2-[(4-methylphenyl)sulfonyl]-1-[4-(methylthio)phenyl]-1-propanone, and mixtures thereof.

P37 The thermosetting powder coating composition according to any one of P1a and P1b, or to any one of the preferments P1 to P6, wherein
D: one or more co-initiators selected from the group consisting of bis(4-dodecylphenyl)iodonium hexafluorophosphate, bis(4-dodecylphenyl)iodonium chloride, bis(4-dodecylphenyl)iodonium iodide, bis(4-dodecylphenyl)iodonium p-toluene sulphate, bis(4-tert-butylphenyl)iodonium hexafluorophosphate, bis(4-tert-butylphenyl)iodonium chloride, bis(4-tert-butylphenyl)iodonium iodide, bis(4-tert-butylphenyl)iodonium p-toluene sulphate, (4-methylphenyl)(4-(2-methylpropyl)phenyl)iodonium hexafluorophosphate, (4-methylphenyl)(4-(2-methylpropyl)phenyl)iodonium chloride, (4-methylphenyl)(4-(2-methylpropyl)phenyl)iodonium iodide, (4-methylphenyl)(4-(2-methylpropyl)phenyl)iodonium p-toluene sulphate, diphenyliodonium chloride, diphenyliodonium hexafluorphosphate, diphenyliodonium iodide, diphenyliodonium p-toluene sulphate, N-ethoxy-2-methylpyridinium hexafluorophosphate, diethyl(2-oxo-2-phenylethyl)sulfonium hexafluorophosphate, diphenyl(p-tolyl)sulfonium 4-methylbenzenesulfonate, triphenylsulfonium trifluoromethanesulfonate, tri(4-((4-acetylphenyl)thio)phenyl)sulfonium, tetrakis(perfluorophnyl)borate, 2-(((tert-butylsulfonyl)(diazo)methyl)sulfonyl)-2-methylpropane, tert-butyl 4-methylbenzenesulfonate, 2-isopropyl-5-methylcyclohexyl 4-methylbenzenesulfonate, 2-methyl-2-[(4-methylphenyl)sulfonyl]-1-[4-(methylthio)phenyl]-1-propanone, and mixtures thereof.

P38 The thermosetting powder coating composition according to any one of P1a and P1b, or to any one of the preferments P1 to P6, wherein
D: one or more co-initiators selected from the group consisting of bis(4-dodecylphenyl)iodonium hexafluorophosphate, bis(4-dodecylphenyl)iodonium chloride, bis(4-dodecylphenyl)iodonium iodide, bis(4-dodecylphenyl)iodonium p-toluene sulphate, bis(4-tert-butylphenyl)iodonium hexafluorophosphate, bis(4-tert-butylphenyl)iodonium chloride, bis(4-tert-butylphenyl)iodonium iodide, bis(4-tert-butylphenyl)iodonium p-toluene sulphate, (4-methylphenyl)(4-(2-methylpropyl)phenyl)iodonium hexafluorophosphate, (4-methylphenyl)(4-(2-methylpropyl)phenyl)iodonium chloride, (4-methylphenyl)(4-(2-methylpropyl)phenyl)iodonium iodide, (4-methylphenyl)(4-(2-methylpropyl)phenyl)iodonium p-toluene sulphate, diphenyliodonium chloride, diphenyliodonium hexafluorphosphate, diphenyliodonium iodide, diphenyliodonium p-toluene sulphate, diethyl(2-oxo-2-phenylethyl)sulfonium hexafluorophosphate, diphenyl(p-tolyl)sulfonium 4-methylbenzenesulfonate, triphenylsulfonium trifluoromethanesulfonate, tri(4-((4-acetylphenyl)thio)phenyl)sulfonium, tetrakis(perfluorophnyl)borate, 2-(((tert-butylsulfonyl)(diazo)methyl)sulfonyl)-2-methylpropane, tert-butyl 4-methylbenzenesulfonate, 2-isopropyl-5-methylcyclohexyl 4-methylbenzenesulfonate, 2-methyl-2-[(4-methylphenyl)sulfonyl]-1-[4-(methylthio)phenyl]-1-propanone, and mixtures thereof.

P39 The thermosetting powder coating composition according to any one of P1a and P1b, or to any one of the preferments P1 to P6, wherein
D: one or more co-initiators selected from the group consisting of bis(4-dodecylphenyl)iodonium hexafluorophosphate, bis(4-dodecylphenyl)iodonium chloride, bis(4-dodecylphenyl)iodonium iodide, bis(4-dodecylphenyl)iodonium p-toluene sulphate, bis(4-tert-butylphenyl)iodonium hexafluorophosphate, bis(4-tert-butylphenyl)iodonium chloride, bis(4-tert-butylphenyl)iodonium iodide, bis(4-tert-butylphenyl)iodonium p-toluene sulphate, (4-methylphenyl)(4-(2-methylpropyl)phenyl)iodonium hexafluorophosphate, (4-methylphenyl)(4-(2-methylpropyl)phenyl)iodonium chloride, (4-methylphenyl)(4-(2-methyl-propyl)phenyl)iodonium iodide, (4-methylphenyl)(4-(2- methylpropyl)phenyl)iodonium p-toluene sulphate, diphenyliodonium chloride, diphenyliodonium hexafluorphosphate, diphenyliodonium iodide, diphenyliodonium p-toluene sulphate, diethyl(2-oxo-2-phenylethyl)sulfonium hexafluorophosphate, diphenyl(p-tolyl)sulfonium 4-methylbenzenesulfonate, triphenylsulfonium trifluoromethanesulfonate, 2-(((tert-butylsulfonyl)(diazo)methyl)sulfonyl)-2-methylpropane, tert-butyl 4-methylbenzenesulfonate, 2-isopropyl-5-methylcyclohexyl 4-methylbenzenesulfonate, 2-methyl-2-[(4-methylphenyl)sulfonyl]-1-[4-(methylthio)phenyl]-1-propanone, and mixtures thereof.

P40 The thermosetting powder coating composition according to any one of P1a and P1b, or to any one of the preferments P1 to P6, wherein
D: one or more co-initiators selected from the group consisting of bis(4-dodecylphenyl)iodonium hexafluorophosphate, bis(4-dodecylphenyl)iodonium chloride, bis(4-dodecylphenyl)iodonium iodide, bis(4-dodecylphenyl)iodonium p-toluene sulphate, bis(4-tert-butylphenyl)iodonium hexafluorophosphate, bis(4-tert-butylphenyl)iodonium chloride, bis(4-tert-butylphenyl)iodonium iodide, bis(4-tert-butylphenyl)iodonium p-toluene sulphate, (4-methylphenyl)(4-(2-methylpropyl)phenyl)iodonium hexafluorophosphate, (4-methylphenyl)(4-(2-methylpropyl)phenyl)iodonium chloride, (4-methylphenyl)(4-(2-methylpropyl)phenyl)iodonium iodide, (4-methylphenyl)(4-(2-methylpropyl)phenyl)iodonium p-toluene sulphate, diphenyliodonium chloride, diphenyliodonium hexafluorphosphate, diphenyliodonium iodide, diphenyliodonium p-toluene sulphate, diethyl(2-oxo-2-phenylethyl)sulfonium hexafluorophosphate, diphenyl(p-tolyl)sulfonium 4-methylbenzenesulfonate, 2-(((tert-butylsulfonyl)(diazo)methyl)sulfonyl)-2-methylpropane, tert-butyl 4-methylbenzenesulfonate, 2-isopropyl-5-methylcyclohexyl 4-methylbenzenesulfonate, 2-methyl-2-[(4-methylphenyl)sulfonyl]-1-[4-(methylthio)phenyl]-1-propanone, and mixtures thereof.

P41 The thermosetting powder coating composition according to any one of P1a and P1b, or to any one of the preferments P1 to P6, wherein
D: one or more co-initiators selected from the group consisting of bis(4-dodecylphenyl)iodonium hexafluorophosphate, bis(4-dodecylphenyl)iodonium chloride, bis(4-dodecylphenyl)iodonium iodide, bis(4-dodecylphenyl)iodonium p-toluene sulphate, bis(4-tert-butylphenyl)iodonium hexafluorophosphate, bis(4-tert-butylphenyl)iodonium chloride, bis(4-tert-butylphenyl)iodonium iodide, bis(4-tert-butylphenyl)iodonium p-toluene sulphate, (4-methylphenyl)(4-(2-methylpropyl)phenyl)iodonium hexafluorophosphate, (4-methylphenyl)(4-(2-methylpropyl)phenyl)iodonium chloride, (4-methylphenyl)(4-(2-methylpropyl)phenyl)iodonium iodide, (4-methylphenyl)(4-(2-methylpropyl)phenyl)iodonium p-toluene sulphate, diphenyliodonium chloride, diphenyliodonium hexafluorphosphate, diphenyliodonium iodide, diphenyliodonium p-toluene sulphate, diethyl(2-oxo-2-phenylethyl)sulfonium hexafluorophosphate, 2-(((tert-butylsulfonyl)(diazo)methyl)sulfonyl)-2-methylpropane, tert-butyl 4-methylbenzenesulfonate, 2-isopropyl-5-methylcyclohexyl 4-methylbenzenesulfonate, 2-methyl-2-[(4-methylphenyl)sulfonyl]-1-[4-(methylthio)phenyl]-1-propanone, and mixtures thereof.

P42 The thermosetting powder coating composition according to any one of P1a and P1b, or to any one of the preferments P1 to P6, wherein
D: one or more co-initiators selected from the group consisting of bis(4-dodecylphenyl)iodonium hexafluorophosphate, bis(4-dodecylphenyl)iodonium chloride, bis(4-dodecylphenyl)iodonium iodide, bis(4-dodecylphenyl) iodonium p-toluene sulphate, bis(4-tert-butylphenyl) iodonium hexafluorophosphate, bis(4-tert-butylphenyl) iodonium chloride, bis(4-tert-butylphenyl)iodonium iodide, bis(4-tert-butylphenyl)iodonium p-toluene sulphate, (4-methylphenyl)(4-(2-methylpropyl)phenyl)iodonium hexafluorophosphate, (4-methylphenyl)(4-(2-methylpropyl)phenyl)iodonium chloride, (4-methylphenyl)(4-(2-methylpropyl)phenyl)iodonium iodide, (4-methylphenyl)(4-(2-methylpropyl)phenyl)iodonium p-toluene sulphate, diphenyliodonium chloride, diphenyliodonium hexafluorphosphate, diphenyliodonium iodide, diphenyliodonium p-toluene sulphate, 2-(((tert-butylsulfonyl)(diazo)methyl)sulfonyl)-2-methylpropane, tert-butyl 4-methylbenzenesulfonate, 2-isopropyl-5-methylcyclohexyl 4-methylbenzenesulfonate, 2-methyl-2-[(4-methylphenyl)sulfonyl]-1-[4-(methylthio)phenyl]-1-propanone, and mixtures thereof.

P43 The thermosetting powder coating composition according to any one of P1a and P1b, or to any one of the preferments P1 to P6, wherein
D: one or more co-initiators selected from the group consisting of bis(4-dodecylphenyl)iodonium hexafluorophosphate, bis(4-dodecylphenyl)iodonium chloride, bis(4-dodecylphenyl)iodonium iodide, bis(4-dodecylphenyl) iodonium p-toluene sulphate, bis(4-tert-butylphenyl) iodonium hexafluorophosphate, bis(4-tert-butylphenyl) iodonium chloride, bis(4-tert-butylphenyl)iodonium iodide, bis(4-tert-butylphenyl)iodonium p-toluene sulphate, (4-methylphenyl)(4-(2-methylpropyl)phenyl)iodonium hexafluorophosphate, (4-methylphenyl)(4-(2-methylpropyl)phenyl)iodonium chloride, (4-methylphenyl)(4-(2-methylpropyl)phenyl)iodonium iodide, (4-methylphenyl)(4-(2-methylpropyl)phenyl)iodonium p-toluene sulphate, diphenyliodonium chloride, diphenyliodonium hexafluorphosphate, diphenyliodonium iodide, diphenyliodonium p-toluene sulphate, 2-(((tert-butylsulfonyl)(diazo)methyl)sulfonyl)-2-methylpropane, tert-butyl 4-methylbenzenesulfonate, 2-isopropyl-5-methylcyclohexyl 4-methylbenzenesulfonate, and mixtures thereof.

P44 The thermosetting powder coating composition according to any one of P1a and P1b, or to any one of the preferments P1 to P6, wherein
D: one or more co-initiators selected from the group consisting of bis(4-dodecylphenyl)iodonium hexafluorophosphate, bis(4-dodecylphenyl)iodonium chloride, bis(4-dodecylphenyl)iodonium iodide, bis(4-dodecylphenyl) iodonium p-toluene sulphate, bis(4-tert-butylphenyl) iodonium hexafluorophosphate, bis(4-tert-butylphenyl) iodonium chloride, bis(4-tert-butylphenyl)iodonium iodide, bis(4-tert-butylphenyl)iodonium p-toluene sulphate, (4-methylphenyl)(4-(2-methylpropyl)phenyl)iodonium hexafluorophosphate, (4-methylphenyl)(4-(2-methylpropyl)phenyl)iodonium chloride, (4-methylphenyl)(4-(2-methyl-propyl)phenyl)iodonium iodide, (4-methylphenyl)(4-(2-methylpropyl)phenyl)iodonium p-toluene sulphate, diphenyliodonium chloride, diphenyliodonium hexafluorphosphate, diphenyliodonium iodide, diphenyliodonium p-toluene sulphate, tert-butyl 4-methylbenzenesulfonate, 2-isopropyl-5-methylcyclohexyl 4-methylbenzenesulfonate, and mixtures thereof.

P45 The thermosetting powder coating composition according to any one of P1a and P1b, or to any one of the preferments P1 to P6, wherein
D: one or more co-initiators selected from the group consisting of bis(4-dodecylphenyl)iodonium hexafluorophosphate, bis(4-dodecylphenyl)iodonium chloride, bis(4-dodecylphenyl)iodonium iodide, bis(4-dodecylphenyl)

iodonium p-toluene sulphate, bis(4-tert-butylphenyl)iodonium hexafluorophosphate, bis(4-tert-butylphenyl)iodonium chloride, bis(4-tert-butylphenyl)iodonium iodide, bis(4-tert-butylphenyl)iodonium p-toluene sulphate, (4-methylphenyl)(4-(2-methylpropyl)phenyl)iodonium hexafluorophosphate, (4-methylphenyl)(4-(2-methylpropyl)phenyl)iodonium chloride, (4-methylphenyl)(4-(2-methylpropyl)phenyl)iodonium iodide, (4-methylphenyl)(4-(2-methylpropyl)phenyl)iodonium p-toluene sulphate, diphenyliodonium chloride, diphenyliodonium hexafluorphosphate, diphenyliodonium iodide, diphenyliodonium p-toluene sulphate, tert-butyl 4-methylbenzenesulfonate, and mixtures thereof.

P46 The thermosetting powder coating composition according to any one of P1a and P1b, or to any one of the preferments P1 to P6, wherein
D: one or more co-initiators selected from the group consisting of bis(4-dodecylphenyl)iodonium hexafluorophosphate, bis(4-dodecylphenyl)iodonium chloride, bis(4-dodecylphenyl)iodonium iodide, bis(4-dodecylphenyl)iodonium p-toluene sulphate, bis(4-tert-butylphenyl)iodonium hexafluorophosphate, bis(4-tert-butylphenyl)iodonium chloride, bis(4-tert-butylphenyl)iodonium iodide, bis(4-tert-butylphenyl)iodonium p-toluene sulphate, (4-methylphenyl)(4-(2-methylpropyl)phenyl)iodonium hexafluorophosphate, (4-methylphenyl)(4-(2-methylpropyl)phenyl)iodonium chloride, (4-methylphenyl)(4-(2-methylpropyl)phenyl)iodonium iodide, (4-methylphenyl)(4-(2-methylpropyl)phenyl)iodonium p-toluene sulphate, diphenyliodonium chloride, diphenyliodonium hexafluorphosphate, diphenyliodonium iodide, diphenyliodonium p-toluene sulphate, and mixtures thereof.

P47 The thermosetting powder coating composition according to any one of P1a and P1b, or to any one of the preferments P1 to P6, wherein
D: one or more co-initiators selected from the group consisting of bis(4-dodecylphenyl)iodonium chloride, bis(4-dodecylphenyl)iodonium iodide, bis(4-dodecylphenyl)iodonium p-toluene sulphate, bis(4-tert-butylphenyl)iodonium hexafluorophosphate, bis(4-tert-butylphenyl)iodonium chloride, bis(4-tert-butylphenyl)iodonium iodide, bis(4-tert-butylphenyl)iodonium p-toluene sulphate, (4-methylphenyl)(4-(2-methylpropyl)phenyl)iodonium hexafluorophosphate, (4-methylphenyl)(4-(2-methylpropyl)phenyl)iodonium chloride, (4-methylphenyl)(4-(2-methylpropyl)phenyl)iodonium iodide, (4-methylphenyl)(4-(2-methylpropyl)phenyl)iodonium p-toluene sulphate, diphenyliodonium chloride, diphenyliodonium hexafluorphosphate, diphenyliodonium iodide, diphenyliodonium p-toluene sulphate, and mixtures thereof.

P48 The thermosetting powder coating composition according to any one of P1a and P1b, or to any one of the preferments P1 to P6, wherein
D: one or more co-initiators selected from the group consisting of bis(4-dodecylphenyl)iodonium chloride, bis(4-dodecylphenyl)iodonium iodide, bis(4-tert-butylphenyl)iodonium hexafluorophosphate, bis(4-tert-butylphenyl)iodonium chloride, bis(4-tert-butylphenyl)iodonium iodide, bis(4-tert-butylphenyl)iodonium p-toluene sulphate, (4-methylphenyl)(4-(2-methylpropyl)phenyl)iodonium hexafluorophosphate, (4-methylphenyl)(4-(2-methylpropyl)phenyl)iodonium chloride, (4-methylphenyl)(4-(2-methylpropyl)phenyl)iodonium iodide, (4-methylphenyl)(4-(2-methylpropyl)phenyl)iodonium p-toluene sulphate, diphenyliodonium chloride, diphenyliodonium hexafluorphosphate, diphenyliodonium iodide, diphenyliodonium p-toluene sulphate, and mixtures thereof.

P49 The thermosetting powder coating composition according to any one of P1a and P1b, or to any one of the preferments P1 to P6, wherein
D: one or more co-initiators selected from the group consisting of bis(4-dodecylphenyl)iodonium chloride, bis(4-tert-butylphenyl)iodonium hexafluorophosphate, bis(4-tert-butylphenyl)iodonium chloride, bis(4-tert-butylphenyl)iodonium iodide, bis(4-tert-butylphenyl)iodonium p-toluene sulphate, (4-methylphenyl)(4-(2-methylpropyl)phenyl)iodonium hexafluorophosphate, (4-methylphenyl)(4-(2-methylpropyl)phenyl)iodonium chloride, (4-methylphenyl)(4-(2-methylpropyl)phenyl)iodonium iodide, (4-methylphenyl)(4-(2-methylpropyl)phenyl)iodonium p-toluene sulphate, diphenyliodonium chloride, diphenyliodonium hexafluorphosphate, diphenyliodonium iodide, diphenyliodonium p-toluene sulphate, and mixtures thereof.

P50 The thermosetting powder coating composition according to any one of P1a and P1b, or to any one of the preferments P1 to P6, wherein
D: one or more co-initiators selected from the group consisting of bis(4-tert-butylphenyl)iodonium hexafluorophosphate, bis(4-tert-butylphenyl)iodonium chloride, bis(4-tert-butylphenyl)iodonium iodide, bis(4-tert-butylphenyl)iodonium p-toluene sulphate, (4-methylphenyl)(4-(2-methylpropyl)phenyl)iodonium hexafluorophosphate, (4-methylphenyl)(4-(2-methylpropyl)phenyl)iodonium chloride, (4-methylphenyl)(4-(2-methylpropyl)phenyl)iodonium iodide, (4-methylphenyl)(4-(2-methylpropyl)phenyl)iodonium p-toluene sulphate, diphenyliodonium chloride, diphenyliodonium hexafluorphosphate, diphenyliodonium iodide, diphenyliodonium p-toluene sulphate, and mixtures thereof.

P51 The thermosetting powder coating composition according to any one of P1a and P1b, or to any one of the preferments P1 to P6, wherein
D: one or more co-initiators selected from the group consisting of bis(4-tert-butylphenyl)iodonium hexafluorophosphate, bis(4-tert-butylphenyl)iodonium chloride, bis(4-tert-butylphenyl)iodonium p-toluene sulphate, (4-methylphenyl)(4-(2-methylpropyl)phenyl)iodonium hexafluorophosphate, (4-methylphenyl)(4-(2-methylpropyl)phenyl)iodonium chloride, (4-methylphenyl)(4-(2-methylpropyl)phenyl)iodonium iodide, (4-methylphenyl)(4-(2-methylpropyl)phenyl)iodonium p-toluene sulphate, diphenyliodonium chloride, diphenyliodonium hexafluorphosphate, diphenyliodonium iodide, diphenyliodonium p-toluene sulphate, and mixtures thereof.

P52 The thermosetting powder coating composition according to any one of P1a and P1b, or to any one of the preferments P1 to P6, wherein
D: one or more co-initiators selected from the group consisting of bis(4-tert-butylphenyl)iodonium hexafluorophosphate, bis(4-tert-butylphenyl)iodonium chloride, bis(4-tert-butylphenyl)iodonium p-toluene sulphate, (4-methylphenyl)(4-(2-methylpropyl)phenyl)iodonium hexafluorophosphate, (4-methylphenyl)(4-(2-methylpropyl)phenyl)iodonium chloride, (4-methylphenyl)(4-(2-methylpropyl)phenyl)iodonium p-toluene sulphate, diphenyliodonium chloride, diphenyliodonium hexafluorphosphate, diphenyliodonium iodide, diphenyliodonium p-toluene sulphate, and mixtures thereof.

P53 The thermosetting powder coating composition according to any one of P1a and P1b, or to any one of the preferments P1 to P6, wherein
D: one or more co-initiators selected from the group consisting of bis(4-tert-butylphenyl)iodonium hexafluorophosphate, bis(4-tert-butylphenyl)iodonium chloride, (4-methylphenyl)(4-(2-methylpropyl)phenyl)iodonium hexafluorophosphate, (4-methylphenyl)(4-(2-methylpropyl) phenyl)iodonium chloride, (4-methylphenyl)(4-(2-methylpropyl)phenyl)iodonium p-toluene sulphate, diphenyliodonium chloride, diphenyliodonium hexafluorphosphate, diphenyliodonium iodide, diphenyliodonium p-toluene sulphate, and mixtures thereof.

P54 The thermosetting powder coating composition according to any one of P1a and P1b, or to any one of the preferments P1 to P6, wherein
D: one or more co-initiators selected from the group consisting of bis(4-tert-butylphenyl)iodonium hexafluorophosphate, bis(4-tert-butylphenyl)iodonium chloride, (4-methylphenyl)(4-(2-methylpropyl)phenyl)iodonium hexafluorophosphate, (4-methylphenyl)(4-(2-methylpropyl) phenyl)iodonium chloride, diphenyliodonium chloride, diphenyliodonium hexafluorphosphate, diphenyliodonium iodide, diphenyliodonium p-toluene sulphate, and mixtures thereof.

P55 The thermosetting powder coating composition according to any one of P1a and P1b, or to any one of the preferments P1 to P6, wherein
D: one or more co-initiators selected from the group consisting of bis(4-tert-butylphenyl)iodonium hexafluorophosphate, bis(4-tert-butylphenyl)iodonium chloride, (4-methylphenyl)(4-(2-methylpropyl)phenyl)iodonium hexafluorophosphate, (4-methylphenyl)(4-(2-methylpropyl) phenyl)iodonium chloride, diphenyliodonium chloride, diphenyliodonium hexafluorphosphate, diphenyliodonium p-toluene sulphate, and mixtures thereof.

P56 The thermosetting powder coating composition according to any one of P1a and P1b, or to any one of the preferments P1 to P6, wherein
D: one or more co-initiators selected from the group consisting of bis(4-tert-butylphenyl)iodonium hexafluorophosphate, (4-methylphenyl)(4-(2-methylpropyl)phenyl)iodonium hexafluorophosphate, (4-methylphenyl)(4-(2-methylpropyl)phenyl)iodonium chloride, diphenyliodonium chloride, diphenyliodonium hexafluorphosphate, diphenyliodonium p-toluene sulphate, and mixtures thereof.

P57 The thermosetting powder coating composition according to any one of P1a and P1b, or to any one of the preferments P1 to P6, wherein
D: one or more co-initiators selected from the group consisting of bis(4-tert-butylphenyl)iodonium hexafluorophosphate, (4-methylphenyl)(4-(2-methylpropyl)phenyl)iodonium hexafluorophosphate, diphenyliodonium chloride, diphenyliodonium hexafluorphosphate, diphenyliodonium p-toluene sulphate, and mixtures thereof.

P58 The thermosetting powder coating composition according to any one of P1a and P1b, or to any one of the preferments P1 to P6, wherein
D: one or more co-initiators selected from the group consisting of (4-methylphenyl)(4-(2-methylpropyl)phenyl)iodonium hexafluorophosphate, diphenyliodonium chloride, diphenyliodonium hexafluorphosphate, diphenyliodonium p-toluene sulphate, and mixtures thereof.

P59 The thermosetting powder coating composition according to any one of P1a and P1b, or to any one of the preferments P1 to P6, wherein
D: one or more co-initiators selected from the group consisting of (4-methylphenyl)(4-(2-methylpropyl)phenyl)iodonium hexafluorophosphate, diphenyliodonium chloride, diphenyliodonium hexafluorophosphate, and mixtures thereof.

P60 The thermosetting powder coating composition according to any one of P1a and P1b, or to any one of the preferments P1 to P6, wherein
D: one or more co-initiators selected from the group consisting of diphenyliodonium chloride, diphenyliodonium hexafluorphosphate, and mixtures thereof.

P61 The thermosetting powder coating composition according to any one of P1a and P1b, or to any one of the preferments P1 to P6, wherein
D: one or more co-initiators selected from the group consisting of diphenyliodonium chloride, 2-methyl-2-[(4-methylphenyl)sulfonyl]-1-[4-(methylthio)phenyl]-1-propanone and mixtures thereof.

P62 The thermosetting powder coating composition according to any one of P1a and P1b, or to any one of the preferments P1 to P6, wherein D is diphenyliodonium chloride.

P63 The thermosetting powder coating composition according to any one of P1a and P1b, or to any one of the preferments P1 to P62, wherein the component D is present in an amount of at most 150 mmol/Kg A and B.

P64 The thermosetting powder coating composition according to any one of P1a and P1b, or to any one of the preferments P1 to P63, wherein the thermosetting powder coating composition further comprises component E, wherein
E: one or more inhibitors.

P65 The thermosetting powder coating composition according to any one of P1a and P1b, or to any one of the preferments P1 to P63, wherein the thermosetting powder coating composition further comprises component E, wherein
E: one or more inhibitors and wherein the total amount of component E is as disclosed in section 1.5 including any preferred range and combinations of said preferred ranges.

P66 The thermosetting powder coating composition according to any one of P1a and P1b, or to any one of the preferments P1 to P63, wherein the thermosetting powder coating composition further comprises component E, wherein
E: one or more inhibitors selected from any group consisting of preferments disclosed in section 1.5.

P67 The thermosetting powder coating composition according to any one of P1a and P1b, or to any one of the preferments P1 to P63, wherein the thermosetting powder coating composition further comprises component E, wherein
E: one or more inhibitors selected from any group consisting of preferments disclosed in section 1.5, and wherein the total amount of component E is as disclosed in section 1.5 including any preferred range and combinations of said preferred ranges.

P68 The thermosetting powder coating composition according to any one of P1a and P1b, or to any one of the preferments P1 to P63, wherein the thermosetting powder coating composition further comprises component E, wherein
E: one or more inhibitors selected from the group consisting of phenolic compounds, stable radicals, catechols, phenothiazines, hydroquinones, benzoquinones and mixtures thereof.

P69 The thermosetting powder coating composition according to any one of P1a and P1b, or to any one of the preferments P1 to P63, wherein the thermosetting powder coating composition further comprises component E, wherein
E: one or more inhibitors selected from the group consisting of phenolic compounds, stable radicals, catechols, phenothiazines, hydroquinones, benzoquinones and mixtures thereof, and wherein the total amount of component E is as disclosed in section 1.5 including any preferred range and combinations of said preferred ranges.

P70 The thermosetting powder coating composition according to any one of P1a and P1b, or to any one of the preferments P64 to P69, wherein the component E is present in an amount of at least 16 and at most 1500, more preferably at least 20 and at most 1500, even more preferably at least 16 and at most 1000, most preferably at least 20 and at most 1000, especially at least 16 and at most 800, more especially at least 20 and at most 800, most especially at least 16 and at most 600, for example at least 20 and at most 600, for example at least 25 and at most 800, for example at least 30 and at most 800, for example at least 40 and at most 1500, for example at least 40 and at most 1000, for example at least 40 and at most 800, for example at least 40 and at most 700, for example at least 40 and at most 600, for example at least 40 and at most 500, for example at least 45 and at most 1500, for example at least 45 and at most 1000, for example at least 45 and at most 800, for example at least 45 and at most 700, for example at least 45 and at most 600, for example at least 45 and at most 500, for example at least 45 and at most 300 mg/Kg A and B.

P71 The thermosetting powder coating composition according to any one of P1a and P1b, or to any one of the preferments P1 to P70, wherein the dilauroyl peroxide is present in an amount of at least 35 and at most 190, more preferably of at least 40 and at most 190, even more preferably of at least 45 and at most 190, most preferably of at least 30 and at most 170, especially of at least 35 and at most 170, more especially of at least 40 and at most 170, most especially of at least 45 and at most 170, for example of at least 30 and at most 150, for example of at least 35 and at most 150, for example of at least 40 and at most 150, for example of at least 45 and at most 150 mmol/Kg A and B.

P72 The thermosetting powder coating composition according to any one of P1a and P1b, or to any one of the preferments P1 to P71, wherein the component C is present in an amount of at most 500, more preferably at most 450, even more preferably at most 400, most preferably at most 350, especially at most 300, more especially at most 250, most especially at most 190, for example at most 170 mmol/Kg A and B.

P73 The thermosetting powder coating composition according to any one of P1a and P1b, or to any one of the preferments P1 to P72, wherein the component C comprises dilauroyl peroxide in an amount of at least 5.2, more preferably of at least 6, even more preferably of at least 7, most preferably of at least 8, especially of at least 9, more especially of at least 9.6, even more especially of at least 10.4, most especially of at least 12, for example of at least 14, for example of at least 16, for example of at least 18, for example of at least 19.2, for example of at least 20, for example of at least 25, for example of at least 30, for example of at least 40, for example of at least 50, for example of at least 60, for example of at least 70, for example of at least 80 for example of at least 90 for example of at least 95 for example of at least 96, for example of at least 97, for example of at least 98, for example of at least 99, for example of at least 99.5, for example at least 99.9 pph of C, for example the component C is dilauroyl peroxide.

P74 The thermosetting powder coating composition according to any one of P1a and P1b, or to any one of the preferments P1 to P73, wherein each of the UR has a number average molecular weight ($M_n$) measured via Gel Permeation Chromatography (GPC) according to the description, of at least 1000 and at most 10000 Da.

P75 The thermosetting powder coating composition according to any one of P1a and P1b, or to any one of the preferments P1 to P75, wherein each of the UR has a glass transition temperature ($T_g$) measured via DSC according to the description, of from and including 40 up to and including 80° C., preferably of from and including 40 up to and including 75° C.

P76 The thermosetting powder coating composition according to any one of P1a and P1b, or to any one of the preferments P1 to P76, wherein the UR has a weight per unsaturation (WPU) measured via $^1$H-NMR spectroscopy, of at least 250 and at most 2200, preferably from 450 to 1350 g/mol.

P77 The thermosetting powder coating composition according to any one of P1a and P1b, or to any one of the preferments P1 to P76, wherein each of the crystalline VU-c and each of the crystalline VFUR-c has a number average molecular weight ($M_n$) measured via Gel Permeation Chromatography (GPC) according to the description, of at least 400 and of at most 20000 Da, more preferably of at least 450 and of at most 10000 Da, most preferably of at least 500 and of at most 7000 Da, especially of at least 550 and of at most 5000, more especially of at least 575 and of at most 3000 Da, most especially of at least 600 and of at most 2000 Da, for example of at least 660 and of at most 2000 Da, for example of at least 660 and of at most 1500 Da, for example of at least 660 and of at most 1200 Da, for example of at least 660 and of at most 1000 Da.

P78 The thermosetting powder coating composition according to any one of P1a and P1b, or to any one of the preferments P1 to P77, wherein any and all of the $T_m$ of the one or more crystalline VU-c, are in the region of from and including 45 up to and including 78° C., preferably in the region of from and including 45 up to and including 77° C.

P79 The thermosetting powder coating composition according to any one of P1a and P1b, or to any one of the preferments P1 to P78, wherein any and all of the $T_m$ of each of the one or more crystalline VFUR-c, are in the region of from and including 45 up to and including 78° C., preferably in the region of from and including 45 up to and including 77° C.

P80 The thermosetting powder coating composition according to any one of P1a and P1b, or to any one of the preferments P1 to P79, wherein each of the crystalline VU-c and each of the crystalline VFUR-c has a melting enthalpy $\Delta H_m \geq 60$, preferably $\geq 100$, more preferably $\geq 120$ J/g.

P81 The thermosetting powder coating composition according to any one of P1a and P1b, or to any one of the preferments P1 to P80, wherein each of the crystalline VU-c has a weight per unsaturation (WPU) measured via $^1$H-NMR spectroscopy according to the description, of at least 190 and at most 1500 g/mol, preferably of at least 190 and at most 1000 g/mol, more preferably of at least 190 and at most 800 g/mol, most preferably of at least 190 and at most 600 g/mol, especially of at least 190 and at most 500 g/mol, more especially of at least 190 and at most 350 g/mol.

P82 The thermosetting powder coating composition according to any one of P1a and P1b, or to any one of the preferments P1 to P81, wherein each of the crystalline VFUR-c has a weight per unsaturation (WPU) measured via $^1$H-NMR spectroscopy according to the description, of at least 190 and at most 1500 g/mol, preferably of at least 190 and at most 1000 g/mol, more preferably of at least 190 and at most 800 g/mol, even more preferably of at least 190 and at most 600 g/mol, most preferably of at least 190 and at most 500 g/mol, especially of at least 190 and at most 350 g/mol.

P83 The thermosetting powder coating composition according to any one of P1a and P1b, or to any one of the preferments P1 to P82, wherein the crystalline VU-c is selected from the group consisting of crystalline VEU-c, crystalline VESU-c, VEESU-c, and mixtures thereof; preferably the crystalline VU-c is selected from the group consisting of crystalline VEU-c; more preferably the crystalline VU-c is selected from the group consisting of diethylene glycol divinyl ether urethane, triethylene glycol divinyl ether urethane, and mixtures thereof; even more preferably the crystalline VU-c is diethylene glycol divinyl ether urethane; most preferably the crystalline VU-c is triethylene glycol divinyl ether urethane.

P84 The thermosetting powder coating composition according to any one of P1a and P1b, or to any one of the preferments P1 to P83, wherein the crystalline VFUR-c is selected from the group consisting of crystalline VEFUR-c, crystalline VESFUR-c, VEESFUR-c, and mixtures thereof; preferably the crystalline VFUR-c is selected from the group consisting of crystalline VEFUR-c, crystalline VESFUR-c, and mixtures thereof; more preferably the crystalline VFUR-c is selected from the group consisting of crystalline VEFUR-c.

P85 The thermosetting powder coating composition according to any one of P1a and P1b, or to any one of the preferments P1 to P84, wherein the curing agent A is selected from the group consisting of crystalline VU-c and mixtures thereof; preferably the curing agent A is selected from the group consisting of crystalline VEU-c, crystalline VESU-c, VEESU-c, and mixtures thereof; more preferably the curing agent A is selected from the group consisting of crystalline VEU-c; even more preferably the curing agent A is selected from the group consisting of diethylene glycol divinyl ether urethane, triethylene glycol divinyl ether urethane, and mixtures thereof; most preferably the curing agent A is diethylene glycol divinyl ether urethane; especially the curing agent A is triethylene glycol divinyl ether urethane.

P86 The thermosetting powder coating composition according to any one of P1a and P1b, or to any one of the preferments P1 to P85, wherein the UR is selected from the group consisting of polyester resins, polyurethanes, polyamides, polyesteramides, polyureas and mixtures thereof.

P87 The thermosetting powder coating composition according to any one of P1a and P1b, or to any one of the preferments P1 to P86, wherein the ethylenic unsaturations of the UR are di-acid ethylenic unsaturations.

P88 The thermosetting powder coating composition according to any one of P1a and P1b, or to any one of the preferments P1 to P86, wherein the UR is an unsaturated polyester resin comprising ethylenic unsaturations.

P89 The thermosetting powder coating composition according to any one of P1a and P1b, or to any one of the preferments P1 to P86, wherein the UR is an unsaturated polyester resin comprising di-acid ethylenic unsaturations.

P90 The thermosetting powder coating composition according to any one of P1a and P1b, or to any one of the preferments P1 to P86, wherein the UR is an unsaturated polyester resin comprising 2-butenedioic acid ethylenic unsaturations.

P91 The thermosetting powder coating composition according to any one of P1a and P1b, or to any one of the preferments P1 to P90, wherein the curing agent A has a $T_c$ which is lower than its $T_m$ and preferably the $T_c$ of the curing agent is at most 55, more preferably at most 50, even more preferably at most 45, most preferably at most 40, especially at most 35° C., lower than its $T_m$, or lower than its highest $T_m$ if the curing agent A has more than one $T_m$.

P92 The thermosetting powder coating composition according to any one of P1a and P1b, or to any one of the preferments P1 to P91, wherein the curing agent A has a $T_c$ of at least 0 and of at most 75, more preferably of at least 10 and of at most 75, even more preferably of at least 10 and at most 72, most preferably of at least 10 and at most 70, especially of at least 10 and at most 68, more especially of at least 10 and at most 66, for example of at least 10 and at most 65, for example of at least 15 and at most 62, for example of at least 20 and at most 60° C.

P93 The thermosetting powder coating composition according to any one of P1a and P1b, or to any one of the preferments P1 to P92, wherein
D: one or more co-initiators selected from the group consisting of onium compounds, sulpho-compounds, and mixtures thereof, and wherein the onium compounds are selected from the group consisting of compounds represented by the following formula I-X and compounds represented by the following formula II-X

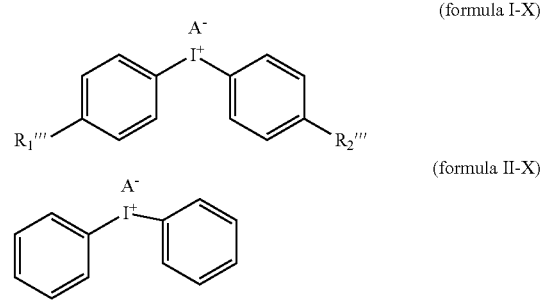

wherein
$A^-$ is selected from the group consisting of halide anions; and
$R_1'''$ is a $C_1$-$C_{12}$ saturated hydrocarbyl, and $R_2'''$ is a $C_1$-$C_{12}$ saturated hydrocarbyl.

P94 The thermosetting powder coating composition according to any one of P1a and P1b, or any one of the preferments P1 to P93, wherein the UR has:
  a) a number average molecular weight ($M_n$) of at least 1000 and at most 10000 Da, and
  b) a glass transition temperature ($T_g$) of at least 40 and at most 75° C., and
  c) a weight per unsaturation (WPU) of at least 250 and at most 2200 g/mol,
  and wherein the $M_n$ is measured via Gel Permeation Chromatography (GPC) according to the description, the $T_g$ is measured via Differential Scanning calorimetry (DSC) according to the description and the WPU is measured via $^1$H-NMR spectroscopy according to the description.

P95 The thermosetting powder coating composition according to any any one of P1a and P1b, or any one of the preferments P1 to P94, wherein the curing agent A which is selected from the group consisting of i), ii) and iii):
  i) one or more crystalline VU-c each of which is a crystalline vinyl urethane having a melting enthalpy $\Delta H_m \geq 35$ J/g, and one or more melting temperatures ($T_m$) wherein any and all of the $T_m$ of the one or more crystalline VU-c are in the region of from and including 45 up to and including 77° C., and a number average molecular weight ($M_n$) of at least 660 and at most 1200 Da, and ii) one or more crystalline VFUR-c each of which is a crystalline vinyl functionalized urethane resin having a melting enthalpy $\Delta H_m \geq 35$ J/g, and one or more melting temperatures ($T_m$) wherein any and all of the $T_m$ of the one or more crystalline VFUR-c are in the region of from and including 45 up to and including 77° C., and a number average molecular weight ($M_n$) of at least 660 and at most 1200 Da, and iii) mixtures of crystalline VU-c and crystalline VFUR-c, wherein the $M_n$ is measured via Gel Permeation Chromatography (GPC) according to the description.

P96 The thermosetting powder coating composition according to any one of P1a and P1b, or to any one of the preferments P1 to P95, wherein the crystalline VFUR-c has a $T_g$ of at least −80 and at most 75° C., more preferably of at least −80 and at most 70° C., even more preferably of at least −80 and at most 60° C., most preferably of at least −80 and at most 50° C., especially of at least −80 and at most 40° C., more especially of at least −80 and at most 30° C., most especially of at least −80 and at most 20° C., for example of at least −80 and at most 10° C., for example of at least −80 and at most 0° C., for example of at least −80 and at most −10° C., for example of at least −80 and at most −20° C.

P97 The thermosetting powder coating composition according to any one of P1a and P1b, or to any one of the preferments P1 to P96, wherein the UR has a glass transition temperature ($T_g$) of at least 20 and at most 120, more preferably of at least 30 and at most 100, even more preferably of at least 35 and at most 90, most preferably of at least 40 and at most 75° C.

P98 The thermosetting powder coating composition according to any one of P1a and P1b, or to any one of the preferments P1 to P99, wherein the thermosetting powder coating composition of the invention has a glass transition temperature of at least 20 and at most 80, more preferably at least 25 and at most 70, even more preferably at least 25 and at most 60, most preferably at least 25 and at most 55, especially at least 25 and at most 50, more especially at least 30 and most 80, even more especially at least 30 and at most 70, most especially at least 30 and at most 60, for example at least 30 and at most 55, for example at least 30 and at most 50° C.

P99 The thermosetting powder coating composition according to any one of P1a and P1b, or to any one of the preferments P1 to P98, wherein the thermosetting powder coating composition is a one component thermosetting powder coating composition.

P100 The thermosetting powder coating composition according to any one of P1a and P1b, or to any one of the preferments P1 to P99.

P101 The thermosetting powder coating composition according to any one of the claims presented herein and any one of the preferments P1 to P100.

A1 A process for making a thermosetting powder coating composition as defined in any one of any one of P1a and P1b, or in any one of the preferments P1 to P101, said process comprising the steps of:
a. mixing the components of the thermosetting powder coating composition to obtain a premix;
b. heating the premix preferably in an extruder, preferably up to and including the decomposition temperature of the component C, more preferably up to and including 90° C., to obtain an extrudate;
c. cooling down the extrudate to obtain a solidified extrudate; and
d. grinding the solidified extrudate into smaller particles to obtain the thermosetting powder coating composition.

A2 A cured thermosetting powder coating composition obtained by curing a thermosetting powder coating composition as defined in any one of any one of P1a and P1b, or in any one of the preferments P1 to P101.

A3 An article having coated thereon a thermosetting powder coating composition as defined in any one of any one of P1a and P1b, or in any one of the preferments P1 to P101.

A4 An article having coated and cured thereon a thermosetting powder coating composition as defined in any one of any one of P1a and P1b, or in any one of the preferments P1 to P101.

A5 A process for making a coated article, said process comprising the steps of:
applying a thermosetting powder coating composition as defined in any one of any one of P1a and P1b, or in any one of the preferments P1 to P101, to an article; and
heating and/or radiating the thermosetting powder coating composition for enough time and at a suitable temperature to cure the thermosetting powder coating composition, to obtain the coated article.

A6 Use of:
a thermosetting powder coating composition as defined in any one of any one of P1a and P1b, or in any one of the preferments P1 to P101; or
a cured thermosetting powder coating composition as defined in aspect A2; or
an article as defined in any one of aspects A3 to A4,
in powder coatings, powder coatings for heat-sensitive articles, powder coatings for non-heat-sensitive articles, 3D-printing, automotive applications, marine applications, aerospace applications, medical applications, defense applications, sports/recreational applications, architectural applications, bottling applications, household applications, machinery applications, can applications, coil applications, energy applications, textile applications and electrical applications.

A7 A process for making either powder coatings, or powder coatings for heat-sensitive articles, or powder coatings for non-heat-sensitive articles, or compositions suitable for 3D-printing, or compositions suitable for applications selected from the group consisting of automotive applications, marine applications, aerospace applications, medical applications, defense applications, sports/recreational applications, architectural applications, bottling applications, household applications, machinery applications, can applications, coil applications, energy applications, textile applications and electrical applications, or articles suitable for applications selected from the group consisting of automotive applications, marine applications, aerospace applications, medical applications, defense applications, sports/recreational applications, architectural applications, bottling applications, household applications, machinery applications, can applications, coil applications, energy applications, textile applications and electrical applications, comprising the step of providing at least one of the following i) to iii):
i) a thermosetting powder coating composition as defined in any one of P1a and P1b, or in any one of the preferments P1 to P101,
ii) a cured thermosetting powder coating composition as defined in aspect A2,
iii) an article as defined in any one of aspects A3 to A4.

Unless otherwise explicitly stated, any feature, element, component, embodiment, aspect, range and especially any preferred feature, preferred element, preferred embodiment, preferred aspect, preferred range, preferred combination of ranges, preferments, embodiments and aspects in connection with any piece of disclosure disclosed in any one of the preferments P1 to P101 and aspects A1 to A7, shown below can be combined with each other and with any other feature, element, component, embodiment, aspect, range and especially any preferred feature, preferred element, preferred embodiment, preferred aspect, preferred range, preferred combination of ranges, preferments, embodiments and aspects of the invention as these are disclosed in the entire application.

DEFINITIONS

By 'dilauroyl peroxide' is meant the organic peroxide having the following formula

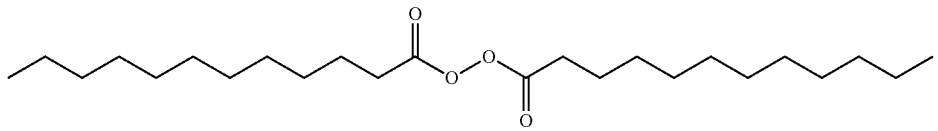 [SMILES: CCCCCCCCCCCC(=O)OOC(=O)CCCCCCCCCCC]

By the term 'hydrocarbon' is meant a chemical compound consisting of carbon and hydrogen only.

By the term 'saturated hydrocarbon' is meant that the hydrocarbon does not contain any cis- or trans-configured carbon-carbon double bond (carbon-carbon double bond unsaturation), and it does not contain a carbon-carbon triple bond (carbon-carbon triple bond unsaturation).

By the term 'unsaturated hydrocarbon' is meant that the hydrocarbon has at least one carbon-carbon double bond and no carbon-carbon triple bond.

By the term 'hydrocarbyl' is meant a univalent organic group formed by removing a hydrogen atom from a saturated or unsaturated hydrocarbon. Exemplary hydrocarbyls include but are not limited to methyl, ethyl, phenyl, benzyl, methylphenyl.

By the term 'saturated hydrocarbyl' is meant a univalent organic group formed by removing a hydrogen atom from a saturated hydrocarbon. Exemplary hydrocarbyls include but are not limited to methyl, ethyl, propyl.

By the term 'hydrocarbylene' is meant a divalent organic group formed by removing two hydrogen atoms from a saturated or unsaturated hydrocarbon, the free valences of which are not engaged in a double bond. Exemplary hydrocarbylenes include but are not limited to methylene, 1,3-phenylene.

By the term 'substituted-hydrocarbyl' is meant a hydrocarbyl optionally substituted by one or more substituents.

By the term 'substituent' is meant an atom or a group of atoms that replaces one or more hydrogen atoms attached to a parent structure. Exemplary substituents include but are not limited to oxygen, chlorine, carboxyl, hydroxyl, amino, cyano, methoxy, formyl, imino, etc.

The 'co-initiator' is selected from the group consisting of onium compounds, sulpho-compounds, and mixtures thereof.

The 'onium compound' is selected from the group consisting of compounds represented by the following formula Y $$Q^+A^- \qquad \text{(formula Y)}$$

wherein $Q^+$ is a cation selected from the group consisting of cations-B, cations-B1 and cations-B2, as each of them is defined below in i) to iii), respectively:

i) cations-B: these cations are derived by addition of a hydron ($H^+$) to a mononuclear parent hydride of N, P, As, Sb, Bi, O, S, Se, Te, Po, F, Cl, Br, I, At (preferably of N, P, O, S, and I, more preferably of N, S, and I, more preferably of S, and I, even more preferably of I), and ii) cations-B1: these cations are derivatives of the cations-B, and are formed by substitution of the cations-B by univalent groups, and iii) cations-B2: these cations are derivatives of the cations-B, and are formed by substitution of the cations-B by groups having two or three free valences on the same atom.

and wherein $A^-$ is an anion which is the counter-anion to $Q^+$, and wherein $A^-$ is selected from the group consisting of halide anions, perhalide anions, phosphate anions, arsenate anions, antimonite anions, sulphonate anions, and borate anions. Preferably, $A^-$ is selected from the group consisting of halide anions, perhalide anions, phosphate anions, arsenate anions, sulphonate anions, and borate anions. More preferably, $A^-$ is selected from the group consisting of halide anions, perhalide anions, phosphate anions, sulphonate anions, and borate anions. Even more preferably, $A^-$ is selected from the group consisting of halide anions, perhalide anions, phosphate anions, and sulphonate anions. Most preferably, $A^-$ is selected from the group consisting of halide anions, phosphate anions and sulphonate anions. Especially $A^-$ is selected from the group consisting of halide anions and sulphonate anions. More especially $A^-$ is selected from the group consisting of halide anions. Even more especially $A^-$ is selected from the group consisting of of $F^-$, $Cl^-$, $Br^-$, and $I^-$. Most especially $A^-$ is selected from the group consisting of $Cl^-$, and $I^-$. For example $A^-$ is $Cl^-$.

By the term 'halide anion' is meant an anion selected from the group consisting of $F^-$, $Cl^-$, $Br^-$, $I^-$, $At^-$. Preferably the halide anion is an anion selected from the group consisting of $F^-$, $Cl^-$, $Br^-$, and $I^-$. More preferably the halide anion is an anion selected from the group consisting of $Cl^-$, $Br^-$, and $I^-$. Even more preferably the halide anion is an anion selected from the group consisting of $Cl^-$, and $I^-$. Most preferably the halide anion is $Cl^-$.

By the term 'perhalide anion' is meant an anion selected from the group consisting of $FO_4^-$, $ClO_4^-$, $BrO_4^-$, $IO_4^-$. Preferably the perhalide anion is $ClO_4^-$ (perchlorate anion).

By the term 'phosphate anion' is meant an anion selected from the group consisting of anions represented by the following formula PA $$PX^- \qquad \text{(formula PA)}$$

wherein X is selected from the group consisting of F, Cl, Br, I, At. Preferably the X is selected from the group consisting of F, Cl, Br, and I. More preferably the X is selected from the group consisting of F, Cl, and Br. Even more preferably the X is selected from the group consisting of F, and Cl. Most preferably the X is F. An example of a phosphate anion (and most preferred of the phosphate anions) is $PF_6^-$.

By the term 'arsenate anion' is meant an anion selected from the group consisting of anions represented by the following formula AA

 (formula AA)

wherein X is selected from the group consisting of F, Cl, Br, I, At. Preferably the X is selected from the group consisting of F, Cl, Br, and I. More preferably the X is selected from the group consisting of F, Cl, and Br. Even more preferably the X is selected from the group consisting of F, and Cl. Most preferably the X is F. An example of an arsenate anion (and most preferred of the arsenate anions) is $AsF_6^-$.

By the term 'antimonate anion' is meant an anion selected from the group consisting of anions represented by the following formula ATA

 (formula ATA)

wherein X is selected from the group consisting of F, Cl, Br, I, At. Preferably the X is selected from the group consisting of F, Cl, Br, and I. More preferably the X is selected from the group consisting of F, Cl, and Br. Even more preferably the X is selected from the group consisting of F, and Cl. Most preferably the X is F. An example of an antimonate anion (and most preferred of the antimonate anions) is $SbF_6^-$.

By the term 'sulphonate anion' is meant an anion selected from the group consisting of anions represented by the following formula SA

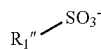 (formula SA)

wherein $R_1''$ is a $C_1$-$C_{12}$ optionally substituted hydrocarbyl, preferably a $C_7$-$C_{12}$ unsaturated hydrocarbyl, more preferably $CH_3C_6H_4$. Examples of sulphonate anions include but are not limited to

(1,1,2,2-tetrafluroethanesulphonate anion)

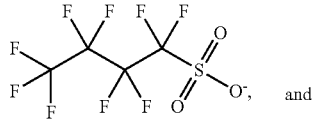 and (perfluoro-1-butanesulphonate anion)

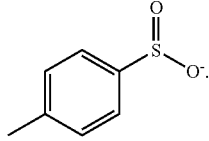

(p-toluene sulphate anion)

Preferably the sulphonate anion is selected from the group consisting of 1,1,2,2-tetrafluroethanesulphonate anion, perfluoro-1-butanesulphonate anion and p-toluene sulphate anion. More preferably, the sulphonate anion is p-toluene sulphate anion.

By the term 'borate anion' is meant an anion selected from the group consisting of anions represented by the formula BA, and anions represented by the formula BA-I,

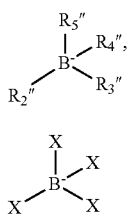

(formula BA)

(formula BA-1)

wherein
$R_2''$ is a $C_1$-$C_{12}$ optionally substituted hydrocarbyl, preferably a $C_1$-$C_{12}$ optionally substituted unsaturated hydrocarbyl, more preferably a halogen substituted aryl, even more preferably is $F_5O_6$, and
$R_3''$ is a $C_1$-$C_{12}$ optionally substituted hydrocarbyl, preferably a $C_1$-$C_{12}$ optionally substituted unsaturated hydrocarbyl, more preferably a halogen substituted aryl, even more preferably is $F_5O_6$, and
$R_4''$ is a $C_1$-$C_{12}$ optionally substituted hydrocarbyl, preferably a $C_1$-$C_{12}$ optionally substituted unsaturated hydrocarbyl, more preferably a halogen substituted aryl, even more preferably is $F_5O_6$, and
$R_5''$ is a $C_1$-$C_{12}$ optionally substituted hydrocarbyl, preferably a $C_1$-$C_{12}$ optionally substituted unsaturated hydrocarbyl, more preferably a halogen substituted aryl, even more preferably is $F_5O_6$;
X is selected from the group consisting of F, Cl, Br, I, At. Preferably the X is selected from the group consisting of F, Cl, Br, and I. More preferably the X is selected from the group consisting of F, Cl, and Br. Even more preferably the X is selected from the group consisting of F, and Cl. Most preferably the X is F.

The 'sulpho-compound' is selected from the group consisting of sulpho-compounds-1, sulpho-compounds-2, sulpho-compounds-3, sulpho-compounds-4, sulpho-compounds-5, and mixtures thereof.

By the term 'sulpho-compound-1' is meant a compound represented by the following formula L1

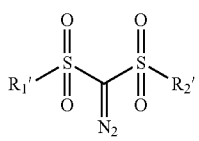 (formula L1)

wherein $R_1'$ is a $C_1$-$C_{10}$ hydrocarbyl, and $R_2'$ is a $C_1$-$C_{10}$ hydrocarbyl. Examples of a sulpho-compound-1 include but are not limited to 2-(((tert-butylsulfonyl)(diazo)methyl)sulfonyl)-2-methylpropane and (diazomethylenedisulfonyl)dicyclohexane.

By the term 'sulpho-compound-2' is meant a compound represented by the following formula L2

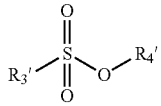 (formula L2)

wherein $R_3'$ is a $C_1$-$C_{12}$ hydrocarbyl, and $R_4'$ is a $C_1$-$C_{12}$ hydrocarbyl. Examples of a sulpho-compound-2 include but are not limited to 2-isopropyl-5-methylcyclohexyl 4-methylbenzenesulfonate and cyclohexyl 4-methylbenzenesulfonate and cyclohexyl 4-methylbenzenesulfonate.

By the term 'sulpho-compound-3' is meant a compound represented by the following formula L3

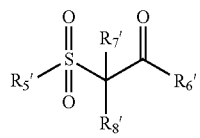

(formula L3)

wherein $R_5'$ is a $C_1$-$C_{12}$ hydrocarbyl, and $R_6'$ is a $C_1$-$C_{12}$ hydrocarbyl and $R_7'$ is a $C_1$-$C_{12}$ saturated hydrocarbyl, and $R_8'$ is a $C_1$-$C_{12}$ saturated hydrocarbyl. Most preferably, $R_5'$ is a $C_1$-$C_{12}$ hydrocarbyl, and $R_6'$ is a $C_1$-$C_{12}$ hydrocarbyl and $R_7'$ is $CH_3$, and $R_8'$ is $CH_3$. An example of a sulpho-compound-3 is 2-methyl-2-[(4-methylphenyl)sulfonyl]-1-[4-(methylthio)phenyl]-1-propanone.

By the term 'sulpho-compound-4' is meant a compound represented by the following formula L4

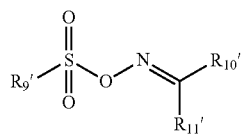

(formula L4)

wherein $R_9'$ is a $C_1$-$C_{12}$ hydrocarbyl, and $R_{10}'$ is a $C_1$-$C_{12}$ hydrocarbyl and $R_{11}'$ is a $C_1$-$C_{12}$ hydrocarbyl. An example of a sulpho-compound-4 is pentan-3-one O-tosyl oxime.

By the term 'sulpho-compound-5' is meant a compound represented by the following formula L5

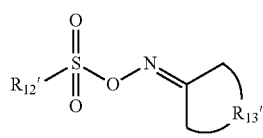

(formula L5)

wherein $R_{12}'$ is a $C_1$-$C_{12}$ hydrocarbyl or a substituted hydrocarbyl, and $R_{13}'$ is a $C_1$-$C_{12}$ hydrocarbylene. An example of a sulpho-compound-5 is (E)-3,4-dihydronaphthalen-1(2H)-one O-((4-chlorophenyl)sulfonyl) oxime.

By the term 'transition metal' is meant a transition metal with atomic number of from and including 21 and up to and including 79. Examples of transition metals include but are not limited to Sc, Ti, V, Cr, Mn, Fe, Co, Ni, Cu, Zn, Mo, and W.

By the term 'transition metal compound' is meant a monomeric compound comprising a transition metal in any valence. Examples of transition metal compounds include but are not limited to $Cu^+$ salts, $Cu^{2+}$ salts, $Mn^{2+}$ salts, $Mn^{3+}$ salts, $Co^{2+}$ salts, $Co^{3+}$ salts, $Fe^{2+}$ salts and $Fe^{3+}$ salts.

The 'stable radical' is selected from the group consisting of radicals-1, radicals-2, radicals-3, and radicals-4.

By the term 'radical-1' is meant an organic radical represented by the following formula R-1

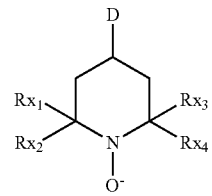

(formula R-1)

wherein
D is selected from the group consisting of H, COOH, and OH; and
$Rx_1$ is a $C_1$-$C_{10}$ saturated hydrocarbyl, and
$Rx_2$ is a $C_1$-$C_{10}$ saturated hydrocarbyl, and
$Rx_3$ is a $C_1$-$C_{10}$ saturated hydrocarbyl, and
$Rx_4$ is a $C_1$-$C_{10}$ saturated hydrocarbyl, and
Examples of a radical-1 include but are not limited to 1-oxyl-2,2,6,6-tetramethylpiperidine, 1-oxyl-2,2,6,6-tetramethylpiperidine-4-ol (a compound also referred to as TEMPOL), 1-oxyl-2,2,6,6-tetramethyl-4-carboxyl-piperidine (a compound also referred to as 4-carboxy-TEMPO).

By the term 'radical-2' is meant an organic radical represented by the following formula R-2

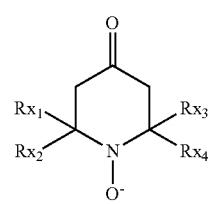

(formula R-2)

wherein
$Rx_1$ is a $C_1$-$C_{10}$ saturated hydrocarbyl, and
$Rx_2$ is a $C_1$-$C_{10}$ saturated hydrocarbyl, and
$Rx_3$ is a $C_1$-$C_{10}$ saturated hydrocarbyl, and
$Rx_4$ is a $C_1$-$C_{10}$ saturated hydrocarbyl, and
A example of a radical-2 is 1-oxyl-2,2,6,6-tetramethylpiperidine-4-one (a compound also referred to as TEMPON).

By the term 'radical-3' is meant an organic radical represented by the following formula R-3

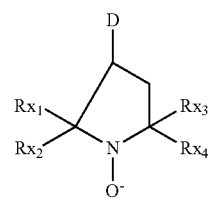

(formula R-3)

wherein
D is selected from the group consisting of H, COOH, OH; and
$Rx_1$ is a $C_1$-$C_{10}$ saturated hydrocarbyl, and
$Rx_2$ is a $C_1$-$C_{10}$ saturated hydrocarbyl, and
$Rx_3$ is a $C_1$-$C_{10}$ saturated hydrocarbyl, and
$Rx_4$ is a $C_1$-$C_{10}$ saturated hydrocarbyl, and Examples of a radical-1 include but are not limited to 1-oxyl-2,2,5,5-tetramethylpyrrolidine, 1-oxyl-2,2,5,5-tetramethyl-3-carboxypyrrolidine (also called 3-carboxy-PROXYL).

By the term 'radical-4' is meant an organic radical represented by the following formula R-4

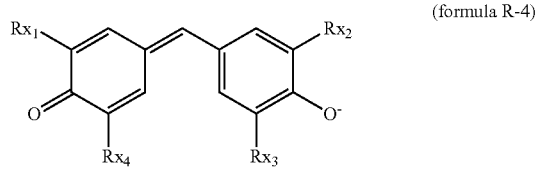

(formula R-4)

wherein
$Rx_1$ is a $C_1$-$C_{10}$ saturated hydrocarbyl, and
$Rx_2$ is a $C_1$-$C_{10}$ saturated hydrocarbyl, and
$Rx_3$ is a $C_1$-$C_{10}$ saturated hydrocarbyl, and
$Rx_4$ is a $C_1$-$C_{10}$ saturated hydrocarbyl, and
An example of a radical-4 is galvinoxyl (2,6-di-tert-butyl-α-(3,5-di-tert-butyl-4-oxo-2,5-cyclohexadien-1-ylidene)-p-tolyloxy).

By the term 'curing' or 'cure' is meant the process of becoming 'set' that is to form an irreversibly crosslinked network (the so-called 'cured form'), a material that can no longer flow, be melted or dissolved. Herein, the terms 'curing' 'cure' and 'crosslinking' are used interchangeably. The curing of a thermosetting powder coating composition of the invention may take place with or without the use of one or both of heat and radiation. If the curing of a thermosetting powder coating composition takes place using only heat, then the curing is called 'heat curing'. For clarity, the term heat curing does not include radiation induced curing. If the curing of a thermosetting powder coating composition of the invention takes place using radiation, the curing is called 'radiation curing'. Preferably, the curing of the thermosetting powder coating composition of the invention takes place via heat curing. Optionally, a combination of heat and pressure can be used to cure a heat-curable thermosetting powder coating composition. In the context of the invention, the term 'heat curing' does not exclude the application of pressure along with heat in order to cure a heat-curable thermosetting powder coating composition, such as the heat-curable thermosetting powder coating composition of the invention.

By the term 'heat-curable thermosetting powder coating composition composition' is meant a thermosetting powder coating composition that has the ability to cure at atmospheric pressure and at a temperature above the room temperature (elevated temperature) and that heating at elevated temperature is necessary to induce and achieve the curing of the composition; radiation and pressure (above or below atmospheric pressure) are not excluded but are not necessary for the curing of said composition.

By the term 'radiation-curable thermosetting powder coating composition' is meant a thermosetting powder coating composition that has the ability to cure at atmospheric pressure and upon radiation and that said radiation is necessary to induce and achieve the curing of the composition; heating at elevated temperature and pressure (above or below atmospheric pressure) are not excluded but are not necessary for the curing of said composition.

By the term 'heat/radiation-curable thermosetting powder coating composition' is meant a thermosetting powder coating composition that can be one or both of a heat-curable and radiation-curable composition.

By the term 'radiation' is meant one or both of ultraviolet (UV) radiation and electron beam radiation.

By the term 'extrudable' referring to a thermosetting powder coating composition is meant that once the components of said composition are mixed together, said mixture can be processed via an extruder.

By the term 'very poor physical storage stability' referring to a thermosetting powder coating composition is meant that the thermosetting powder coating composition upon storage at 23±1° C. for 7 weeks, has a physical storage stability as this is assessed herein, of 1 (rating is based on a scale from 1 to 10, with 1 being the worst and 10 the best). By the term 'poor physical storage stability' referring to a thermosetting powder coating composition is meant that the thermosetting powder coating composition upon storage at 23±1° C. for 7 weeks, has a physical storage stability as this is assessed herein, of 2 (rating is based on a scale from 1 to 10, with 1 being the worst and 10 the best). By the term 'mediocre physical storage stability' referring to a thermosetting powder coating composition is meant that the thermosetting powder coating composition upon storage at 23±1° C. for 7 weeks, has a physical storage stability as this is assessed herein, of at least 3 and at most 4 (rating is based on a scale from 1 to 10, with 1 being the worst and 10 the best). By the term 'good physical storage stability' referring to a thermosetting powder coating composition is meant that the thermosetting powder coating composition upon storage at 23±1° C. for 7 weeks, has a physical storage stability as this is assessed herein, of at least 5 and at most 6 (rating is based on a scale from 1 to 10, with 1 being the worst and 10 the best). By the term 'very good physical storage stability' referring to a thermosetting powder coating composition is meant that the thermosetting powder coating composition upon storage at 23±1° C. for 7 weeks, has a physical storage stability as this is assessed herein, of at least 7 and at most 9 (rating is based on a scale from 1 to 10, with 1 being the worst and 10 the best). By the term 'excellent physical storage stability' referring to a thermosetting powder coating composition is meant that the thermosetting powder coating composition upon storage at 23±1° C. for 7 weeks, has a physical storage stability as this is assessed herein, of 10 (rating is based on a scale from 1 to 10, with 1 being the worst and 10 the best). The physical storage stability is abbreviated herein as PSS and it is measured according to the relevant method described in the Examples.

By the term 'able to heat-cure fast at low temperature' or equally 'able to heat-curing fast at low temperature' or equally 'able to fast heat-cure at low temperatures' or equally 'able to fast heat-curing at low temperatures' referring to a thermosetting powder coating composition, is meant that said composition once applied on a MDF substrate and heat-cured at 95° C. for 3 minutes in an infra-red oven (without the application of UV-radiation), it affords a powder coating that can withstand at least 210 acetone double rubs. A thermosetting powder coating composition which can heat-cure fast at low temperatures is particularly suitable for coating heat-sensitive articles.

By the term 'heat-cure at low temperature' or equally 'heat-curing at low temperature' is meant heat-cure at 95° C. for 3 minutes in an infra-red oven (without the application of radiation).

By the term 'heat-cure at very low temperature' or equally 'heat-curing at very low temperature' is meant heat-cure at 85° C. for 30 minutes, in an infra-red oven (without the application of radiation).

By the term 'very poor chemical resistance' referring to a powder coating, is meant that said powder coating can withstand at most 99 acetone double rubs. By the term 'poor chemical resistance' referring to a powder coating is meant that said powder coating can withstand at least 100 and most 149 acetone double rubs. By the term 'sufficient chemical resistance' referring to a powder coating is meant that said powder coating can withstand at least 150 and at most 249 acetone double rubs. By the term 'good chemical resistance' referring to a powder coating is meant that said powder coating can withstand at least 250 and at most 449 acetone double rubs. By the term 'very good chemical resistance' referring to a powder coating is meant that said powder coating can withstand at least 450 and at most 499 acetone double rubs. By the term 'excellent chemical resistance' referring to a powder coating is meant that said powder coating can withstand at least 500 acetone double rubs. A powder coating that has at least good chemical resistance is particularly suitable for coating heat-sensitive articles. The acetone double rubs abbreviated herein as ADR are measured according to the relevant method described in the Examples.

By the term 'sufficient smoothness' referring to a powder coating, is meant a smoothness as measured according to the relevant method described in the Examples, of ≥2.

By the term 'poor smoothness' referring to a powder coating, is meant a smoothness as measured according to the relevant method described in the Examples, of ≤1.

The 'K' represents the ratio of the total mol of the ethylenic unsaturations in B (herein Total $Mol_B$) divided by the total mol of the ethylenic unsaturations in A (herein Total $Mol_A$), and it is calculated according to the following equation:

$$K = \text{Total Mol}_B/\text{Total Mol}_A$$

wherein $$\text{Total Mol}_B = \sum_{s=1}^{n}\left(\frac{Ms}{WPU_s}\right)$$

and $$\text{Total Mol}_A = \sum_{r=1}^{n}\left(\frac{Mr}{WPU_r}\right)$$

and wherein
$M_s$ is the amount of a curing agent which forms part of the component B and $WPU_s$ is the weight per unsaturation of said curing agent; and
$M_r$ is the amount of a UR which forms part of the component A and $WPU_r$ is the weight per unsaturation of said UR. Each of the $WPU_s$ and $WPU_r$ is measured via $^1$H-NMR spectroscopy as disclosed in the description for the measurement of WPU.

By 'room temperature' is meant a temperature of 23±1° C.

A 'resin' is herein understood to have the same meaning as it has to a skilled person in thermosetting polymer chemistry, namely as a low molecular weight polymer comprising reactive moieties such as for example ethylenic unsaturations, said resin is able to crosslink; said reactive moieties via a chemical reaction preferably said chemical reaction is induced by means of heat and/or radiation, ultimately connect the polymer chains together through the formation of permanent covalent (crosslink) bonds, resulting to the cured resin. The term 'low molecular weight' means a number average molecular weight ($M_n$) ranging of from 200 up to and including 20000 Da. Preferably a resin has a $M_n$ of at least 200, more preferably of at least 205, even more preferably of at least 210, most preferably of at least 215, especially of at least 220, more especially of at least 250, most especially of at least 300, for example of at least 310, for example of at least 315, for example of at least 350, for example of at least 400, for example of at least 450, for example of at least 500, for example of at least 600, for example of at least 700, for example of at least 800 for example at least 1000, for example at least 1200, for example at least 1500, for example at least 1800, for example at least 2000, for example at least 2200 Da. Preferably, a resin has a $M_n$ of at most 20000, more preferably of at most 10000, even more preferably of at most 9000, most preferably of at most 8000, especially of at most 7000, more especially of at most 6000, most especially of at most 5000 Da. A resin is classified as acid functional in case its hydroxyl value (OHV) is lower than its acid value (AV). A resin is classified as hydroxyl functional in case its acid value is lower than its hydroxyl value.

The acid and hydroxyl values values are measured according to the relevant methods disclosed in the Examples.

By 'urethane resin' is meant a resin comprising urethane moieties . . . —NH—(C=O)—O— . . . .

By 'composition' is meant the combining and/or mixture of distinct chemical substances and/or components to form a whole.

By 'vinyl functionalized urethane resin' (VFUR) is meant a urethane resin comprising vinyl groups . . . —CH=CH$_2$.

The term 'vinyl groups' is used herein interchangeably with the term 'vinyl unsaturations'.

The term 'vinyl' is used herein interchangeably with the term 'ethenyl'.

By 'vinyl ether functionalized urethane resin' (VEFUR) is meant a urethane resin comprising vinyl ether groups (see chemical structure 1;

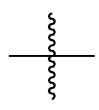

indicates a point of attachment of the vinyl ether group).

(chemical structure 1)

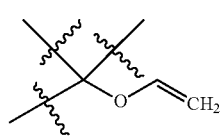

By 'vinyl ester functionalized urethane resin' (VESFUR) is meant a urethane resin comprising vinyl ester groups (see chemical structure 2;

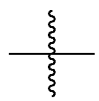

indicates a point of attachment of the vinyl ester group).

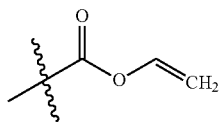
(chemical structure 2)

By 'vinyl (ether-ester) functionalized urethane resin' (VEESFUR) is meant a urethane resin comprising vinyl ether groups (see chemical structure 1) and vinyl ester groups (see chemical structure 2).

Vinyl ether functionalized urethane resins, vinyl ester functionalized urethane resins and vinyl (ether-ester) functionalized urethane resins as well as their preferred embodiments are each a vinyl functionalized urethane resin.

By 'vinyl urethane' (VU) is meant a monomeric organic compound comprising urethane moieties . . . —NH—(C═O)—O— . . . and vinyl groups . . . —CH═CH$_2$.

By 'vinyl ether urethane' (VEU) is meant a monomeric organic compound comprising urethane moieties . . . —NH—(C═O)—O— . . . and vinyl ether groups (see chemical structure 3;

indicates a point of attachment of the vinyl ether group).

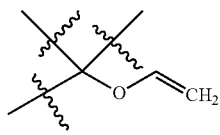
(chemical structure 3)

By 'vinyl ester urethane' (VESU) is meant a monomeric organic compound comprising urethane moieties . . . —NH—(C═O)—O— . . . and vinyl ester groups (see chemical structure 4;

indicates a point of attachment of the vinyl ester group).

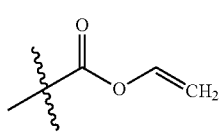
(chemical structure 4)

By 'vinyl (ether-ester) urethane' (VEESU) is meant a monomeric organic compound comprising urethane moieties . . . —NH—(C═O)—O— . . . and vinyl ether groups (see chemical structure 3) and vinyl ester groups (see chemical structure 4).

Vinyl ether urethanes, vinyl ester urethanes and vinyl (ether-ester) urethanes as well as their preferred embodiments are each a vinyl urethane.

By 'powder' is meant, a substantially dry solid substance at room temperature and at atmospheric pressure reduced to a state of fine, loose particles wherein the individual particles have preferably a maximum particle size of at most 200, more preferably of at most 180, even more preferably of at most 160, most preferably of at most 150, especially of at most 140, more especially of at most 130, most especially of at most 120, for example of at most 110, for example of at most 100, for example of at most 90 μm at 23° C. and at atmospheric pressure; the individual particles have preferably a minimum particle size of at least 5, more preferably of at least 10, even more preferably of at least 15, most preferably of at least 20, especially of at least 25, more especially of at least 30, most especially of at least 35, for example of at least 40, for example of at least 45, for example of at least 50, for example of at least 55 μm at 23° C. and at atmospheric pressure. A particle is defined as a small object that: a) has mean linear dimensions as described herein after and b) behaves as a whole unit in terms of its transport and properties. The particle size distribution (PSD) of a powder is a list of values or a mathematical function that defines the relative amounts of particles present, sorted according to size. The terms 'particle size' and 'particle size distribution' will be used interchangeably in the context of the invention when used in relation to a powder. The method used to measure the particle size of the thermosetting powder coating compositions of the invention is sieve analysis. According to it, the powder is separated on sieves of different sizes. Thus, the PSD is defined in terms of discrete size ranges: e.g. 'weight % of sample powder has particle size in the range of 75 microns to 90 microns', when sieves of these sizes are used. Preferably, 70 weight % of the thermosetting powder coating composition of the invention has a particle size in the range of 10 to 200 micron. The PSD can be determined for example by the following method: a certain amount of thermosetting powder coating composition, for example 100 g, is brought onto a Fritsch Analysette Spartan sieving apparatus equipped with a 200 micron sieve. The sample is sieved for 15 minutes at a 2.5 mm amplitude. The fraction of the sample which remained on the sieve was weighed after sieving. The fraction of the sample that went through the sieve (sieved fraction) is collected and is placed on a 160 micron sieve and is sieved as mentioned herein above. Once the same measurements (weighing) are performed as mentioned herein above, the same procedure is repeated using sequentially a 140, a 125, a 112, a 100, a 90, a 75, a 50, a 20 and a 10 micron sieve; the last sieved fraction with a size smaller than 10 micron is also weighed. Summing up the various weight fractions, this should yield the initial amount of sample, in this example 100 g. The various weight fractions represent the PSD as a list of values representing the relative amounts of particles present, sorted according to sieves used.

By 'substantially dry' is meant that the powder e.g. a thermosetting powder composition, does not comprise any deliberately added water or moisture but the powder may comprise moisture absorbed from the atmosphere in an amount of up to 30, preferably up to 20, more preferably up to 10, even more preferably up to 5, most preferably up to 3, especially up to 2, more especially up to 1% w/w based on the total weight of the component.

By 'thermosetting powder coating compositions' or 'powders' is meant, a mixture of components in the form of a powder and which compositions have the ability to form an irreversible crosslinked network (the so-called 'cured form') upon curing, preferably via heat and/or radiation curing, more preferably via heat curing.

By 'components of the thermosetting powder coating compositions of the invention' is meant constituent elements, their preferred embodiments and combinations thereof, that constitute part of the thermosetting powder coating composition of the invention; said components, their preferred embodiments and combinations thereof, should be construed in view of the whole disclosure; exemplary components include but are not limited to component A, component B, component C, UR, VU, perdicarbonate-X, crystalline VU-c, crystalline VFUR-c, as each is defined herein.

The terms amorphous and crystalline used to characterize a monomeric compound or a resin or a component of a composition are informal terms used in the art to indicate the predominant character of the relevant monomeric compound or a resin or a component of a composition in respect to its degree of crystallinity but these terms are defined more precisely herein by melting enthalpy ($\Delta H_m$) values. The term 'crystalline' denotes both crystalline and semicrystalline By 'amorphous' is meant that a monomeric compound, or a resin, or a component of a composition, for example a vinyl urethane or a vinyl functionalized urethane resin or a UR has a melting enthalpy ($\Delta H_m$)<35 J/g.

By 'crystalline' is meant that a monomeric compound, or a resin, or a component of a composition, for example a vinyl urethane or a vinyl functionalized urethane resin or a UR has a melting enthalpy ($\Delta H_m$)≥35 J/g.

By 'crystalline VU-c' is meant a crystalline vinyl urethane having a melting enthalpy $\Delta H_m$≥35 J/g, and one or more melting temperatures ($T_m$) wherein any and all of the $T_m$ of the crystalline VU-c are in the region of from and including 30 up to and including 80° C.

By 'crystalline VEU-c' is meant a crystalline vinyl ether urethane having a melting enthalpy $\Delta H_m$≥35 J/g, and one or more melting temperatures ($T_m$) wherein any and all of the $T_m$ of the crystalline VEU-c are in the region of from and including 30 up to and including 80° C. A crystalline VEU-c is a species of a crystalline VU-c.

By 'crystalline VESU-c' is meant a crystalline vinyl ester urethane having a melting enthalpy $\Delta H_m$≥35 J/g, and one or more melting temperatures ($T_m$) wherein any and all of the $T_m$ of the crystalline VESU-c are in the region of from and including 30 up to and including 80° C. A crystalline VESU-c is a species of a crystalline VU-c.

By 'crystalline VEESU-c' is meant a crystalline vinyl (ether-ester) urethane having a melting enthalpy $\Delta H_m$≥35 J/g, and one or more melting temperatures ($T_m$) wherein any and all of the $T_m$ of the crystalline VEESU-c are in the region of from and including 30 up to and including 80° C. A crystalline VEESU-c is a species of a crystalline VU-c.

By 'crystalline VFUR-c' is meant a crystalline vinyl functionalized urethane resin having a melting enthalpy $\Delta H_m$≥35 J/g, and one or more melting temperatures ($T_m$) wherein any and all of the $T_m$ of the crystalline VFUR-c are in the region of from and including 30 up to and including 80° C.

By 'crystalline VEFUR-c' is meant a crystalline vinyl ether functionalized urethane resin having a melting enthalpy $\Delta H_m$≥35 J/g, and one or more melting temperatures ($T_m$) wherein any and all of the $T_m$ of the crystalline VEFUR-c are in the region of from and including 30 up to and including 80° C. A crystalline VEFUR-c is a species of a crystalline VFUR-c.

By 'crystalline VESFUR-c' is meant a crystalline vinyl ester functionalized urethane resin having a melting enthalpy $\Delta H_m$≥35 J/g, and one or more melting temperatures ($T_m$) wherein any and all of the $T_m$ of the crystalline VESFUR-c are in the region of from and including 30 up to and including 80° C. A crystalline VESFUR-c is a species of a crystalline VFUR-c.

By 'crystalline VEESFUR-c' is meant a crystalline vinyl (ether-ester) functionalized urethane resin having a melting enthalpy $\Delta H_m$≥35 J/g, and one or more melting temperatures ($T_m$) wherein any and all of the $T_m$ of the crystalline VEESFUR-c are in the region of from and including 30 up to and including 80° C. A crystalline VEESFUR-c is a species of a crystalline VFUR-c.

By '$T_g$' is meant the glass transition temperature. The $T_g$ is measured using DSC (Differential Scanning calorimetry) as described herein.

By '$T_c$' is meant the crystallization temperature; in case a monomer or a resin or a resin composition has multiple crystallization peaks, then the peak temperature of the crystallization peak with the largest crystallization enthalpy ($\Delta H_c$) is mentioned herein as $T_c$. The $T_c$ is measured using DSC (Differential Scanning calorimetry) as described herein.

By '$T_m$' is meant the melting temperature; in case a monomer or a resin or a resin composition or a compound has multiple meltings then the $T_m$ of the melting with the largest melting enthalpy is mentioned herein as $T_m$. The $T_m$ is measured using DSC as described herein.

By '$\Delta H_m$' is meant the melting enthalpy. The ($\Delta H_m$) is measured using DSC as described herein. In case a monomer or a resin or a resin composition has more than one melting peaks then the melting enthalpy ($\Delta H_m$) values mentioned herein, refer to the total of the melting enthalpy ($\Delta H_m$) said total obtained by summing up the $\Delta H_m$ values of each of the melting peaks.

By '$\Delta H_c$' is meant the crystallization enthalpy. The ($\Delta H_c$) is measured using DSC as described herein. In case a monomer or a resin or a resin composition has more than one crystallization peaks then the crystallization enthalpy ($\Delta H_c$) values mentioned herein, refer to the total of the crystallization enthalpy ($\Delta H_c$) said total obtained by summing up the $\Delta H_c$ values of each of the crystallization peaks.

The glass transition temperature ($T_g$), melting temperature ($T_m$), crystallization temperature ($T_c$), melting enthalpy ($\Delta H_m$) crystallization enthalpy ($\Delta H_c$), measurements are carried out via Differential Scanning calorimetry (DSC) as described herein.

The acid value (AV) of a sample e.g. a resin or a curing agent (AV in mg KOH/g sample) is measured titrimetrically according to ISO 2114-2000.

The hydroxyl value (OHV) of a sample e.g. resin or a curing agent (OHV in mg KOH/g sample) is measured titrimetrically according to ISO 4629-1978.

By 'cured thermosetting powder coating composition' is meant a form that is obtained by partial or full curing of a thermosetting powder coating composition; said curing may be effected via heat and/or radiation, preferably via heat; said form may have any shape or size and it can for example be a film, coating; preferably the cured thermosetting powder coating composition is a powder coating.

By 'powder coating' is meant the partially or fully cured form of a thermosetting powder coating composition, the latter being preferably heat- and/or radiation curable, said form being a coating. A powder coating is obtained by curing of a thermosetting powder coating composition.

By 'article' is meant an individual object or item or element of a class designed to serve a purpose or perform a special function and can stand alone. A substrate is an example of an article.

By 'di-acid' as used herein means a dicarboxylic acid or anhydride or diester or other derivatives of a dicarboxylic acid such as for examples dicarboxylic acid salts; preferably 'di-acid' is a dicarboxylic acid or anhydride, more preferably 'di-acid' is a dicarboxylic acid.

By 'ethylenic unsaturation' as used herein means cis- or trans-configured reactive carbon-carbon double bond unsaturation and does not include aromatic unsaturation, carbon-carbon triple bond, carbon-heteroatom unsaturation. Preferably, the ethylenic unsaturation comprises at least a hydrogen which is covalently bonded to a carbon of the ethylenic unsaturation, more preferably the ethylenic unsaturation is a non-aromatic cis- or trans-configured carbon-carbon double bond unsaturation according to the following formula: . . . —CH═CH— . . . . A vinyl unsaturation is an example of an ethylenic unsaturation.

The term 'di-acid ethylenic unsaturations' as used herein means ethylenic unsaturations obtainable from any isomer of an unsaturated di-acid and/or derivatives thereof, such as for example ethylenic unsaturations obtainable from a di-acid chosen from the group of 2-butenedioic acid, 2-methyl-2-butenedioic acid, itaconic acid and mixtures thereof. Derivatives of any isomer of unsaturated di-acids include esters, anhydrides, acid salts. Fumaric acid and maleic acid are isomers of 2-butenedioic acid, whereas citraconic acid and mesaconic acid are isomers of 2-methyl-2-butenedioic acid. For example 'di-acid ethylenic unsaturations' may be obtainable from fumaric, maleic, itaconic, citraconic and/or mesaconic acids, derivatives thereof and/or mixtures thereof. Fumaric acid based unsaturation is an informal term used herein to denote unsaturation derived from fumaric acid, its isomers e.g. maleic acid and/or derivatives thereof.

By '2-butenedioic acid ethylenic unsaturations' as used herein means di-acid ethylenic unsaturations obtainable from any isomer of 2-butenedioic acid and/or derivatives thereof. Fumaric acid and maleic acid are isomers of 2-butenedioic acid. Maleic acid is the cis-isomer of 2-butenedioic acid, whereas fumaric acid is the trans-isomer of 2-butenedioic acid. Derivatives of any isomer of 2-butenedioic acid include esters, anhydrides, acid salts.

By 'unsaturated resin comprising ethylenic unsaturations' or equally mentioned herein as 'UR', is meant an unsaturated resin having ethylenic unsaturations. For example an unsaturated polyester resin comprising 2-butenedioic acid ethylenic unsaturations, an acrylated polyester resin, a methacylated polyester resin, a (meth)acrylated polyester resin, are each an unsaturated resin comprising ethylenic unsaturations.

By 'unsaturated resin comprising di-acid ethylenic unsaturations' is meant an unsaturated resin having di-acid ethylenic unsaturations; said resin is a sub-class of an unsaturated resin comprising ethylenic unsaturations. For example an unsaturated polyester resin comprising di-acid ethylenic unsaturations is an unsaturated resin comprising di-acid ethylenic unsaturations.

By 'unsaturated resin comprising 2-butenedioic acid ethylenic unsaturations' is meant an unsaturated resin having 2-butenedioic acid ethylenic unsaturations; said resin is a sub-class of an unsaturated resin comprising di-acid ethylenic unsaturations and thus a further sub-class of an unsaturated resin comprising ethylenic unsaturations. For example an unsaturated polyester resin having 2-butenedioic acid ethylenic unsaturations is an unsaturated resin comprising 2-butenedioic acid ethylenic unsaturations.

By 'unsaturated polyester resin comprising ethylenic unsaturations' or equally 'unsaturated polyester resin having ethylenic unsaturations' is meant, an unsaturated polyester resin having ethylenic unsaturations.

By 'unsaturated polyester resin comprising di-acid ethylenic unsaturations' or equally 'unsaturated polyester resin having di-acid ethylenic unsaturations' is meant, an unsaturated polyester resin having di-acid ethylenic unsaturations; said polyester resin is a sub-class of an unsaturated polyester resin comprising ethylenic unsaturations By 'unsaturated polyester resin comprising 2-butenedioic acid ethylenic unsaturations' or equally 'unsaturated polyester resin having 2-butenedioic acid ethylenic unsaturations' is meant, an unsaturated polyester resin having 2-butenedioic acid ethylenic unsaturations. The 'unsaturated polyester resin comprising 2-butenedioic acid ethylenic unsaturations' may for example be prepared from any isomer of 2-butenedioic acid and/or derivatives thereof. Fumaric acid and maleic acid are isomers of 2-butenedioic acid. Maleic acid is the cis-isomer of 2-butenedioic acid, whereas fumaric acid is the trans-isomer of 2-butenedioic acid. Derivatives of any isomer of 2-butenedioic acid include esters, anhydrides, acid salts. Maleic acid and maleic acid anhydride partly isomerize to fumaric acid when used in the synthesis of a polyester resin comprising 2-butenedioic acid ethylenic unsaturations.

The 'curing agent' is selected from the group consisting of vinyl urethanes, vinyl functionalized urethane resins and mixtures thereof.

By 'curing agent A' is meant a curing agent selected from the group consisting of i), ii) and iii):
  i) one or more crystalline VU-c each of which is a crystalline vinyl urethane having a melting enthalpy $\Delta H_m \geq 35$ J/g and one or more melting temperatures ($T_m$) wherein any and all of the $T_m$ of the one or more crystalline VU-c are in the region of from and including 30 up to and including 80° C., and
  ii) one or more crystalline VFUR-c each of which is a crystalline vinyl functionalized urethane resin having a melting enthalpy $\Delta H_m \geq 35$ J/g and one or more melting temperatures ($T_m$) wherein any and all of the $T_m$ of the one or more crystalline VFUR-c are in the region of from and including 30 up to and including 80° C., and
  iii) mixtures of crystalline VU-c and crystalline VFUR-c, wherein the $\Delta H_m$ and $T_m$ is each measured via Differential Scanning calorimetry (DSC) according to the description.

By 'thermal radical initiator' is meant any monomeric organic or monomeric inorganic compound that upon heating and without the application of UV-radiation is able to generate free radicals, for example via decomposition and initiate radical crosslinking in the thermosetting powder coating composition of the invention; preferably the thermal radical initiator is able to generate free radicals without the application of UV-radiation upon being heated at temperatures of up to 230° C., more preferably the thermal radical initiator is able to generate free radicals without the application of UV-radiation upon being heated at temperatures of from and including 20 up to and including 170° C. Preferably, the thermal radical initiator is any monomeric organic compound that upon heating and without the application of UV-radiation is able to generate free radicals, for example via decomposition and initiate radical crosslinking in the thermosetting powder coating composition of the invention; preferably the thermal radical initiator is able to generate free radicals without the application of UV-radiation upon being heated at temperatures of up to 230° C., more preferably upon being heated at temperatures of from and including 20 up to and including 170° C. Preferably the thermal radical initiator is selected from the group consisting of organic peroxides, azo compounds, and mixtures thereof, more preferably the thermal radical initiator is selected from the group consisting of organic peroxides. Exemplary organic peroxides include but are not limited to hydroperoxides, ketone peroxides, peroxyketals, perethers, peroxyesters (also known as peresters), monopercarbonates, peroxydicarbonates, peranhydrides. Exemplary azo compounds include but are not limited to azo isobutyronitrile (AIBN), 1,1'-azobis(cyclohexanenitrile), 1,1'-azobis(2,4,4-trimethylpentane).

By 'decomposition temperature of the component C', is meant the temperature (rounded up to the nearest integer) ±1° C., wherein the component C has a half-life time of 6 minutes, said temperature been measured via Differential Scanning calorimetry-Thermal Activity Monitoring (DSC-TAM) of a 0.1M solution of the component C in monochorobenzene. The half-life time of the component C at a given temperature, is the time required to reduce the initial amount of the component C by 50%, at said given temperature.

By the term 'photoinitiator' is meant any monomeric organic or monomeric inorganic compound that is capable to generate free radicals upon exposure to UV-radiation without the application of heat, and is selected from the group of compounds consisting of i), ii), iii) iv), v) and vi):

i) acyl phosphines such as bis-acyl phosphine oxides such as 2,4,6-trimethylbenzoyl diphenylphosphine oxide, and ii) α-hydroxy ketones, and iii) α-cleavage free radical photoinitiators including benzoin and its derivatives such as benzoin ethers such as isobutyl benzoin ether, and benzyl ketals such as benzyl dimethyl ketal, 2-hydroxy-2-methyl-1-phenylpropan-1-one and 4-(2-hydroxyethoxy)phenyl-2-hydroxy-2-propyl ketone, and iv) aryl ketones such as 1-hydroxycyclohexyl phenyl ketone, 2-benzyl-2-dimethylamino-1-(4-morpholinophenyl)-butan-1-one, 2,2-dimethoxy-2-phenylacetophenone, mixture of benzophenone and 1-hydroxycyclohexyl phenyl ketone, and 2-methyl-1-(4-(methylthiophenyl)-2-(4-morpholinyl))-1-propanone, and v) hydrogen abstraction free radical type photoinitiators such as Michler's ketone (4-4'-bisdimethylamino benzophenone), Michler's ethyl ketone (4-4'-bisdiethylamino benzophenone ethyl ketone), benzophenone, thioxanthone, anthroquinone, d,l-camphorquinone, ethyl d,l-ccamphorquinone, ketocoumarin, anthracene and derivatives of each of them, and vi) any mixture of i), ii), iii), iv) and v).

The 'ethoxylated hydroxybutyl vinyl ether-X' is selected from the group of compounds represented by the following formula HBVE(EO) and mixtures thereof

[formula HBVE(EO)]

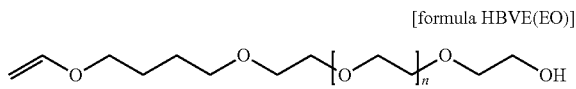

wherein n is an integer selected from the group consisting of 1, 2, 3, 4, and 5. Examples of compounds of formula HBVE(EO) include 3,6,9,14-tetraoxahexadec-15-en-1-ol (wherein n=1), and 3,6,9,12,17-pentaoxanonadec-18-en-1-ol (wherein n=3), and 3,6,9,12,15,18,23-heptaoxapentacos-24-en-1-ol (wherein n=5).

Certain moieties, species, groups, repeat units, compounds, oligomers, polymers, materials, mixtures, compositions and/or formulations which comprise and/or are used in some or all of the invention as described herein may exist as one or more different forms such as any of those in the following non exhaustive list: stereoisomers (such as enantiomers (e.g. E and/or Z forms), diastereoisomers and/or geometric isomers); tautomers (e.g. keto and/or enol forms). The invention comprises and/or uses all such forms which are effective as defined herein.

By '$M_n$' is meant the number average molecular weight and it is measured as disclosed herein.

By 'mg/Kg A and B' is meant mg ($=10^{-3}$ g) per 1 Kg of the total of components A and B together. For example if in a TPCC of the invention the total amount of component E is 2400 mg and the amounts of components A and B in the TPCC of the invention are 2 Kg and 1 Kg respectively, then the total amount of component E in said TPCC is 800 mg/Kg A and B.

By 'mmol/Kg A and B' is meant mmol ($=10^{-3}$ mol) per 1 Kg of the total of components A and B together. For example if in a TPCC of the invention the total amount of component C is 1900 mmol and the amounts of components A and B in the TPCC of the invention are 5 Kg and 5 Kg respectively, then the total amount of component C in said TPCC is 190 mmol/Kg A and B.

By 'pph' is meant weight parts per one hundred weight parts.

By 'pph of A and B' (or equally 'pph A and B') is meant weight parts per one hundred weight parts of the total of components A and B together. For example if in a TPCC of the invention the total amount of component B is 20 Kg and the amount of component A in the TPCC of the invention is 80 Kg, then component B is present in an amount of 20 pph A and B; thus, in this particular example since B is present in an amount of 20 weight parts, at the same time A is present in an amount of 80 weight parts.

By 'WPU' is meant the measured weight per ethylenic unsaturation, unless otherwise stated; the WPU is measured using $^1$H-NMR spectroscopy as described in the Examples [see Examples, $^1$H-NMR method for the measurement of the WPU ($^1$H-NMR method WPU)].

By 'viscosity' (η) is meant the melt viscosity (in Pa·s) at 160° C. Viscosity measurements were carried out at 160° C., on a Brookfield CAP 2000+H Viscometer. The applied shear-rate was 70 s$^{-1}$ and a 19.05 mm spindle (cone spindle CAP-S-05 (19.05 mm, 1.8°) was used.

By 'decomposition temperature of the component C', is meant the temperature (rounded up to the nearest integer) ±1° C., wherein the component C has a half-life time of 6 minutes, said temperature been measured via Differential Scanning calorimetry-Thermal Activity Monitoring (DSC-TAM) of a 0.1M solution of the component C in monochorobenzene. The half-life time of the component C at a given temperature, is the time required to reduce the initial amount of the component C by 50%, at said given temperature.

By '(N)IR lamp' denotes herein both a near-IR lamp and an IR lamp.

By the term 'lower than' is meant that the relevant maximum boundary value is not included in the range.

By the term 'higher than' is meant that the relevant minimum boundary value is not included in the range.

For all upper and lower boundaries of any parameters given herein, the boundary value is included in each range for each parameter. All combinations of minimum and maximum values of the parameters described herein may be used to define the parameter ranges for various embodiments and preferences of the invention.

In the context of the invention unless stated to the contrary, the disclosure of alternative values for the upper or lower limit of the permitted range of a parameter, coupled with an indication that one of said values is more highly preferred than the other, is to be construed as an implied statement that each intermediate value of said parameter, lying in between the more preferred and the less preferred of said alternatives, is itself preferred to said less preferred value and also to each value lying between said less preferred value and said intermediate value.

The term 'comprising' as used herein means that the list that immediately follows is non-exhaustive and may or may not include any other additional suitable items, for example one or more further feature(s), component(s) and/or substituent(s) as appropriate. The term 'comprising' will be used interchangeably with the term 'containing'. "Substantially comprising" as used herein means a component or list of component(s) is present in a given material in an amount greater than or equal to about 90% w/w, preferably greater than or equal to 95% w/w, more preferably greater than or equal to 98% w/w, even more preferably greater than or equal to 99% w/w of the total amount of the given material. The term 'consisting of' as used herein mean that the list that follows is exhaustive and does not include additional items.

It will be understood that the total sum of any quantities expressed herein as percentages cannot (allowing for rounding errors) exceed 100%. For example the sum of all components of which the composition of the invention (or part(s) thereof) comprises may, when expressed as a weight (or other) percentage of the composition (or the same part(s) thereof), total 100% allowing for rounding errors. However where a list of components is non-exhaustive the sum of the percentage for each of such components may be less than 100% to allow a certain percentage for additional amount(s) of any additional component(s) that may not be explicitly described herein.

Unless the context clearly indicates otherwise, as used herein plural forms of the terms herein (for example composition, compound, component, resin, minute) are to be construed as including the singular form and vice versa.

1. The Thermosetting Powder Coating Composition of the Invention

Any and all of the thermosetting powder coating compositions disclosed in this section 1 (including any and all sub-sections) are collectively referred to in the whole of the application—as the 'thermosetting powder coating composition of the invention'. By 'thermosetting powder coating composition of the invention' (or equally 'TPCC of the invention') is meant a thermosetting powder coating composition of the invention according to the invention. Unless otherwise explicitly stated, the term 'thermosetting powder coating composition of the invention' as used herein includes any and all of its components, preferments, combinations of its features and ranges as well as combinations of any and all of its components, preferments with any and all of the combinations of its components, preferments, features and ranges. Thus, any and all of the thermosetting powder coating compositions disclosed in this section 1 (including any and all sub-sections) includes any and all of its components, preferments, combinations of its features and ranges as well as combinations of any and all of its components, preferments with any and all of the combinations of its components, preferments, features and ranges, are collectively referred to —in the whole of the application—as the thermosetting powder coating composition of the invention. Any reference in this application as to the 'thermosetting powder coating compositions as disclosed herein' refers to the thermosetting powder coating composition of the invention.

Broadly in accordance with the invention, there is provided a thermosetting powder coating composition as described in the claims and as disclosed herein.

More particularly broadly in accordance with the invention there is provided a thermosetting powder coating composition according to any one of P1a and P1b.

Preferably, the thermosetting powder coating composition comprises the following components A to D:

A: one or more unsaturated resins comprising ethylenic unsaturations (UR), each of which is an unsaturated polymer having ai) and aii):
  ai) a number average molecular weight ($M_n$) of at least 200 and at most 20000 Da, and
  aii) ethylenic unsaturations which are cis- or trans-configured reactive carbon-carbon double bond unsaturations and do not include aromatic unsaturations, carbon-carbon triple bonds, carbon-heteroatom unsaturations; and
  wherein the UR is selected from the group consisting of polyester resins, acrylic resins, polyurethanes, epoxy resins, polyamides, polyesteramides, polycarbonates, polyureas and mixtures thereof, and B: one or more curing agents selected from the group consisting of vinyl urethanes, vinyl functionalized urethane resins and mixtures thereof, wherein at least one curing agent is curing agent A which is selected from the group consisting of i), ii) and iii):
  i) one or more crystalline VU-c each of which is a crystalline vinyl urethane having a melting enthalpy $\Delta H_m \geq 35$ J/g, and one or more melting temperatures ($T_m$) wherein any and all of the $T_m$ of the one or more crystalline VU-c are in the region of from and including 30 up to and including 80° C., and
  ii) one or more crystalline VFUR-c each of which is a crystalline vinyl functionalized urethane resin having a melting enthalpy $\Delta H_m \geq 35$ J/g, and one or more melting temperatures ($T_m$) wherein any and all of the $T_m$ of the one or more crystalline VFUR-c are in the region of from and including 30 up to and including 80° C., and
  iii) mixtures of crystalline VU-c and crystalline VFUR-c,
  wherein the $\Delta H_m$ and $T_m$ is each measured via Differential Scanning calorimetry (DSC) according to the description,
  and C: one or more thermal radical initiators, wherein at least one thermal radical initiator is dilauroyl peroxide and wherein the dilauroyl peroxide is present in an amount of at least 30 and at most 190 mmol/Kg A and B, and D: one or more co-initiators selected is selected from the group consisting of onium compounds, sulpho-compounds, and mixtures thereof, and wherein the total amount of component D is at least 10 and at most 300 mmol/Kg A and B.

Preferably the thermosetting powder coating composition of the invention has a glass transition temperature ($T_g$) of at least 20 and at most 80, more preferably at least 25 and at most 70, even more preferably at least 25 and at most 60, most preferably at least 25 and at most 55, especially at least 25 and at most 50, more especially at least 30 and most 80, even more especially at least 30 and at most 70, most especially at least 30 and at most 60, for example at least 30 and at most 55, for example at least 30 and at most 50° C.

The various components of the thermosetting powder coating compositions of the invention, and their preferments, including any and all their features, ranges are disclosed in the sub-sections of section 1.

Unless otherwise explicitly stated, any feature, element, component, embodiment, aspect, range and especially any preferred feature, preferred element, preferred embodiment, preferred aspect, preferred range, preferred combination of ranges, preferments, embodiments and aspects in connection with any piece of disclosure disclosed in this section 1 including sub-sections 1.2 to 1.7 and their sub-sections, can be combined with each other and with any other feature, element, component, embodiment, aspect, range and especially any preferred feature, preferred element, preferred embodiment, preferred aspect, preferred range, preferred combination of ranges, preferments, embodiments and aspects of the invention as these are disclosed in the entire application.

1.1 the Component a of the TPCC of the Invention: Unsaturated Resins Comprising Ethylenic Unsaturations (UR)

The TPCC of the invention comprises component A wherein component A represents one or more unsaturated resins comprising ethylenic unsaturations (UR) selected from the group consisting of polyester resins, acrylic resins, polyurethanes, epoxy resins, polyamides, polyesteramides, polycarbonates, polyureas and mixtures thereof.

More specifically, the TPCC of the invention comprises component A wherein component A represents one or more unsaturated resins comprising ethylenic unsaturations (UR) selected from the group consisting of polyester resins, acrylic resins, polyurethanes, epoxy resins, polyamides, polyesteramides, polycarbonates, polyureas and mixtures thereof, and wherein each of which has ai) and aii):
  ai) a number average molecular weight ($M_n$) of at least 200 and at most 20000 Da, preferably of at least 1000 and at most 10000 Da, and
  aii) ethylenic unsaturations which are cis- or trans-configured reactive carbon-carbon double bond unsaturations and do not include aromatic unsaturations, carbon-carbon triple bonds, carbon-heteroatom unsaturations.

Preferably, in the TPCC of the invention the component A is present in an amount of at least 10 and at most 96, more preferably in an amount of at least 15 and at most 90, even more preferably in an amount of at least 40 and at most 85, most preferably in an amount of at least 45 and at most 84 pph of A and B.

Unless otherwise explicitly stated, any feature, element, component, embodiment, aspect, range and especially any preferred feature, preferred element, preferred embodiment, preferred aspect, preferred range, preferred combination of ranges, preferments, embodiments and aspects in connection with any piece of disclosure disclosed in this section 1.1 can be combined with each other and with any other feature, element, component, embodiment, aspect, range and especially any preferred feature, preferred element, preferred embodiment, preferred aspect, preferred range, preferred combination of ranges, preferments, embodiments and aspects of the invention as these are disclosed in the entire application.

Preferably the UR is selected from the group consisting of polyester resins, polyurethanes, polyamides, polyesteramides, polyureas; most preferably the UR is selected from the group consisting of unsaturated polyester resins, acrylic resins (polyacrylates), unsaturated polyurethanes, unsaturated epoxy resins, unsaturated polyamides, unsaturated polyesteramides, unsaturated polycarbonates, unsaturated polyureas and mixtures thereof; especially the UR is selected from the group consisting of unsaturated polyester resins, unsaturated polyurethanes, unsaturated polyamides, unsaturated polyesteramides, unsaturated polyureas and mixtures thereof. For example the UR is a polyester resin; most preferably the UR is an unsaturated polyester resin; most preferably the UR is an unsaturated polyester resin comprising ethylenic unsaturations such as acrylated polyester resins, unsaturated polyester resins comprising di-acid ethylenic unsaturations, unsaturated polyester resins comprising 2-butenedioic acid ethylenic unsaturations; especially the UR is an unsaturated polyester resin comprising di-acid ethylenic unsaturations; more especially the UR is an unsaturated polyester resin comprising 2-butenedioic acid ethylenic unsaturations.

The UR may be a polyacrylate, also known as acrylic resin. Generally, an acrylic resin is based on alkyl esters of acrylic acid or methacrylic acid, optionally in combination with styrene. These alkyl esters of acrylic or methacrylic acid may be replaced by hydroxyl or glycidyl functional acrylic or methacrylic acids. Exemplary alkyl esters of acrylic or methacrylic acids include but are not limited to ethyl methacrylate, ethyl acrylate, isopropyl methacrylate, isopropyl acrylate, n-butyl methacrylate, n-butyl acrylate, n-propyl methacrylate, n-propyl acrylate, isobutyl methacrylate, isobutyl acrylate, ethylhexyl acrylate, cyclohexyl methacrylate, cyclohexyl acrylate and mixtures thereof. To obtain an acrylic resin having a hydroxyl functionality, the acrylic resin contains a hydroxyl functional (meth)acrylic acid [by the term '(meth)acrylic' is meant 'methacrylic or acrylic'], preferably in combination with alkyl esters of (meth)acrylic acid. Examples of hydroxyl functional (meth)acrylic acid esters include hydroxyethyl (meth)acrylate, and hydroxypropyl (meth)acrylate etc. To obtain an acrylic resin having a glycidyl functionality, the acrylic resin contains a glycidyl functional (meth)acrylic acid esters, preferably in combination with alkyl esters of (meth)acrylic acid. Examples of glycidyl functional (meth)acrylic acid esters include glycidyl methacrylate, etc. It is also possible to synthesize acrylic resins with both hydroxyl and glycidyl functionality. The introduction of ethylenic unsaturations to an acrylic resin may be carried out by reacting the hydroxyl and/or glycidyl moieties on the acrylic resin with an unsaturated organic acid such as acrylic acid, methacrylic acid, 2-butenedioic acid.

The UR may be a polyurethane. In the context of the invention the term 'polyurethane' does not include vinyl functionalized urethane resins (VFUR). In other words the UR may be a polyurethane other than a VFUR. Polyurethanes can for example be prepared using customary, generally known polyaddition reaction of a (poly)isocyanate with a (poly)alcohol in the presence of, if needed a catalyst and other additives. For example, if needed, customary catalysts such as, for example tertiary amines or organometallic compounds, such as for example monobutyltin, tris(2-ethylhexanoate), tetrabutyl titanate or dibutyl tin dilaurate can be used. Examples of amounts of these catalysts used are usually around 0.01 wt % based on the total weight of the resin. Examples of the (poly)alcohols that may be used in the preparation of polyurethanes are the same as those that can be used in the preparation of a polyester resin. Examples of isocyanates that may be used in the preparation of polyurethanes include but are not limited to those mentioned herein for the preparation of the VFUR. The introduction of ethylenic unsaturations to a polyurethane resin may be carried out by reacting the isocyanate moieties on the polyurethane resin with an unsaturated hydroxyl functional ester such as hydroxyl propyl methacrylate or hydroxyl ethyl acrylate or hydroxyl ethyl methacrylate; alternatively the introduction of ethylenic unsaturations to a polyurethane resin may be carried out by reacting the hydroxyl moieties on the polyurethane with an unsaturated organic acid such as acrylic acid, methacrylic acid, 2-butenedioic acid.

The UR may be an epoxy resin. Epoxy resins may for example be prepared from phenolic compounds in combination with epichlorohydrins resulting in epoxy resins like for example a bisphenol A diglycidyl ether such as is commercially available as Epikote™ 1001 or a Novolac epoxide. The introduction of ethylenic unsaturations to an epoxy resin may be carried out by reacting the epoxy moieities on the epoxy resin with an unsaturated organic acid such as acrylic acid, methacrylic acid, 2-butenedioic acid.

The UR may be a polyamide. Polyamides can for example be prepared by a polycondensation reaction of a diamine and a dicarboxylic acid. The dicarboxylic acids may be branched, non-linear or linear. Exemplary dicarboxylic acids include but are not limited to phthalic acid, isophthalic acid, terephthalic acid, 1,4-cyclohexanedicarboxylic acid, naphthalene-2,6-dicarboxylic acid, cyclohexanediacetic acid, diphenyl-4,4'-dicarboxylic acid, phenylenedi (oxyacetic acid), sebacic acid, succinic acid, adipic acid, glutaric acid and/or azelaic acid. Exemplary diamines include but are not limited to isophorondiamine, 1,2-ethylenediamine, 1,3-propylenediamine, 1,6-hexamethylenediamine, 1,12-dodecylenediamine, 1,4 cyclohexanebismethylamine, piperazine, p-xylylenediamine and/or m-xylylenediamine. The polyamide may also be branched using branching agents. Exemplary branching agents include but are not limited to amines for example di-alkylene-triamines, such as for example di-ethylene-triamine or di-hexamethylene-triamine; di-alkylene-tetramines or di-alkylene-pentamines; acids, for example 1,3,5-benzene tricarboxylic acid, trimellitic anhydride or pyromelitic anhydride; and poly-functional amino acids, such as for example aspartic acid or glutamic acid. The introduction of ethylenic unsaturations may be carried out by reacting the carboxyl moieities on a polyamide resin with an unsaturated organic alcohol, such as hydroxyethylacrylate, hydroxyethylmethacrylate. The UR may be a polyesteramide. Polyesteramides are resins comprising both ester bonds (as in a polyester) and amide bonds (as in a polyamide) and may for example be prepared from mono-, di-, tri- or polyfunctional monomers, such as monomers with carboxylic acid functionality, monomers with hydroxyl functionality, monomers with amine functionality and/or monomers having a combination of any of these functionalities. The introduction of ethylenic unsaturations may be carried out by reacting the carboxyl moieities on a polyesteramide resin with an unsaturated organic alcohol, such as hydroxyethyl(meth)acrylate. The UR may be a polycarbonate. The introduction of ethylenic unsaturations to a polycarbonate may be carried out by reacting the hydroxyl moieities on the polycarbonate with an unsaturated organic acid such as acrylic acid, methacrylic acid, 2-butenedioic acid.

The UR may be a polyurea. Polyureas can for example be prepared using customary, generally known polyaddition reactions of a (poly)isocyanate with a (poly)amine in the presence of, if needed a catalyst and other additives similar to what is described above for polyurethanes. Suitable (poly)amines for the preparation of polyureas include those as are exemplified above for the polyamides. Suitable (poly)isocyanates for the preparation of polyureas include those as are exemplified above for the polyurethanes. The introduction of ethylenic unsaturations to a polyurea may be carried out by reacting the amine and/or isocyanate moieties in the polyurea with an unsaturated organic acid such as acrylic acid, methacrylic acid, 2-butenedioic acid.

The UR may be an unsaturated polyester resin such as an acrylated polyester resin or a polyester comprising ethylenic unsaturations in its backbone; preferably the UR is an unsaturated polyester resin comprising ethylenic unsaturations such as acrylated polyester resins, unsaturated polyester resins comprising di-acid ethylenic unsaturations, unsaturated polyester resins comprising 2-butenedioic acid ethylenic unsaturations; especially the UR is an unsaturated polyester resin comprising di-acid ethylenic unsaturations; more especially the UR is an unsaturated polyester resin comprising 2-butenedioic acid ethylenic unsaturations. The unsaturated polyester resins comprising ethylenic unsaturations may be amorphous or crystalline. The unsaturated polyester resin comprising di-acid ethylenic unsaturations may be amorphous or crystalline. The unsaturated polyester resins comprising 2-butenedioic acid ethylenic unsaturations may be amorphous or crystalline.

Polyesters (or commonly known in the art as polyester resins) are generally polycondensation products of polyols and polycarboxylic acids. According to the invention a polyester resin is preferably the polycondensation product of polyols and polycarboxylic acids, more preferably a polyester resin is the polycondensation product of dicarboxylic acids, di-alcohols (diols) and/or trifunctional alcohols and/or trifunctional carboxylic acids.

Examples of polycarboxylic acids, especially dicarboxylic acids which may be used in the preparation of a polyester resininclude isophthalic acid, terephthalic acid, hexahydroterephthalic acid, 2,6-naphthalenedicarboxylic acid and 4,4'-oxybisbenzoic acid, 3,6-dichlorophthalic acid, tetrachlorophthalic acid, tetrahydrophthalic acid, hexahydroterephthalic acid, hexachloroendomethylenetetrahydrophthalic acid, endomethylenetetrahydrophthalic acid, phthalic acid, azelaic acid, sebacic acid, decanedicarboxylic acid, adipic acid, succinic acid and trimellitic acid. These illustrative polycarboxylic acids can be used in their acid form or where available, in the form of their anhydrides, acyl chlorides or lower alkyl esters. Mixtures of polycarboxylic acids can also be used. In addition hydroxycarboxylic acids and lactones can be used. Examples include hydroxypivalic acid and ε-caprolactone.

Polyols, in particular diols, can be reacted with the carboxylic acids or their analogues as described above to prepare the polyester resin. Examples of polyalcohols include aliphatic diols, for example, ethylene glycol, propane-1,2-diol, propane-1,3-diol, butane-1,2-diol, butane-1,4-diol, butane-1,3-diol, 2,2-dimethylpropane-1,3-diol (neopentyl glycol), hexane-2,5-diol, hexane-1,6-diol, 2,2-bis-(4-hydroxycyclohexyl)-propane (hydrogenated bisphenol-A), 1,4-dimethylolcyclohexane, diethylene glycol, dipropylene glycol and 2,2-bis[4-(2-hydroxyethoxy)-phenyl]propane, the hydroxypivalic ester of neopentylglycol and 4,8-bis-(hydroxymethyl)tricyclo[5,2,1,0]decane (=tricyclodecane dimethylol) and 2,3-butenediol.

Monofunctional carboxylic acids, for example para-tertbutyl benzoic acid, benzoic acid, methyl benzoic acid, cinnamic acid, crotonic acid may be used to block the polymer chain.

Trifunctional or more functional alcohols or carboxylic acids can be used to obtain branched polyester resins. Examples of suitable trifunctional or more functional alcohols or carboxylic acids include but not limited to glycerol, hexanetriol, trimethylol ethane, trimethylol propane, pentaerythritol and sorbitol, trimellitic acid, trimellitic acid anhydride, pyromellitic acid dimethylolpropionic acid (DMPA). To obtain branched polyester resins trifunctional monomers such as trimethylolpropane may be used.

The polyester resins can be prepared via customary, generally known polymerization methods by conventional esterification and/or transesterification or by esterification and/or transesterification via the use of an enzyme. For example, if needed, customary esterification catalysts such as, for example, butylchlorotindihydroxide, dibutyltin oxide, tetrabutyl titanate or butyl stannoic acid can be used. Examples of amounts of these esterification catalysts used are usually around 0.1 wt % based on the total weight of the polyester resin.

The conditions for preparing a polyester resin and the COOH/OH ratio can be chosen such that end products are obtained which have an acid value or hydroxyl value which is within the intended range of values.

The polyester resins used in the thermosetting powder coating compositions of the invention are unsaturated polyester resins comprising ethylenic unsaturations, preferably comprising di-acid ethylenic unsaturations, more preferably comprising 2-butenedioic acid ethylenic unsaturations; said ethylenic unsaturations may be present in the backbone of the polyester resin and/or pendant to the backbone of the polyester resin and/or at the terminus of the polyester resin. Preferably, said ethylenic unsaturations are in the backbone of the polyester resin and/or pendant to the backbone of the polyester resin, more preferably said ethylenic unsaturations are in the backbone of the polyester resin; said ethylenic unsaturations may be built into the polyester resin backbone, for instance by reacting a hydroxyl functional monomer (such as the polyalcohols mentioned before) with an unsaturated di-acid monomer as mentioned above. It is also possible to connect the di-acid ethylenic unsaturation to the terminus (or termini) of the polyester resin, for example by reacting a hydroxyl functional terminal group of the polyester resin with an unsaturated di-acid monomer or its corresponding anhydride as mentioned above.

Acrylated polyester resins are unsaturated polyester resins comprising ethylenic unsaturations said ethylenic unsaturations being derived from methacrylic acid, acrylic acid, ethylenically unsaturated glycidyl functional monomer, such as for example glycidyl methacrylate or glycidyl acrylate; in the acrylated polyester resins said ethylenic unsaturations are typically at the terminus (or termini) of the unsaturated polyester resin. Acrylated polyester resins may be prepared by reacting for example a hydroxyl or an epoxy or an amine functional (preferably also terminal) group of a polyester resin with methacrylic acid, acrylic acid, ethylenically unsaturated glycidyl functional monomer, such as for example glycidyl methacrylate or glycidyl acrylate. Alternatively, an acrylated polyester resin may be prepared by reacting a carboxyl functional (preferably also terminal) group of a polyester resin with an ethylenically unsaturated glycidyl functional monomer, such as for example glycidyl methacrylate or glycidyl acrylate.

Preferably polyester resins comprising di-acid ethylenic unsaturations have di-acids chosen from the group consisting of any isomer of 2-butenedioic acid, 2-methyl-2-butenedioic acid, itaconic acid and mixtures thereof. Derivatives of any isomer of unsaturated di-acids include esters, anhydrides, acid salts. Fumaric acid and maleic acid are isomers of 2-butenedioic acid, whereas citraconic acid and mesaconic acid are isomers of 2-methyl-2-butenedioic acid. For example 'di-acid ethylenic unsaturations' may be obtainable from fumaric, maleic, itaconic, citraconic and/or mesaconic acids, derivatives thereof and/or mixtures thereof. Fumaric acid based unsaturation is an informal term used herein to denote unsaturation derived from fumaric acid, its isomers e.g. maleic acid and/or derivatives thereof. More preferably the di-acids are chosen from the group consisting of any isomer of 2-butenedioc acid, itaconic acid and mixtures thereof, even more the di-acids are chosen from the group consisting of any isomer of 2-butenedioc acid. Besides 2-butenedioic acid ethylenic unsaturations, the unsaturated polyester resin may of course also have other di-acid ethylenic unsaturations.

Preferably, the unsaturated polyester resin comprising ethylenic unsaturations such as di-acid ethylenic unsaturations such as 2-butenedioic acid ethylenic unsaturations is obtainable from at least the following monomers: unsaturated di-acid for example any isomer of 2-butenedioic acid, 2-methyl-2-butenedioic acid, itaconic acid, derivatives thereof and/or mixtures thereof, terephthalic acid, neopentylglycol and/or propylene glycol. Trifunctional monomers such as trimethylolpropane may be used in order to obtain branched polyester resin comprising ethylenic unsaturations such as di-acid ethylenic unsaturations such as 2-butenedioic acid ethylenic unsaturations.

Most preferably, the UR is an unsaturated polyester resin comprising 2-butenedioic acid ethylenic unsaturations.

The disclosures and any and all preferments concerning the ethylenic unsaturations, the $M_n$, $T_g$, WPU, AV, OHV, viscosity of the UR presented here below till the end of section 1.1, are also meant to be disclosed for and apply equally for each one of acrylic resin, polyurethane, epoxy resin, polyamide, polyesteramide, polycarbonate, polyurea and polyester resin e.g. for an unsaturated polyester resin, for an unsaturated polyester resin comprising ethylenic unsaturations such as an acrylated polyester resin, unsaturated polyester resin comprising di-acid ethylenic unsaturations, for an unsaturated polyester resin comprising 2-butenedioic acid ethylenic unsaturations.

Preferably, the ethylenic unsaturations of the UR are di-acid ethylenic unsaturations. More preferably, the ethylenic unsaturations of the UR are 2-butenedioic acid ethylenic unsaturations.

Preferably, the UR has a $M_n$ of at least 800, more preferably of at least 1000, even more preferably of at least 1500, most preferably of at least 1800, especially of at least 2000, more especially of at least 2200 Da. Preferably, the UR has a $M_n$ of at most 20000, more preferably of at most 10000, even more preferably of at most 9000, most preferably of at most 8000, especially of at most 7000, more especially of at most 6000, most especially of at most 5000 Da. Preferably, the UR has a $M_n$ of at least 1000 and of at most 10000, more preferably of at least 2000 and of at most 8000 Da.

Preferably, the UR has a WPU of at least 250, more preferably of at least 300, even more preferably of at least 350, most preferably of at least 400, most preferably of at least 450, especially of at least 500 g/mol. The UR has a WPU of at most 2200, more preferably of at most 1650, even more preferably of at most 1450, most preferably of at most 1350, especially of at most 1200 g/mol. Preferably the WPU of UR ranges from 250 to 2200, more preferably from 450 to 1350 g/mol.

Preferably the UR has a glass transition temperature of at least 20, more preferably of at least 25, even more preferably of at least 30, most preferably of at least 40° C. Preferably, the UR has a glass transition temperature of at most 120, more preferably of at most 110, even more preferably of at most 100, most preferably of at most 90, especially of at most 80, more especially of at most 75, most especially of at most 70, for example of at most 65, for example of at most 60° C. Preferably the UR has a glass transition temperature of at least 20 and at most 120, more preferably of at least 30 and at most 100, even more preferably of at least 35 and at most 90, most preferably of at least 40 and at most 75° C. Preferably, the UR has a glass transition temperature of at least 40 and of at most 75° C.

Preferably the UR has a viscosity of at most 150, more preferably of at most 120, even more preferably of at most 100, most preferably of at most 80, especially of at most 60, more especially of at most 40, most especially of at most 20, for example of at most 15 Pa·s. Preferably the UR has a viscosity of at least 0.001, more preferably of at least 0.1, even more preferably of at least 0.5, most preferably of at least 1, especially of at least 2 Pa·s. Preferably the UR has a viscosity of at least 0.001 and at most 40 Pa·s, more preferably of at least 0.05 and at most 20 Pa·s.

If the UR has carboxyl groups, then the acid value (AV) of the UR is preferably at least 0 and at most 60, more preferably at least 0.05 and at most 50, even more preferably of at least 0.1 and at most 20, most preferably at least 0.1 and at most 10 mg KOH/g UR.

If the UR has hydroxyl groups, then the hydroxyl value (OHV) of the UR is preferably at least 0.1 and at most 80, more preferably at least 5 and at most 75, even more preferably at least 8 and at most 70, most preferably at least 10 and at most 60 mg KOH/g UR.

1.2 the Component B of the TPCC of the Invention

The terms 'component B' and 'B' are used herein interchangeably.

The TPCC of the invention comprises component B wherein component B represents one or more curing agents selected from the group consisting of vinyl urethanes, vinyl functionalized urethane resins and mixtures thereof, wherein at least one curing agent is curing agent A which is selected from the group consisting of i), ii) and iii):

i) one or more crystalline VU-c each of which is a crystalline vinyl urethane having a melting enthalpy $\Delta H_m \geq 35$ J/g and one or more melting temperatures ($T_m$) wherein any and all of the $T_m$ of the one or more crystalline VU-c are in the region of from and including 30 up to and including 80° C., and ii) one or more crystalline VFUR-c each of which is a crystalline vinyl functionalized urethane resin having a melting enthalpy $\Delta H_m \geq 35$ J/g and one or more melting temperatures ($T_m$) wherein any and all of the $T_m$ of the one or more crystalline VFUR-c are in the region of from and including 30 up to and including 80° C., and iii) mixtures of crystalline VU-c and crystalline VFUR-c, wherein the $\Delta H_m$ and $T_m$ is each measured via Differential Scanning calorimetry (DSC) according to the description.

By 'curing agent' is meant a compound selected from the group consisting of vinyl urethanes, vinyl functionalized urethane resins and mixtures thereof.

The vinyl urethane (VU) may be amorphous or crystalline. An example of a VU is Uralac® P3307 which is a crystalline VU having a $T_m$ of 100° C.

The vinyl functionalized urethane resin (VFUR) may be amorphous or crystalline.

Preferably the vinyl urethane (VU)—whether amorphous or crystalline—has a $M_n$ of at least 400 and of at most 20000 Da, and a WPU of at least 100 and of at most 2000 g/mol; and the vinyl functionalized urethane resin (VFUR)—whether amorphous or crystalline—has a $M_n$ of at least 400 and of at most 20000 Da, and a WPU of at least 100 and of at most 2000 g/mol.

If the VU has a $T_m$, then its $T_m$ is preferably at least 20 and at most 120° C.

If the VFUR has a $T_m$, then its $T_m$ is preferably at least 20 and at most 120° C.

If the VFUR has a $T_g$, then its $T_g$ is preferably at least –80 and at most 100, more preferably at most 80° C.

Preferably the crystalline VU-c is selected from the group consisting of crystalline VEU-c, crystalline VESU-c, and crystalline VEESU-c; more preferably the crystalline VU-c is selected from the group consisting of crystalline VEU-c, and crystalline VESU-c; most preferably the crystalline VU-c is selected from the group consisting of crystalline VEU-c; especially the crystalline VU-c is selected from the group consisting of diethylene glycol divinyl ether urethane, triethylene glycol divinyl ether urethane and mixtures thereof; more especially the crystalline VU-c is diethylene glycol divinyl ether urethane; most especially the crystalline VU-c is triethylene glycol divinyl ether urethane.

Preferably the crystalline VFUR-c is selected from the group consisting of crystalline VEFUR-c, crystalline VESFUR-c, and crystalline VEESFUR-c; more preferably the crystalline VFUR-c is selected from the group consisting of crystalline VEFUR-c, and crystalline VESFUR-c; most preferably the crystalline VFUR-c is selected from the group consisting of crystalline VEFUR-c.

Preferably, the TPCC of the invention comprises component B wherein component B represents one or more curing agents, wherein at least one curing agent is curing agent A which is selected from the group consisting of i), ii) and iii):

i) one or more crystalline VU-c each of which is a crystalline vinyl urethane having a melting enthalpy $\Delta H_m \geq 35$ J/g and one or more melting temperatures ($T_m$) wherein any and all of the $T_m$ of the one or more crystalline VU-c are in the region of from and including 30 up to and including 80° C., and wherein the crystalline VU-c is selected from the group consisting of crystalline VEU-c, crystalline VESU-c, and crystalline VEESU-c; more preferably from the group consisting of crystalline VEU-c, and crystalline VESU-c; most preferably from the group consisting of crystalline VEU-c; especially from the group consisting of diethylene glycol divinyl ether urethane, triethylene glycol divinyl ether urethane and mixtures thereof; more especially is diethylene glycol divinyl ether urethane; most especially the crystalline VU-c is triethylene glycol divinyl ether urethane, and ii) one or more crystalline VFUR-c each of which is a crystalline vinyl functionalized urethane resin having a melting enthalpy $\Delta H_m \geq 35$ J/g and one or more melting temperatures ($T_m$) wherein any and all of the $T_m$ of the one or more crystalline VFUR-c are in the region of from and including 30 up to and including 80° C., and wherein the crystalline VFUR-c is selected from the group consisting of crystalline VEFUR-c, crystalline VESFUR-c, and crystalline VEESFUR-c; more preferably the crystalline VFUR-c is selected from the group consisting of crystalline VEFUR-c, and crystalline VESFUR-c; most preferably the crystalline VFUR-c is selected from the group consisting of crystalline VEFUR-c, and iii) mixtures of crystalline VU-c and crystalline VFUR-c, wherein the $\Delta H_m$ and $T_m$ is each measured via Differential Scanning calorimetry (DSC) according to the description.

Preferably, the TPCC of the invention comprises component B wherein component B represents one or more curing agents, wherein at least one curing agent is curing agent A which is one or more crystalline VU-c each of which is a crystalline vinyl urethane having a melting enthalpy $\Delta H_m \geq 35$ J/g and one or more melting temperatures ($T_m$) wherein any and all of the $T_m$ of the one or more crystalline VU-c are in the region of from and including 30 up to and including 80° C., and wherein the crystalline VU-c is a crystalline VEU-c, and wherein the $\Delta H_m$ and $T_m$ is each measured via Differential Scanning calorimetry (DSC) according to the description.

Preferably, the TPCC of the invention comprises component B wherein component B represents one or more curing agents, wherein at least one curing agent is curing agent A which is one or more crystalline VU-c each of which is a crystalline vinyl urethane having a melting enthalpy $\Delta H_m \geq 35$ J/g and one or more melting temperatures ($T_m$) wherein any and all of the $T_m$ of the one or more crystalline VU-c are in the region of from and including 30 up to and including 80° C. (preferably in the region of from and including 30 up to and including 78° C., more preferably in the region of form and including 45 up to and including 77° C.), and wherein the crystalline VU-c is selected from the group consisting of diethylene glycol divinyl ether urethane, triethylene glycol divinyl ether urethane and mixtures thereof; more especially the crystalline VU-c is diethylene glycol divinyl ether urethane; most especially the crystalline VU-c is triethylene glycol divinyl ether urethane, and wherein the $\Delta H_m$ and $T_m$ is each measured via Differential Scanning calorimetry (DSC) according to the description.

Preferably, in the TPCC of the invention the component B is present in an amount of at least 4 and at most 90, more preferably in an amount of at least 10 and at most 85, even more preferably in an amount of at least 15 and at most 60, most preferably in an amount of at least 16 and at most 55 pph of A and B.

Preferably, in the TPCC of the invention the curing agent A is present in an amount of at least 5, more preferably at least 10, even more preferably at least 20, most preferably at least 30, especially at least 40, more especially at least 50, most especially at least 60, for example at least 70, for example at least 80, for example at least 90, for example at least 94, for example at least 95, for example at least 96, for example at least 97, for example at least 98, for example at least 99, for example at least 99.1, for example at least 99.2, for example at least 99.3, for example at least 99.4, for example at least 99.5, for example at least 99.6, for example at least 99.7, for example at least 99.8, for example at least 99.9, for example 100 pph of B. Preferably in the TPCC of the invention the curing agent A is present in an amount of at least 98, more preferably in an amount of at least 99 pph of B.

Preferably, the K is at most 9, preferably at most 8, more preferably at most 7, even more preferably at most 6, most preferably at most 5, especially at most 4, more especially at most 3, even more especially at most 2.8, most especially at most 2.6, for example at most 2.5. Preferably, the K is at least 0.1, more preferably at least 0.2, even more preferably at least 0.3, most preferably at least 0.4, especially at least 0.5, more especially at least 0.6, most especially at least 0.7, for example at least 0.8. Preferably the K is at least 0.3 and at most 9, more preferably K is at least 0.5 and at most 4, most preferably K is at least 0.6 and at most 3, especially K is at least 0.8 and at most 2.8, more especially K is at least 0.9 and at most 2.6, most especially K is at least 0.95 and at most 2.5, for example K is at least 0.95 and at most 3, for example K is at least 0.8 and at most 2.5.

The curing agent A may have a $T_c$ which is lower than its $T_m$. Preferably the $T_c$ of the curing agent is at most 55, more preferably at most 50, even more preferably at most 45, most preferably at most 40, especially at most 35° C., lower than its $T_m$, or lower than its highest $T_m$ if the curing agent A has more than one $T_m$. Preferably the curing agent A has a crystallization temperature ($T_c$) of at least 0 and of at most 75, more preferably of at least 10 and of at most 75, even more preferably of at least 10 and at most 72, most preferably of at least 10 and at most 70, especially of at least 10 and at most 68, more especially of at least 10 and at most 66, for example of at least 10 and at most 65, for example of at least 15 and at most 62, for example of at least 20 and at most 60° C.

Unless otherwise explicitly stated, any feature, element, component, embodiment, aspect, range and especially any preferred feature, preferred element, preferred embodiment, preferred aspect, preferred range, preferred combination of ranges, preferments, embodiments and aspects in connection with any piece of disclosure disclosed in this section 1.2 and in sub-sections 1.2.1 and 1.2.2 can be combined with each other and with any other feature, element, component, embodiment, aspect, range and especially any preferred feature, preferred element, preferred embodiment, preferred aspect, preferred range, preferred combination of ranges, preferments, embodiments and aspects of the invention as these are disclosed in the entire application.

1.2.1 the Crystalline VU-c of Curing Agent A

By 'crystalline VU-c' is meant a crystalline vinyl urethane having a melting enthalpy $\Delta H_m \geq 35$ J/g, and one or more melting temperatures ($T_m$) wherein any and all of the $T_m$ of the one or more crystalline VU-c are in the region of from and including 30 up to and including 80° C. Preferably the crystalline VU-c has a melting enthalpy $\Delta H_m \geq 40$, more preferably $\geq 50$, even more preferably $\geq 60$, most preferably $\geq 70$, especially $\geq 80$, more especially $\geq 90$, most especially $\geq 100$, for example $\geq 110$, for example $\geq 120$ J/g.

Preferably the crystalline VU-c has one or more melting temperatures ($T_m$) wherein any and all of the $T_m$ of the one or more crystalline VU-c are in the region of from and including 40 up to and including 80° C., more preferably of from and including 45 up to and including 80° C., most preferably of from and including 50 up to and including 80° C., especially of from and including 30 up to and including 78° C., more especially of from and including 40 up to and including 78° C., most especially of from and including 45 up to and including 78° C., for example of from and including 50 up to and including 78° C., for example of from and including 30 up to and including 77° C., for example of from and including 40 up to and including 77° C., for example of from and including 45 up to and including 77° C., for example of from and including 50 up to and including 77° C.

Preferably the crystalline VU-c has a $M_n$ of at least 400 and of at most 20000 Da, and a WPU of at least 100 and of at most 2000 g/mol. Preferements of these ranges are detailed herein.

Preferably the crystalline VU-c has a $M_n$ of at least 400 and of at most 20000 Da, more preferably of at least 450 and of at most 10000 Da, most preferably of at least 500 and of at most 7000 Da, especially of at least 550 and of at most 5000, more especially of at least 575 and of at most 3000 Da, most especially of at least 600 and of at most 2000 Da, for example of at least 660 and of at most 2000 Da, for example of at least 660 and of at most 1500 Da, for example of at least 660 and of at most 1200 Da, for example of at least 660 and of at most 1000 Da. Preferably the crystalline VU-c has a $M_n$ of at least 400 and of at most 5000 Da, more preferably of at least 500 and of at most 3000 Da, most preferably of at least 600 and of at most 2000 Da, especially of at least 660 and of at most 1500, more especially of at least 660 and of at most 1200 Da.

Preferably, the crystalline VU-c has a WPU of at least 100, more preferably at least 120, even more preferably at least 140, most preferably at least 145, especially at least 150, more especially at least 155, most especially at least 160, for example at least 170, for example at least 190 g/mol.

Obviously, crystalline VU-c is a sub-class of vinyl urethanes. For example Uralac® P3307 is a VU (in specific a crystalline VU) but it is not a crystalline VU-c.

Preferably the crystalline VU-c is selected from the group consisting of crystalline VEU-c, crystalline VESU-c, and crystalline VEESU-c; more preferably the crystalline VU-c is selected from the group consisting of crystalline VEU-c, and crystalline VESU-c; most preferably the crystalline VU-c is selected from the group consisting of crystalline VEU-c; especially the crystalline VU-c is selected from the group consisting of diethylene glycol divinyl ether urethane, triethylene glycol divinyl ether urethane and mixtures thereof; more especially the crystalline VU-c is diethylene glycol divinyl ether urethane; most especially the crystalline VU-c is triethylene glycol divinyl ether urethane.

The formulae of diethylene glycol divinyl ether urethane and triethylene glycol divinyl ether urethane are as shown below:

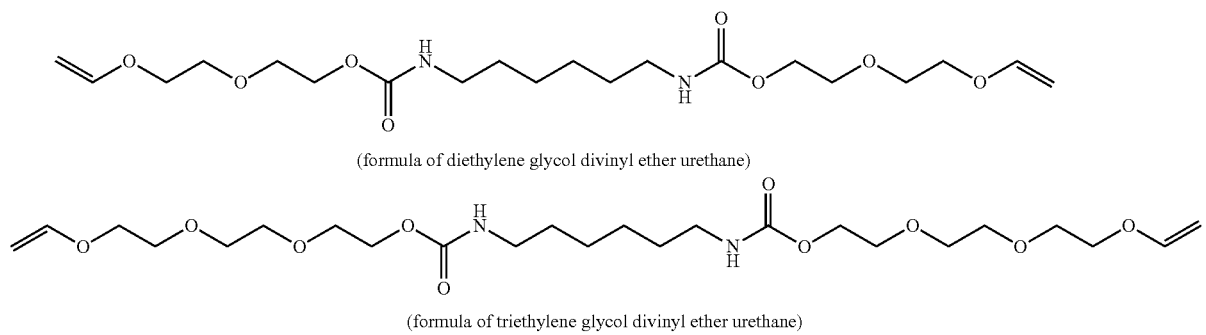

(formula of diethylene glycol divinyl ether urethane)

(formula of triethylene glycol divinyl ether urethane)

Preferably the crystalline VU-c has a WPU of at most 2000, more preferably at most 1500, even more preferably at most 1200, most preferably at most 1000, especially at most 900, more especially at most 800, most especially at most 700, for example at most 600, for example at most 500, for example at most 400, for example at most 380, for example at most 370, for example at most 350, for example at most 300, for example at most 280, for example at most 260 g/mol.

Preferably the viscosity of the crystalline VU-c is at most 30, more preferably at most 25, even more preferably at most 20, most preferably at most 15, especially at most 10, more especially at most 8, most especially at most 6, for example at most 5, for example at most 4, for example at most 3, for example at most 2, for example at most 1, for example at most 0.5, for example at most 0.2, for example at most 0.1 Pa·s.

The crystalline VU-c may have a $T_c$ which is lower than its $T_m$. Preferably the $T_c$ of the curing agent is at most 55, more preferably at most 50, even more preferably at most 45° C., lower than its $T_m$, or lower than its highest $T_m$ if the crystalline VU-c has more than one $T_m$. Preferably the crystalline VU-c has a crystallization temperature ($T_c$) of at least 0 and of at most 75, more preferably of at least 10 and of at most 75, even more preferably of at least 10 and at most 72, most preferably of at least 10 and at most 70, especially of at least 10 and at most 68, more especially of at least 10 and at most 66, for example of at least 10 and at most 65, for example of at least 15 and at most 62, for example of at least 20 and at most 60° C.

Examples of crystalline VU-c include but are not limited to diethylene glycol divinyl ether urethane and triethylene glycol divinyl ether urethane.

By 'crystalline VEU-c' is meant a crystalline vinyl ether urethane having a melting enthalpy $\Delta H_m \geq 35$ J/g, and one or more melting temperatures ($T_m$) wherein any and all of the $T_m$ of the one or more crystalline VEU-c are in the region of from and including 30 up to and including 80° C. A crystalline VEU-c is a sub-class of a crystalline VU-c.

Preferably the crystalline VEU-c has a melting enthalpy $\Delta H_m \geq 40$, more preferably $\geq 50$, even more preferably $\geq 60$, most preferably $\geq 70$, especially $\geq 80$, more especially $\geq 90$, most especially $\geq 100$, for example $\geq 110$, for example $\geq 120$ J/g.

Preferably the crystalline VEU-c has one or more melting temperatures ($T_m$) wherein any and all of the $T_m$ of the one or more crystalline VEU-c are in the region of from and including 40 up to and including 80° C., more preferably of from and including 45 up to and including 80° C., most preferably of from and including 50 up to and including 80° C., especially of from and including 30 up to and including 78° C., more especially of from and including 40 up to and including 78° C., most especially of from and including 45 up to and including 78° C., for example of from and including 50 up to and including 78° C., for example of from and including 30 up to and including 77° C., for example of from and including 40 up to and including 77° C., for example of from and including 45 up to and including 77° C., for example of from and including 50 up to and including 77° C.

Preferably the crystalline VEU-c has a $M_n$ of at least 400 and of at most 20000 Da, and a WPU of at least 100 and of at most 2000 g/mol. Preferements of these ranges are detailed herein.

Preferably the crystalline VEU-c has a $M_n$ of at least 400 and of at most 20000 Da, more preferably of at least 450 and of at most 10000 Da, most preferably of at least 500 and of at most 7000 Da, especially of at least 550 and of at most 5000, more especially of at least 575 and of at most 3000 Da, most especially of at least 600 and of at most 2000 Da, for example of at least 660 and of at most 2000 Da, for example of at least 660 and of at most 1500 Da, for example of at least 660 and of at most 1200 Da, for example of at least 660 and of at most 1000 Da. Preferably the crystalline VEU-c has a $M_n$ of at least 400 and of at most 5000 Da, more preferably of at least 500 and of at most 3000 Da, most preferably of at least 600 and of at most 2000 Da, especially of at least 660 and of at most 1500, more especially of at least 660 and of at most 1200 Da.

Preferably, the crystalline VEU-c has a WPU of at least 100, more preferably at least 120, even more preferably at least 140, most preferably at least 145, especially at least 150, more especially at least 155, most especially at least 160, for example at least 170, for example at least 190 g/mol. Preferably the crystalline VEU-c has a WPU of at most 2000, more preferably at most 1500, even more preferably at most 1200, most preferably at most 1000, especially at most 900, more especially at most 800, most especially at most 700, for example at most 600, for example at most 500, for example at most 400, for example at most 380, for example at most 370, for example at most 350, for example at most 300, for example at most 280, for example at most 260 g/mol.

Preferably the viscosity of the crystalline VEU-c is at most 30, more preferably at most 25, even more preferably at most 20, most preferably at most 15, especially at most 10, more especially at most 8, most especially at most 6, for example at most 5, for example at most 4, for example at most 3, for example at most 2, for example at most 1, for example at most 0.5, for example at most 0.2, for example at most 0.1 Pa·s.

Examples of crystalline VEU-c include but are not limited to diethylene glycol divinyl ether urethane and triethylene glycol divinyl ether urethane.

The crystalline VEU-c may have a $T_c$ which is lower than its $T_m$. Preferably the $T_c$ of the curing agent is at most 55, more preferably at most 50, even more preferably at most 45° C., lower than its $T_m$, or lower than its highest $T_m$ if the crystalline VEU-c has more than one $T_m$. Preferably the crystalline VEU-c has a crystallization temperature (TO of at least 0 and of at most 75, more preferably of at least 10 and of at most 75, even more preferably of at least 10 and at most 72, most preferably of at least 10 and at most 70, especially of at least 10 and at most 68, more especially of at least 10 and at most 66, for example of at least 10 and at most 65, for example of at least 15 and at most 62, for example of at least 20 and at most 60° C.

By 'crystalline VESU-c' is meant a crystalline vinyl ester urethane having a melting enthalpy $\Delta H_m \geq 35$ J/g, and one or more melting temperatures ($T_m$) wherein any and all of the $T_m$ of the one or more crystalline VESU-c are in the region of from and including 30 up to and including 80° C. A crystalline VESU-c is a sub-class of a crystalline VU-c. Preferably the crystalline VESU-c has a melting enthalpy $\Delta H_m \geq 40$, more preferably $\geq 50$, even more preferably $\geq 60$, most preferably $\geq 70$, especially $\geq 80$, more especially $\geq 90$, most especially $\geq 100$, for example $\geq 110$, for example $\geq 120$ J/g.

Preferably the crystalline VESU-c has one or more melting temperatures ($T_m$) wherein any and all of the $T_m$ of the one or more crystalline VESU-c are in the region of from and including 40 up to and including 80° C., more preferably of from and including 45 up to and including 80° C., most preferably of from and including 50 up to and including 80° C., especially of from and including 30 up to and including 78° C., more especially of from and including 40 up to and including 78° C., most especially of from and including 45 up to and including 78° C., for example of from and including 50 up to and including 78° C., for example of from and including 30 up to and including 77° C., for example of from and including 40 up to and including 77° C., for example of from and including 45 up to and including 77° C., for example of from and including 50 up to and including 77° C.

Preferably the crystalline VESU-c has a $M_n$ of at least 400 and of at most 20000 Da, and a WPU of at least 100 and of at most 2000 g/mol. Preferements of these ranges are detailed herein.

Preferably the crystalline VESU-c has a $M_n$ of at least 400 and of at most 20000 Da, more preferably of at least 450 and of at most 10000 Da, most preferably of at least 500 and of at most 7000 Da, especially of at least 550 and of at most 5000, more especially of at least 575 and of at most 3000 Da, most especially of at least 600 and of at most 2000 Da, for example of at least 660 and of at most 2000 Da, for example of at least 660 and of at most 1500 Da, for example of at least 660 and of at most 1200 Da, for example of at least 660 and of at most 1000 Da. Preferably the crystalline VESU-c has a $M_n$ of at least 400 and of at most 5000 Da, more preferably of at least 500 and of at most 3000 Da, most preferably of at least 600 and of at most 2000 Da, especially of at least 660 and of at most 1500, more especially of at least 660 and of at most 1200 Da.

Preferably, the crystalline VESU-c has a WPU of at least 100, more preferably at least 120, even more preferably at least 140, most preferably at least 145, especially at least 150, more especially at least 155, most especially at least 160, for example at least 170, for example at least 190 g/mol. Preferably the crystalline VESU-c has a WPU of at most 2000, more preferably at most 1500, even more preferably at most 1200, most preferably at most 1000, especially at most 900, more especially at most 800, most especially at most 700, for example at most 600, for example at most 500, for example at most 400, for example at most 380, for example at most 370, for example at most 350, for example at most 300, for example at most 280, for example at most 260 g/mol.

Preferably the viscosity of the crystalline VESU-c is at most 30, more preferably at most 25, even more preferably at most 20, most preferably at most 15, especially at most 10, more especially at most 8, most especially at most 6, for example at most 5, for example at most 4, for example at most 3, for example at most 2, for example at most 1, for example at most 0.5, for example at most 0.2, for example at most 0.1 Pa·s.

The crystalline VESU-c may have a $T_c$ which is lower than its $T_m$. Preferably the $T_c$ of the curing agent is at most 55, more preferably at most 50, even more preferably at most 45° C., lower than its $T_m$, or lower than its highest $T_m$ if the crystalline VESU-c has more than one $T_m$. Preferably the crystalline VESU-c has a crystallization temperature (TO of at least 0 and of at most 75, more preferably of at least 10 and of at most 75, even more preferably of at least 10 and at most 72, most preferably of at least 10 and at most 70, especially of at least 10 and at most 68, more especially of at least 10 and at most 66, for example of at least 10 and at most 65, for example of at least 15 and at most 62, for example of at least 20 and at most 60° C.

By 'crystalline VEESU-c' is meant a crystalline vinyl (ether-ester) urethane having a melting enthalpy $\Delta H_m \geq 35$ J/g, and one or more melting temperatures ($T_m$) wherein any and all of the $T_m$ of the one or more crystalline VEESU-c are in the region of from and including 30 up to and including 80° C. A crystalline VEESU-c is a sub-class of a crystalline VU-c. Preferably the crystalline VEESU-c has a melting enthalpy $\Delta H_m \geq 40$, more preferably $\geq 50$, even more preferably $\geq 60$, most preferably 70, especially $\geq 80$, more especially $\geq 90$, most especially $\geq 100$, for example $\geq 110$, for example $\geq 120$ J/g.

Preferably the crystalline VEESU-c has one or more melting temperatures ($T_m$) wherein any and all of the $T_m$ of the one or more crystalline VEESU-c are in the region of from and including 40 up to and including 80° C., more preferably of from and including 45 up to and including 80° C., most preferably of from and including 50 up to and including 80° C., especially of from and including 30 up to and including 78° C., more especially of from and including 40 up to and including 78° C., most especially of from and including 45 up to and including 78° C., for example of from and including 50 up to and including 78° C., for example of from and including 30 up to and including 77° C., for example of from and including 40 up to and including 77° C., for example of from and including 45 up to and including 77° C., for example of from and including 50 up to and including 77° C.

Preferably the crystalline VEESU-c has a $M_n$ of at least 400 and of at most 20000 Da, and a WPU of at least 100 and of at most 2000 g/mol. Preferences of these ranges are detailed herein.

Preferably the crystalline VEESU-c has a $M_n$ of at least 400 and of at most 20000 Da, more preferably of at least 450 and of at most 10000 Da, most preferably of at least 500 and of at most 7000 Da, especially of at least 550 and of at most 5000, more especially of at least 575 and of at most 3000 Da, most especially of at least 600 and of at most 2000 Da, for example of at least 660 and of at most 2000 Da, for example of at least 660 and of at most 1500 Da, for example of at least 660 and of at most 1200 Da, for example of at least 660 and of at most 1000 Da. Preferably the crystalline VEESU-c has a $M_n$ of at least 400 and of at most 5000 Da, more preferably of at least 500 and of at most 3000 Da, most preferably of at least 600 and of at most 2000 Da, especially of at least 660 and of at most 1500, more especially of at least 660 and of at most 1200 Da.

Preferably, the crystalline VEESU-c has a WPU of at least 100, more preferably at least 120, even more preferably at least 140, most preferably at least 145, especially at least 150, more especially at least 155, most especially at least 160, for example at least 170, for example at least 190 g/mol. Preferably the crystalline VEESU-c has a WPU of at most 2000, more preferably at most 1500, even more preferably at most 1200, most preferably at most 1000, especially at most 900, more especially at most 800, most especially at most 700, for example at most 600, for example at most 500, for example at most 400, for example at most 380, for example at most 370, for example at most 350, for example at most 300, for example at most 280, for example at most 260 g/mol.

Preferably the viscosity of the crystalline VEESU-c is at most 30, more preferably at most 25, even more preferably at most 20, most preferably at most 15, especially at most 10, more especially at most 8, most especially at most 6, for example at most 5, for example at most 4, for example at most 3, for example at most 2, for example at most 1, for example at most 0.5, for example at most 0.2, for example at most 0.1 Pa·s.

The crystalline VEESU-c may have a $T_c$ which is lower than its $T_m$. Preferably the $T_c$ of the curing agent is at most 55, more preferably at most 50, even more preferably at most 45° C., lower than its $T_m$, or lower than its highest $T_m$ if the crystalline VEESU-c has more than one $T_m$. Preferably the crystalline VEESU-c has a crystallization temperature (TO of at least 0 and of at most 75, more preferably of at least 10 and of at most 75, even more preferably of at least 10 and at most 72, most preferably of at least 10 and at most 70, especially of at least 10 and at most 68, more especially of at least 10 and at most 66, for example of at least 10 and at most 65, for example of at least 15 and at most 62, for example of at least 20 and at most 60° C.

Unless otherwise explicitly stated, any feature, element, component, embodiment, aspect, range and especially any preferred feature, preferred element, preferred embodiment, preferred aspect, preferred range, preferred combination of ranges, preferments, embodiments and aspects in connection with any piece of disclosure disclosed in this section 1.2.1 can be combined with each other and with any other feature, element, component, embodiment, aspect, range and especially any preferred feature, preferred element, preferred embodiment, preferred aspect, preferred range, preferred combination of ranges, preferments, embodiments and aspects of the invention as these are disclosed in the entire application.

1.2.2 the Crystalline VFUR-c of Curing Agent A

By 'crystalline VFUR-c' is meant a crystalline vinyl functionalized urethane resin having a melting enthalpy $\Delta H_m \geq 35$ J/g, and one or more melting temperatures ($T_m$) wherein any and all of the $T_m$ of the one or more crystalline VFUR-c are in the region of from and including 30 up to and including 80° C. Preferably the crystalline VFUR-c has a melting enthalpy $\Delta H_m \geq 40$, more preferably $\geq 50$, even more preferably $\geq 60$, most preferably $\geq 70$, especially $\geq 80$, more especially $\geq 90$, most especially $\geq 100$, for example $\geq 110$, for example $\geq 120$, J/g. Preferably the crystalline VFUR-c has one or more melting temperatures ($T_m$) wherein any and all of the $T_m$ of the one or more crystalline VFUR-c are in the region of from and including 40 up to and including 80° C., more preferably of from and including 45 up to and including 80° C., most preferably of from and including 50 up to and including 80° C., especially of from and including 30 up to and including 78° C., more especially of from and including 40 up to and including 78° C., most especially of from and including 45 up to and including 78° C., for example of from and including 50 up to and including 78° C., for example of from and including 30 up to and including 77° C., for example of from and including 40 up to and including 77° C., for example of from and including 45 up to and including 77° C., for example of from and including 50 up to and including 77° C.

Preferably the crystalline VFUR-c has a $T_g$ of at least −80 and at most 75° C., more preferably of at least −80 and at most 70° C., even more preferably of at least −80 and at most 60° C., most preferably of at least −80 and at most 50° C., especially of at least −80 and at most 40° C., more especially of at least −80 and at most 30° C., most especially of at least −80 and at most 20° C., for example of at least −80 and at most 10° C., for example of at least −80 and at most 0° C., for example of at least −80 and at most −10° C., for example of at least −80 and at most −20° C.

Preferably the crystalline VFUR-c has a $M_n$ of at least 400 and of at most 20000 Da, and a WPU of at least 100 and of at most 2000 g/mol. Preferements of these ranges are detailed herein.

Preferably the crystalline VFUR-c has a $M_n$ of at least 400 and of at most 20000 Da, more preferably of at least 450 and of at most 10000 Da, most preferably of at least 500 and of at most 7000 Da, especially of at least 550 and of at most 5000, more especially of at least 575 and of at most 3000 Da, most especially of at least 600 and of at most 2000 Da, for example of at least 660 and of at most 2000 Da, for example of at least 660 and of at most 1500 Da, for example of at least 660 and of at most 1200 Da, for example of at least 660 and of at most 1000 Da. Preferably the crystalline VFUR-c has a $M_n$ of at least 400 and of at most 5000 Da, more preferably of at least 500 and of at most 3000 Da, most preferably of at least 600 and of at most 2000 Da, especially of at least 660 and of at most 1500, more especially of at least 660 and of at most 1200 Da.

Preferably, the crystalline VFUR-c has a WPU of at least 100, more preferably at least 120, even more preferably at least 140, most preferably at least 145, especially at least 150, more especially at least 155, most especially at least 160, for example at least 170, for example at least 190 g/mol. Preferably the crystalline VFUR-c has a WPU of at most 2000, more preferably at most 1500, even more preferably at most 1200, most preferably at most 1000, especially at most 900, more especially at most 800, most especially at most 700, for example at most 600, for example at most 500, for example at most 400, for example at most 380, for example at most 370, for example at most 350, for example at most 300, for example at most 280, for example at most 260 g/mol.

Preferably the viscosity of the crystalline VFUR-c is at most 30, more preferably at most 25, even more preferably at most 20, most preferably at most 15, especially at most 10, more especially at most 8, most especially at most 6, for example at most 5, for example at most 4, for example at most 3, for example at most 2, for example at most 1, for example at most 0.5, for example at most 0.2, for example at most 0.1 Pa·s.

Obviously, crystalline VFUR-c is a sub-class of VFUR.

Preferably the crystalline VFUR-c is selected from the group consisting of crystalline VEFUR-c, crystalline VESFUR-c, and crystalline VEESFUR-c; more preferably the crystalline VFUR-c is selected from the group consisting of crystalline VEFUR-c, and crystalline VESFUR-c; most preferably the crystalline VFUR-c is selected from the group consisting of crystalline VEFUR-c.

The crystalline VFUR-c may have a $T_c$ which is lower than its $T_m$. Preferably the $T_c$ of the curing agent is at most 55, more preferably at most 50, even more preferably at most 45° C., lower than its $T_m$, or lower than its highest $T_m$ if the crystalline VFUR-c has more than one $T_m$. Preferably the crystalline VFUR-c has a crystallization temperature (TO of at least 0 and of at most 75, more preferably of at least 10 and of at most 75, even more preferably of at least 10 and at most 72, most preferably of at least 10 and at most 70, especially of at least 10 and at most 68, more especially of at least 10 and at most 66, for example of at least 10 and at most 65, for example of at least 15 and at most 62, for example of at least 20 and at most 60° C.

By 'crystalline VEFUR-c' is meant a crystalline vinyl ether functionalized urethane resin having a melting enthalpy $\Delta H_m \geq 35$ J/g, and one or more melting temperatures ($T_m$) wherein any and all of the $T_m$ of the one or more crystalline VEFUR-c are in the region of from and including 30 up to and including 80° C. A crystalline VEFUR-c is a sub-class of a crystalline VFUR-c. Preferably the crystalline VEFUR-c has a melting enthalpy $\Delta H_m \geq 40$, more preferably $\geq 50$, even more preferably 60, most preferably $\geq 70$, especially $\geq 80$, more especially $\geq 90$, most especially $\geq 100$, for example $\geq 110$, for example $\geq 120$, J/g. Preferably the crystalline VEFUR-c has one or more melting temperatures ($T_m$) wherein any and all of the $T_m$ of the one or more crystalline VEFUR-c are in the region of from and including 40 up to and including 80° C., more preferably of from and including 45 up to and including 80° C., most preferably of from and including 50 up to and including 80° C., especially of from and including 30 up to and including 78° C., more especially of from and including 40 up to and including 78° C., most especially of from and including 45 up to and including 78° C., for example of from and including 50 up to and including 78° C., for example of from and including 30 up to and including 77° C., for example of from and including 40 up to and including 77° C., for example of from and including 45 up to and including 77° C., for example of from and including 50 up to and including 77° C.

Preferably the crystalline VEFUR-c has a $T_g$ of at least −80 and at most 75° C., more preferably of at least −80 and at most 70° C., even more preferably of at least −80 and at most 60° C., most preferably of at least −80 and at most 50° C., especially of at least −80 and at most 40° C., more especially of at least −80 and at most 30° C., most especially of at least −80 and at most 20° C., for example of at least −80 and at most 10° C., for example of at least −80 and at most 0° C., for example of at least −80 and at most −10° C., for example of at least −80 and at most −20° C.

Preferably the crystalline VEFUR-c has a $M_n$ of at least 400 and of at most 20000 Da, and a WPU of at least 100 and of at most 2000 g/mol. Preferements of these ranges are detailed herein.

Preferably the crystalline VEFUR-c has a $M_n$ of at least 400 and of at most 20000 Da, more preferably of at least 450 and of at most 10000 Da, most preferably of at least 500 and of at most 7000 Da, especially of at least 550 and of at most 5000, more especially of at least 575 and of at most 3000 Da, most especially of at least 600 and of at most 2000 Da, for example of at least 660 and of at most 2000 Da, for example of at least 660 and of at most 1500 Da, for example of at least 660 and of at most 1200 Da, for example of at least 660 and of at most 1000 Da. Preferably the crystalline VEFUR-c has a $M_n$ of at least 400 and of at most 5000 Da, more preferably of at least 500 and of at most 3000 Da, most preferably of at least 600 and of at most 2000 Da, especially of at least 660 and of at most 1500, more especially of at least 660 and of at most 1200 Da.

Preferably, the crystalline VEFUR-c has a WPU of at least 100, more preferably at least 120, even more preferably at least 140, most preferably at least 145, especially at least 150, more especially at least 155, most especially at least 160, for example at least 170, for example at least 190 g/mol. Preferably the crystalline VEFUR-c has a WPU of at most 2000, more preferably at most 1500, even more preferably at most 1200, most preferably at most 1000, especially at most 900, more especially at most 800, most especially at most 700, for example at most 600, for example at most 500, for example at most 400, for example at most 380, for example at most 370, for example at most 350, for example at most 300, for example at most 280, for example at most 260 g/mol.

Preferably the viscosity of the crystalline VEFUR-c is at most 30, more preferably at most 25, even more preferably at most 20, most preferably at most 15, especially at most 10, more especially at most 8, most especially at most 6, for example at most 5, for example at most 4, for example at most 3, for example at most 2, for example at most 1, for example at most 0.5, for example at most 0.2, for example at most 0.1 Pa·s.

The crystalline VEFUR-c may have a $T_c$ which is lower than its $T_m$. Preferably the $T_c$ of the curing agent is at most 55, more preferably at most 50, even more preferably at most 45° C., lower than its $T_m$, or lower than its highest $T_m$ if the crystalline VEFUR-c has more than one $T_m$. Preferably the crystalline VEFUR-c has a crystallization temperature (TO of at least 0 and of at most 75, more preferably of at least 10 and of at most 75, even more preferably of at least 10 and at most 72, most preferably of at least 10 and at most 70, especially of at least 10 and at most 68, more especially of at least 10 and at most 66, for example of at least 10 and at most 65, for example of at least 15 and at most 62, for example of at least 20 and at most 60° C.

By 'crystalline VESFUR-c' is meant a crystalline vinyl ester functionalized urethane resin having a melting enthalpy $\Delta H_m \geq 35$ J/g, and one or more melting temperatures $(T_m)$ wherein any and all of the $T_m$ of the one or more crystalline VESFUR-c are in the region of from and including 30 up to and including 80° C. A crystalline VESFUR-c is a sub-class of a crystalline VFUR-c. Preferably the crystalline VESFUR-c has a melting enthalpy $\Delta H_m \geq 40$, more preferably $\geq 50$, even more preferably 60, most preferably $\geq 70$, especially $\geq 80$, more especially $\geq 90$, most especially $\geq 100$, for example $\geq 110$, for example $\geq 120$, J/g. Preferably the crystalline VESFUR-c has one or more melting temperatures $(T_m)$ wherein any and all of the $T_m$ of the one or more crystalline VESFUR-c are in the region of from and including 40 up to and including 80° C., more preferably of from and including 45 up to and including 80° C., most preferably of from and including 50 up to and including 80° C., especially of from and including 30 up to and including 78° C., more especially of from and including 40 up to and including 78° C., most especially of from and including 45 up to and including 78° C., for example of from and including 50 up to and including 78° C., for example of from and including 30 up to and including 77° C., for example of from and including 40 up to and including 77° C., for example of from and including 45 up to and including 77° C., for example of from and including 50 up to and including 77° C.

Preferably the crystalline VESFUR-c has a $T_g$ of at least −80 and at most 75° C., more preferably of at least −80 and at most 70° C., even more preferably of at least −80 and at most 60° C., most preferably of at least −80 and at most 50° C., especially of at least −80 and at most 40° C., more especially of at least −80 and at most 30° C., most especially of at least −80 and at most 20° C., for example of at least −80 and at most 10° C., for example of at least −80 and at most 0° C., for example of at least −80 and at most −10° C., for example of at least −80 and at most −20° C.

Preferably the crystalline VESFUR-c has a $M_n$ of at least 400 and of at most 20000 Da, and a WPU of at least 100 and of at most 2000 g/mol. Preferements of these ranges are detailed herein.

Preferably the crystalline VESFUR-c has a $M_n$ of at least 400 and of at most 20000 Da, more preferably of at least 450 and of at most 10000 Da, most preferably of at least 500 and of at most 7000 Da, especially of at least 550 and of at most 5000 Da, more especially of at least 575 and of at most 3000 Da, most especially of at least 600 and of at most 2000 Da, for example of at least 660 and of at most 2000 Da, for example of at least 660 and of at most 1500 Da, for example of at least 660 and of at most 1200 Da, for example of at least 660 and of at most 1000 Da. Preferably the crystalline VESFUR-c has a $M_n$ of at least 400 and of at most 5000 Da, more preferably of at least 500 and of at most 3000 Da, most preferably of at least 600 and of at most 2000 Da, especially of at least 660 and of at most 1500, more especially of at least 660 and of at most 1200 Da.

Preferably, the crystalline VESFUR-c has a WPU of at least 100, more preferably at least 120, even more preferably at least 140, most preferably at least 145, especially at least 150, more especially at least 155, most especially at least 160, for example at least 170, for example at least 190 g/mol. Preferably the crystalline VESFUR-c has a WPU of at most 2000, more preferably at most 1500, even more preferably at most 1200, most preferably at most 1000, especially at most 900, more especially at most 800, most especially at most 700, for example at most 600, for example at most 500, for example at most 400, for example at most 380, for example at most 370, for example at most 350, for example at most 300, for example at most 280, for example at most 260 g/mol.

Preferably the viscosity of the crystalline VESFUR-c is at most 30, more preferably at most 25, even more preferably at most 20, most preferably at most 15, especially at most 10, more especially at most 8, most especially at most 6, for example at most 5, for example at most 4, for example at most 3, for example at most 2, for example at most 1, for example at most 0.5, for example at most 0.2, for example at most 0.1 Pa·s.

The crystalline VESFUR-c may have a $T_c$ which is lower than its $T_m$. Preferably the $T_c$ of the curing agent is at most 55, more preferably at most 50, even more preferably at most 45° C., lower than its $T_m$ or lower than its highest $T_m$ if the crystalline VESFUR-c has more than one $T_m$. Preferably the crystalline VESFUR-c has a crystallization temperature (TO of at least 0 and of at most 75, more preferably of at least 10 and of at most 75, even more preferably of at least 10 and at most 72, most preferably of at least 10 and at most 70, especially of at least 10 and at most 68, more especially of at least 10 and at most 66, for example of at least 10 and at most 65, for example of at least 15 and at most 62, for example of at least 20 and at most 60° C.

By 'crystalline VEESFUR-c' is meant a crystalline vinyl (ether-ester) functionalized urethane resin having a melting enthalpy $\Delta H_m \geq 35$ J/g, and one or more melting temperatures $(T_m)$ wherein any and all of the $T_m$ of the one or more crystalline VEESFUR-c are in the region of from and including 30 up to and including 80° C. A crystalline VEESFUR-c is a sub-class of a crystalline VFUR-c. Preferably the crystalline VEESFUR-c has a melting enthalpy $\Delta H_m \geq 40$, more preferably $\geq 50$, even more preferably $\geq 60$, most preferably $\geq 70$, especially $\geq 80$, more especially $\geq 90$, most especially $\geq 100$, for example $\geq 110$, for example $\geq 120$, J/g. Preferably the crystalline VEESFUR-c has one or more melting temperatures $(T_m)$ wherein any and all of the $T_m$ of the one or more crystalline VEESFUR-c are in the region of from and including 40 up to and including 80° C., more preferably of from and including 45 up to and including 80° C., most preferably of from and including 50 up to and including 80° C., especially of from and including 30 up to and including 78° C., more especially of from and including 40 up to and including 78° C., most especially of from and including 45 up to and including 78° C., for example of from and including 50 up to and including 78° C., for example of from and including 30 up to and including 77° C., for example of from and including 40 up to and including 77°

C., for example of from and including 45 up to and including 77° C., for example of from and including 50 up to and including 77° C.

Preferably the crystalline VEESFUR-c has a $T_g$ of at least −80 and at most 75° C., more preferably of at least −80 and at most 70° C., even more preferably of at least −80 and at most 60° C., most preferably of at least −80 and at most 50° C., especially of at least −80 and at most 40° C., more especially of at least −80 and at most 30° C., most especially of at least −80 and at most 20° C., for example of at least −80 and at most 10° C., for example of at least −80 and at most 0° C., for example of at least −80 and at most −10° C., for example of at least −80 and at most −20° C.

Preferably the crystalline VEESFUR-c has a $M_n$ of at least 400 and of at most 20000 Da, and a WPU of at least 100 and of at most 2000 g/mol. Preferements of these ranges are detailed herein.

Preferably the crystalline VEESFUR-c has a $M_n$ of at least 400 and of at most 20000 Da, more preferably of at least 450 and of at most 10000 Da, most preferably of at least 500 and of at most 7000 Da, especially of at least 550 and of at most 5000, more especially of at least 575 and of at most 3000 Da, most especially of at least 600 and of at most 2000 Da, for example of at least 660 and of at most 2000 Da, for example of at least 660 and of at most 1500 Da, for example of at least 660 and of at most 1200 Da, for example of at least 660 and of at most 1000 Da. Preferably the crystalline VEESFUR-c has a $M_n$ of at least 400 and of at most 5000 Da, more preferably of at least 500 and of at most 3000 Da, most preferably of at least 600 and of at most 2000 Da, especially of at least 660 and of at most 1500, more especially of at least 660 and of at most 1200 Da.

Preferably, the crystalline VEESFUR-c has a WPU of at least 100, more preferably at least 120, even more preferably at least 140, most preferably at least 145, especially at least 150, more especially at least 155, most especially at least 160, for example at least 170, for example at least 190 g/mol. Preferably the crystalline VEESFUR-c has a WPU of at most 2000, more preferably at most 1500, even more preferably at most 1200, most preferably at most 1000, especially at most 900, more especially at most 800, most especially at most 700, for example at most 600, for example at most 500, for example at most 400, for example at most 380, for example at most 370, for example at most 350, for example at most 300, for example at most 280, for example at most 260 g/mol.

Preferably the viscosity of the crystalline VEESFUR-c is at most 30, more preferably at most 25, even more preferably at most 20, most preferably at most 15, especially at most 10, more especially at most 8, most especially at most 6, for example at most 5, for example at most 4, for example at most 3, for example at most 2, for example at most 1, for example at most 0.5, for example at most 0.2, for example at most 0.1 Pa·s.

The crystalline VEESFUR-c may have a $T_c$ which is lower than its $T_m$. Preferably the $T_c$ of the curing agent is at most 55, more preferably at most 50, even more preferably at most 45° C., lower than its $T_m$, or lower than its highest $T_m$ if the crystalline VEESFUR-c has more than one $T_m$. Preferably the crystalline VEESFUR-c has a crystallization temperature ($T_c$) of at least 0 and of at most 75, more preferably of at least 10 and of at most 75, even more preferably of at least 10 and at most 72, most preferably of at least 10 and at most 70, especially of at least 10 and at most 68, more especially of at least 10 and at most 66, for example of at least 10 and at most 65, for example of at least 15 and at most 62, for example of at least 20 and at most 60° C.

Unless otherwise explicitly stated, any feature, element, component, embodiment, aspect, range and especially any preferred feature, preferred element, preferred embodiment, preferred aspect, preferred range, preferred combination of ranges, preferments, embodiments and aspects in connection with any piece of disclosure disclosed in this section 1.2.2 can be combined with each other and with any other feature, element, component, embodiment, aspect, range and especially any preferred feature, preferred element, preferred embodiment, preferred aspect, preferred range, preferred combination of ranges, preferments, embodiments and aspects of the invention as these are disclosed in the entire application.

1.2.3 Methods of Preparation of a VU or a VFUR

A VU (including any sub-class such as a crystalline VU-c) may be prepared from
- at least a compound A comprising isocyanate groups; and
- at least a compound B comprising hydroxyl groups and said compound B is selected from the group consisting of compounds comprising vinyl ether groups and compounds comprising vinyl ester groups and compounds comprising vinyl ether and vinyl ester groups; and preferably the hydroxyl groups of compound B are able to react with the isocyanate groups of compound A.

Examples of preparing a VU are given in the Examples.

In case the VU is a vinyl ether urethane such as for example a crystalline VEU-c, then said vinyl ether urethane may be prepared from:
- at least a compound A comprising isocyanate groups; and
- at least a compound B comprising hydroxyl groups and vinyl ether groups; and preferably the hydroxyl groups of compound B are able to react with the isocyanate groups of compound A.

In case the VU is a vinyl ester urethane such as for example a crystalline VESU-c, then said vinyl ester urethane may be prepared from:
- at least a compound A comprising isocyanate groups; and
- at least a compound B comprising hydroxyl groups and vinyl ester groups; and
- preferably the hydroxyl groups of compound B are able to react with the isocyanate groups of compound A.

In case the VU is a vinyl(ether-ester) urethane such as for example a crystalline VEESU-c, then said vinyl(ether-ester) urethane may be prepared from:
- at least a compound A comprising isocyanate groups; and
- at least a compound B comprising hydroxyl groups, vinyl ether groups and vinyl ester groups; and preferably the hydroxyl groups of compound B are able to react with the isocyanate groups of compound A.

A VFUR (including any sub-class such as a crystalline VFUR-c) may be prepared from
- at least a compound A comprising isocyanate groups; and
- at least a compound B comprising hydroxyl groups and said compound B is selected from the group consisting of compounds comprising vinyl ether groups and compounds comprising vinyl ester groups and compounds comprising vinyl ether and vinyl ester groups; and preferably the hydroxyl groups of compound B are able to react with the isocyanate groups of compound A; and
- at least an organic compound C comprising hydroxyl groups which are able to react with the isocyanate groups of compound A.

In case the VFUR is a vinyl ether functionalized urethane resin (VEFUR), then the VEFUR may be prepared from:
- at least a compound A comprising isocyanate groups; and
- at least a compound B comprising hydroxyl groups and vinyl ether groups; and preferably the hydroxyl groups of compound B are able to react with the isocyanate groups of compound A; and
- at least an organic compound C comprising hydroxyl groups which are able to react with the isocyanate groups of compound A.

In case the VFUR is a vinyl ester functionalized urethane resin (VESFUR), then the VESFUR may be prepared from:
- at least a compound A comprising isocyanate groups; and
- at least a compound B comprising hydroxyl groups and vinyl ester groups; and
- preferably the hydroxyl groups of compound B are able to react with the isocyanate groups of compound A; and
- at least an organic compound C comprising hydroxyl groups which are able to react with the isocyanate groups of compound A.

In case the VFUR is a vinyl(ether-ester) functionalized urethane resin, then the VEESFUR may be prepared from
- at least a compound A comprising isocyanate groups; and
- at least a compound B comprising hydroxyl groups, vinyl ether groups and vinyl ester groups; and preferably the hydroxyl groups of compound B are able to react with the isocyanate groups of compound A; and
- at least an organic compound C comprising hydroxyl groups which are able to react with the isocyanate groups of compound A.

The vinyl ether and/or vinyl ester groups may be pendant and/or terminal to the VFUR. Preferably, the vinyl ether and/or vinyl ester groups are terminal to the VFUR; in this case and depending on the existence of vinyl ether groups and/or vinyl ester groups in the VFUR, the VFUR is mentioned herein as a vinyl ether terminated urethane resin (VFUR comprises terminal vinyl ether groups and does not comprise vinyl ester groups), or vinyl ester terminated urethane resin (VFUR comprises terminal vinyl ester groups and does not comprise vinyl ether groups) or vinyl(ether-ester) terminated urethane resin (VFUR comprises terminal vinyl ether groups and terminal vinyl ester groups).

Broadly stated, a VU (including any sub-class such as a crystalline VU-c) may be prepared by reacting a compound A comprising isocyanate groups, for example a diisocyanate monomer with a compound B comprising hydroxyl groups and said compound B is selected from the group consisting of compounds comprising vinyl ether groups (VET) and compounds comprising vinyl ester groups (VES) and compounds comprising vinyl ether and vinyl ester groups (VET-VES) (process 1a).

In process 1a the relative amounts of compounds A and B are chosen such that the sum of the hydroxyl (—OH) group equivalents of compound B is equal or in slight excess e.g. 1% excess, to the isocyanate (—NCO) groups equivalents of compound A.

Broadly stated, a VFUR (including any sub-class such as a crystalline VFUR-c) may be prepared by either:
i) reacting a compound A comprising isocyanate groups, for example a polyisocyanate with a compound B comprising hydroxyl groups and said compound B is selected from the group consisting of compounds comprising vinyl ether groups (VET) and compounds comprising vinyl ester groups (VES) and compounds comprising vinyl ether and vinyl ester groups (VET-VES) and with at least an organic compound C comprising hydroxyl groups (process 2a), or by ii) reacting a compound A comprising isocyanate groups, for example a diisocyanate monomer or a polyisocyanate with at least an organic compound C comprising hydroxyl groups e.g. a mono-alcohol or a polyol, to form an adduct of compound A with said organic compound C, mentioned herein as "adduct", wherein the reaction conditions will be chosen so as to form an isocyanate terminated adduct to the virtual exclusion of hydroxyl terminated polymeric materials that can for example be achieved by the use of a molar excess of the compound A (step 1); subsequently the adduct is reacted with a compound B comprising hydroxyl groups and said compound B is selected from the group consisting of compounds comprising vinyl ether groups (VET), compounds comprising vinyl ester groups (VES), compounds comprising vinyl ether and vinyl ester groups (VET-VES) (step 2) (process 2b).

In process 2a or 2b, the relative amounts of compounds A, B and C are chosen such that the sum of the hydroxyl (—OH) group equivalents of compounds B and C is equal or in slight excess e.g. 1% excess, to the isocyanate (—NCO) groups equivalents of compound A.

Preferably, the VFUR (including any sub-class such as a crystalline VFUR-c) is prepared according to process 2b.

The reaction conditions which may be employed in i) (process 1) include temperatures that do not to exceed 120° C. Care must be taken to control the reaction exotherm as well. The reaction is also usually performed in a moisture free atmosphere, such as in a nitrogen atmosphere. It is preferred that the reaction is carried out in the presence of a catalyst such as an organotin catalyst, for example, dibutyltin dilaurate. In the reaction, a stoichiometric equivalent amount of the reactants is employed. Thus, the reactants (Compound A, B and C) are present in a 1:1 mol ratio of isocyanate to hydroxyl groups to ensure complete polymerization.

The reaction conditions which may be employed in ii) (process 2) include temperatures in the range of 50 to 120° C. Care must be taken to control the urethane reaction exotherm. The reaction is also usually performed in a moisture-free atmosphere, such as in a nitrogen atmosphere. It is also preferred that the reaction is carried out in the presence of a catalyst. A particularly preferred catalyst is one that contains tin, for example, dibutyltin dilaurate. In the reaction, a stoichiometric excess amount of the aliphatic diisocyanate is employed. Generally, the reactants (Compound A and C) for the preparation of the adduct (step 1 of process 2) are preferably present in a molar ratio (total mol of isocyanate groups to total mol of hydroxyl groups) ranging from 40:1 to 3.97:1; more preferably, said reactants are present in a molar ratio between 9:1 and 14:1. The reaction conditions which may be employed for step 2 of process 2 are generally the same as those for the step 1 of process 2. Usually, this step 2 will immediately follow the completion of step 1 in the same reaction vessel. Care must be taken here as well to control the exotherm. Preferably, the total of reactants (Compounds A, B and C) employed in steps 1 and 2 of process 2 are present in a 1:1 mol ratio of isocyanate to hydroxyl groups to ensure complete polymerization and to ensure that RVRUF is according to the invention. Preferably, the amount of Compound B added during the step 2 of the process 2, is chosen such that the total of reactants (Compounds A, B and C) employed in steps 1 and 2 of process 2 are present in a 1:1 mol ratio of isocyanate to hydroxyl groups to ensure complete polymerization.

The compounds A, B and C that are used in any one of the process 1a, 2a and 2b are described below.

Compound A may be an organic monomeric compound or a polymer. Preferably compound A is an organic monomeric compound. Exemplary compounds A include but are not limited to monomeric or polymeric diisocyanates for example toluene 2,4-diisocyanate, toluene 2,6-diisocyanate (TDI, is a mixture of toluene 2,4- and toluene 2,6-diisocyanate), 4,4'-diphenyl methane diisocyanate, 2,4'-diphenyl methane diisocyanate, 2,2'-diphenyl methane diisocyanate, 1,6'-hexamethylene diisocyanate (HDI), 5-isocyanato-1-(isocyanatomethy)-1,3,3-trimethylcyclohexane (isophorone diisocyanate), m-tetramethylxylene diisocyanate, dicyclohexylmethane 4,4'-diisocyanate, naphthalene 1,5-diisocyanate or 1,4-diisocyanatobenzene; monomeric or polymeric polyisocyanates for example triisocyanates for example triphenylmethane-4,4',4"-triisocyanate, functionalized polymers derived from diisocyanates such as isocyanurates and uretdiones; and mixtures thereof. Preferably, compound A is a diisocyanate, more preferably compound A is selected from the group consisting of toluene 2,4-diisocyanate, toluene 2,6-diisocyanate, 1,6'-hexamethylene diisocyanate, isophorone diisocyanate, most preferably compound A is 1,6'-hexamethylene diisocyanate.

Compound B comprises hydroxyl groups and said compound B is selected from the group consisting of compounds comprising vinyl ether groups and compounds comprising vinyl ester groups and compounds comprising vinyl ether and vinyl ester groups. Compound B may be an organic monomeric compound or a polymer. Preferably compound B is an organic monomeric compound. Exemplary vinyl ethers include but are not limited to mono (alcohol) functionalized vinyl ethers, for example 6-hydroxyhexyl vinyl ether, 4-hydroxybutyl vinyl ether, 2-hydroxyethyl vinyl ether, diethylene glycol monovinyl ether, triethylene glycol monovinyl ether or 4-(hydroxymethyl) cyclohexyl methyl vinyl ether (1,4-cyclohexanedimethanol vinyl ether); vinyl ether polyester resins that can be prepared via transesterification of hydroxyl functional polyester resins with hydroxyl functional vinyl ethers.

The hydroxyl vinyl ethers which may be employed in making the VFUR include those prepared by any of the methods well known to those of ordinary skill in the art. Examples of hydroxyl vinyl ethers include but are not limited to 4-hydroxybutyl vinyl ether, 2-hydroxyethyl vinyl ether. It is understood that other hydroxyl vinyl ethers may be used, for example, those having the general formula $CH_2=CH—O—R—OH$, where R is a hydrocarbylene, or $CH_2—CH_2—O—CH_2—CH_2$ or $CH_2—CH_2—O—CH_2—CH_2—O—CH_2—CH_2$. Preferably R is $CH_2—CH_2—O—CH_2—CH_2$ or $CH_2—CH_2—O—CH_2—CH_2—O—CH_2—CH_2$.

It is understood that hydroxyl vinyl esters may be used, for example, those having the general formula $CH_2=CH—O—(C=O)—R—OH$, where R is a hydrocarbylene, or $CH_2—CH_2—O—CH_2—CH_2$ or $CH_2—CH_2—O—CH_2—CH_2—O—CH_2—CH_2$. Preferably R is $CH_2—CH_2—O—CH_2—CH_2$ or $CH_2—CH_2—O—CH_2—CH_2—O—CH_2—CH_2$.

Exemplary vinyl esters include but are not limited to hydroxyl vinyl esters and to those prepared by any of the methods well known to those of ordinary skill in the art. The hydroxyl vinyl esters are usually prepared by the reaction of acetaldehyde with acid chlorides in the presence of tertiary amines; methods for the preparation of hydroxyl vinyl esters are known in the art.

Preferably compound B is a hydroxyl vinyl ether, more preferably compound B is selected from the group consisting of 6-hydroxyhexyl vinyl ether, 4-hydroxybutyl vinyl ether, 2-hydroxyethyl vinyl ether, diethylene glycol monovinyl ether, triethylene glycol monovinyl ether, 4-(hydroxymethyl) cyclohexyl methyl vinyl ether (1,4-cyclohexanedimethanol vinyl ether), and ethoxylated hydroxybutyl vinyl ether-X; more preferably compound B is selected from the group consisting of 6-hydroxyhexyl vinyl ether, 4-hydroxybutyl vinyl ether, 2-hydroxyethyl vinyl ether, diethylene glycol monovinyl ether, triethylene glycol monovinyl ether, 4-(hydroxymethyl) cyclohexyl methyl vinyl ether (1,4-cyclohexanedimethanol vinyl ether); even more preferably compound B is selected from the group of compounds consisting of diethylene glycol monovinyl ether and triethylene glycol monovinyl ether; most preferably compound B is triethylene glycol monovinyl ether.

Preferably, the organic compound C is a mono-alcohol, polyol e.g. di-alcohol (diol), tri-alcohol (triol) or polyalcohol that is an alcohol having more than three hydroxyl groups per molecule, or a hydroxyl functional polymer e.g. a hydroxyl functional polyester resin. Preferably the organic compound C is selected from the group consisting of monoalcohol, polyol, hydroxyl functional polymer; more preferably the organic compound C is selected from the group consisting of diols, triols, polyalcohols, hydroxyl functional oligomer, hydroxyl functional polymer; even more preferably the organic compound C is selected from the group consisting of diols, triols, polyalcohols; most preferably the organic compound C is a diol. Mono-alcohols and polyols that may be used in i) (process 1) and/or ii) (process 2) include those selected from crystallizing or non-crystallizing mono-alcohols and polyols, although crystallizing mono-alcohols and polyols are particularly preferred. Exemplary polyols include but are not limited to ethylene glycol, diethylene glycol, triethylene glycol, 1,2-propylene glycol, 1,3-propylene glycol, 1,3-butylethyl propanediol, neopentyl glycol (2,2'-dimethyl-1,3-propanediol), 2-butyl-2-ethyl-1,3-propanediol (BEPD), 2-methyl-1,3-propanediol (MP diol), 1,2-butylene glycol, 1,3-butylene glycol, 1,4-butylene glycol, 1,3-isobutanediol, 1,2-isobutanediol, 2,3-butanediol, 2-butenediol(1,4), 2,2,4-trimethyl-1,3-pentanediol, 1,2-cyclopentanediol, 1,3-cyclopentanediol, 1,4-cyclopentanediol, 1,6-hexanediol, 1,4-dimethoxy cylcohexane, 1,2-cyclohexanediol, 1,3-cyclohexanediol, 1,4-cyclohexanediol, 1,4-cyclohexanedimethanol, 4,4'-methylene-bis(cyclohexanol), 4,4'-isopropylidene-bis(cyclohexanol), (hydrogenated bisphenol A) 1,4-bis(hydroxymethyl)cyclohexane, 1,3-bis(hydroxyethyl) cyclohexane, 1,3-bis(hydroxypropyl) cyclohexane, 1,3-bis(hydroxyisopropyl) cyclohexane, dodecanediol, xylene glycol, 4,4'-isopropylidene diphenol (bisphenol A), trimethylolpropane, triethylolpropane, pentaerythritol, bisphenol A/propylene oxide adducts, hydroquinone/propylene oxide adducts, and hydroquinone/ethylene oxide adducts. Preferably, diethylene glycol or neopentyl glycol is employed in i) (process 1). Exemplary hydroxyl functional oligomers include but are not limited to castor oil which is a triglyceride with approximately 90% of ricinoleic acid. Exemplary hydroxyl functional polymers include but are not limited to Uralac® P 1411, Uralac® P 1420, Uralac® P 1430, Uralac® P 1535, Uralac® P 1580, Uralac® P 1590, Uralac® P 1620, Uralac® P 1680, Uralac® P 2115, Uralac® P 4125, Uralac® P 5504 and Uralac® P 6504, and moreover polymers prepared via esterification from preferably crystallizing polyols and polyacids. Preferably the hydroxyl functional polymers are hydroxyl functional polyester resins; all examples mentioned in this paragraph are hydroxyl functional polyester resins.

Unless otherwise explicitly stated, any feature, element, component, embodiment, aspect, range and especially any preferred feature, preferred element, preferred embodiment, preferred aspect, preferred range, preferred combination of ranges, preferments, embodiments and aspects in connection with any piece of disclosure disclosed in this section 1.2.3 can be combined with each other and with any other feature, element, component, embodiment, aspect, range and especially any preferred feature, preferred element, preferred embodiment, preferred aspect, preferred range, preferred combination of ranges, preferments, embodiments and aspects of the invention as these are disclosed in the entire application.

1.3 the Component C of the TPCC of the Invention

The terms 'component C' and 'C' are used herein interchangeably.

The TPCC of the invention comprises component C wherein component C represents one or more thermal radical initiators—preferably the one or more thermal radical initiators are selected from the group consisting of organic peroxides, azo compounds, and mixtures thereof—, wherein at least one thermal radical initiator is dilauroyl peroxide and wherein the dilauroyl peroxide is present in an amount of at least 30 and at most 190 mmol/Kg A and B.

Obviously, the dilauroyl peroxide is an example of an organic peroxide and thus also an example of a thermal radical initiator.

Preferably the dilauroyl peroxide is present in an amount of at least 35 and at most 190, more preferably of at least 40 and at most 190, even more preferably of at least 45 and at most 190, most preferably of at least 30 and at most 170, especially of at least 35 and at most 170, more especially of at least 40 and at most 170, most especially of at least 45 and at most 170, for example of at least 30 and at most 150, for example of at least 35 and at most 150, for example of at least 40 and at most 150, for example of at least 45 and at most 150 mmol/Kg A and B.

Preferably the component C is present in an amount of at most 500, more preferably at most 450, even more preferably at most 400, most preferably at most 350, especially at most 300, more especially at most 250, most especially at most 190, for example at most 170 mmol/Kg A and B.

Preferably the dilauroyl peroxide and the component C are present in any combination of preferred amount or preferred range of amounts disclosed individually for the dilauroyl peroxide and the component C in this section 1.3 in a way that the total amount of C is always at least equal to or higher than the amount of the dilauroyl peroxide. For example, the dilauroyl peroxide may be present in an amount of at least 30 and at most 190 mmol/Kg A and B and the component C is present in an amount of at most 500 mmol/Kg A and B; for example the dilauroyl peroxide may be is present in an amount of at least 30 and at most 190 mmol/Kg A and B and the component C is present in an amount of at most 250 mmol/Kg A and B; for example the dilauroyl peroxide may be present in an amount of at least 30 and at most 190 mmol/Kg A and B and the component C is present in an amount of at most 190 mmol/Kg A and B; for example the dilauroyl peroxide may be present in an amount of at least 30 and at most 170 mmol/Kg A and B and the component C is present in an amount of at most 250 mmol/Kg A and B; for example the dilauroyl peroxide may be present in an amount of at least 40 and at most 170 mmol/Kg A and B and the component C is present in an amount of at most 170 mmol/Kg A and B.

Preferably, the component C of the TPCC of the invention comprises dilauroyl peroxide in an amount of at least 5.2, more preferably of at least 6, even more preferably of at least 7, most preferably of at least 8, especially of at least 9, more especially of at least 9.6, even more especially of at least 10.4, most especially of at least 12, for example of at least 14, for example of at least 16, for example of at least 18, for example of at least 19.2, for example of at least 20, for example of at least 25, for example of at least 30, for example of at least 40, for example of at least 50, for example of at least 60, for example of at least 70, for example of at least 80 for example of at least 90 for example of at least 95 for example of at least 96, for example of at least 97, for example of at least 98, for example of at least 99, for example of at least 99.5, for example at least 99.9 pph of C. Preferably, the TPCC of the invention comprises component C wherein component C is dilauroyl peroxide.

Unless otherwise explicitly stated, any feature, element, component, embodiment, aspect, range and especially any preferred feature, preferred element, preferred embodiment, preferred aspect, preferred range, preferred combination of ranges, preferments, embodiments and aspects in connection with any piece of disclosure disclosed in this section 1.3 can be combined with each other and with any other feature, element, component, embodiment, aspect, range and especially any preferred feature, preferred element, preferred embodiment, preferred aspect, preferred range, preferred combination of ranges, preferments, embodiments and aspects of the invention as these are disclosed in the entire application.

1.4 the Component D of the TPCC of the Invention

The terms 'component D' and 'D' are used herein interchangeably.

The TPCC of the invention comprises component D wherein component D represents one or more co-initiators selected from the group consisting of onium compounds, sulpho-compounds, and mixtures thereof, and wherein the total amount of component D is at least 10 and at most 300 mmol/Kg A and B.

Preferably, the component D is present in an amount of at least 10 and at most 200, more preferably at least 10 and at most 150, even more preferably at least 12 and at most 300, most preferably at least 12 and at most 200, especially at least 12 and at most 150 mmol/Kg A and B. These ranges and their preferments apply equally for any co-initiator, any combination of co-initiators as well as for any preferment thereof, as disclosed herein.

The co-initiator is selected from the group consisting of onium compounds, sulpho-compounds, and mixtures thereof. Preferably the co-initiator is selected from the group of onium compounds. Preferably the co-initiator is selected from the group of sulpho-compounds.

Preferably the co-initiator is selected from the group consisting of onium compounds, sulpho-compounds, and mixtures thereof, wherein the onium compounds are selected from the group consisting of compounds represented by formula I-X, compounds represented by formula II-X, compounds represented by formula III-X, compounds represented by formula IV-X, compounds represented by formula V-X, compounds represented by formula VI-X, compounds represented by formula VII-X, compounds represented by formula VIII-X, and compounds represented by formula IX-X; and wherein the sulpho-compounds are selected from the group consisting of sulpho-compound-1, sulpho-compound-2, sulpho-compound-3, sulpho-compound-4 and sulpho-compound-5.

Preferably the co-initiator is selected from the group consisting of onium compounds, sulpho-compounds, and mixtures thereof, wherein the onium compounds are selected from the group consisting of compounds represented by formula I-X, compounds represented by formula II-X, compounds represented by formula III-X, compounds represented by formula IV-X, compounds represented by formula V-X, compounds represented by formula VI-X, compounds represented by formula VII-X, compounds represented by formula VIII-X, and compounds represented by formula IX-X; and wherein the sulpho-compounds are selected from the group consisting of sulpho-compound-1, sulpho-compound-2, sulpho-compound-3, and sulpho-compound-5.

Preferably the co-initiator is selected from the group consisting of onium compounds, sulpho-compounds, and mixtures thereof, wherein the onium compounds are selected from the group consisting of compounds represented by formula I-X, compounds represented by formula II-X, compounds represented by formula III-X, compounds represented by formula IV-X, compounds represented by formula V-X, compounds represented by formula VI-X, compounds represented by formula VII-X, compounds represented by formula VIII-X, and compounds represented by formula IX-X; and wherein the sulpho-compounds are selected from the group consisting of sulpho-compound-1, sulpho-compound-2, and sulpho-compound-3.

Preferably the co-initiator is selected from the group consisting of onium compounds, sulpho-compounds, and mixtures thereof, wherein the onium compounds are selected from the group consisting of compounds represented by formula I-X, compounds represented by formula II-X, compounds represented by formula III-X, compounds represented by formula IV-X, compounds represented by formula V-X, compounds represented by formula VI-X, compounds represented by formula VII-X, compounds represented by formula VIII-X, and compounds represented by formula IX-X; and wherein the sulpho-compounds are selected from the group consisting of sulpho-compound-2, and sulpho-compound-3.

Preferably the co-initiator is selected from the group consisting of onium compounds, sulpho-compounds, and mixtures thereof, wherein the onium compounds are selected from the group consisting of compounds represented by formula I-X, compounds represented by formula II-X, compounds represented by formula III-X, compounds represented by formula IV-X, compounds represented by formula V-X, compounds represented by formula VI-X, compounds represented by formula VII-X, compounds represented by formula VIII-X, and compounds represented by formula IX-X; and wherein the sulpho-compounds are selected from the group consisting of sulpho-compound-3.

Preferably the co-initiator is selected from the group consisting of onium compounds, sulpho-compounds, and mixtures thereof, wherein the onium compounds are selected from the group consisting of compounds represented by formula I-X, compounds represented by formula II-X, compounds represented by formula III-X, compounds represented by formula IV-X, compounds represented by formula V-X, compounds represented by formula VI-X, and compounds represented by formula VIII-X; and wherein the sulpho-compounds are selected from the group consisting of sulpho-compound-1, sulpho-compound-2, sulpho-compound-3, sulpho-compound-4, and sulpho-compound-5.

Preferably the co-initiator is selected from the group consisting of onium compounds, sulpho-compounds, and mixtures thereof, wherein the onium compounds are selected from the group consisting of compounds represented by formula I-X, compounds represented by formula II-X, compounds represented by formula III-X, compounds represented by formula IV-X, compounds represented by formula V-X, compounds represented by formula VI-X, and compounds represented by formula VII-X; and wherein the sulpho-compounds are selected from the group consisting of sulpho-compound-1, sulpho-compound-2, sulpho-compound-3, sulpho-compound-4, and sulpho-compound-5.

Preferably the co-initiator is selected from the group consisting of onium compounds, sulpho-compounds, and mixtures thereof, wherein the onium compounds are selected from the group consisting of compounds represented by formula I-X, compounds represented by formula II-X, compounds represented by formula III-X, compounds represented by formula V-X, compounds represented by formula VI-X, and compounds represented by formula VII-X; and wherein the sulpho-compounds are selected from the group consisting of sulpho-compound-1, sulpho-compound-2, sulpho-compound-3, sulpho-compound-4, and sulpho-compound-5.

Preferably the co-initiator is selected from the group consisting of onium compounds, sulpho-compounds, and mixtures thereof, wherein the onium compounds are selected from the group consisting of compounds represented by formula I-X, compounds represented by formula II-X, compounds represented by formula V-X, compounds represented by formula VI-X, and compounds represented by formula VII-X; and wherein the sulpho-compounds are selected from the group consisting of sulpho-compound-1, sulpho-compound-2, sulpho-compound-3, sulpho-compound-4 and sulpho-compound-5.

Preferably the co-initiator is selected from the group consisting of onium compounds, sulpho-compounds, and mixtures thereof, wherein the onium compounds are selected from the group consisting of compounds represented by formula I-X, compounds represented by formula II-X, compounds represented by formula V-X, compounds represented by formula VI-X; and wherein the sulpho-compounds are selected from the group consisting of sulpho-compound-1, sulpho-compound-2, sulpho-compound-3, sulpho-compound-4 and sulpho-compound-5.

Preferably the co-initiator is selected from the group consisting of onium compounds, sulpho-compounds, and mixtures thereof, wherein the onium compounds are selected from the group consisting of compounds represented by formula I-X, compounds represented by formula II-X, compounds represented by formula V-X; and wherein the sulpho-compounds are selected from the group consisting of sulpho-compound-1, sulpho-compound-2, sulpho-compound-3, sulpho-compound-4 and sulpho-compound-5.

Preferably the co-initiator is selected from the group consisting of onium compounds, sulpho-compounds, and mixtures thereof, wherein the onium compounds are selected from the group consisting of compounds represented by formula I-X, compounds represented by formula II-X; and wherein the sulpho-compounds are selected from the group consisting of sulpho-compound-1, sulpho-compound-2, sulpho-compound-3, sulpho-compound-4 and sulpho-compound-5.

Preferably the co-initiator is selected from the group consisting of onium compounds, sulpho-compounds, and mixtures thereof, wherein the onium compounds are selected from the group consisting of compounds represented by formula II-X; and wherein the sulpho-compounds are selected from the group consisting of sulpho-compound- 1, sulpho-compound-2, sulpho-compound-3, sulpho-compound-4 and sulpho-compound-5.

Preferably the co-initiator is selected from the group consisting of onium compounds, sulpho-compounds, and mixtures thereof, wherein the onium compounds are selected from the group consisting of compounds represented by formula II-X; and wherein the sulpho-compounds are selected from the group consisting of sulpho-compound-1, sulpho-compound-2, sulpho-compound-3, and sulpho-compound-5.

Preferably the co-initiator is selected from the group consisting of onium compounds, sulpho-compounds, and mixtures thereof, wherein the onium compounds are selected from the group consisting of compounds represented by formula I-X, and compounds represented by formula II-X; and wherein the sulpho-compounds are selected from the group consisting of sulpho-compound-1, sulpho-compound-2, and sulpho-compound-3.

Preferably the co-initiator is selected from the group consisting of onium compounds, sulpho-compounds, and mixtures thereof, wherein the onium compounds are selected from the group consisting of compounds represented by formula I-X, and compounds represented by formula II-X; and wherein the sulpho-compounds are selected from the group consisting of sulpho-compound-2, and sulpho-compound-3.

Preferably the co-initiator is selected from the group consisting of onium compounds, sulpho-compounds, and mixtures thereof, wherein the onium compounds are selected from the group consisting of compounds represented by formula I-X, and compounds represented by formula II-X; and wherein the sulpho-compounds are selected from the group consisting of sulpho-compound-3.

Preferably the co-initiator is selected from the group consisting of onium compounds, sulpho-compounds, and mixtures thereof, wherein the onium compounds are selected from the group consisting of compounds represented by formula I-X; and compounds represented by formula II-X.

Preferably the co-initiator is selected from the group consisting of onium compounds wherein the onium compounds are selected from the group consisting of compounds represented by formula II-X.

Preferably the co-initiator is selected from the group consisting of onium compounds, sulpho-compounds, and mixtures thereof, wherein the onium compounds are selected from the group consisting of compounds represented by formula I-X and compounds represented by formula II-X and wherein the $A^-$ in formulae I-X and II-X is selected from the group consisting of halide anions, perhalide anions, phosphate anions, arsenate anions, antimonite anions, sulphonate anions, and borate anions.

Preferably the co-initiator is selected from the group consisting of onium compounds, sulpho-compounds, and mixtures thereof, wherein the onium compounds are selected from the group consisting of compounds represented by formula I-X and compounds represented by formula II-X and wherein the $A^-$ in formulae I-X and II-X is selected from the group of halide anions, perhalide anions, phosphate anions, sulphonate anions, and borate anions.

Preferably the co-initiator is selected from the group consisting of onium compounds, sulpho-compounds, and mixtures thereof, wherein the onium compounds are selected from the group consisting of compounds represented by formula I-X and compounds represented by formula II-X and wherein the $A^-$ in formulae I-X and II-X is selected from the group of halide anions.

Preferably the co-initiator is selected from the group consisting of bis(4-dodecylphenyl)iodonium hexafluorophosphate, bis(4-dodecylphenyl)iodonium chloride, bis(4-dodecylphenyl)iodonium iodide, bis(4-dodecylphenyl)iodonium p-toluene sulphate, bis(4-tert-butylphenyl)iodonium hexafluorophosphate, bis(4-tert-butylphenyl)iodonium chloride, bis(4-tert-butylphenyl)iodonium iodide, bis(4-tert-butylphenyl)iodonium p-toluene sulphate, (4-methylphenyl)(4-(2-methylpropyl)phenyl)iodonium hexafluorophosphate, (4-methylphenyl)(4-(2-methylpropyl)phenyl)iodonium chloride, (4-methylphenyl)(4-(2-methylpropyl)phenyl)iodonium iodide, (4-methylphenyl)(4-(2-methylpropyl)phenyl)iodonium p-toluene sulphate, diphenyliodonium chloride, diphenyliodonium hexafluorphosphate, diphenyliodonium iodide, diphenyliodonium p-toluene sulphate, N-benzylpyridinium hexafluorophosphate, N-ethoxy-2-methylpyridinium hexafluorophosphate, diethyl(2-oxo-2-phenylethyl)sulfonium hexafluorophosphate, diphenyl(p-tolyl)sulfonium 4-methylbenzenesulfinate, triphenylsulfonium trifluoromethanesulfonate, tri(4-((4-acetylphenyl)thio)phenyl)sulfonium, tetrakis(perfluorophnyl)borate, methyl(diphenyl)sulfonium tetrafluoroborate, triethylsulfonium tetrafluoroborate, 2-(((tert-butylsulfonyl)(diazo)methyl)sulfonyl)-2-methylpropane, tert-butyl 4-methylbenzenesulfonate, 2-isopropyl-5-methylcyclohexyl 4-methylbenzenesulfonate, 2-methyl-2-[(4-methylphenyl)sulfonyl]-1-[4-(methylthio)phenyl]-1-propanone, pentan-3-one O-tosyl oxime, (E)-3,4-dihydronaphthalen-1(2H)-one O-((4-chlorophenyl)sulfonyl) oxime and mixtures thereof.

Preferably the co-initiator is selected from the group consisting of bis(4-dodecylphenyl)iodonium hexafluorophosphate, bis(4-dodecylphenyl)iodonium chloride, bis(4-dodecylphenyl)iodonium iodide, bis(4-dodecylphenyl)iodonium p-toluene sulphate, bis(4-tert-butylphenyl)iodonium hexafluorophosphate, bis(4-tert-butylphenyl)iodonium chloride, bis(4-tert-butylphenyl)iodonium iodide, bis(4-tert-butylphenyl)iodonium p-toluene sulphate, (4-methylphenyl)(4-(2-methylpropyl)phenyl)iodonium hexafluorophosphate, (4-methylphenyl)(4-(2-methylpropyl)phenyl)iodonium chloride, (4-methylphenyl)(4-(2-methylpropyl)phenyl)iodonium iodide, (4-methylphenyl)(4-(2-methylpropyl)phenyl)iodonium p-toluene sulphate, diphenyliodonium chloride, diphenyliodonium hexafluorphosphate, diphenyliodonium iodide, diphenyliodonium p-toluene sulphate, N-benzylpyridinium hexafluorophosphate, N-ethoxy-2-methylpyridinium hexafluorophosphate, diethyl(2-oxo-2-phenylethyl)sulfonium hexafluorophosphate, diphenyl(p-tolyl)sulfonium 4-methylbenzenesulfonate, triphenylsulfonium trifluoromethanesulfonate, tri(4-((4-acetylphenyl)thio)phenyl)sulfonium, tetrakis(perfluorophnyl)borate, methyl(diphenyl)sulfonium tetrafluoroborate, triethylsulfonium tetrafluoroborate, 2-(((tert-butylsulfonyl)(diazo)methyl)sulfonyl)-2-methylpropane, tert-butyl 4-methylbenzenesulfonate, 2-isopropyl-5-methylcyclohexyl 4-methylbenzenesulfonate, 2-methyl-2-[(4-methylphenyl)sulfonyl]-1-[4-(methylthio)phenyl]-1-propanone, (E)-3,4-dihydronaphthalen-1(2H)-one O-((4-chlorophenyl)sulfonyl) oxime and mixtures thereof.

Preferably the co-initiator is selected from the group consisting of bis(4-dodecylphenyl)iodonium hexafluorophosphate, bis(4-dodecylphenyl)iodonium chloride, bis(4-dodecylphenyl)iodonium iodide, bis(4-dodecylphenyl)iodonium p-toluene sulphate, bis(4-tert-butylphenyl)iodonium hexafluorophosphate, bis(4-tert-butylphenyl)iodonium chloride, bis(4-tert-butylphenyl)iodonium iodide, bis(4-tert-butylphenyl)iodonium p-toluene sulphate, (4-methylphenyl)(4-(2-methylpropyl)phenyl)iodonium hexafluorophosphate, (4-methylphenyl)(4-(2-methylpropyl)phenyl)iodonium chloride, (4-methylphenyl)(4-(2-methylpropyl)phenyl)iodonium iodide, (4-methylphenyl)(4-(2-methylpropyl)phenyl) iodonium p-toluene sulphate, diphenyliodonium chloride, diphenyliodonium hexafluorphosphate, diphenyliodonium iodide, diphenyliodonium p-toluene sulphate, N-benzylpyridinium hexafluorophosphate, N-ethoxy-2-methylpyridinium hexafluorophosphate, diethyl(2-oxo-2-phenylethyl)sulfonium hexafluorophosphate, diphenyl(p-tolyl)sulfonium 4-methylbenzenesulfonate, triphenylsulfonium trifluoromethanesulfonate, tri(4-((4-acetylphenyl)thio)phenyl)sulfonium, tetrakis(perfluorophnyl)borate, methyl(diphenyl)sulfonium tetrafluoroborate, triethylsulfonium tetrafluoroborate, 2-(((tert-butylsulfonyl)(diazo)methyl)sulfonyl)-2-methylpropane, tert-butyl 4-methylbenzenesulfonate, 2-isopropyl-5-methylcyclohexyl 4-methylbenzenesulfonate, 2-methyl-2-[(4-methylphenyl)sulfonyl]-1-[4-(methylthio)phenyl]-1-propanone, and mixtures thereof.

Preferably the co-initiator is selected from the group consisting of bis(4-dodecylphenyl)iodonium hexafluorophosphate, bis(4-dodecylphenyl)iodonium chloride, bis(4-dodecylphenyl)iodonium iodide, bis(4-dodecylphenyl)iodonium p-toluene sulphate, bis(4-tert-butylphenyl)iodonium hexafluorophosphate, bis(4-tert-butylphenyl)iodonium chloride, bis(4-tert-butylphenyl)iodonium iodide, bis(4-tert-butylphenyl)iodonium p-toluene sulphate, (4-methylphenyl)(4-(2-methylpropyl)phenyl)iodonium hexafluorophosphate, (4-methylphenyl)(4-(2-methylpropyl)phenyl)iodonium chloride, (4-methylphenyl)(4-(2-methylpropyl)phenyl)iodonium iodide, (4-methylphenyl)(4-(2-methylpropyl)phenyl) iodonium p-toluene sulphate, diphenyliodonium chloride, diphenyliodonium hexafluorphosphate, diphenyliodonium iodide, diphenyliodonium p-toluene sulphate, N-benzylpyridinium hexafluorophosphate, N-ethoxy-2-methylpyridinium hexafluorophosphate, diethyl(2-oxo-2-phenylethyl)sulfonium hexafluorophosphate, diphenyl(p-tolyl)sulfonium 4-methylbenzenesulfonate, triphenylsulfonium trifluoromethanesulfonate, tri(4-((4-acetylphenyl)thio)phenyl)sulfonium, tetrakis(perfluorophnyl)borate, methyl(diphenyl)sulfonium tetrafluoroborate, 2-(((tert-butylsulfonyl)(diazo)methyl)sulfonyl)-2-methylpropane, tert-butyl 4-methylbenzenesulfonate, 2-isopropyl-5-methylcyclohexyl 4-methylbenzenesulfonate, 2-methyl-2-[(4-methylphenyl)sulfonyl]-1-[4-(methylthio)phenyl]-1-propanone, and mixtures thereof.

Preferably the co-initiator is selected from the group consisting of bis(4-dodecylphenyl)iodonium hexafluorophosphate, bis(4-dodecylphenyl)iodonium chloride, bis(4-dodecylphenyl)iodonium iodide, bis(4-dodecylphenyl)iodonium p-toluene sulphate, bis(4-tert-butylphenyl)iodonium hexafluorophosphate, bis(4-tert-butylphenyl)iodonium chloride, bis(4-tert-butylphenyl)iodonium iodide, bis(4-tert-butylphenyl)iodonium p-toluene sulphate, (4-methylphenyl)(4-(2-methylpropyl)phenyl)iodonium hexafluorophosphate, (4-methylphenyl)(4-(2-methylpropyl)phenyl)iodonium chloride, (4-methylphenyl)(4-(2-methylpropyl)phenyl)iodonium iodide, (4-methylphenyl)(4-(2-methylpropyl)phenyl) iodonium p-toluene sulphate, diphenyliodonium chloride, diphenyliodonium hexafluorphosphate, diphenyliodonium iodide, diphenyliodonium p-toluene sulphate, N-benzylpyridinium hexafluorophosphate, N-ethoxy-2-methylpyridinium hexafluorophosphate, diethyl(2-oxo-2-phenylethyl)sulfonium hexafluorophosphate, diphenyl(p-tolyl)sulfonium 4-methylbenzenesulfonate, triphenylsulfonium trifluoromethanesulfonate, tri(4-((4-acetylphenyl)thio)phenyl)sulfonium, tetrakis(perfluorophnyl)borate, 2-(((tert-butylsulfonyl)(diazo)methyl)sulfonyl)-2-methylpropane, tert-butyl 4-methylbenzenesulfonate, 2-isopropyl-5-methylcyclohexyl 4-methylbenzenesulfonate, 2-methyl-2-[(4-methylphenyl)sulfonyl]-1-[4-(methylthio)phenyl]-1-propanone, and mixtures thereof.

Preferably the co-initiator is selected from the group consisting of bis(4-dodecylphenyl)iodonium hexafluorophosphate, bis(4-dodecylphenyl)iodonium chloride, bis(4-dodecylphenyl)iodonium iodide, bis(4-dodecylphenyl)iodonium p-toluene sulphate, bis(4-tert-butylphenyl)iodonium hexafluorophosphate, bis(4-tert-butylphenyl)iodonium chloride, bis(4-tert-butylphenyl)iodonium iodide, bis(4-tert-butylphenyl)iodonium p-toluene sulphate, (4-methylphenyl)(4-(2-methylpropyl)phenyl)iodonium hexafluorophosphate, (4-methylphenyl)(4-(2-methylpropyl)phenyl)iodonium chloride, (4-methylphenyl)(4-(2-methylpropyl)phenyl)iodonium iodide, (4-methylphenyl)(4-(2-methylpropyl)phenyl) iodonium p-toluene sulphate, diphenyliodonium chloride, diphenyliodonium hexafluorphosphate, diphenyliodonium iodide, diphenyliodonium p-toluene sulphate, diethyl(2-oxo-2-phenylethyl)sulfonium hexafluorophosphate, diphenyl(p-tolyl)sulfonium 4-methylbenzenesulfonate, triphenylsulfonium trifluoromethanesulfonate, tri(4-((4-acetylphenyl)thio)phenyl)sulfonium, tetrakis(perfluorophnyl)borate, 2-(((tert-butylsulfonyl)(diazo)methyl)sulfonyl)-2-methylpropane, tert-butyl 4-methylbenzenesulfonate, 2-isopropyl-5-methylcyclohexyl 4-methylbenzenesulfonate, 2-methyl-2-[(4-methylphenyl)sulfonyl]-1-[4-(methylthio)phenyl]-1-propanone, and mixtures thereof.

Preferably the co-initiator is selected from the group consisting of bis(4-dodecylphenyl)iodonium hexafluorophosphate, bis(4-dodecylphenyl)iodonium chloride, bis(4-dodecylphenyl)iodonium iodide, bis(4-dodecylphenyl)iodonium p-toluene sulphate, bis(4-tert-butylphenyl)iodonium hexafluorophosphate, bis(4-tert-butylphenyl)iodonium chloride, bis(4-tert-butylphenyl)iodonium iodide, bis(4-tert-butylphenyl)iodonium p-toluene sulphate, (4-methylphenyl)(4-(2-methylpropyl)phenyl)iodonium hexafluorophosphate, (4-methylphenyl)(4-(2-methylpropyl)phenyl)iodonium chloride, (4-methylphenyl)(4-(2-methylpropyl)phenyl)iodonium iodide, (4-methylphenyl)(4-(2-methylpropyl)phenyl) iodonium p-toluene sulphate, diphenyliodonium chloride, diphenyliodonium hexafluorphosphate, diphenyliodonium iodide, diphenyliodonium p-toluene sulphate, diethyl(2-oxo-2-phenylethyl)sulfonium hexafluorophosphate, diphenyl(p-tolyl)sulfonium 4-methylbenzenesulfonate, triphenylsulfonium trifluoromethanesulfonate, 2-(((tert-butylsulfonyl)(diazo)methyl)sulfonyl)-2-methylpropane, tert-butyl 4-methylbenzenesulfonate, 2-isopropyl-5-methylcyclohexyl 4-methylbenzenesulfonate, 2-methyl-2-[(4-methylphenyl)sulfonyl]-1-[4-(methylthio)phenyl]-1-propanone, and mixtures thereof.

Preferably the co-initiator is selected from the group consisting of bis(4-dodecylphenyl)iodonium hexafluorophosphate, bis(4-dodecylphenyl)iodonium chloride, bis(4-dodecylphenyl)iodonium iodide, bis(4-dodecylphenyl)iodonium p-toluene sulphate, bis(4-tert-butylphenyl)iodonium hexafluorophosphate, bis(4-tert-butylphenyl)iodonium chloride, bis(4-tert-butylphenyl)iodonium iodide, bis(4-tert-butylphenyl)iodonium p-toluene sulphate, (4-methylphenyl)(4-(2-methylpropyl)phenyl)iodonium hexafluorophosphate, (4-methylphenyl)(4-(2-methylpropyl)phenyl)iodonium chloride, (4-methylphenyl)(4-(2-methylpropyl)phenyl)iodonium iodide, (4-methylphenyl)(4-(2-methylpropyl)phenyl)iodonium p-toluene sulphate, diphenyliodonium chloride, diphenyliodonium hexafluorphosphate, diphenyliodonium iodide, diphenyliodonium p-toluene sulphate, diethyl(2-oxo-2-phenylethyl)sulfonium hexafluorophosphate, diphenyl(p-tolyl)sulfonium 4-methylbenzenesulfonate, 2-(((tert-butylsulfonyl)(diazo)methyl)sulfonyl)-2-methylpropane, tert-butyl 4-methylbenzenesulfonate, 2-isopropyl-5-methylcyclohexyl 4-methylbenzenesulfonate, 2-methyl-2-[(4-methylphenyl)sulfonyl]-1-[4-(methylthio)phenyl]-1-propanone, and mixtures thereof.

Preferably the co-initiator is selected from the group consisting of bis(4-dodecylphenyl)iodonium hexafluorophosphate, bis(4-dodecylphenyl)iodonium chloride, bis(4-dodecylphenyl)iodonium iodide, bis(4-dodecylphenyl)iodonium p-toluene sulphate, bis(4-tert-butylphenyl)iodonium hexafluorophosphate, bis(4-tert-butylphenyl)iodonium chloride, bis(4-tert-butylphenyl)iodonium iodide, bis(4-tert-butylphenyl)iodonium p-toluene sulphate, (4-methylphenyl)(4-(2-methylpropyl)phenyl)iodonium hexafluorophosphate, (4-methylphenyl)(4-(2-methylpropyl)phenyl)iodonium chloride, (4-methylphenyl)(4-(2-methylpropyl)phenyl)iodonium iodide, (4-methylphenyl)(4-(2-methylpropyl)phenyl)iodonium p-toluene sulphate, diphenyliodonium chloride, diphenyliodonium hexafluorphosphate, diphenyliodonium iodide, diphenyliodonium p-toluene sulphate, diethyl(2-oxo-2-phenylethyl)sulfonium hexafluorophosphate, 2-(((tert-butylsulfonyl)(diazo)methyl)sulfonyl)-2-methylpropane, tert-butyl 4-methylbenzenesulfonate, 2-isopropyl-5-methylcyclohexyl 4-methylbenzenesulfonate, 2-methyl-2-[(4-methylphenyl)sulfonyl]-1-[4-(methylthio)phenyl]-1-propanone, and mixtures thereof.

Preferably the co-initiator is selected from the group consisting of bis(4-dodecylphenyl)iodonium hexafluorophosphate, bis(4-dodecylphenyl)iodonium chloride, bis(4-dodecylphenyl)iodonium iodide, bis(4-dodecylphenyl)iodonium p-toluene sulphate, bis(4-tert-butylphenyl)iodonium hexafluorophosphate, bis(4-tert-butylphenyl)iodonium chloride, bis(4-tert-butylphenyl)iodonium iodide, bis(4-tert-butylphenyl)iodonium p-toluene sulphate, (4-methylphenyl)(4-(2-methylpropyl)phenyl)iodonium hexafluorophosphate, (4-methylphenyl)(4-(2-methylpropyl)phenyl)iodonium chloride, (4-methylphenyl)(4-(2-methylpropyl)phenyl)iodonium iodide, (4-methylphenyl)(4-(2-methylpropyl)phenyl)iodonium p-toluene sulphate, diphenyliodonium chloride, diphenyliodonium hexafluorphosphate, diphenyliodonium iodide, diphenyliodonium p-toluene sulphate, 2-(((tert-butylsulfonyl)(diazo)methyl)sulfonyl)-2-methylpropane, tert-butyl 4-methylbenzenesulfonate, 2-isopropyl-5-methylcyclohexyl 4-methylbenzenesulfonate, 2-methyl-2-[(4-methylphenyl)sulfonyl]-1-[4-(methylthio)phenyl]-1-propanone, and mixtures thereof.

Preferably the co-initiator is selected from the group consisting of bis(4-dodecylphenyl)iodonium hexafluorophosphate, bis(4-dodecylphenyl)iodonium chloride, bis(4-dodecylphenyl)iodonium iodide, bis(4-dodecylphenyl)iodonium p-toluene sulphate, bis(4-tert-butylphenyl)iodonium hexafluorophosphate, bis(4-tert-butylphenyl)iodonium chloride, bis(4-tert-butylphenyl)iodonium iodide, bis(4-tert-butylphenyl)iodonium p-toluene sulphate, (4-methylphenyl)(4-(2-methylpropyl)phenyl)iodonium hexafluorophosphate, (4-methylphenyl)(4-(2-methylpropyl)phenyl)iodonium chloride, (4-methylphenyl)(4-(2-methylpropyl)phenyl)iodonium iodide, (4-methylphenyl)(4-(2-methylpropyl)phenyl)iodonium p-toluene sulphate, diphenyliodonium chloride, diphenyliodonium hexafluorphosphate, diphenyliodonium iodide, diphenyliodonium p-toluene sulphate, tert-butyl 4-methylbenzenesulfonate, 2-isopropyl-5-methylcyclohexyl 4-methylbenzenesulfonate, and mixtures thereof.

Preferably the co-initiator is selected from the group consisting of bis(4-dodecylphenyl)iodonium hexafluorophosphate, bis(4-dodecylphenyl)iodonium chloride, bis(4-dodecylphenyl)iodonium iodide, bis(4-dodecylphenyl)iodonium p-toluene sulphate, bis(4-tert-butylphenyl)iodonium hexafluorophosphate, bis(4-tert-butylphenyl)iodonium chloride, bis(4-tert-butylphenyl)iodonium iodide, bis(4-tert-butylphenyl)iodonium p-toluene sulphate, (4-methylphenyl)(4-(2-methylpropyl)phenyl)iodonium hexafluorophosphate, (4-methylphenyl)(4-(2-methylpropyl)phenyl)iodonium chloride, (4-methylphenyl)(4-(2-methylpropyl)phenyl)iodonium iodide, (4-methylphenyl)(4-(2-methylpropyl)phenyl)iodonium p-toluene sulphate, diphenyliodonium chloride, diphenyliodonium hexafluorphosphate, diphenyliodonium iodide, diphenyliodonium p-toluene sulphate, tert-butyl 4-methylbenzenesulfonate, and mixtures thereof.

Preferably the co-initiator is selected from the group consisting of bis(4-dodecylphenyl)iodonium hexafluorophosphate, bis(4-dodecylphenyl)iodonium chloride, bis(4-dodecylphenyl)iodonium iodide, bis(4-dodecylphenyl)iodonium p-toluene sulphate, bis(4-tert-butylphenyl)iodonium hexafluorophosphate, bis(4-tert-butylphenyl)iodonium chloride, bis(4-tert-butylphenyl)iodonium iodide, bis(4-tert-butylphenyl)iodonium p-toluene sulphate, (4-methylphenyl)(4-(2-methylpropyl)phenyl)iodonium hexafluorophosphate, (4-methylphenyl)(4-(2-methylpropyl)phenyl)iodonium chloride, (4-methylphenyl)(4-(2-methylpropyl)phenyl)iodonium iodide, (4-methylphenyl)(4-(2-methylpropyl)phenyl)iodonium p-toluene sulphate, diphenyliodonium chloride, diphenyliodonium hexafluorphosphate, diphenyliodonium iodide, diphenyliodonium p-toluene sulphate, and mixtures thereof.

Preferably the co-initiator is selected from the group consisting of bis(4-dodecylphenyl)iodonium chloride, bis(4-dodecylphenyl)iodonium iodide, bis(4-dodecylphenyl)iodonium p-toluene sulphate, bis(4-tert-butylphenyl)iodonium hexafluorophosphate, bis(4-tert-butylphenyl)iodonium chloride, bis(4-tert-butylphenyl)iodonium iodide, bis(4-tert-butylphenyl)iodonium p-toluene sulphate, (4-methylphenyl)(4-(2-methylpropyl)phenyl)iodonium hexafluorophosphate, (4-methylphenyl)(4-(2-methylpropyl)phenyl)iodonium chloride, (4-methylphenyl)(4-(2-methyl propyl)phenyl)iodonium iodide, (4-methylphenyl)(4-(2-methylpropyl)phenyl)iodonium p-toluene sulphate, diphenyliodonium chloride, diphenyliodonium hexafluorphosphate, diphenyliodonium iodide, diphenyliodonium p-toluene sulphate, and mixtures thereof.

Preferably the co-initiator is selected from the group consisting of bis(4-dodecylphenyl)iodonium chloride, bis(4-dodecylphenyl)iodonium iodide, bis(4-tert-butylphenyl)iodonium hexafluorophosphate, bis(4-tert-butylphenyl)iodonium chloride, bis(4-tert-butylphenyl)iodonium iodide, bis(4-tert-butylphenyl)iodonium p-toluene sulphate, (4-methylphenyl)(4-(2-methylpropyl)phenyl)iodonium hexafluorophosphate, (4-methylphenyl)(4-(2-methylpropyl)phenyl)iodonium chloride, (4-methylphenyl)(4-(2-methylpropyl)phenyl)iodonium iodide, (4-methylphenyl)(4-(2-methylpropyl)phenyl)iodonium p-toluene sulphate, diphenyliodonium chloride, diphenyliodonium hexafluorphosphate, diphenyliodonium iodide, diphenyliodonium p-toluene sulphate, and mixtures thereof.

Preferably the co-initiator is selected from the group consisting of bis(4-dodecylphenyl)iodonium chloride, bis(4-tert-butylphenyl)iodonium hexafluorophosphate, bis(4-tert-butylphenyl)iodonium chloride, bis(4-tert-butylphenyl)iodonium iodide, bis(4-tert-butylphenyl)iodonium p-toluene sulphate, (4-methylphenyl)(4-(2-methylpropyl)phenyl)iodonium hexafluorophosphate, (4-methylphenyl)(4-(2-methylpropyl)phenyl)iodonium chloride, (4-methylphenyl)(4-(2-methylpropyl)phenyl)iodonium iodide, (4-methylphenyl)(4-(2-methylpropyl)phenyl)iodonium p-toluene sulphate, diphenyliodonium chloride, diphenyliodonium hexafluorphosphate, diphenyliodonium iodide, diphenyliodonium p-toluene sulphate, and mixtures thereof.

Preferably the co-initiator is selected from the group consisting of bis(4-tert-butylphenyl)iodonium hexafluorophosphate, bis(4-tert-butylphenyl)iodonium chloride, bis(4-tert-butylphenyl)iodonium iodide, bis(4-tert-butylphenyl)iodonium p-toluene sulphate, (4-methylphenyl)(4-(2-methylpropyl)phenyl)iodonium hexafluorophosphate, (4-methylphenyl)(4-(2-methylpropyl)phenyl)iodonium chloride, (4-methylphenyl)(4-(2-methylpropyl)phenyl)iodonium iodide, (4-methylphenyl)(4-(2-methylpropyl)phenyl)iodonium p-toluene sulphate, diphenyliodonium chloride, diphenyliodonium hexafluorphosphate, diphenyliodonium iodide, diphenyliodonium p-toluene sulphate, and mixtures thereof.

Preferably the co-initiator is selected from the group consisting of bis(4-tert-butylphenyl)iodonium hexafluorophosphate, bis(4-tert-butylphenyl)iodonium chloride, bis(4-tert-butylphenyl)iodonium p-toluene sulphate, (4-methylphenyl)(4-(2-methylpropyl)phenyl)iodonium hexafluorophosphate, (4-methylphenyl)(4-(2-methylpropyl)phenyl)iodonium chloride, (4-methylphenyl)(4-(2-methylpropyl)phenyl)iodonium iodide, (4-methylphenyl)(4-(2-methylpropyl)phenyl)iodonium p-toluene sulphate, diphenyliodonium chloride, diphenyliodonium hexafluorphosphate, diphenyliodonium iodide, diphenyliodonium p-toluene sulphate, and mixtures thereof.

Preferably the co-initiator is selected from the group consisting of bis(4-tert-butylphenyl)iodonium hexafluorophosphate, bis(4-tert-butylphenyl)iodonium chloride, bis(4-tert-butylphenyl)iodonium p-toluene sulphate, (4-methylphenyl)(4-(2-methylpropyl)phenyl)iodonium hexafluorophosphate, (4-methylphenyl)(4-(2-methylpropyl)phenyl)iodonium chloride, (4-methylphenyl)(4-(2-methylpropyl)phenyl)iodonium p-toluene sulphate, diphenyliodonium chloride, diphenyliodonium hexafluorphosphate, diphenyliodonium iodide, diphenyliodonium p-toluene sulphate, and mixtures thereof.

Preferably the co-initiator is selected from the group consisting of bis(4-tert-butylphenyl)iodonium hexafluorophosphate, bis(4-tert-butylphenyl)iodonium chloride, (4-methylphenyl)(4-(2-methylpropyl)phenyl)iodonium hexafluorophosphate, (4-methylphenyl)(4-(2-methylpropyl)phenyl)iodonium chloride, (4-methylphenyl)(4-(2-methylpropyl)phenyl)iodonium p-toluene sulphate, diphenyliodonium chloride, diphenyliodonium hexafluorphosphate, diphenyliodonium iodide, diphenyliodonium p-toluene sulphate, and mixtures thereof.

Preferably the co-initiator is selected from the group consisting of bis(4-tert-butylphenyl)iodonium hexafluorophosphate, bis(4-tert-butylphenyl)iodonium chloride, (4-methylphenyl)(4-(2-methylpropyl)phenyl)iodonium hexafluorophosphate, (4-methylphenyl)(4-(2-methylpropyl)phenyl)iodonium chloride, diphenyliodonium chloride, diphenyliodonium hexafluorphosphate, diphenyliodonium iodide, diphenyliodonium p-toluene sulphate, and mixtures thereof.

Preferably the co-initiator is selected from the group consisting of bis(4-tert-butylphenyl)iodonium hexafluorophosphate, (4-methylphenyl)(4-(2-methylpropyl)phenyl)iodonium hexafluorophosphate, (4-methylphenyl)(4-(2-methylpropyl)phenyl)iodonium chloride, diphenyliodonium chloride, diphenyliodonium hexafluorphosphate, diphenyliodonium p-toluene sulphate, and mixtures thereof.

Preferably the co-initiator is selected from the group consisting of bis(4-tert-butylphenyl)iodonium hexafluorophosphate, (4-methylphenyl)(4-(2-methylpropyl)phenyl)iodonium hexafluorophosphate, diphenyliodonium chloride, diphenyliodonium hexafluorphosphate, diphenyliodonium p-toluene sulphate, and mixtures thereof.

Preferably the co-initiator is selected from the group consisting of (4-methylphenyl)(4-(2-methylpropyl)phenyl)iodonium hexafluorophosphate, diphenyliodonium chloride, diphenyliodonium hexafluorphosphate, diphenyliodonium p-toluene sulphate, and mixtures thereof.

Preferably the co-initiator is selected from the group consisting of (4-methylphenyl)(4-(2-methylpropyl)phenyl)iodonium hexafluorophosphate, diphenyliodonium chloride, diphenyliodonium hexafluorphosphate, and mixtures thereof.

Preferably the co-initiator is selected from the group consisting of diphenyliodonium chloride, diphenyliodonium hexafluorphosphate, and mixtures thereof.

Preferably the co-initiator is selected from the group consisting of diphenyliodonium chloride, 2-methyl-2-[(4-methylphenyl)sulfonyl]-1-[4-(methylthio)phenyl]-1-propanone and mixtures thereof.

Preferably the co-initiator is diphenyliodonium chloride.

The onium compounds and their preferments, as well the sulpho-compounds and their preferments are disclosed in sections 1.4.1 and 1.4.2.

Unless otherwise explicitly stated, any feature, element, component, embodiment, aspect, range and especially any preferred feature, preferred element, preferred embodiment, preferred aspect, preferred range, preferred combination of ranges, preferments, embodiments and aspects in connection with any piece of disclosure disclosed in this section 1.4 and in sub-sections 1.4.1 and 1.4.2 can be combined with each other and with any other feature, element, component, embodiment, aspect, range and especially any preferred feature, preferred element, preferred embodiment, preferred aspect, preferred range, preferred combination of ranges, preferments, embodiments and aspects of the invention as these are disclosed in the entire application.

1.4.1 the Onium Compound

The onium compound is selected from the group consisting of compounds represented by the following formula Y $Q^+A^-$ (formula Y)

wherein $Q^+$ is a cation selected from the group consisting of cations-B, cations-B1 and cations-B2, as each of them is defined below in i) to iii), respectively:
  i) cations-B: these cations are derived by addition of a hydron ($H^+$) to a mononuclear parent hydride of N, P, As, Sb, Bi, O, S, Se, Te, Po, F, Cl, Br, I, At (preferably of N, P, O, S, and I, more preferably of N, S, and I, more preferably of S, and I, even more preferably of I), and
  ii) cations-B1: these cations are derivatives of the cations-B, and are formed by substitution of the cations-B by univalent groups, and
  iii) cations-B2: these cations are derivatives of the cations-B, and are formed by substitution of the cations-B by groups having two or three free valences on the same atom.

and wherein $A^-$ is an anion which is the counter-anion to $Q^+$, and wherein $A^-$ is selected from the group consisting of halide anions, perhalide anions, phosphate anions, arsenate anions, antimonite anions, sulphonate anions, and borate anions. Preferably, $A^-$ is selected from the group consisting of halide anions, perhalide anions, phosphate anions, arsenate anions, sulphonate anions, and borate anions. More preferably, $A^-$ is selected from the group consisting of halide anions, perhalide anions, phosphate anions, sulphonate anions, and borate anions. Even more preferably, $A^-$ is selected from the group consisting of halide anions, perhalide anions, phosphate anions, and sulphonate anions. Most preferably, $A^-$ is selected from the group consisting of halide anions, phosphate anions and sulphonate anions. Especially $A^-$ is selected from the group consisting of halide anions and sulphonate anions. More especially $A^-$ is selected from the group consisting of halide anions. Even more especially $A^-$ is selected from the group consisting of $F^-$, $Cl^-$, $Br^-$ and $I^-$. Most especially $A^-$ is selected from the group consisting of $Cl^-$, and $I^-$. For example $A^-$ is $Cl^-$.

Exemplary cations-B include but are not limited to ($H_4N^+$) ammonium, ($H_3O^+$) oxonium, ($H_2F^+$) fluoronium, ($H_4P^+$) phosphonium, ($H_3S^+$) sulfonium, ($H_2Cl^+$) chloronium, ($H_4As^+$) arsonium, ($H_3Se^+$) selenonium, ($H_2Br^+$) bromonium, ($H_4Sb^+$) stibonium, ($H_3Te^+$) telluronium, ($H_2I^+$) iodonium, ($H_4Bi^+$) bismuthonium. In the case of cations-B1, the number of substituted hydrogen atoms is, especially in the case of hydrocarbyl substituents, indicated by the adjectives primary, secondary, tertiary or quaternary. Exemplary cations-B1 include but are not limited to ($Cl_2F^+$) dichlorofluoronium, $(CH_3)_2S^+H$ dimethylsulfonium (a secondary sulfonium ion), $Cl(CH_3)_3P^+$ chlorotrimethylphosphonium, $(CH_3CH_2)_4N^+$ tetraethylammonium (a quaternary ammonium ion). In the case of cations-B2 such cations are, where possible, designated by a specific class name. Exemplary cations-B2 include but are not limited to $RC\equiv O^+$ hydrocarbylidyne oxonium ions, $R_2C=N^+H_2X^-$ iminium compounds, $RC\equiv NH^+$ nitrilium ions.

Exemplary onium compounds comprising a cation-B include but are not limited to ammonium fluoride, oxonium antimone (V) fluoride, ammonium tetrafluoroborate. Exemplary onium compounds comprising a cation-B1 include but are not limited to benzenediazonium chloride, tetraphenylphosphonium hexafluorphosphate, trimethyloxonium tetrafluoroborate, triethyloxonium tetrafluoroborate, bis(2,4,6-trimethylpyridine)bromonium hexafluorophosphate, bis(4-tert-butylphenyl)iodonium hexafluorophosphate, diphenyliodoniumchloride, diphenyliodonium hexafluorophosphate, diphenyliodonium perchlorate, ethynyl(phenyl) iodonium tetrafluoroborate, triphenylsulfonium hexaflurphosphate. Exemplary onium compounds comprising a cation-B2 include but are not limited to 1-butyl-3-methyl-imidazolium tetrafluoroborate, N-ethyl acetonitrilium tetrafluoroborate, and N-benzylpyridinium hexafluorophosphate, 2,4,6-triphenylpyrylium hydrogensulfate, 2,4,6-trimethylpyrylium tetrafluoroborate, 2,6-di-tert-butyl-4-methylpyrylium trifluoromethanesulfonate.

Preferably, the onium compound is a compound selected from the group consisting of compounds represented by the following formula Y $Q^+A^-$ (formula Y)

wherein $Q^+$ is a cation selected from the group consisting of cations-B1 and cations-B2, as each of them is defined below in i) to ii), respectively:
  i) cations-B1: these cations are derivatives of the cations-B, and are formed by substitution of the cations-B by univalent groups, and
  ii) cations-B2: these cations are derivatives of the cations-B, and are formed by substitution of the cations-B by groups having two or three free valences on the same atom, wherein the cations-B are derived by addition of a hydron ($H^+$) to a mononuclear parent hydride of N, P, As, Sb, Bi, O, S, Se, Te, Po, F, Cl, Br, I, and At (preferably of N, P, O, S, and I, more preferably of N, S, and I, more preferably of S, and I, even more preferably of I), and wherein $A^-$ is an anion which is the counter-anion to $Q^+$, and wherein $A^-$ is selected from the group consisting of halide anions, perhalide anions, phosphate anions, arsenate anions, antimonite anions, sulphonate anions, and borate anions. Preferably, $A^-$ is selected from the group consisting of halide anions, perhalide anions, phosphate anions, arsenate anions, sulphonate anions, and borate anions. More preferably, $A^-$ is selected from the group consisting of halide anions, perhalide anions, phosphate anions, sulphonate anions, and borate anions. Even more preferably, $A^-$ is selected from the group consisting of halide anions, perhalide anions, phosphate anions, and sulphonate anions. Most preferably, $A^-$ is selected from the group consisting of halide anions, phosphate anions and sulphonate anions. Especially A⁻ is selected from the group consisting of halide anions and sulphonate anions. More especially A⁻ is selected from the group consisting of halide anions. Even more especially A⁻ is selected from the group consisting of F⁻, Cl⁻, Br, and I⁻. Most especially A⁻ is selected from the group consisting of Cl⁻, and I⁻. For example A⁻ is Cl⁻.

Preferably, the onium compound is a compound selected from the group consisting of compounds represented by the following formula Y

Q⁺A⁻ (formula Y)

wherein Q⁺ is a cation selected from the group consisting of cations-B1 wherein the cations-B1 are derivatives of the cations-B that are formed by substitution of the cations-B by univalent groups, and wherein the cations-B are derived by addition of a hydron (H⁺) to a mononuclear parent hydride of N, P, As, Sb, Bi, O, S, Se, Te, Po, F, Cl, Br, I, and At (preferably of N, P, O, S, and I, more preferably of N, S, and I, more preferably of S, and I, even more preferably of I), and
wherein A⁻ is an anion which is the counter-anion to Q⁺, and wherein A⁻ is selected from the group consisting of halide anions, perhalide anions, phosphate anions, arsenate anions, antimonite anions, sulphonate anions, and borate anions. Preferably, A⁻ is selected from the group consisting of halide anions, perhalide anions, phosphate anions, arsenate anions, sulphonate anions, and borate anions. More preferably, A⁻ is selected from the group consisting of halide anions, perhalide anions, phosphate anions, sulphonate anions, and borate anions. Even more preferably, A⁻ is selected from the group consisting of halide anions, perhalide anions, phosphate anions, and sulphonate anions. Most preferably, A⁻ is selected from the group consisting of halide anions, phosphate anions and sulphonate anions. Especially A⁻ is selected from the group consisting of halide anions and sulphonate anions. More especially A⁻ is selected from the group consisting of halide anions. Even more especially A⁻ is selected from the group consisting of F⁻, Cl⁻, Br, and I⁻. Most especially A⁻ is selected from the group consisting of Cl⁻, and I⁻. For example A⁻ is Cl⁻.

By the term 'halide anion' is meant an anion selected from the group consisting of F⁻, Cl⁻, Br, I⁻, At⁻. Preferably the halide anion is an anion selected from the group consisting of F⁻, Cl⁻, Br, and I⁻. More preferably the halide anion is an anion selected from the group consisting of Cl⁻, Br, and I⁻. Even more preferably the halide anion is an anion selected from the group consisting of Cl⁻, and I⁻. Most preferably the halide anion is Cl⁻.

By the term 'perhalide anion' is meant an anion selected from the group consisting of FO₄⁻, ClO₄⁻, BrO₄⁻, IO₄⁻. Preferably the perhalide anion is ClO₄⁻ (perchlorate anion).

By the term 'phosphate anion' is meant an anion selected from the group consisting of anions represented by the following formula PA

PX⁻ (formula PA)

wherein X is selected from the group consisting of F, Cl, Br, I, At. Preferably the X is selected from the group consisting of F, Cl, Br, and I. More preferably the X is selected from the group consisting of F, Cl, and Br. Even more preferably the X is selected from the group consisting of F, and Cl. Most preferably the X is F. An example of a phosphate anion (and most preferred of the phosphate anions) is PF₆⁻.

By the term 'arsenate anion' is meant an anion selected from the group consisting of anions represented by the following formula AA

AsX⁻ (formula AA)

wherein X is selected from the group consisting of F, Cl, Br, I, At. Preferably the X is selected from the group consisting of F, Cl, Br, and I. More preferably the X is selected from the group consisting of F, Cl, and Br. Even more preferably the X is selected from the group consisting of F, and Cl. Most preferably the X is F. An example of an arsenate anion (and most preferred of the arsenate anions) is AsF₆⁻.

By the term 'antimonate anion' is meant an anion selected from the group consisting of anions represented by the following formula ATA

SbX⁻ (formula ATA)

wherein X is selected from the group consisting of F, Cl, Br, I, At. Preferably the X is selected from the group consisting of F, Cl, Br, and I. More preferably the X is selected from the group consisting of F, Cl, and Br. Even more preferably the X is selected from the group consisting of F, and Cl. Most preferably the X is F. An example of an antimonate anion (and most preferred of the antimonate anions) is SbF₆⁻.

By the term 'sulphonate anion' is meant an anion selected from the group consisting of anions represented by the following formula SA

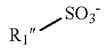 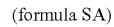

(formula SA)

wherein R₁" is a C₁-C₁₂ optionally substituted hydrocarbyl, preferably a C₇-C₁₂ unsaturated hydrocarbyl, more preferably CH₃C₆H₄. Examples of sulphonate anions include but are not limited to

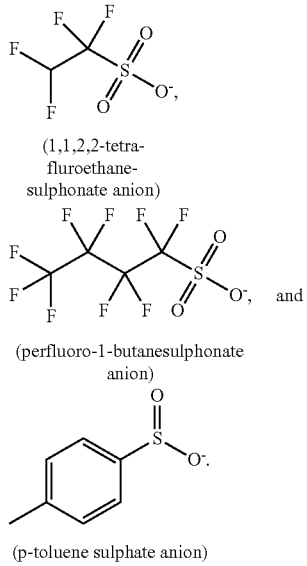

(1,1,2,2-tetra-fluroethane-sulphonate anion)

(perfluoro-1-butanesulphonate anion)

(p-toluene sulphate anion)

Preferably the sulphonate anion is selected from the group consisting of 1,1,2,2-tetrafluroethanesulphonate anion, perfluoro-1-butanesulphonate anion and p-toluene sulphate anion. More preferably, the sulphonate anion is p-toluene sulphate anion. By the term 'borate anion' is meant an anion selected from the group consisting of anions represented by the formula BA, and anions represented by the formula BA-I,

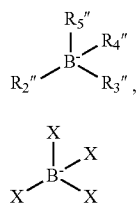

(formula BA)

(formula BA-I)

wherein
$R_2''$ is a $C_1$-$C_{12}$ optionally substituted hydrocarbyl, preferably a $C_1$-$C_{12}$ optionally substituted unsaturated hydrocarbyl, more preferably a halogen substituted aryl, even more preferably is $F_5C_6$, and
$R_3''$ is a $C_1$-$C_{12}$ optionally substituted hydrocarbyl, preferably a $C_1$-$C_{12}$ optionally substituted unsaturated hydrocarbyl, more preferably a halogen substituted aryl, even more preferably is $F_5C_6$, and
$R_4''$ is a $C_1$-$C_{12}$ optionally substituted hydrocarbyl, preferably a $C_1$-$C_{12}$ optionally substituted unsaturated hydrocarbyl, more preferably a halogen substituted aryl, even more preferably is $F_5C_6$, and
$R_5''$ is a $C_1$-$C_{12}$ optionally substituted hydrocarbyl, preferably a $C_1$-$C_{12}$ optionally substituted unsaturated hydrocarbyl, more preferably a halogen substituted aryl, even more preferably is $F_5O_6$;
X is selected from the group consisting of F, Cl, Br, I, At. Preferably the X is selected from the group consisting of F, Cl, Br, and I. More preferably the X is selected from the group consisting of F, Cl, and Br. Even more preferably the X is selected from the group consisting of F, and Cl. Most preferably the X is F.

An example of a borate anion of formula BA (and most preferred of the borate anions of formula BA) is $(F_5O_6)_4B^-$ [tetrakis(2,3,4,5,6-pentafluorophenyl)borate anion] (see formula below).

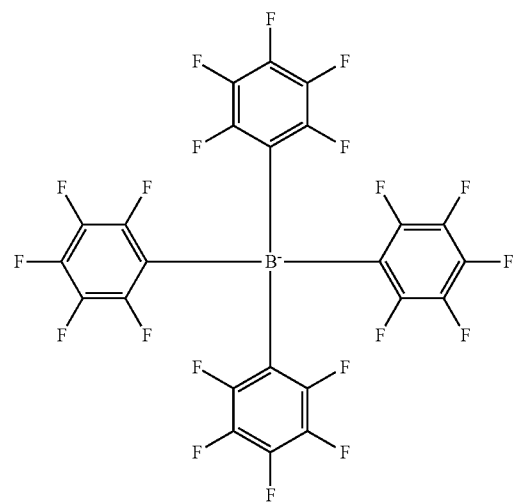 [SMILES: Fc1c(F)c(F)c([B-](c2c(F)c(F)c(F)c(F)c2F)(c2c(F)c(F)c(F)c(F)c2F)c2c(F)c(F)c(F)c(F)c2F)c(F)c1F]

An example of a borate anion of formula BA-I (and most preferred of the borate anion of formula BA-I) is $BF_4^-$. Most preferably the borate anion is an anion selected from the group of anions consisting of $(F_5O_6)_4B^-$ and $BF_4^-$.

Preferably the onium compound is selected from the group consisting of compounds represented by the following formula I-X, compounds represented by the following formula II-X, compounds represented by the following formula III-X, compounds represented by the following formula IV-X, compounds represented by the following formula V-X, compounds represented by the following formula VI-X, compounds represented by the following formula VII-X, compounds represented by the following formula VIII-X, compounds represented by the following formula IX-X,

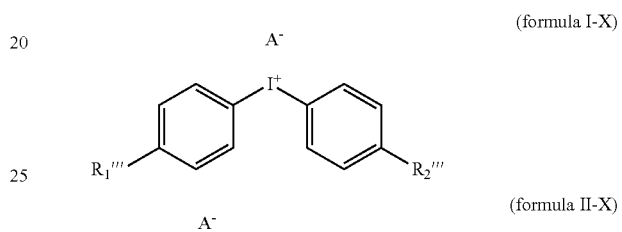

(formula I-X)

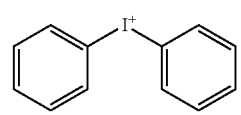

(formula II-X)

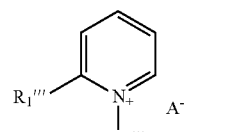

(formula III-X)

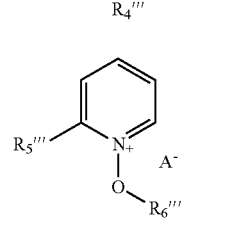

(formula IV-X)

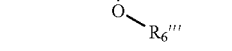

(formula V-X)

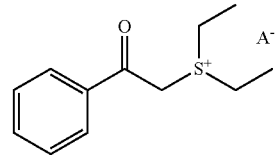

(formula VI-X)

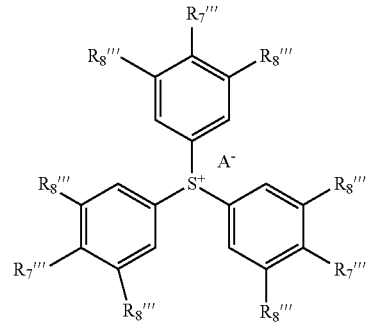

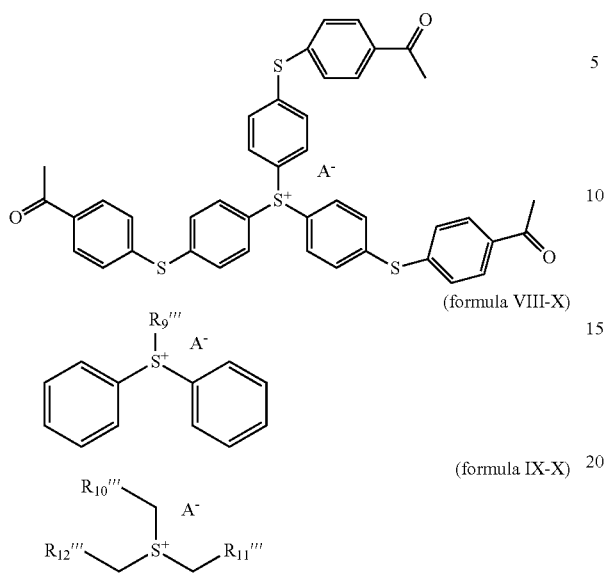

(formula VII-X)

(formula VIII-X)

(formula IX-X)

wherein
A⁻ is selected from the group consisting of phosphate anions, sulphonate anions, borate anions and halide anions; and
$R_1'''$ is a $C_1$-$C_{12}$ saturated hydrocarbyl, and $R_2'''$ is a $C_1$-$C_{12}$ saturated hydrocarbyl; and
$R_3'''$ is H or a $C_1$-$C_{12}$ hydrocarbyl, and $R_4'''$ is a $C_1$-$C_{12}$ hydrocarbyl; and
$R_5'''$ is H or a $C_1$-$C_{12}$ hydrocarbyl, and $R_6'''$ is a $C_1$-$C_{12}$ hydrocarbyl; and
$R_7'''$ is H or a $C_1$-$C_{12}$ hydrocarbyl, and $R_8'''$ is H or a $C_1$-$C_{12}$ hydrocarbyl; and
$R_9'''$ is H or a $C_1$-$C_{12}$ hydrocarbyl, and
$R_{10}'''$ is H or a $C_1$-$C_{12}$ hydrocarbyl, and $R_{11}'''$ is H or a $C_1$-$C_{12}$ hydrocarbyl, and $R_{12}'''$ is H or a $C_1$-$C_{12}$ hydrocarbyl.

Examples of compounds of formula I-X include but are not limited to bis(4-dodecylphenyl)iodonium hexafluorophosphate, bis(4-tert-butylphenyl)iodonium hexafluorophosphate, and (4-methylphenyl)(4-(2-methylpropyl)phenyl)iodonium hexafluorophosphate, the formulae of which are shown below.

[bis(4-dodecylphenyl)iodonium hexafluorophosphate]

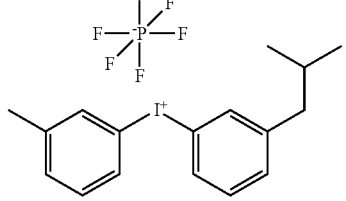

[bis(4-tert-butylphenyl)iodonium hexafluorophosphate]

[(4-methylpheny)(4-(2-methylpropyl)phenyl) iodonium hexafluorophosphate]

Examples of compounds of formula II-X include but are not limited to diphenyliodonium chloride and diphenyliodonium hexafluorphosphate, the formulae of which are shown below.

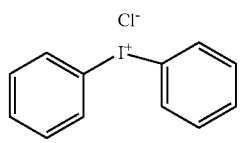

(diphenyliodonium chloride)

(diphenyliodonium hexafluorphosphate)

An example of a compound of formula III-X is N-benzylpyridinium hexafluorophosphate the formula of which is shown below.

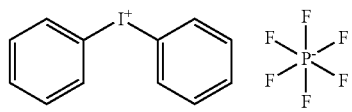

An example of a compound of formula IV-X is N-ethoxy-2-methylpyridinium hexafluorophosphate the formula of which is shown below.

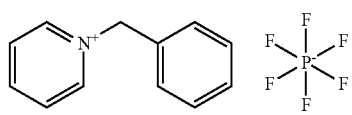 [SMILES: c1ccc(C[n+]2ccccc2)cc1 ; F[P-](F)(F)(F)(F)F]

An example of a compound of formula V-X is diethyl(2-oxo-2-phenylethyl)sulfonium hexafluorophosphate the formula of which is shown below.

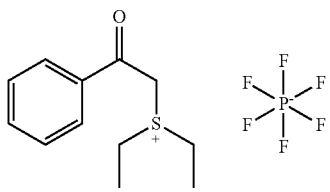

An example of a compound of formula VI-X is diphenyl (p-tolyl)sulfonium 4-methylbenzenesulfinate and triphenylsulfonium trifluoromethanesulfonate, the formulae of which are shown below.

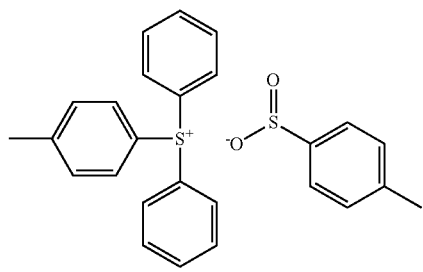

(diphenyl(p-tolyl)sulfonium 4-methylbenzenesulfinate)

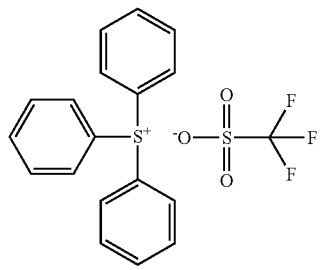

(triphenylsulfonium trifluoromethanesulfonate)

An example of a compound of formula VII-X is tri(4-((4-acetylphenyl)thio)phenyl)sulfonium tetrakis(perfluorophnyl)borate the formula of which is shown below.

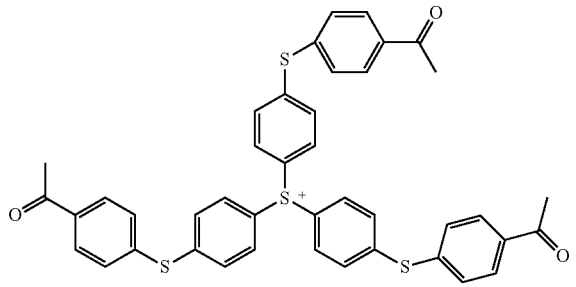

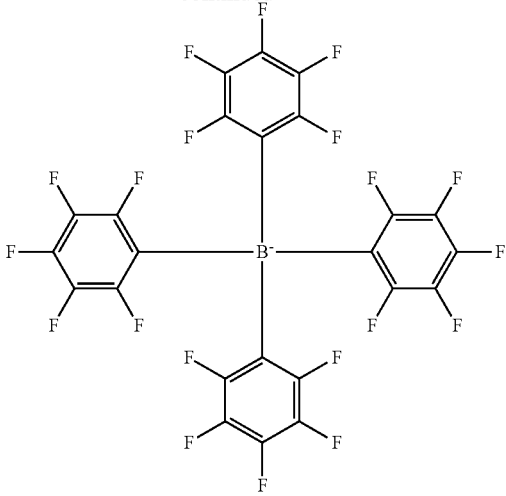

An example of a compound of formula VIII-X is methyl (diphenyl)sulfonium tetrafluoroborate the formula of which is shown below.

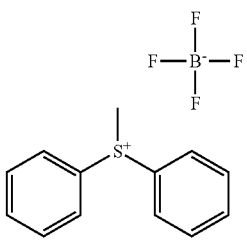

An example of a compound of formula IX-X is triethylsulfonium tetrafluoroborate the formula of which is shown below.

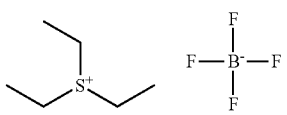

Unless otherwise explicitly stated, any feature, element, component, embodiment, aspect, range and especially any preferred feature, preferred element, preferred embodiment, preferred aspect, preferred range, preferred combination of ranges, preferments, embodiments and aspects in connection with any piece of disclosure disclosed in this section 1.4.1 can be combined with each other and with any other feature, element, component, embodiment, aspect, range and especially any preferred feature, preferred element, preferred embodiment, preferred aspect, preferred range, preferred combination of ranges, preferments, embodiments and aspects of the invention as these are disclosed in the entire application.

1.4.2 The Sulpho-Compound

The sulpho-compound is selected from the group consisting of sulpho-compounds-1, sulpho-compounds-2, sulpho-compounds-3, sulpho-compounds-4, sulpho-compounds-5, and mixtures thereof.

By the term 'sulpho-compound-1' is meant a compound represented by the following formula L1

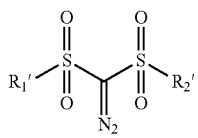
(formula L1)

wherein $R_1'$ is a $C_1$-$C_{10}$ hydrocarbyl, and $R_2'$ is a $C_1$-$C_{10}$ hydrocarbyl. Examples of a sulpho-compound-1 include but are not limited to 2-(((tert-butylsulfonyl)(diazo)methyl)sulfonyl)-2-methylpropane and (diazomethylenedisulfonyl)dicyclohexane.

By the term 'sulpho-compound-2' is meant a compound represented by the following formula L2

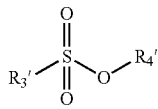
(formula L2)

wherein $R_3'$ is a $C_1$-$C_{12}$ hydrocarbyl, and $R_4'$ is a $C_1$-$C_{12}$ hydrocarbyl. Examples of a sulpho-compound-2 include but are not limited to 2-isopropyl-5-methylcyclohexyl 4-methylbenzenesulfonate and cyclohexyl 4-methylbenzenesulfonate and cyclohexyl 4-methylbenzenesulfonate.

By the term 'sulpho-compound-3' is meant a compound represented by the following formula L3

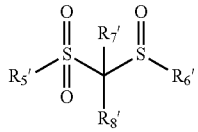
(formula L3)

wherein $R_5'$ is a $C_1$-$C_{12}$ hydrocarbyl, and $R_6'$ is a $C_1$-$C_{12}$ hydrocarbyl and $R_7'$ is a $C_1$-$C_{12}$ saturated hydrocarbyl, and $R_8'$ is a $C_1$-$C_{12}$ saturated hydrocarbyl. Most preferably, $R_5'$ is a $C_1$-$C_{12}$ hydrocarbyl, and $R_6'$ is a $C_1$-$C_{12}$ hydrocarbyl and $R_7'$ is $CH_3$, and $R_8'$ is $CH_3$. An example of a sulpho-compound-3 is 2-methyl-2-[(4-methylphenyl)sulfonyl]-1-[4-(methylthio)phenyl]-1-propanone.

By the term 'sulpho-compound-4' is meant a compound represented by the following formula L4

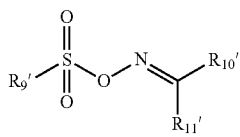
(formula L4)

wherein $R_9'$ is a $C_1$-$C_{12}$ hydrocarbyl, and $R_{10}'$ is a $C_1$-$C_{12}$ hydrocarbyl and $R_{11}'$ is a $C_1$-$C_{12}$ hydrocarbyl. An example of a sulpho-compound-4 is pentan-3-one O-tosyl oxime.

By the term 'sulpho-compound-5' is meant a compound represented by the following formula L5

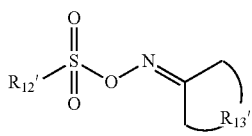
(formula L5)

wherein $R_{12}'$ is a $C_1$-$C_{12}$ hydrocarbyl or a substituted hydrocarbyl, and $R_{13}'$ is a $C_1$-$C_{12}$ hydrocarbylene. An example of a sulpho-compound-5 is (E)-3,4-dihydronaphthalen-1(2H)-one O-((4-chlorophenyl)sulfonyl) oxime.

Preferably, the sulpho compound is selected from the group consisting of sulpho-compound-1, sulpho-compound-2, sulpho-compound-3, and sulpho-compound-5. More preferably, the sulpho compound is selected from the group consisting of sulpho-compound-1, sulpho-compound-2, and sulpho-compound-3. Even more preferably, the sulpho compound is selected from the group consisting of sulpho-compound-2, and sulpho-compound-3. Most preferably, the sulpho compound is a sulpho-compound-3. Especially, the sulpho compound is is 2-methyl-2-[(4-methylphenyl)sulfonyl]-1-[4-(methylthio)phenyl]-1-propanone.

Unless otherwise explicitly stated, any feature, element, component, embodiment, aspect, range and especially any preferred feature, preferred element, preferred embodiment, preferred aspect, preferred range, preferred combination of ranges, preferments, embodiments and aspects in connection with any piece of disclosure disclosed in this section 1.4.2 can be combined with each other and with any other feature, element, component, embodiment, aspect, range and especially any preferred feature, preferred element, preferred embodiment, preferred aspect, preferred range, preferred combination of ranges, preferments, embodiments and aspects of the invention as these are disclosed in the entire application.

1.5 the Component E of the TPCC of the Invention

The terms 'component E' and 'E' are used herein interchangeably.

The TPCC of the invention may (optionally) further comprise component E wherein component E represents one or more inhibitors, preferably selected from the group consisting of phenolic compounds, stable radicals, catechols, phenothiazines, hydroquinones, benzoquinones or mixtures thereof.

If the TPCC of the invention comprises component E, then preferably the component E is present in an amount of at least 5, more preferably at least 10, even more preferably at least 15, most preferably at least 16, especially at least 18, more especially at least 20, most especially at least 25, for example at least 30, for example at least 35, for example at least 40, for example at least 45 mg/Kg A and B. If the TPCC of the invention comprises component E, then preferably the component E is present in an amount of at most 5000, more preferably at most 4000, even more preferably at most 3000, most preferably at most 2500, especially at most 2000, more especially at most 1800, most especially at most 1500, for example at most 1200, for example at most 1000, for example at most 900 for example at most 800 for example at most 700 for example at most 600 for example at most 500, for example at most 400, for example is at most 300, for example is at most 260 mg/Kg A and B. Preferably, the amount of component E in the thermosetting powder coating composition of the invention is at least 16 and at most 1500, more preferably at least 20 and at most 1500, even more preferably at least 16 and at most 1000, most preferably at least 20 and at most 1000, especially at least 16 and at most 800, more especially at least 20 and at most 800, most especially at least 16 and at most 600, for example at least 20 and at most 600, for example at least 25 and at most 800, for example at least 30 and at most 800, for example at least 40 and at most 1500, for example at least 40 and at most 1000, for example at least 40 and at most 800, for example at least 40 and at most 700, for example at least 40 and at most 600, for example at least 40 and at most 500, for example at least 45 and at most 1500, for example at least 45 and at most 1000, for example at least 45 and at most 800, for example at least 45 and at most 700, for example at least 45 and at most 600, for example at least 45 and at most 500, for example at least 45 and at most 300 mg/Kg A and B.

An inhibitor may be added either: i) during the preparation of the thermosetting powder coating composition, or ii) during the synthesis of the UR, or iii) during the synthesis of the VFUR, or iv) in any one of i) to iii) in any combination.

Examples of phenolic compounds include 2-methoxyphenol, 4-methoxyphenol, 2,6-di-t-butyl-4-methylphenol, 2,6-di-t-butylphenol, 2,6-di-6-butyl-4-ethyl phenol, 2,4,6-trimethyl-phenol, 2,4,6-tris-dimethylaminomethyl phenol, 4,4'-thio-bis(3-methyl-6-t-butylphenol), 4,4'-isopropylidene diphenol, 2,4-di-t-butylphenol and 6,6'-di-t-butyl-2,2'-methylene di-p-cresol.

Examples of stable radicals include 1-oxyl-2,2,6,6-tetramethylpiperidine, 1-oxyl-2,2,6,6-tetramethylpiperidine-4-ol (a compound also referred to as TEMPOL), 1-oxyl-2,2,6,6-tetramethylpiperidine-4-one (a compound also referred to as TEMPON), 1-oxyl-2,2,6,6-tetramethyl-4-carboxyl-piperidine (a compound also referred to as 4-carboxy-TEMPO), 1-oxyl-2,2,5,5-tetramethylpyrrolidine, 1-oxyl-2,2,5,5-tetramethyl-3-carboxylpyrrolidine (also called 3-carboxy-PROXYL and galvinoxyl (2,6-di-tert-butyl-α-(3,5-di-tert-butyl-4-oxo-2,5-cyclohexadien-1-ylidene)-p-tolyloxy).

Examples of catechols include catechol, 4-tert-butylcatechol, and 3,5-di-tert-butylcatechol.

Examples of hydroquinones include hydroquinone, 2-methylhydroquinone, 2-tert-butylhydroquinone, 2,5-di-tert-butylhydroquinone, 2,6-di-tert-butylhydroquinone, 2,6-dimethylhydroquinone and 2,3,5-trimethylhydroquinone.

Examples of benzoquinones include benzoquinone, 2,3,5,6-tetrachloro-1,4-benzoquinone, methylbenzoquinone, 2,6-dimethylbenzoquinone, and napthoquinone.

Preferably, each of one or more inhibitors is chosen from the group consisting of phenolic compounds, stable radicals, catechols, phenothiazines, hydroquinones, benzoquinones or mixtures thereof; more preferably from the group consisting of phenolic compounds, catechols, phenothiazines, hydroquinones, benzoquinones or mixtures thereof; even more preferably from the group consisting of catechols, phenothiazines, hydroquinones, benzoquinones or mixtures thereof; most preferably from the group consisting of catechols, hydroquinones, benzoquinones or mixtures thereof; especially from the group consisting of catechols, hydroquinones, benzoquinones or mixtures thereof; more especially from the group consisting of catechols, hydroquinones, or mixtures thereof; most especially from the group of hydroquinones.

Preferably, each of one or more inhibitors is chosen from the group consisting of hydroquinone, 2-methylhydroquinone, 2-tert-butylhydroquinone, 2,5-di-tert-butylhydroquinone, 2,6-di-tert-butylhydroquinone, 2,6-dimethylhydroquinone and 2,3,5-trimethylhydroquinone, or mixtures thereof; more preferably from the group consisting of hydroquinone, 2-methylhydroquinone, 2-tert-butylhydroquinone, 2,5-di-tert-butylhydroquinone, 2,6-di-tert-butylhydroquinone, 2,6-dimethylhydroquinone or mixtures thereof; most preferably from the group consisting of hydroquinone, 2-methylhydroquinone, 2-tert-butylhydroquinone, 2,5-di-tert-butylhydroquinone, 2,6-di-tert-butylhydroquinone, or mixtures thereof; especially from the group of consisting of hydroquinone, 2-methylhydroquinone, 2-tert-butylhydroquinone, 2,5-di-tert-butylhydroquinone, 2,6-di-tert-butylhydroquinone, or mixtures thereof; especially from the group of consisting of hydroquinone, 2-tert-butylhydroquinone, 2,5-di-tert-butylhydroquinone, 2,6-di-tert-butylhydroquinone, or mixtures thereof; especially from the group of consisting of hydroquinone, 2-tert-butylhydroquinone and 2-methylhydroquinone, or mixtures thereof.

Unless otherwise explicitly stated, any feature, element, component, embodiment, aspect, range and especially any preferred feature, preferred element, preferred embodiment, preferred aspect, preferred range, preferred combination of ranges, preferments, embodiments and aspects in connection with any piece of disclosure disclosed in this section 1.5 can be combined with each other and with any other feature, element, component, embodiment, aspect, range and especially any preferred feature, preferred element, preferred embodiment, preferred aspect, preferred range, preferred combination of ranges, preferments, embodiments and aspects of the invention as these are disclosed in the entire application.

1.6 the Component F of the TPCC of the Invention

The terms 'component F' and 'F' are used herein interchangeably.

The TPCC of the invention may (optionally) further comprise component F wherein component F represents one or more accelerators selected from the group consisting of transition metal compounds, and mixtures thereof.

Preferably the transition metal compounds are selected from the group consisting of transition metal salts, and transition metal complexes; more preferably the transition metal compounds are selected from the group consisting of transition metal organic salts, and transition metal complexes; most preferably the transition metal compounds are selected from the group consisting of transition metal organic acid salts, and derivatives of transition metal organic acid salts. Examples of suitable transition metal compounds are transition metal carboxylates, transition metal acetoacetates, for example transition metal ethylhexanoate. Preferably the transition metal compounds are selected from the group consisting of transition metal compounds and transition metal complexes of the following transition metals Sc, Ti, V, Cr, Mn, Fe, Co, Ni, Cu, Zn, Mo, and W; more preferably Mn, Fe, Co, and Cu, even more preferably, Mn, Fe, and Cu. Preferably the transition metal compounds are selected from the group consisting of transition metal organic salts and transition metal complexes of the following transition metals Sc, Ti, V, Cr, Mn, Fe, Co, Ni, Cu, Zn, Mo, and W; more preferably Mn, Fe, Co, and Cu, even more preferably, Mn, Fe, and Cu. Preferably the transition metal compounds are selected from the group consisting of transition metal organic acid salts, and derivatives of transition metal organic acid salts of the following transition metals Sc, Ti, V, Cr, Mn, Fe, Co, Ni, Cu, Zn, Mo, and W; more preferably Mn, Fe, Co, and Cu, even more preferably, Mn, Fe, and Cu. Preferably the transition metal compounds are selected from the group consisting of transition metal carboxylates, and transition metal acetoacetates of the following transition metals Sc, Ti, V, Cr, Mn, Fe, Co, Ni, Cu, Zn, Mo, and W; more preferably Mn, Fe, Co, and Cu, even more preferably, Mn, Fe, and Cu. If a copper compound is used, it may for example be in the form of a $Cu^+$ salt or a $Cu^{2+}$ salt. If a manganese compound is used, it may for example be in the form of a $Mn^{2+}$ salt or a $Mn^{3+}$ salt. If a cobalt compound is used, it may for example be in the form of a $Co^{2+}$ salt or a $Co^{3+}$ salt. If an iron compound is used, it may for example be in the form of a $Fe^{2+}$ salt or a $Fe^{3+}$ salt. Examples of transition metal compounds include but are not limited to $Cu^+$ salts, $Cu^{2+}$ salts, $Mn^{2+}$ salts, $Mn^{3+}$ salts, $Co^{2+}$ salts, $Co^{3+}$ salts, $Fe^{2+}$ salts and $Fe^{3+}$ salts.

If the TPCC of the invention comprises component F, then preferably the component F is present in an amount of at least 0.000003 and at most 50, more preferably in an amount of at least 0.00003 and at most 45, even more preferably in an amount of at least 0.0003 and at most 40, most preferably in an amount of at least 0.003 and at most 35, especially in an amount of at least 0.03 and at most 30, more especially of at least 0.1 and at most 20, even more especially in an amount of at least 0.2 and at most 18, most especially in an amount of at least 0.3 and at most 15, for example in an amount of at least 0.5 and at most 12, for example in an amount of at least 1 and at most 10 mg/Kg A and B.

Unless otherwise explicitly stated, any feature, element, component, embodiment, aspect, range and especially any preferred feature, preferred element, preferred embodiment, preferred aspect, preferred range, preferred combination of ranges, preferments, embodiments and aspects in connection with any piece of disclosure disclosed in this section 1.6 can be combined with each other and with any other feature, element, component, embodiment, aspect, range and especially any preferred feature, preferred element, preferred embodiment, preferred aspect, preferred range, preferred combination of ranges, preferments, embodiments and aspects of the invention as these are disclosed in the entire application.

1.7 Other Components of the TPCC of the Invention

The thermosetting powder coating composition of the invention may optionally further comprise waxes, pigments, fillers, degassing agents, flow agents, appearance enhancing agents, photoinitiators, stabilizers such as light stabilizers. The pigments may be inorganic or organic. Suitable inorganic pigments include for example, titanium dioxide, zinc sulphide, zinc phosphate, mica, iron oxide and/or chromium oxide. Suitable organic pigments include for example quinacridones, phthalocyanines, perylenes, pyrroles. Suitable fillers include for example metal oxides, silicates, carbonates and sulphates. Suitable stabilizers include for example primary and/or secondary antioxidants and UV stabilizers for example quinones, (sterically hindered) phenolic compounds, phosphonites, phosphites, thioethers and HALS (hindered amine light stabilizers). Examples of suitable degassing agents include cyclohexane dimethanol bisbenzoate, benzoin and benzoin derivatives such as for example those described in WO02/50194, the relevant passages of which are incorporated herein by reference. Examples of flow agents include Byk® 361 N and Resiflow® PV-5.

The thermosetting powder coating composition of the invention can be cured via heat (heat-curable thermosetting powder coating composition) and/or radiation (radiation curable thermosetting powder coating composition). Preferably, the thermosetting powder coating composition of the invention is heat-curable without being necessary to use radiation for curing. Heat curing has the advantage that it does not require the use of additional and rather expensive equipment, for instance equipment that generates UV light or accelerated electrons and in only one step involving heating of the thermosetting powder coating composition the latter is melted and cured onto a substrate. In contrast to that, a thermosetting powder coating composition that requires radiation curing, the curing of said composition requires two steps, one to melt (heating step) and one to cure (radiation cure typically induced via UV light or electron beam irradiation) the composition. Heat curing is especially desirable for coating 3D objects.

Unless otherwise explicitly stated, any feature, element, component, embodiment, aspect, range and especially any preferred feature, preferred element, preferred embodiment, preferred aspect, preferred range, preferred combination of ranges, preferments, embodiments and aspects in connection with any piece of disclosure disclosed in this section 1.7 and their sub-sections, can be combined with each other and with any other feature, element, component, embodiment, aspect, range and especially any preferred feature, preferred element, preferred embodiment, preferred aspect, preferred range, preferred combination of ranges, preferments, embodiments and aspects of the invention as these are disclosed in the entire application.

2. Process for Making the Thermosetting Powder Coating Compositions of the Invention The thermosetting powder coating compositions of the invention may be prepared by mixing the separately weighed-out components in a premixer, heat the obtained premix, for example in a kneader, preferably in an extruder to obtain an extrudate, cool down the obtained extrudate until it solidifies and grind it into granules or flakes that are further ground to reduce the particle size followed by appropriate classification to obtain a powder coating composition of the right particle size.

Alternatively, the thermosetting powder coating compositions of the invention may be prepared by mixing the separately weighed-out component B with the component A in a premixer, heat the obtained premix, for example in a kneader, preferably in an extruder to obtain an extrudate, cool down the obtained extrudate until it solidifies and grind it into granules or flakes that are further ground to reduce the particle size. Subsequently, mixing the rest of the separately weighed-out components and the extrudate of components A and B, in a premixer, heat the obtained premix, for example in a kneader, preferably in an extruder to obtain an extrudate, cool down the obtained extrudate until it solidifies and grind it into granules or flakes that are further ground to reduce the particle size followed by appropriate classification to obtain a powder coating composition of the right particle size.

Preferably, the thermosetting powder coating composition of the invention is prepared by a process comprising the steps of:
a. mixing the components of the thermosetting powder coating composition according to the invention to obtain a premix;
b. heating the premix preferably in an extruder, preferably up to and including the decomposition temperature of the component C, more preferably up to and including 90° C., to obtain an extrudate;
c. cooling down the extrudate to obtain a solidified extrudate; and
d. grinding the solidified extrudate into smaller particles to obtain the thermosetting powder coating composition.

Preferably, the thermosetting powder coating composition of the invention is prepared by a process comprising the steps of:
a. mixing the components A and B to obtain a premix 1;
b. heating the premix 1, preferably in an extruder, to obtain an extrudate of components A and B, namely extrudate 1;
c. cooling down the extrudate 1 to obtain a solidified extrudate 1; and
d. grinding the solidified extrudate 1 into smaller particles to obtain a mixture of components A and B, namely mixture 1; and
e. mixing the rest of the components of the thermosetting powder coating composition of the invention with the mixture 1, to obtain a premix 2;
f. heating the premix 2, preferably in an extruder, preferably up to and including the decomposition temperature of the component C, more preferably up to and including 90° C., to obtain an extrudate 2;
g. cooling down the extrudate 2 to obtain a solidified extrudate 2; and
h. grinding the solidified extrudate 2 into smaller particles to obtain the thermosetting powder coating composition.

Preferably, the thermosetting powder coating composition of the invention is prepared by a process comprising the steps of:
a. mixing the components A and B to obtain a premix 1;
b. heating the premix 1, preferably in an extruder, to obtain an extrudate of components A and B, namely extrudate 1;
c. cooling down the extrudate 1 to obtain a solidified extrudate 1; and
d. grinding the solidified extrudate 1 into smaller particles to obtain a mixture of components A and B, namely mixture 1; and
e. mixing the rest of the components of the thermosetting powder coating composition of the invention with the mixture 1, to obtain a premix 2;
f. heating the premix 2, preferably in an extruder, preferably up to and including the decomposition temperature of the component C, more preferably up to and including 90° C., to obtain an extrudate 2;
g. cooling down the extrudate 2 at a temperature of at most 75, preferably of at most 50° C. for at least 30 minutes, preferably for at least 60 minutes, more preferably for at least 90 minutes, even more preferably for at least 120 minutes, to obtain a solidified extrudate 2; and
h. grinding the solidified extrudate 2 into smaller particles to obtain the thermosetting powder coating composition.

Preferably, the premix 1 is heated to a temperature at least 5, more preferably at least 10° C. below the temperature at which it is intended to cure the thermosetting powder coating composition.

Preferably the thermosetting powder coating composition of the invention is a one component (1K) system or equally a one component thermosetting powder coating composition. With a 'one component system', also called a 1K system, is meant that all the components of the thermosetting powder coating composition form part of one powder. In contrast to that, a 'two component system', also called 2K system, is a thermosetting powder coating composition which is composed of at least two different powders with different chemical compositions, wherein said system keeps the reactive components physically separated. The compositions of the at least two different powders in the 2K system are usually selected such that each powder contains a component which is needed for curing but is absent from the other powder(s). This separation allows preparation of the individual powder composition in a heated state (such as by melt mixing) without the initiation of the cure reaction.

Unless otherwise explicitly stated, any feature, element, component, embodiment, aspect, range and especially any preferred feature, preferred element, preferred embodiment, preferred aspect, preferred range, preferred combination of ranges, preferments, embodiments and aspects in connection with any piece of disclosure disclosed in this section 2 can be combined with each other and with any other feature, element, component, embodiment, aspect, range and especially any preferred feature, preferred element, preferred embodiment, preferred aspect, preferred range, preferred combination of ranges, preferments, embodiments and aspects of the invention as these are disclosed in the entire application.

3. Processes for Coating an Article with the Thermosetting Powder Coating Composition of the Invention In another aspect, the invention relates to a process for coating a substrate comprising the steps of:
a. applying the thermosetting powder coating composition of the invention to an article as said article is defined herein;
b. heating and/or radiating the thermosetting powder coating composition for enough time (curing time) and at a suitable temperature to cure (curing temperature) the thermosetting powder coating composition to obtain the coated article.

The composition of the invention may be applied using the techniques known to the person skilled in the art, for example using electrostatic spray or electrostatic fluidized bed or flame spray.

Heating of the coated substrate may be done using conventional methods, such as with an infrared (IR) oven, convection oven and/or with an (N)IR lamp. Even microwave equipment may be used to heat the substrate.

The TPCC of the invention may be cured at a temperature ranging from 85 to 225° C. for a time that may range from 3 up to 60 minutes.

Unless otherwise explicitly stated, any feature, element, component, embodiment, aspect, range and especially any preferred feature, preferred element, preferred embodiment, preferred aspect, preferred range, preferred combination of ranges, preferments, embodiments and aspects in connection with any piece of disclosure disclosed in this section 3 can be combined with each other and with any other feature, element, component, embodiment, aspect, range and especially any preferred feature, preferred element, preferred embodiment, preferred aspect, preferred range, preferred combination of ranges, preferments, embodiments and aspects of the invention as these are disclosed in the entire application.

4. Other Aspects and Embodiments of the Invention

In another aspect the invention provides for a process for making a cured thermosetting powder coating composition comprising the step of curing the thermosetting powder coating composition of the invention.

In another aspect, the invention provides for a cured thermosetting powder coating composition obtained by curing of the thermosetting powder coating composition of the invention; preferably the cured thermosetting powder coating composition is obtainable by the process for making the cured thermosetting powder coating composition. For example, the cured thermosetting powder coating composition may be derived or is obtainable by a 3D-printing process.

In another aspect, the invention relates to an article of any shape, size or form, for example a substrate, having coated and cured thereon a thermosetting powder coating composition as defined herein. Preferably, said article is selected from the group consisting of heat-sensitive articles and non-heat sensitive articles; more preferably said article is selected from the group consisting of wood for example low density fibre board, medium density fibreboard and high density fibreboard, plastic, thermoplastic composite, thermoset composite, fibre reinforced composites, sandwich materials e.g. sandwich materials comprising heat sensitive foam core, metal and combinations thereof.

Heat-sensitive articles for example heat-sensitive substrates, include plastic articles, wood articles for example solid wood, such as for example: hard wood, soft wood, plywood; veneer, particle board, low density fibre board, medium density fibreboard and high density fibreboard, OSB (Oriented Strand Board) wood laminates, chipboard and other articles in which wood is an important constituent, such as for example foil covered wooden articles, engineered wood, plastic modified wood, plastic articles or wood plastic compounds (WPC); articles with cellulosic fibres, for example cardboard or paper articles; textile and leather articles. Examples of plastic articles include unsaturated polyester resinbased compositions, ABS (acrylonitril butadiene styrene), melamine-formaldehyde resins, polycarbonate, polyethylene, polypropylene, ethylene-propylene-diene monomer (EPDM), thermoplastic olefin (TPO), polyurethane (PU), polypropylene oxide (PPO), polyethylene oxide (PEO), polyethyleneterephthalate and nylon, for example polyamide 6,6 and mixtures thereof, for example polycarbonate-ABS. Other heat-sensitive articles include objects that are a combination of a non-heat-sensitive part such as metal parts with a heat-sensitive part, such as any one of the aforementioned for example plastic hosing with heavy metal parts, strips for example aluminium frames with heat strips etc.

Specific wood coating markets where the thermosetting powder coating compositions of the invention may be used include domestic furniture, such as tables, chairs, cabinets, etc., bedroom and bathroom furniture, office furniture, contract furniture such as school and child furniture, hospital furniture, restaurant and hotel furniture, kitchen cabinets and furniture, (flat) panels for interior design, interior and exterior windows and doors, interior and exterior window frames and door frames, exterior and interior sidings and wooden flooring.

Specific plastic coating markets where thermosetting powder coating compositions of the invention may be used include automotive applications, such as interior car parts, wheel covers, bumpers, under the hood parts etc., flexible flooring, sporting goods, cosmetics, audio-visual applications, such as TV sets, computer housing, phones, etc., household appliances and satellite dishes.

Typical examples of non-heat-sensitive articles include glass, ceramic, composite, fibre cement board, or metal, for example aluminum, copper or steel articles, for instance carbon steel, where the main alloying constituent is carbon. Carbon steel usually contains carbon 0.2 and 1.5% w/w based on the total alloy composition and often contains other constituents such as manganese, chromium, nickel, molybdenum, copper, tungsten, cobalt, or silicon, depending on the desired steel properties. Steel has properties similar to iron if the amount of carbon is not too high, for example not more than 1.5% w/w based on the total alloy composition. The steel may be surface treated (treatment with zinc, or zinc phosphate or iron phosphate etc.) or non-surface treated.

In another aspect, the invention relates to a powder coating obtained by partial or full cure of the thermosetting powder coating composition of the invention. The powder coating can be a primer, top coat or an intermediate coating.

In another aspect, the invention relates to the use of any one of the compositions according to the invention to fully or partially coat an article.

In another embodiment the invention relates to the use of any one of the compositions of the invention to coat a heat-sensitive article preferably wood for example low density fibre board, medium density fibreboard and high density fibreboard, plastic, etc., or combinations thereof.

In another aspect, the invention relates to an article that is fully or partially coated with any one of the compositions of the invention.

In one embodiment of the invention the substrate is a non-heat-sensitive substrate, for example glass, ceramic, fibre cement board, or metal, for example aluminum, copper or steel, preferably metal.

In yet another embodiment, the invention provides for a use of the composition of the invention to coat a heat-sensitive article as defined herein and/or a non-heat-sensitive article as defined herein.

In yet another embodiment, the invention provides for a use of the thermosetting powder coating compositions of the invention to coat an article wherein the article is a heat-sensitive article for example wood such as low density fibre board, medium density fibreboard and high density fibreboard, plastic and combinations thereof.

In yet another embodiment, the invention provides for a use of the thermosetting powder coating compositions of the invention to coat an article wherein the article is a non-heat-sensitive article for example glass, ceramic, composite, fibre cement board, or metal, for example aluminum, copper or steel articles, for instance carbon steel.

In yet another embodiment, the invention provides for a use of the thermosetting powder coating compositions of the invention to coat an article wherein the article is a heat-sensitive article for example wood such as low density fibre board, medium density fibreboard and high density fibreboard, plastic and combinations thereof and also to coat an article wherein the article is a non-heat-sensitive article for example glass, ceramic, composite, fibre cement board, or metal, for example aluminum, copper or steel articles, for instance carbon steel.

In another aspect of the invention there is provided a use of:
  a thermosetting powder coating composition as disclosed herein; or
  a cured thermosetting powder coating composition as disclosed herein; or
  an article having coated thereon a thermosetting powder coating composition as the latter is disclosed herein, or
  an article having coated and cured thereon a thermosetting powder coating composition as the latter is disclosed herein, in powder coatings, powder coatings for heat-sensitive articles, powder coatings for non-heat-sensitive articles, 3D-printing, automotive applications (car parts, agricultural machines, composite structures, ceramic structures, etc.), marine applications (ships, boats), aerospace applications (planes, helicopters, composite structures, ceramic structures, etc.), medical applications (artificial joints, meshes, woven or non-woven sheets, tapes, ribbons, bands, cables, tube-like products for e.g. ligament replacement, composite structures, ceramic structures, etc.), defense applications (ballistic protection, body armor, ballistic vests, ballistic helmets, ballistic vehicle protection, composite structures, ceramic structures, etc.), sports/recreational applications (fencing, skates, skateboarding, snowboarding, suspension lines on sport parachutes, paragliders, kites, kite lines for kite sports, climbing equipment, composite structures, ceramic structures, etc.), architectural applications (windows, doors, (pseudo-) walls, cables, etc.), bottling applications, household applications (household appliances, whitegoods, furniture, computer housings, etc.), machinery applications (can and bottle handling machine parts, moving parts on weaving machines, bearings, gears, composite structures, ceramic structures, computer housings, etc.), can applications, coil applications, energy applications for e.g. generators for wind, tide or solar energy, textile applications for e.g. fabrics, this can be very broad from impregnation technical textiles to for example complete composites both as coating and as a binder for composites, and electrical applications for e.g. cabinets for electrical wire or switch boards.

In another aspect of the invention there is provided a process for making either powder coatings, or powder coatings for heat-sensitive articles, or powder coatings for non-heat-sensitive articles, or compositions suitable for 3D-printing, or compositions suitable for applications selected from the group consisting of automotive applications, marine applications, aerospace applications, medical applications, defense applications, sports/recreational applications, architectural applications, bottling applications, household applications, machinery applications, can applications, coil applications, energy applications, textile applications and electrical applications, or articles suitable for applications selected from the group consisting of automotive applications, marine applications, aerospace applications, medical applications, defense applications, sports/recreational applications, architectural applications, bottling applications, household applications, machinery applications, can applications, coil applications, energy applications, textile applications and electrical applications, wherein at least one of the following i) to iv), is used
  i) a thermosetting powder coating composition as disclosed herein,
  ii) a cured thermosetting powder coating composition as disclosed herein,
  iii) an article having coated thereon a thermosetting powder coating composition as the latter is disclosed herein,
  iv) an article having coated and cured thereon a thermosetting powder coating composition as the latter is disclosed herein.

Unless otherwise explicitly stated, any feature, element, component, embodiment, aspect, range and especially any preferred feature, preferred element, preferred embodiment, preferred aspect, preferred range, preferred combination of ranges, preferments, embodiments and aspects in connection with any piece of disclosure disclosed in this section 5, can be combined with each other and with any other feature, element, component, embodiment, aspect, range and especially any preferred feature, preferred element, preferred embodiment, preferred aspect, preferred range, preferred combination of ranges, preferments, embodiments and aspects of the invention as these are disclosed in the entire application.

Yet, another aspect of the invention is a thermosetting powder coating composition selected from the group consisting of thermosetting powder coating compositions according to InvPCC1-InvPCC18.

Yet, another aspect of the invention is a powder coating selected from the group consisting of powder coatings according to InvPC1-InvPC18.

Many other variations and embodiments of the invention will be apparent to those skilled in the art and such variations are contemplated within the scope of the claimed invention.

Unless otherwise explicitly stated, any feature, element, component, embodiment, aspect, range and especially any preferred feature, preferred element, preferred embodiment, preferred aspect, preferred range, preferred combination of ranges, preferments, embodiments and aspects in connection with any piece of disclosure concerning the invention and disclosed in the entire application can be combined with each other and with any other feature, element, component, embodiment, aspect, range and especially any preferred feature, preferred element, preferred embodiment, preferred aspect, preferred range, preferred combination of ranges, preferments, embodiments and aspects of the invention as these are disclosed in the entire application.

Further aspects of the invention and preferred features thereof are given in the claims herein.

The invention will now be described in detail with reference to the following non limiting examples which are by way of illustration only.

EXAMPLES

The invention is explained in more detail with reference to the following non-limiting examples.

In the Examples section, the abbreviation UR represents unsaturated resin comprising ethylenic unsaturations, the abbreviation VU represents vinyl urethanes, the abbreviation VFUR represents vinyl functionalized urethane resins used as curing agents, the abbreviation PCC represents thermosetting powder coating composition and the abbreviation PC represents powder coating. In all the examples the unsaturated resins comprising ethylenic unsaturations (UR) were unsaturated polyester resins comprising 2-butenedioic acid ethylenic unsaturations.

All powder coating compositions presented in the Examples were thermosetting powder coating compositions (TPCC).

In the Examples section the abbreviation 'Comp' denotes a Comparative Example of either a thermosetting powder coating composition e.g. CompPCC1, or a powder coating e.g. CompPC1. In the Examples section the abbreviation 'Inv' denotes an Inventive Example of a thermosetting powder coating composition e.g. InvPCC1, or a powder coating e.g. InvPC1.

In this section (Examples), any method for the measurement of a parameter for a UR is meant to equally apply for any acrylic resin, polyurethane, epoxy resin, polyamide, polyesteramide, polycarbonate, polyurea and polyester resin e.g. for an unsaturated polyester resin, for an unsaturated polyester resin comprising ethylenic unsaturations such as an acrylated polyester resin, unsaturated polyester resin comprising di-acid ethylenic unsaturations, for an unsaturated polyester resin comprising 2-butenedioic acid ethylenic unsaturations, that a UR may be selected from.

In this section (Examples), any method for the measurement of a parameter for a VU is meant to equally apply for any VU such as any crystalline VU-c e.g. any crystalline VEU-c, any crystalline VESU-c, any crystalline VEESU-c.

In this section (Examples), any method for the measurement of a parameter for a VFUR is meant to equally apply for any VFUR such as any crystalline VFUR-c e.g. such as any crystalline VEFUR-c e.g. any crystalline VESFUR-c, any crystalline VEESFUR-c.

Any reference to paragraph numbers mentioned in the Examples section, refers to paragraphs mentioned in the Examples section.

1. Chemicals, Raw Materials; Analytical Methods and Techniques 1.1 Chemicals & Raw Materials Laurox®-S (supplied by AkzoNobel Polymer Chemicals), is a solid mixture of dilauroyl peroxide (peranhydride) and water wherein the amount of dilauroyl peroxide is 99% w/w on the solid mixture; water is the carrier material for the dilauroyl peroxide.

Perkadox® 24-FL (supplied by AkzoNobel Polymer Chemicals), is a solid mixture of dicetyl peroxydicarbonate and water wherein the amount of dicetyl peroxydicarbonate is 94.5% w/w on the solid mixture; water is the carrier material for the dicetyl peroxydicarbonate.

Perkadox® 26 (supplied by AkzoNobel Polymer Chemicals), is a solid mixture of dimyristyl peroxydicarbonate and water wherein the amount of dimyristyl peroxydicarbonate is 94.5% w/w on the solid mixture; water is the carrier material for the dimyristyl peroxydicarbonate.

Perkadox® 16 (supplied by AkzoNobel Polymer Chemicals), is a solid mixture of di(4-tert-butylcyclohexyl) peroxydicarbonate and water wherein the amount of di(4-tert-butylcyclohexyl) peroxydicarbonate is 95.5% w/w on the solid mixture; water is the carrier material for the di(4-tert-butylcyclohexyl) peroxydicarbonate.

Perkadox® PM-W75 (supplied by AkzoNobel Polymer Chemicals), is a solid mixture of bis(4-methylbenzoyl) peroxide (peranhydride) and water wherein the amount of bis(4-methylbenzoyl) peroxide is 75% w/w on the solid mixture; water is the carrier material for bis(4-methylbenzoyl) peroxide.

Trigonox® C-50D PD (supplied by AkzoNobel Polymer Chemicals) is a solid mixture of t-butyl peroxybenzoate (perester) and silicium oxide wherein the amount of t-butyl peroxybenzoate is 50% w/w on the solid mixture; silicium oxide is the carrier material for the t-butyl peroxybenzoate.

Trigonox® EHP (supplied by AkzoNobel Polymer Chemicals), is a liquid mixture of di(2-ethylhexyl) peroxydicarbonate (peroxydicarbonate) and water wherein the amount od di(2-ethylhexyl) peroxydicarbonate is 98% w/w on the liquid mixture; water is the carrier material for di(2-ethylhexyl) peroxydicarbonateperoxydicarbonate. Trigonox® EHP is a peroxydicarbobate.

Trigonox® 23 (supplied by AkzoNobel Polymer Chemicals), is a liquid mixture of tert-butyl peroxyneodecanoate (perester) and water wherein the amount tert-Butyl peroxyneodecanoate is 95% w/w on the liquid mixture; water is the carrier material tert-Butyl peroxyneodecanoate. Trigonox® 23 is a perester.

Trigonox® 423 C70 (supplied by AkzoNobel Polymer Chemicals), is a liquid mixture of 1,1,3,3-tetramethylbutyl peroxyneodecanoate (perester) and OMS (=odorless mineral spirits), wherein the amount tert-1,1,3,3-tetramethylbutyl peroxyneodecanoate is 70% w/w on the liquid mixture; water is the carrier material 1,1,3,3-tetramethylbutyl peroxyneodecanoate.

Cobalt stearate (solid, purity of 98%) (supplied by Alfa Aesar) was used a transition metal compound.

Kronos® 2360 (supplied by Kronos Titan GmbH) is titanium dioxide and was used as a white pigment.

t-Butyl hydroquinone (supplied by Sigma-Aldrich) was used as an inhibitor.

Resiflow® PV-5 (supplied by Worlée-Chemie GmbH) was used as a flow control agent.

Diphenyliodoniumchloride (supplied by Sigma-Aldrich) is an onium compound and it reads on formula II-X.

Diethylene glycol monovinylether (liquid; purity 99%) was supplied by BASF.

Triethylene glycol monovinylether (liquid; purity 99%) was supplied by BASF.

4-hydroxybutyl vinylether (liquid; purity 99%) was supplied by BASF.

Any other chemicals mentioned in the Examples and not explicitly mentioned in this paragraph, were supplied by Aldrich and they were used as supplied.

1.2 Analytical Methods and Techniques

The methods described 1.2.1-1.2.6 for the measurement of properties disclosed herein for a UR applies analogously for any UR that may form part of component A as disclosed in the entire application, e.g. acrylic resin, polyurethane, epoxy resin, polyamide, polyesteramide, polycarbonate, polyurea and polyester resin e.g. for an unsaturated polyester resin, for an unsaturated polyester resin comprising ethylenic unsaturations such as an acrylated polyester resin, unsaturated polyester resin comprising di-acid ethylenic unsaturations, for an unsaturated polyester resin comprising 2-butenedioic acid ethylenic unsaturations.

The methods described 1.2.1-1.2.6 for the measurement of properties disclosed herein for a VFUR applies analogously for any VFUR that may form part of component B as disclosed in the entire application, e.g. a crystalline VFUR-c such as a crystalline VEFUR-c, a crystalline VESFUR-c, a crystalline VEESFUR-c.

The methods described 1.2.1-1.2.6 for the measurement of properties disclosed herein for a VU applies analogously for any VU that may form part of the component B as disclosed in the entire application, e.g. a crystalline VU-c such as a crystalline VEU-c, a crystalline VESU-c, a crystalline VEESU-c.

The methods described 1.2.6, 1.2.8 and 1.2.9 for the measurement of properties disclosed herein for a TPCC of the invention applies analogously for any TPCC of the invention as disclosed in the entire application.

1.2.1 Method for Measuring the Number Average Molecular Weight ($M_n$) (Herein Abbreviated as 'GPC Method')

The number average molecular weight ($M_n$) was measured via Gel Permeation Chromatography (GPC) calibrated with a set of polystyrene standards (type EASICAL PS1 and 2 from Agilent) with a molecular weight range of from 500 up to $2.5 \times 10^6$ g/mol and using as eluent a mixture of tetrahydrofuran (THF) 99.92% and 0.08% acetic acid, at a flow rate of 1 mL eluent/minute at 40° C. More specifically, 40 mg of a sample of for example UR or VU or VFUR—as the case may be—, were dissolved in 700 µL NMP (N-methyl-pyrrolidone) for 20 minutes at 100° C. The solution thus produced was subsequently cooled down to 25° C., and 5 mL of eluent were added to the solution. 40 µL of the solution thus prepared were injected into the pre-column (as this is described below) for the GPC measurement to be carried out. The GPC measurements were carried out on a Waters Alliance HPLC system equipped with: i) a Waters Alliance 2414 refractive index detector at 40° C., and ii) a Waters Alliance 2695 separation module equipped with a pre-column of mixed-C type, PLgel 5 µm Guard, 50×7.5 mm (PL1110-1520 from Agilent) and two consecutive PL-gel columns of Mixed-C type with l/d=300/7.5 mm (PL1110-6500 from Agilent), and filled with particles having a particle size of 5 µm (supplied by the Polymer Laboratories) and c) software for analyzing the obtained chromatograph and measuring the $M_n$.

1.2.2 Method for Measuring the Melt Viscosity

Melt viscosity (herein mentioned as viscosity, in Pa·s) measurements were carried out at 160° C. on a Brookfield CAP 2000+ H Viscometer. The applied shear-rate was 70 $s^{-1}$ and a 19.05 mm spindle (cone spindle CAP-S-05 (19.05 mm, 1.8°) was used.

1.2.3 Method for Measuring the Acid Value (AV)

The acid value (AV) was measured according to ISO 2114. The AV is given as the mass of potassium hydroxide (KOH) in milligrams that is required to neutralize one gram of the tested substance and is used as a measure of the concentration of carboxylic acid groups present.

1.2.4 Method for Measuring the Hydroxyl Value (OHV)

The hydroxyl value (OHV) was measured according to ISO 4629. The OHV is given as the mass of potassium hydroxide (KOH) in milligrams that is required to neutralize one gram of the tested substance and is used as a measure of the concentration of hydroxyl groups present.

1.2.5 Method for Measuring the WPU (Herein Abbreviated as '$^1$H-NMR Method WPU')

The WPU was measured via $^1$H-NMR spectroscopy according to the method entitled—for simplicity—'$^1$H-NMR method WPU' which is presented herein. The estimated margin of error of this method for determining the WPU is +1-2%; the margin of error was determined on the basis of measuring three samples of the same lot of a UR or a VFUR or a VU.

More specifically, said WPU was measured via $^1$H-NMR spectroscopy as explained herein after and it was calculated according to the following equation EX2:

$$WPU = \left[ \frac{W_{pyr}}{W_{resin}} \frac{1}{MW_{pyr}} \frac{A_{c=c}/N_{c=c}}{A_{pyr}/N_{pyr}} \right]^{-1} \quad (EX2)$$

wherein, $W_{pyr}$ is the weight of pyrazine (internal standard),
$W_{resin}$ is the weight of UR such as an unsaturated polyester resin comprising 2-butenedioic acid ethylenic unsaturations, or the weight of a curing agent such as a VFUR or a VU; $W_{pyr}$ and $W_{resin}$ are expressed in the same units.
$MW_{pyr}$ is the molecular weight of the pyrazine (=80 Da) (internal standard).
$A_{pyr}$ is the peak area for methine protons attached to the aromatic ring of pyrazine and
$N_{pyr}$ is the number of the methine protons of pyrazine (=4).

In case of a UR:
$A_{C=C}$ is the peak area for methine protons ( . . . —CH= . . . ) of the ethylenic unsaturations (>C=C<) of the UR; $N_{C=C}$ is the number of methine protons ( . . . —CH= . . . ) attached to the ethylenic unsaturations (>C=C<) of the UR.

In case of a VFUR or a VU—as the case may be—:
$A_{C=C}$ is the peak area for the methine proton ( . . . —CH= . . . ) of the vinyl groups ( . . . —CH=CH$_2$) in the VFUR or in the VU—as the case may be—; $N_{C=C}$ is the number of methine protons ( . . . —CH= . . . ) of the vinyl groups ( . . . —CH=CH$_2$) in the VFUR or in the VU—as the case may be—.

The peak areas of the methine protons of pyrazine and methine protons ( . . . —CH= . . . ) of the ethylenic unsaturations (>C=C<) of the UR in EX2 were measured as follows: A sample of 75 mg of UR was diluted at 25° C. in 1 ml deuterated chloroform containing a known amount (mg) of pyrazine as internal standard for performing $^1$H-NMR spectroscopy. Subsequently, the $^1$H-NMR spectrum of the UR sample was recorded at 25° C. on a 400 MHz BRUKER NMR-spectrometer. Afterwards, the chemical shifts (ppm) of the methine protons of pyrazine and the methine protons ( . . . —CH= . . . ) of the ethylenic unsaturations (>C=C<) of the UR were identified; the chemical shifts (ppm) of the methine protons of pyrazine and the methine protons ( . . . —CH= . . . ) of the ethylenic unsaturations (>C=C<) of the UR in EX2 measured on a 400 MHz BRUKER NMR-spectrometer in methanol and deuterated chloroform were at about 8.6 and at about 6.4-6.9 ppm, respectively. Subsequently, with the help of suitable commercially available software for analyzing $^1$H-NMR spectra such as ACD/Spectrus Processor software provided by ACD/Labs, the peak areas of the methine protons of pyrazine and methine protons ( . . . —CH= . . . ) of the ethylenic unsaturations (>C=C<) of the UR of EX2 were measured and from these values the WPU was determined according to EX2.

If 75 mg of a UR is not soluble at 25° C. in 1 ml of deuterated chloroform, then any other suitable solvent or mixture of solvents known to the skilled person for performing the $^1$H-NMR spectroscopy may be used; for example DMSO (dimethyl sulfoxide), pyridine, tetra-chloro ethane, and mixtures thereof. The choice of a suitable solvent or a mixture of suitable solvents depends on the solubility of the sample of the UR in said solvents. If 75 mg of UR is soluble in 1 mL of deuterated chloroform at 25° C., then deuterated chloroform is the solvent of choice for performing the $^1$H-NMR spectroscopy for the UR. If a different solvent or mixture of solvents is used for performing the $^1$H-NMR Method WPU, then the chemical shifts of the protons of EX2 may shift from the ones reported here for the selected solvents for the $^1$H-NMR Method WPU since the actual chemical shifts may depend on the solvent or mixture of solvents used to record the $^1$H-NMR spectrum; in such case one should identify and determine the chemical shifts of the corresponding protons and apply EX2 for the determination of WPU.

The peak areas of the methine protons of pyrazine and methine protons ( . . . —CH= . . . ) of the vinyl groups ( . . . —CH=CH$_2$) in the VFUR or in the VU of EX2—as the case may be—were measured as follows: A sample of 75 mg of VFUR or VU—as the case may be—was diluted at 40° C. in a mixture of 0.200 ml methanol and 0.600 ml deuterated chloroform containing a known amount (mg) of pyrazine as internal standard for performing $^1$H-NMR spectroscopy. Subsequently, the $^1$H-NMR spectrum of the VFUR or the VU sample—as the case may be—was recorded at 40° C. on a 400 MHz BRUKER NMR-spectrometer. Afterwards, the chemical shifts (ppm) of the methine protons of pyrazine and the methine protons ( . . . —CH= . . . ) of the vinyl groups ( . . . —CH=CH$_2$) in the VFUR or in the VU—as the case may be—were identified; the chemical shifts (ppm) of the methine protons of pyrazine and methine protons ( . . . —CH= . . . ) of the vinyl groups ( . . . —CH=CH$_2$) in the VFUR or in the VU of EX2—as the case may be—were measured on a 400 MHz BRUKER NMR-spectrometer in methanol and deuterated chloroform were at about 8.6 and at about 6.4-6.5 ppm, respectively. Subsequently, with the help of suitable commercially available software for analyzing $^1$H-NMR spectra such as ACD/Spectrus Processor software provided by ACD/Labs, the peak areas of the methine protons of pyrazine and methine protons ( . . . —CH= . . . ) of the vinyl groups ( . . . —CH=CH$_2$) in the VFUR or in the VU of EX2—as the case may be—were measured and from these values the WPU was determined according to EX2.

If 75 mg of a VFUR or a VU—as the case may be—, are not soluble at 40° C. in a mixture of 0.200 ml methanol and 0.600 ml deuterated chloroform, then any other suitable solvent or mixture of solvents known to the skilled person for performing the $^1$H-NMR spectroscopy may be used; for example DMSO (dimethyl sulfoxide), pyridine, tetra-chloro ethane, and mixtures thereof. The choice of a suitable solvent or a mixture of suitable solvents depends on the solubility of the sample of the VFUR or a VU—as the case may be—, in said solvents. If 75 mg of VFUR or VU—as the case may be—, are soluble in a mixture of 0.200 ml methanol and 0.600 ml deuterated chloroform at 40° C., then a mixture of methanol and deuterated chloroform is the solvent of choice for performing the $^1$H-NMR spectroscopy for the VFUR or the VU.

If a different solvent or mixture of solvents is used for performing the $^1$H-NMR Method WPU, then the chemical shifts of the protons of EX2 may shift from the ones reported here for the selected solvents for the $^1$H-NMR Method WPU since the actual chemical shifts may depend on the solvent or mixture of solvents used to record the $^1$H-NMR spectrum; in addition, one may perform the measurement at different temperature than the one disclosed herein, for example the measurement can be performed at higher temperature than the one disclosed herein in order to solubilize the sample intended to be analyzed for measuring its WPU according to this method and/or may use a lower amount of sample e.g. 25 mg, depending on the resolution of the NMR instrument; in such case one should identify and determine the chemical shifts of the corresponding protons and apply EX2 for the determination of WPU.

The method—as described herein—for the measurement of the WPU of the samples mentioned in the Examples, applies analogously for any UR and any VFUR, VU, taking of course into account common general knowledge in performing and analyzing results of NMR spectroscopy, the particular chemical nature of the UR or the VFUR or the VU and the skills of one skilled in the art of NMR spectroscopy; for example, the chemical shifts may be somewhat shifted from the ones disclosed herein, and/or the temperatures used to perform the measurement different e.g. higher than the ones disclosed herein, or the amount of the sample used can be lower e.g. 25 mg, depending on the resolution of the NMR instrument; in such case one should identify and determine the chemical shifts of the corresponding protons and apply EX2 for the determination of WPU.

1.2.6 DSC Method for the Measurement of $T_g$, $T_m$, $T_c$, $\Delta H_m$, $\Delta H_c$, (Herein Abbreviated as 'DSC Method')

The glass transition temperature ($T_g$ in ° C.), the crystallization temperature ($T_c$ in ° C.), the crystallization enthalpy ($\Delta H_c$ in J/g), the melting temperature ($T_m$ in ° C.), the melting enthalpy ($\Delta H_m$ in J/g) were measured via Differential Scanning calorimetry (DSC) on a TA instruments DSC Q2000 apparatus equipped with a cooling system TA instruments RCS90, in $N_2$ atmosphere calibrated with indium. The glass transition temperature, the crystallization temperature, the crystallization enthalpy, the melting temperature, the melting enthalpy, of a chemical entity described in this application—to the extent that these parameters were applicable for said entity—were measured at any time from 24 up to and including 72 hours from the time of the preparation of said chemical entity. The processing of the signal (DSC thermogramme, Heat Flow vs. Temperature) was carried out using Universal Analysis 2000 software version 4.5a provided by TA instruments, as described herein after:

A sample of 10±0.5 mg was weight and placed in the DSC cell. The sample was cooled down to −20° C. and the temperature was kept at −20° C. for 1 minute; upon 1 minute the sample was heated up to 200° C. at a heating rate of 5° C./minute (thermograph A). Once the sample has reached 200° C., the temperature was maintained at 200° C. for 1 minute. Subsequently, the sample was cooled down to −90° C. at a cooling rate of 5° C./minute (thermograph B); once the sample has reached −90° C., the temperature was maintained at −90° C. for 1 minute. Subsequently, the sample was heated up to 150° C. at a heating rate of 5° C./minute (thermograph C) Thermographs A, B and C were processed as the Y axis of the thermographs representing the heat flow has exotherm up and endotherm down.

Thermograph A was used for measuring the glass transition temperature of the thermosetting powder coating composition ($T_{g\ TPCC}$).

Thermograph C was used for measuring the glass transition temperature of the UR ($T_{g\ UR}$).

Thermograph C was used for measuring the glass transition temperature of the VFUR ($T_{g\ VFUR}$).

Thermograph C was used for measuring the $\Delta H_m$ and $T_m$.

Thermograph B was used to measure the $\Delta H_c$, $T_c$.

The glass transition temperature was the midpoint temperature of the temperature range over which the glass transition took place, said midpoint temperature was the point at which the curve was intersected by a line that was equidistant between the two extrapolated baselines, as defined in § 3.2 and § 3.3 in ISO 11357-2 edition 1999-03-15 [for midpoint temperature see § 3.3.3 in ISO 11357-2; edition 1999-03-15].

The $T_m$ was measured as the temperature recorded at the minimum heat flow of the endothermic signal attributed to the melting of the sample.

The $\Delta H_m$ was measured as the integrated heat flow over the temperature range of the melting.

The $T_c$ was measured as the temperature recorded at the maximum heat flow of the exothermic signal attributed to the crystallization of the sample.

The $\Delta H_c$ was measured as the integrated heat flow over the temperature range of the crystallization.

1.2.7 Method to Determine Presence of Unreacted —N=C=O Groups (Free Isocyanate Groups) (Herein Abbreviated as 'Method NCO')

An FT-IR spectrum was recorded on a Digilab Excalibur infrared spectrometer, using a Golden gate ATR accessory from Specac. FT-IR spectra were taken using a resolution of 4 cm$^{-1}$, over a range of 700 cm$^{-1}$ to 4000 cm$^{-1}$ over 64 scans and processed with Varian Resolutions pro software version 5.1. A characteristic peak for unreacted —N=C=O groups can be found around 2250 cm$^{-1}$; the presence of this peak is indicative of unreacted —N=C=O groups (free isocyanate groups).

1.2.8 Measurement and Assessment of the Physical Storage Stability of the Thermosetting Powder Coating Compositions The physical storage stability (PSS) of the thermosetting powder coating compositions of the invention was tested at 23° C. for 7 weeks (for results see Table 3). Prior to assessing the PSS the thermosetting powder coating composition was left to cool down to room temperature for about 2-3 hours. The greater the extent of agglomeration or sintering the powder the PSS, thus the lower its ranking according to the following scale. The extent of agglomeration was visually assessed and ranked according to the following rating on a 1-10 scale (1 representing the worst PSS and 10 the best PSS):

10: No change.
9: No agglomeration, very good fluidity.
8: No agglomeration, good fluidity.
7: Very low agglomeration; agglomeration can be dispersed by one light tap into a fine powder.
6: Very low agglomeration; agglomeration can be dispersed by several taps into a fine powder.
5: Low agglomeration; agglomeration can be dispersed by hand pressure into a fine powder.
4: Low agglomeration; agglomeration cannot be dispersed by hand pressure in a fine powder.
3: Severe agglomeration into several large lumps, material is pourable.
2: Severe agglomeration into several large lumps, material is not pourable.
1: product sintered to one lump, volume reduced.

1.2.9 Assessment of the Ability of a Thermosetting Powder Coating Composition to Heat-Cure Fast at Low Temperature The assessment of the ability of a thermosetting powder coating composition to heat-cure fast at low temperature was performed preparing a powder coating of said thermosetting powder coating composition according to § 4 in the Examples ('Preparation of the powder coatings') and then measuring the acetone double rubs that the thus prepared powder coating withstood. If the powder coating was able to withstand 210 ADR, then the corresponding thermosetting powder coating composition was able to heat-cure fast at low temperature (this is indicated as a 'yes' in the corresponding examples). If the powder coating was not able to withstand 210 ADR, then the corresponding thermosetting powder coating composition was not able to heat-cure fast at low temperature (this is indicated as a 'no' in the corresponding examples).

1.2.10 Methods for the Measurement of Properties of the Powder Coatings Obtained by Heat-Curing of the Thermosetting Powder Coating Compositions Prepared Herein The properties of the any and all of the powder coatings obtained by heat-curing of their corresponding thermosetting powder coating compositions were (and are to be) measured on the MDF substrates that they were applied on (see also 'Preparation of the powder coatings'). Any and all properties of the powder coatings e.g. acetone double rubs (ADR), smoothness, coating (film) thickness, shown in the Exmaples, were assessed upon heat-curing the corresponding thermosetting powder coating compositions (applied on MDF substrates) at low temperature, that is upon heat-curing at 95° C. for 3 minutes in a catalytic IR oven. The type of MDF substrates used was of Medite-MR type.

1.2.10.1 Smoothness

Smoothness (or also known in the art as flow) of powder coatings obtained by heat cure of the corresponding thermosetting powder coating compositions, was determined by comparing the smoothness of the coating with PCI Powder Coating Smoothness panels (ACT Test Panels Inc., APR22163 (A) Batch: 50708816) at a thickness of 100-120 μm. The rating of smoothness is from 1 to 10, with 1 representing the roughest coating and 10 representing the smoothest coating. By a rating of '<1' is meant that the smoothness of the powder coating was lower than the powder coating smoothness panel with the lowest smoothness that of 1; effectively a powder coating with a smoothness <1 is a very rough powder coating.

1.2.10.2 Coating (Film) Thickness

The coating (film) thickness of the powder coatings derived upon heat curing of the corresponding thermosetting powder coating compositions, was measured with a Elcometer 195 Saberg Drill from Elcometer according to EN ISO 2808-5B:2007; the measurement was carried out on a coated surface of the coated MDF panel. The film thickness of any one of powder coatings shown in the Examples and the Tables was in the range of from 100 up to 120 μm; any and all properties measured herein concerning powder coatings should be measured at this film thickness range.

1.2.10.3 Acetone Double Rubs (ADR)

With one acetone double rub (ADR) is meant one continuous back and forward movement, in a cycle time of about one second, over the surface of a powder coating having a thickness of 100-120 μm using a cotton cloth drenched in acetone, which cotton cloth covers a hammer head having a weight of about 980 grams and a contact surface area with the powder coating of about 2 $cm^2$. Every 10 rubs the cloth was drenched in acetone. The measurement was carried out at room temperature, and it was performed on coatings that were left at room temperature for 24-48 hours before been tested; the measurement was continued either until the coating was removed and the number of ADR at which the coating was removed was reported, or until 500 ADR were reached. A result reported as 500 ADR indicates that there was coating left after 500 ADR.

2. Synthesis of UR and Curing Agents 2.1 Synthesis of Unsaturated Resins Comprising Ethylenic Unsaturations (UR)

Table 1 presents the monomers used for the preparation of the unsaturated resins comprising ethylenic unsaturations said resins being amorphous unsaturated polyester resin comprising 2-butenedioic acid ethylenic unsaturations and the properties of said resins.

Amorphous (UR1-UR3) unsaturated polyesters comprising 2-butenedioic acid ethylenic unsaturations were prepared.

All unsaturated polyester resins comprising 2-butenedioic acid ethylenic unsaturations (UR1-UR3) prepared herein were solid at room temperature and at atmospheric pressure.

UR1

A reactor vessel fitted with a thermometer, a stirrer and a distillation device for the removal of water formed during the synthesis, was filled with a tin catalyst (butyl stannoic acid, 1 g) and the monomers for the first step (isophthalic acid (320.1 g; 1.93 mol), neopentylglycol (314.5 g; 3.02 mol) and hydrogenated bisphenol A (270.1 g; 1.12 mol) as listed in Table 1). Stirring was then applied and a light nitrogen flow was passed over the reaction mixture while the temperature was raised to 220° C.; the temperature was kept at 220° C. till no water was released. Subsequently, the reaction mixture was cooled down to 180° C.; once the temperature reached 180° C. fumaric acid (231.6 g; 2.0 mol) together with a small amount of t-butyl hydroquinone (0.2 g; 0.0012 mol) was added at a temperature of 180° C. followed by esterification at 205° C. (second step). When an acid value of less than 15 mg KOH/g resin was reached and water stopped being released, the third step of the polyester preparation was carried out under reduced pressure at 205° C. till an acid value of 6.5 mg KOH/g was reached. In order to lower the acid value of the resin below 5 mgKOH/g resin, 2,3-epoxy propyl neodecanoate (7.7 g; 0.03 mol) was added to the resin in order to react with the acid groups of the resin;

upon the addition of 2,3-epoxy propyl neodecanoate the reaction continued for at least 30 minutes. Subsequently, the polyester resin was discharged onto an aluminum foil kept at room temperature. The polyester resin obtained had an acid value of 4.7 mgKOH/g resin and a hydroxyl value of 35.7 mgKOH/g resin.

UR2

A reactor vessel fitted with a thermometer, a stirrer and a distillation device for the removal of water formed during the synthesis, was filled with a tin catalyst (butyl stanoic acid, 1 g) and the monomers for the first step (terephthalic acid (553.7 g; 3.33 mol), trimethylol propane (44.1 g; 0.33 mol) and neopentyl glycol (443.4 g; 4.26 mol) as listed in Table 1). Stirring was then applied and a light nitrogen flow was passed over the reaction mixture while the temperature was raised to 220° C.; the temperature was kept at 220° C. till no water was released. Subsequently, the reaction mixture was cooled down to 180° C.; once the temperature reached 180° C. fumaric acid (112.5 g; 0.92 mol) together with a small amount t-butyl hydroquinone (0.1 g; 0.0006 mol) was added at a temperature of 180° C. followed by esterification at 205° C. (second step). When an acid value of less than 15 mg KOH/g resin was reached and water stopped being released, the third step of the polyester preparation was carried out under reduced pressure at 205° C. till an acid value of 6.5 mg KOH/g was reached. In order to lower the acid value of the resin below 5 mgKOH/g resin, ethylene carbonate (5.6 g; 0.06 mol) was added to the resin in order to react with the acid groups of the resin; upon the addition of ethylene carbonate the reaction continued for at least 30 minutes. Subsequently, the polyester resin was discharged onto an aluminum foil kept at room temperature. The polyester resin obtained had an acid value of 3.1 mgKOH/g resin and a hydroxyl value of 42.7 mgKOH/g resin.

UR3

A reactor vessel fitted with a thermometer, a stirrer and a distillation device for the removal of water formed during the synthesis, was filled with a tin catalyst (butyl stannoic acid, 1 g) and the monomers for the first step (terephthalic acid (422 g; 2.54 mol), 1,2-propylene glycol (354.6 g; 4.66 mol), benzoic acid (92.8 g; 0.76 mol) and trimethylol propane (18.8 g; 0.14 mol) as listed in Table 1). Stirring was then applied and a light nitrogen flow was passed over the reaction mixture while the temperature was raised to 220° C.; the temperature was kept at 220° C. till no water was released. Subsequently, the reaction mixture was cooled down to 180° C.; once the temperature reached 180° C. fumaric acid (220.5 g; 1.9 mol) together with a small amount of t-butyl hydroquinone (0.1 g; 0.0006 mol) was added at a temperature of 180° C. followed by esterification at 205° C. (second step). When an acid value of less than 15 mg KOH/g resin was reached and water stopped being released, the third step of the polyester preparation was carried out under reduced pressure at 205° C. till an acid value of 6.5 mg KOH/g was reached. Subsequently, the polyester resin was discharged onto an aluminum foil kept at room temperature. The polyester resin obtained had an acid value of 1 mgKOH/g resin and a hydroxyl value of 52.6 mgKOH/g resin.

2.2 Synthesis of the Curing Agents

Vinyl functionalized urethane resins (VFUR) and vinyl urethanes (VU) were prepared and they were used as curing agents in the thermosetting powder coating compositions prepared herein.

Table 2 presents the monomers used for the preparation of VFUR1, VFUR2, VU1, VU2 and VU3 and their properties.

Each of the VFUR1, VFUR2 was a crystalline vinyl ether functionalized urethane resin (crystalline VEFUR).

VU1 was a crystalline vinyl ether urethane (crystalline VEU).

VU2 was a crystalline VEU-c; more particularly VU2 was diethylene glycol divinyl ether urethane.

VU3 was a crystalline VEU-c; more particularly VU3 was triethylene glycol divinyl ether urethane.

Each of VFUR1, VFUR2, VU1, VU2 and VU3 was crystalline, because each of them had a $\Delta Hm \geq 35$ J/g.

The VFUR1 is not a curing agent A because it did not have any and all of its melting temperatures within the $T_m$ range of 30-80° C. The VFUR1 had two melting temperatures, one at 98 and one at 107° C., thus both of them were outside the $T_m$ range of 30-80° C.

The VFUR2 is not a curing agent A because it did not have any and all of its melting temperatures within the $T_m$ range of 30-80° C. The VFUR2 had two melting temperatures, one at 74 and one at 84° C., thus one of them was outside the $T_m$ range of 30-80° C.

The VU1 is not a curing agent A because it did not have any and all of its melting temperatures within the $T_m$ range of 30-80° C. The VU1 had a melting temperature at 100° C., which was outside the $T_m$ range of 30-80° C.

The VU2 is a curing agent A because it did have any and all of its melting temperatures within the $T_m$ range of 30-80° C. The VU2 had two melting temperatures, one at 69 and one at 76° C., thus any and all of its $T_m$ was within the $T_m$ range of 30-80° C.

The VU3 is a curing agent A because it did have any and all of its melting temperatures within the $T_m$ range of 30-80° C. The VU3 had one melting temperature at 56° C., thus any and all of its $T_m$ was within the $T_m$ range of 30-80° C.

VFUR1

A reaction vessel fitted with a thermometer and a stirrer, was filled with the monomers for the first step as listed in Table 2. Stirring was then applied and a light nitrogen flow was passed over the reaction mixture while the temperature was raised to approximately 60° C. Subsequently, for the second step an isocyanate as listed in Table 2 was dosed such that the reaction mixture was kept below 120° C. during addition. After all isocyanate was dosed, the temperature was kept or set at 120° C. and maintained at this temperature for approximately half an hour. The temperature was kept at 120° C. and vacuum was applied to remove all volatiles. After vacuum the content of the vessel was discharged.

VFUR2

A reaction vessel fitted with a thermometer, a stirrer and a distillation device for the removal of water formed during the synthesis, was filled with a tin catalyst (butyl stannoic acid, 0.5 g) and the monomers for the first step (except 4-hydroxybutyl vinyl ether) as listed in Table 2. Stirring was then applied and a light nitrogen flow was passed over the reaction mixture while the temperature was raised to 220° C. The temperature was kept at 220° C. till an acid value of approximately 10 mg KOH/g resin was reached and till no water was being released. Subsequently, the temperature was lowered to 120° C. and as last monomer of the first step the 4-hydroxybutyl vinyl ether and a tin catalyst (dibutyltin dilaurate, 0.5 g) were added at a temperature of 120° C. Subsequently, for the second step the isocyanate as listed in Table 2 was dosed such that the reaction mixture was kept below 120° C. during addition. After all the isocyanate was dosed, the temperature was kept or set at 120° C. and maintained at this temperature for approximately half an hour. The temperature was kept at 120° C. and vacuum was applied to remove all volatiles. After vacuum the content of the vessel was discharged.

VU1

A reaction vessel fitted with a thermometer and a stirrer, was filled with the monomers for the first step as listed in Table 2. Stirring was then applied and a light nitrogen flow was passed over the reaction mixture while the temperature was raised to approximately 60° C. Subsequently, for the second step an isocyanate as listed in Table 2 was dosed such that the reaction mixture was kept below 120° C. during addition. After all isocyanate was dosed, the temperature was kept or set at 120° C. and maintained at this temperature for approximately half an hour. The temperature was kept at 120° C. and vacuum was applied for half an hour to remove all volatiles. Subsequently, n-butanol was added until there were no unreactable isocyanate groups as evidenced by using the Method NCO, described herein. At 120° C. a vacuum was applied for half an hour to remove any residual n-butanol. After this period the content of the vessel was discharged.

VU2

A reaction vessel fitted with a thermometer and a stirrer, was filled with the monomers for the first step as listed in Table 2. Stirring was then applied and a light nitrogen flow was passed over the reaction mixture while the temperature was raised to approximately 60° C. Subsequently, for the second step an isocyanate as listed in table 2 was dosed such that the reaction mixture was kept below 100° C. during addition. After all isocyanate was dosed, the temperature was kept or set at 90° C. and maintained at this temperature for approximately half an hour. The temperature was kept at 90° C. until there were no unreactable isocyanate groups as evidenced by using the Method NCO, described herein and then vacuum was applied for half an hour to remove all volatiles. After this period the content of the vessel was discharged.

VU3

A reaction vessel fitted with a thermometer and a stirrer, was filled with the monomers for the first step as listed in Table 2. Stirring was then applied and a light nitrogen flow was passed over the reaction mixture while the temperature was raised to approximately 60° C. Subsequently, for the second step an isocyanate as listed in table 2 was dosed such that the reaction mixture was kept below 100° C. during addition. After all isocyanate was dosed, the temperature was kept or set at 80° C. and maintained at this temperature for approximately half an hour. The temperature was kept at 80° C. until there were no unreactable isocyanate groups as evidenced by using the Method NCO, described herein and then vacuum was applied for half an hour to remove all volatiles. After this period the content of the vessel was discharged.

3. Preparation of the Thermosetting Powder Coating Compositions

The preparation of the thermosetting powder coating compositions shown in the Examples and used for either the CompPCC or InvPCC was carried out as follows: First the unsaturated resin comprising ethylenic unsaturation (UR) and the vinyl urethane or the vinyl functionalized urethane resin—as the case may be—were mixed in a 90/10 ratio on weight (UR/VU or UR/VFUR as the case may be) in a blender; said mixture was subsequently extruded in a PRISM TSE16 PC twin screw extruder at 120° C. with a screw speed of 200 rpm and a torque higher than 90%. The obtained extrudate was allowed to cool to room temperature and broken into chips. Subsequently, the extrudate was placed in a blender, together with all other paint components, including any remaining VU or VFUR—as the case may be—, making the formulations as listed in the corresponding Tables; subsequently, the mixture obtained was extruded in a PRISM TSE16 PC twin screw extruder at 80° C. with a screw speed of 200 rpm and a torque higher than 50%. The extrudate was allowed to cool at room temperature and broken into chips. After approximately 12-16 hours these chips were then ground in an ultra-centrifugal mill at 14000 rpm and sieved in a Retsch ZM100 sieve. The sieve fraction with particle size below 90 μm was collected (by means of a Fritsch Analysette Spartan sieving apparatus equipped with a 90 micron sieve, sieving performed for 15 minutes at 2.5 mm amplitude) and used for further processing.

Any one of the thermosetting powder coating compositions described in the Examples and shown in the relevant Tables, was white and had a particle size lower than 90 microns.

Each of the thermosetting powder coating compositions according to the invention shown in the Examples (InvPCC) had a glass transition temperature ($T_g$) of at least 25 and at most 70° C., wherein the $T_g$ was measured via Differential Scanning calorimetry (DSC) according to § 1.2.6.

4. Preparation of the Powder Coatings

MDF substrates (type Medite-MR) were preheated at 60-70° C. using a gas catalytic IR oven from Vulcan. The thermosetting powder coating compositions CompPCC and InvPCC alike, prepared herein, were electrostatically sprayed (corona spray gun, 60 kV) onto the preheated MDF substrates once the latter were brought out from the oven; the temperature of MDF substrates during the electrostatic spraying was 50-60° C. Subsequently, the coated MDF substrates were cured at 95° C. for 3 minutes in a catalytic IR oven (Vulcan) (without the application of radiation), affording white powder coatings.

TABLE 1

Composition and characterization of the unsaturated resins comprising ethylenic unsaturations (UR) (each of the UR was an unsaturated polyester resin comprising 2-butenedioic acid ethylenic unsaturations).

|  | UR1 | UR2 | UR3 |
|---|---|---|---|
| Monomers first step |  |  |  |
| Isophthalic acid (mol) | 1.93 |  |  |
| Terephthalic acid (mol) |  | 3.33 | 2 54 |
| Neopentylglycol (mol) | 3.02 | 4 26 |  |
| Trimethylol propane (mol) |  | 0.33 | 0 14 |
| 1,2-propylene glycol (mol) |  |  | 4 66 |
| Benzoic acid |  |  | 0.76 |
| Hydrogenated bisphenol A (mol) | 1.12 |  |  |
| Monomers second step |  |  |  |
| Fumaric acid (mol) | 2 | 0.97 | 1.9 |
| Total (mol) | 8.07 | 8.89 | 10 |
| Monomers first step |  |  |  |
| Isophthalic acid (g) | 320.1 |  |  |
| Terephthalic acid (g) |  | 553.7 | 631.6 |
| Neopentylglycol (g) | 314.5 | 443.4 |  |
| Trimethylol propane (g) |  | 44.1 | 45.1 |
| 1,2-propylene glycol (g) |  |  | 362.2 |
| Hydrogenated bisphenol A (g) | 270.1 |  |  |

TABLE 1-continued

Composition and characterization of the unsaturated resins comprising ethylenic unsaturations (UR) (each of the UR was an unsaturated polyester resin comprising 2-butenedioic acid ethylenic unsaturations).

|  | UR1 | UR2 | UR3 |
|---|---|---|---|
| Monomers second step |  |  |  |
| Fumaric acid (g) | 231.6 | 112.5 | 114 |
| Total weight (g) | 1136.3 | 1153.7 | 1152.9 |
| Water formed during synthesis (g) | 136.3 | 153.7 | 152.9 |
| Weight (g) of resin produced | 1000 | 1000 | 1000 |
| Properties & Characterisation | amorphous | amorphous | amorphous |
| WPU (g/mol) | 536 | 1130 | 530 |
| $M_n$ (Da) | 3451 | 2798 | 3324 |
| $T_g$ (° C.) | 53 | 47 | 43.2 |
| Viscosity (Pa · s) @ 160° C. | 41.1 | 21.2 | 4.0 |
| AV (mg KOH/g UR) | 4.7 | 3.1 | 6.5 |
| OHV (mg KOH/g UR) | 35.7 | 42.7 | 12.8 |

TABLE 2

Composition and characterization of the vinyl functionalized urethanes resins (VFUR) and vinyl urethanes (VU) used as curing agents in the TPCC shown in the Examples.

|  | VFUR1 | VFUR2 | VU1 | VU2 | VU3 |
|---|---|---|---|---|---|
| Monomers first step |  |  |  |  |  |
| Hexane diol (mol) | 0.32 |  |  |  |  |
| Butane diol (mol) |  |  | 0.05 |  |  |
| 4-Hydroxylbutyl vinyl ether (mol) | 4.53 | 2.83 | 4.8 |  |  |
| diethylene glycol monovinylether |  |  |  | 4.64 |  |
| triethylene glycol monovinylether |  |  |  |  | 3.85 |
| dodecane dioic acid |  | 1.13 |  |  |  |
| ethyleneglycol |  | 1.79 |  |  |  |
| Monomers second step |  |  |  |  |  |
| Hexamethylene diisocyanate (mol) | 2.58 | 1.77 | 2.58 | 2.3 | 1.9 |
| Total (mol) | 7.43 | 7.52 | 7.43 | 6.94 | 5.76 |
| Total weight of reactants (g) | 1000 | 1000 | 1000 | 1000 | 1000 |
| Weight (g) of VFUR or VU produced | 1000 | 1000 | 1000 | 1000 | 1000 |
| Properties & Characterisation | crystaline VEFUR | crystaline VEFUR | crystalline VEU | crystalline VEU-c | crystalline VEU-c |
| WPU (g/mol) | 207 | 328 | 183 | 197 | 239 |
| $M_n$ (Da) | 738 | 1053 | 656 | 685 | 818 |
| $T_g$ (° C.) | −59 | — | — | — | — |
| $T_m$ (° C.) (first melting temperature) | 98 | 74 | 100 | 69 | 56 |
| $T_m$ (° C.) (second melting temperature) | 107 | 84 | — | 76 | — |
| $\Delta H_m$ (J/g) (associated to the first melting temperature) | 170 | 102 | 165 | 35 | 141 |
| $\Delta H_m$ (J/g) (associated to the second melting temperature) | 1.9 | 55 | — | 100 | — |
| $\Delta H_m$ (J/g) (the sum of all AH associated to each of the melting temperatures) | 171.9 | 157 | 165 | 135 | 141 |
| $T_c$ (° C.) | 84 | 61 | 77 | 48 | 25 |
| $\Delta H_c$ (J/g) | 175 | 99 | 166 | 136 | 126 |
| Viscosity (Pa · s) @ 160° C. | <0.1 | <0.1 | <0.1 | <0.1 | <0.1 |
| AV (mg KOH/g VU) | 0 | 0 | 0 | 0 | 0 |
| OHV (mg KOH/g VU) | 0 | 0 | 0 | 0 | 0 |

TABLE 3

Composition and properties of comparative thermosetting powder coating compositions and powder coatings thereof.

| | CompPCC1 | CompPCC2 | CompPCC3 | CompPCC4 | CompPCC5 | CompPCC6 | CompPCC7 | CompPCC8 | CompPCC9 | CompPCC10 | CompPCC11 |
|---|---|---|---|---|---|---|---|---|---|---|---|
| UR1 (g) | 200 | 200 | 200 | 200 | 200 | 200 | 200 | 200 | 200 | 200 | 200 |
| VFUR1 (g) | 81.8 | | | | | | | | | | |
| VU2 (g) | | 78.2 | 78.2 | 78.2 | 78.2 | 78.2 | 78.2 | 78.2 | 78.2 | 78.2 | 78.2 |
| Perkadox ® PM-W75 (g) | | 15.1 | 10.1 | | | | | | | | |
| Laurox ® S (g) | | | | 16.6 | | | | | | | |
| Trigonox ® EHP (g) | | | | | 14.5 | | | | | | |
| Trigonox ® 23 (g) | | | | | | 9.6 | | | | | |
| Trigonox ® 423 C70 (g) | | | | | | | 10.2 | | | | |
| Perkadox ® 24 FL (g) | 16.7 | | | | | | | 6.8 | | | |
| Trigonox ® C 500 PD (g) | | | | | | | | | 16.2 | 11.9 | 17.9 |
| cobaltstearate (g) | | | | | | | | | 0.87 | | |
| diphenyliodonium chloride (g) | 2.7 | | | | | | | 2.7 | | 2.7 | |
| t-butylhydroquinone (g) | 0.070 | 0.070 | 0.070 | 0.070 | 0.070 | 0.070 | 0.070 | 0.070 | 0.070 | 0.070 | 0.070 |
| Kronos ® 2310 (g) | 84.5 | 83.5 | 83.5 | 83.5 | 83.5 | 83.5 | 83.5 | 83.5 | 83.5 | 83.5 | 83.5 |
| Resiflow ® PV-5 (g) | 4.2 | 4.2 | 4.2 | 4.2 | 4.2 | 4.2 | 4.2 | 4.2 | 4.2 | 4.2 | 4.2 |
| K | 1.06 | 1.06 | 1.06 | 1.06 | 1.06 | 1,06 | 1.06 | 1.06 | 1.06 | 1.06 | 11 |
| Amount of component C (mmol/Kg A and B) | 99.8 | 150.8 | 100.8 | 149.9 | 150.2 | 99.4 | 150.3 | 100.2 | 98.0 | 99.6 | 149.8 |
| Amount of component D (mmol/Kg A and B) | 29.8 | 0.0 | 30.2 | 0.0 | 0.0 | 30.2 | 0.0 | 30.2 | 0.0 | 30.2 | 0.0 |
| Amount of component E (mg/Kg A and B) | 250 | 250 | 250 | 250 | 250 | 250 | 250 | 250 | 250 | 250 | 250 |

Properties of the the thermosetting powder coating compositions

| | CompPCC1 | CompPCC2 | CompPCC3 | CompPCC4 | CompPCC5 | CompPCC6 | CompPCC7 | CompPCC8 | CompPCC9 | CompPCC10 | CompPCC11 |
|---|---|---|---|---|---|---|---|---|---|---|---|
| PSS | 8 | 8 | 8 | 8 | 5 | 7 | 6 | 8 | 8 | 1 | 1 |
| | very good | very good | very good | very good | good | very good | good | very good | very good | very poor | very poor |
| Able to heat-cure fast at low temperature | no | no | no | no | no | no | no | no | no | no | no |

Properties of the corresponding powder coatings

| | CompPC1 | CompPC2 | CompPC3 | CompPC4 | CompPC5 | CompPC6 | CompPC7 | CompPC8 | CompPC9 | CompPC10 | CompPC11 |
|---|---|---|---|---|---|---|---|---|---|---|---|
| Chemical Resistance (ADR) (assessed upon heat curing at 95° C./3 minutes) | 10 | 15 | 17 | 77 | 17 | 139 | 12 | 35 | 42 | 8 | 63 |
| | very poor | very poor | very poor | very poor | very poor | poor | very poor | very poor | very poor | very poor | very poor |
| Smoothness (PCI) (assessed upon heat curing at 95°C./3 minutes) | <1 | 5 | 5 | 4 | 3 | 2 | 4 | 4 | 4 | <1 | 1 |
| | poor | sufficient | sufficient | sufficient | sufficient | sufficient | sufficient | sufficient | sufficient | poor | poor |

TABLE 4

Composition and properties of comparative thermosetting powder coating compositions and powder coatings thereof.

|  | CompPCC12 | CompPCC13 | CompPCC14 | CompPCC15 | CompPCC16 |
|---|---|---|---|---|---|
| UR1 (g) | 200 | 200 | 200 | | |
| UR2 (g) | | | | 200 | |
| UR3 (g) | | | | | 200 |
| VFUR1 (g) | 81.8 | 81.8 | | | |
| VU1 (g) | | | | 41.4 | 82.8 |
| VFUR2 (g) | | | 133.1 | | |
| Perkadox ® PM-W75 (g) | 10.1 | | | | |
| Perkadox ® 26 (g) | | | | | 12.4 |
| Perkadox ® 16 (g) | | | | 6.7 | |
| Perkadox ® 24 FL (g) | | 16.7 | 19.8 | | |
| diphenyliodonium chloride (g) | 2.7 | 2.7 | 3.2 | | |
| t-butylhydroquinone (g) | 0.070 | 0.070 | 0.083 | 0.060 | 0.071 |
| Kronos ® 2310 (g) | 84.5 | 84.5 | 99.9 | 72.4 | 84.8 |
| Resiflow PV-5 (g) | 4.2 | 4.2 | 5.0 | 3.6 | 4.2 |
| K | 1.20 | 1.20 | 1.09 | 1.13 | 1.06 |
| Amount of component C (mmol/Kg A and B) | 100 | 100 | 100 | 82 | 82 |
| Amount of component D (mmol/Kg A and B) | 29.8 | 29.8 | 29.9 | 0.0 | 0.0 |
| Amount of component E (mg/Kg A and B) | 250 | 250 | 250 | 250 | 250 |

| Properties of the the thermosetting powder coating compositions | | | | | |
|---|---|---|---|---|---|
| PSS | 8 | 8 | 8 | 2 | 3 |
|  | very good | very good | very good | poor | mediocre |
| Able to heat-cure fast at low temperature | no | no | no | no | no |

|  | CompPC12 | CompPC13 | CompPC14 | CompPC15 | CompPC16 |
|---|---|---|---|---|---|
| Properties of the corresponding powder coatings | | | | | |
| Chemical Resistance (ADR) (assessed upon heat curing at 95° C./3 minutes) | 10 | 17 | 8 | 13 | 24 |
|  | very poor | very poor | very poor | very poor | very poor |
| Smoothness (PCI) (assessed upon heat curing at 95° C./3 minutes) | 1 | 0 | 0 | 0 | 1 |
|  | poor | poor | poor | poor | poor |

TABLE 5

Composition and properties of comparative thermosetting powder coating compositions and powder coatings thereof.

|  | CompPCC17 | CompPCC18 | CompPCC19 |
|---|---|---|---|
| UR1 (g) | 200 | 200 | 200 |
| VU2 (g) | 78.2 | 78.2 | 78.2 |
| Perkadox ® 24 FL (g) | 4.2 | 4.2 | |
| diphenyliodonium chloride (g) | 8.9 | 4.2 | |
| t-butylhydroquinone (g) | 0.070 | 0.070 | 0.070 |
| Kronosa ® 2310 (g) | 83.5 | 83.5 | 83.5 |
| Resiflow ® PV-5 (g) | 4.2 | 4.2 | 4.2 |
| K | 1.07 | 1.07 | 1.07 |
| Amount of component C (mmol/Kg A and B) | 0 | 25 | 25 |
| Amount of component D (nnmol/Kg A and B) | 100 | o | 47 |
| Amount of component E (mg/Kg A and B) | 250 | 250 | 250 |

| Properties of the the thermosetting powder coating compositions | | | |
|---|---|---|---|
| PSS | 8 | 9 | 8 |
|  | very good | very good | very good |
| Able to heat-cure fast at low temperature | no | no | no |

|  | CompPC17 | CompPC18 | CompPC19 |
|---|---|---|---|
| Properties of the corresponding powder coatings | | | |
| Chemical Resistance (ADR) (assessed upon heat curing at 95° C./3 minutes) | 23 | 12 | 27 |
|  | very poor | very poor | very poor |
| Smoothness (PCI) (asessed upon heat curing at 95° C./3 minutes) | 7 | 5 | 3 |
|  | sufficient | sufficient | sufficient |

TABLE 6

Composition and properties of comparative thermosetting powder coating compositions and powder coatings thereof.

|  | CompPCC20 | CompPCC21 | CompPCC22 | CompPCC23 | CompPCC24 | CompPCC25 | CompPCC26 | CompPCC27 |
|---|---|---|---|---|---|---|---|---|
| UR1 (g) | 200 | 200 | 200 | 200 | 200 | 200 | 200 | 200 |
| VFUR1 (g) | 81.5 | | | | | | | |
| VU2 (g) | | 78.2 | 78.2 | 78.2 | 78.2 | 78.2 | 78.2 | 78.2 |
| Laurox ® S (g) | 11.2 | | 5.5 | 22.3 | 16.6 | 22 | 2.8 | 11 |
| diphenyliodonium chloride (g) | 4.4 | 8.9 | | | | | 13.4 | 13.4 |
| t-butylhydroquinone (g) | 0.070 | 0.070 | 0.070 | 0.417 | 0.070 | 0.070 | 0.070 | 0.070 |
| Kronos ® 2310 (g) | 84.5 | 83.5 | 83.5 | 83.5 | 83.5 | 83.5 | 83.5 | 83.5 |
| Resiflow ® PV-5 (g) | 4.2 | 4.2 | 4.2 | 4.2 | 4.2 | 4.2 | 4.2 | 4.2 |
| K | 1.06 | 1.07 | 1.07 | 1.07 | 1.07 | 1.07 | 1.07 | 1.07 |
| Amount of component C (mmol/Kg A and B) | 100 | 0 | 50 | 201 | 150 | 199 | 25 | 99 |
| Amount of component D (mmol/Kg A and B) | 49 | 100 | 0 | 0 | 0 | 50 | 50 | 0 |
| Amount of component E (mg/Kg A and B) | 250 | 250 | 250 | 1500 | 250 | 250 | 250 | 250 |
| Properties of the the thermosetting powder coating compositions | | | | | | | | |
| PSS | 8 | 8 | 8 | 7 | 7 | 6 | 8 | 8 |
|  | very good | very good | very good | very good | very good | good | very good | very good |
| Able to heat-cure fast at low temperature | no | no | no | no | no | no | no | yes |
|  | CompPC20 | CompPC21 | CompPC22 | CompPC23 | CompPC24 | CompPC25 | CompPC26 | CompPC27 |
| Properties of the corresponding powder coatings | | | | | | | | |
| Chemical Resistance (ADR) (assessed upon heat curing at 95° C./3 minutes) | 83 | 23 | 27 | 77 | 83 | 6 | 23 | 53 |
|  | very poor | very poor | very poor | very poor | very poor | very poor | very poor | very poor |
| Smoothness (PCI) (assessed upon heat curing at 95° C./3 minutes) | 1 | 7 | 3 | 8 | 4 | 1 | 4 | 3 |
|  | poor | sufficient | sufficient | sufficient | sufficient | poor | sufficient | sufficient |

TABLE 7

Composition and properties of inventive thermosetting powder coating compositions and powder coatings thereof.

|  | InvPCC1 | InvPCC3 | InvPCC4 | InvPCC5 | InvPCC6 | InvPCC7 |
|---|---|---|---|---|---|---|
| UR1 (g) | 200 | 200 | 200 | 200 | 200 | 200 |
| VU2 (g) | 78.2 | 78.2 | 78.2 | 78.2 | 78.2 | |
| VU3 (g) | | | | | | 94.5 |
| Laurox ® S (g) | 5.5 | 11 | 11 | 11 | 11 | 11.7 |
| diphenyliodonium chloride (g) | 4.4 | 1.3 | 2.7 | 4.4 | 8.9 | 4.7 |
| t-butylhydroquinone (g) | 0.014 | 0.070 | 0.070 | 0.070 | 0.070 | 0.074 |
| Kronos ® 2310 (g) | 83.5 | 83.5 | 83.5 | 83.5 | 83.5 | 88.4 |
| Resiflow ® PV-5 (g) | 4.2 | 4.2 | 4.2 | 4.2 | 4.2 | 4.4 |
| K | 1.07 | 1.07 | 1.07 | 1.07 | 1.07 | 1.06 |
| Amount of component C (mmol/Kg A and B) | 50 | 99 | 99 | 99 | 99 | 100 |
| Amount of component D (mmol/Kg A and B) | 49 | 15 | 30 | 49 | 100 | 50 |
| Amount of component E (mg/Kg A and B) | 50 | 250 | 250 | 250 | 250 | 250 |
| Properties of the the thermosetting powder coating compositions | | | | | | |
| PSS | 8 | 8 | 8 | 8 | 8 | 7 |
|  | very good | very good | very good | very good | very good | very good |
| Able to heat-cure fast at low temperature | yes | yes | yes | yes | yes | yes |
|  | InvPC1 | InvPC3 | InvPC4 | InvPC5 | InvPC6 | InvPC7 |
| Properties of the corresponding powder coatings | | | | | | |
| Chemical Resistance (ADR) (assessed upon heat curing at 95° C./3 minutes) | 500 | 500 | 500 | 500 | 500 | 500 |
|  | excellent | excellent | excellent | excellent | excellent | excellent |
| Smoothness (PCI) (assessed upon heat curing at 95° C./3 minutes) | 4 | 3 | 3 | 3 | 2 | 3 |
|  | sufficient | sufficient | sufficient | sufficient | sufficient | sufficient |

TABLE 8

Composition and properties of comparative thermosetting powder coating compositions and powder coatings thereof.

|  | CompPCC28 | CompPCC29 | CompPCC30 | CompPCC31 | CompPCC32 |
|---|---|---|---|---|---|
| UR1 (g) | 200 | 200 | 200 | 200 | 200 |
| VU3 (g) | 94.5 | 94.5 | 94.5 | 94.5 | 94.5 |
| Laurox ® 5(g) | 2.9 | 31 | 11.7 | 11.7 | 11.7 |
| diphenyliodoniumchloride (g) | 4.7 | 4.7 | 33 | 0 | 0.2 |
| t-butylhydroquinone (g) | 0.074 | 0.074 | 0.074 | 0.074 | 0.074 |
| Kronos ® 2310 (g) | 88.4 | 88.4 | 88.4 | 88.4 | 88.4 |
| Resiflow ® PV-5 (g) | 4.4 | 4.4 | 4.4 | 4.4 | 4.4 |
| K | 1.06 | 1.06 | 1.06 | 1.06 | 1.06 |
| Amount of component C (mmol/Kg A and B) | 25 | 264 | 100 | 100 | 100 |
| Amount of component D (mmol/Kg A and B) | 50 | 50 | 349 | 0 | 2 |
| Amount of component E (mg/Kg A and B) | 250 | 250 | 250 | 250 | 250 |
| Properties of the the thermosetting powder coating compositions | | | | | |
| PSS | 9 | 5 | 4 | 7 | 7 |
|  | very good | good | mediocre | very good | very good |
| Able to heat-cure fast at low temperature | no | no | no | no | no |
|  | CompPC28 | CompPC29 | CompPC30 | CompPC31 | CompPC32 |
| Properties of the corresponding powder coatings | | | | | |
| Chemical Resistance (ADR) (assessed upon heat curing at 95° C./3 minutes) | 15 | 58 | 40 | 33 | 68 |
|  | very poor | very poor | very poor | very poor | very poor |
| Smoothness (PCI) (assessed upon heat curing at 95° C./3 minutes) | 4 | 3 | <1 | 4 | 3 |
|  | sufficient | sufficient | poor | sufficient | sufficient |

TABLE 9

Composition and properties of inventive thermosetting powder coating compositions and powder coatings thereof.

|  | InvPCC8 | InvPCC9 | InvPCC10 | InvPCC11 | InvPCC12 | InvPCC13 |
|---|---|---|---|---|---|---|
| UR1 (g) | 200 | 200 | 200 | 200 | 200 | 200 |
| VU3 (g) | 94.5 | 94.5 | 94.5 | 94.5 | 94.5 | 94.5 |
| Laurox ® 5 (g) | 6 | 17.5 | 20.5 | 21.7 | 11.7 | 11.7 |
| diphenyliodoniumchloride (g) | 4.7 | 4.7 | 4.7 | 4.7 | 4.7 | 14.1 |
| t-butylhydroquinone (g) | 0.074 | 0.074 | 0.074 | 0.074 | 0.295 | 0.074 |
| Kronos ® 2310 (g) | 88.4 | 88.4 | 88.4 | 88.4 | 88.4 | 88.4 |
| Resiflow ® PV-5 (g) | 4.4 | 4.4 | 4.4 | 4.4 | 4.4 | 4.4 |
| K | 1.06 | 1.06 | 1.06 | 1.06 | 1.06 | 1.06 |
| Amount of component C (mmol/Kg A and B) | 51 | 149 | 175 | 185 | 100 | 100 |
| Amount of component D (mmol/Kg A and B) | 50 | 50 | 50 | 50 | 50 | 149 |
| Amount of component E (mg/Kg A and B) | 250 | 250 | 250 | 250 | 1000 | 250 |
| Properties of the the thermosetting powder coating compositions | | | | | | |
| PSS | 9 | 8 | 7 | 7 | 8 | 7 |
|  | very good | very good | very good | very good | very good | excellent |
| Able to heat-cure fast at low temperature | yes | yes | yes | yes | yes | yes |
|  | InvPC8 | InvPC9 | InvPC10 | InvPC11 | InvPC12 | InvPC13 |
| Properties of the corresponding powder coatings | | | | | | |
| Chemical Resistance (ADR) (assessed upon heat curing at 95° C./3 minutes) | 500 | 500 | 500 | 500 | 500 | 500 |
|  | excellent | excellent | excellent | excellent | excellent | excellent |
| Smoothness (PCI) (assessed upon heat curing at 95° C./3 minutes) | 4 | 3 | 3 | 3 | 4 | 2 |
|  | sufficient | sufficient | sufficient | sufficient | sufficient | sufficient |

TABLE 10

Composition and properties of inventive thermosetting powder coating compositions and powder coatings thereof.

| | InvPCC14 | InvPCC15 | InvPCC16 | InvPCC17 | InvPCC18 |
|---|---|---|---|---|---|
| UR1 (g) | 200 | 200 | 200 | 200 | 200 |
| VFUR2 (g) | | 10 | | | |
| VU3 (g) | 82 | 62 | 116 | 94.5 | 94.5 |
| Laurox ® S (g) | 11.7 | 10.6 | 12.5 | 11.7 | 11.7 |
| diphenyliodoniumchloride (g) | 4.7 | 4.2 | 5.1 | 4.7 | 1.5 |
| t-butylhydroquinone (g) | 0.073 | 0.066 | 0.079 | 0.074 | 0.074 |
| Kronos ® 2310 (g) | 87.6 | 78.6 | 94.8 | 88.4 | 88.4 |
| Resiflow ® PV-5 (g) | 4.4 | 3.9 | 4.7 | 4.4 | 4.4 |
| K | 1.05 | 0.70 | 1.30 | 1.06 | 1.06 |
| Amount of component C (mmol/Kg A and B) | 101 | 102 | 99 | 100 | 100 |
| Amount of component D (mmol/Kg A and B) | 50 | 50 | 50 | 50 | 16 |
| Amount of component E (mg/Kg A and B) | 250 | 250 | 250 | 250 | 250 |
| Properties of the the thermosetting powder coating compositions | | | | | |
| PSS | 8 | 8 | 8 | 8 | 8 |
| | very good | very good | very good | very good | very good |
| Able to heat-cure fast at low temperature | yes | yes | yes | yes | yes |
| | InvPC14 | InvPC15 | InvPC16 | InvPC17 | InvPC18 |
| Properties of the corresponding powder coatings | | | | | |
| Chemical Resistance (ADR) (assessed upon heat curing at 95° C./3 minutes) | 500 excellent | 500 excellent | 500 excellent | 500 excellent | 500 excellent |
| Smoothness (PCI) (assessed upon heat curing at 95° C./3 minutes) | 2 sufficient | 2 sufficient | 4 sufficient | 3 sufficient | 4 sufficient |

Only the Inventive Examples (thermosetting powder coating compositions according to the invention of claim 1; also referred as inventive TPCC) had in combination all features of claim 1. It was surprisingly found that only the inventive TPCC were able to provide for a unique combination of much desired properties. More specifically, only the inventive TPCC were heat curable and were able to heat-cure fast at low temperature and said heat curable thermosetting powder coating compositions upon heat-curing at low temperature were able to produce powder coatings having at least good, preferably very good, more preferably excellent chemical resistance. Actually, all the inventive TPCC were heat curable and were able to heat-cure fast at low temperature and said heat curable thermosetting powder coating compositions upon heat-curing at low temperature were able to produce powder coatings having excellent chemical resistance. Thus, only the inventive TPCC met the primary object of the invention.

In addition, only the inventive TPCC were heat curable and were able to heat-cure fast at low temperature, had very good physical storage stability and said heat curable thermosetting powder coating compositions upon heat-curing at low temperature were able to produce powder coatings having at least good, preferably very good, more preferably excellent chemical resistance. Furthermore, only the inventive TPCC were heat curable and were able to heat-cure fast at low temperature, had very good physical storage stability, and said heat curable thermosetting powder coating compositions upon heat-curing at low temperature were able to produce powder coatings having: i) excellent chemical resistance, and ii) at least sufficient smoothness.

None of the Comparative Examples had in combination all features of claim 1. Any and all Comparative Examples failed even to meet the primary object of the invention, let alone the additional surprising array of very desirable as explained and shown in this application.

The invention of claim 1 constitutes a noticeable progress over the prior art and it contributes a great deal to the advancement and progress of the technology of thermosetting powder coatings. The reason being the invention of claim 1 makes feasible the achievement of heat curable thermosetting powder coating compositions that were able to heat-cure fast at low temperature and said heat curable thermosetting powder coating compositions upon heat-curing at low temperature were able to produce powder coatings having at least good, preferably very good, more preferably excellent chemical resistance. Actually, all the inventive TPCC were heat curable and were able to heat-cure fast at low temperature and said heat curable thermosetting powder coating compositions upon heat-curing at low temperature were able to produce powder coatings having excellent chemical resistance. In addition the inventive thermosetting powder coating compositions were able at the same time to achieve a further fantastic and unique array of very desirable properties as explained and shown in this application.

The invention claimed is:

1. A thermosetting powder coating composition comprising the following components A to D:
    A: one or more unsaturated resins comprising ethylenic unsaturations (UR) selected from the group consisting of polyester resins, acrylic resins, polyurethanes, epoxy resins, polyamides, polyesteramides, polycarbonates, polyureas and mixtures thereof, and
    B: one or more curing agents selected from the group consisting of vinyl urethanes, vinyl functionalized urethane resins and mixtures thereof, wherein at least one curing agent is curing agent A which is selected from the group consisting of i), ii) and iii):
        i) one or more crystalline VU-c each of which is a crystalline vinyl urethane having a melting enthalpy $\Delta H_m \geq 35$ J/g, and one or more melting temperatures ($T_m$) wherein any and all of the $T_m$ of the one or more crystalline VU-c are in the region of from and including 30 up to and including 80° C., and
  ii) one or more crystalline VFUR-c each of which is a crystalline vinyl functionalized urethane resin having a melting enthalpy $\Delta H_m \geq 35$ J/g, and one or more melting temperatures ($T_m$) wherein any and all of the $T_m$ of the one or more crystalline VFUR-c are in the region of from and including 30 up to and including 80° C., and
  iii) mixtures of crystalline VU-c and crystalline VFUR-c, wherein the $\Delta H_m$ and $T_m$ is each measured via Differential Scanning calorimetry (DSC),
C: one or more thermal radical initiators, wherein at least one thermal radical initiator is dilauroyl peroxide and wherein the dilauroyl peroxide is present in an amount of at least 30 and at most 190 mmol/Kg A and B, and
D: one or more co-initiators selected is selected from the group consisting of onium compounds, sulpho-compounds, and mixtures thereof, and wherein the total amount of component D is at least 10 and at most 300 mmol/Kg A and B.

2. The thermosetting powder coating composition according to claim 1, wherein the dilauroyl peroxide is present in an amount of at least 35 mmol/Kg A and B.

3. The thermosetting powder coating composition according to claim 1, wherein the dilauroyl peroxide is present in an amount of at least 40 mmol/Kg A and B.

4. The thermosetting powder coating composition according to claim 3, wherein the total amount of the component C is at most 250 mmol/Kg A and B.

5. The thermosetting powder coating composition according to claim 4, wherein the total amount of the component C is at most 190 mmol/Kg A and B.

6. The thermosetting powder coating composition according to claim 5, wherein the onium compounds of component D are selected from the group consisting of compounds represented by the following formula I-X and compounds represented by the following formula II-X:

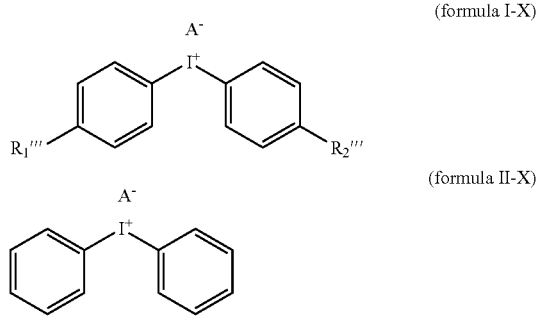

(formula I-X)

(formula II-X)

wherein
A⁻ is selected from the group consisting of halide anions; and
$R_1'''$ is a $C_1$-$C_{12}$ saturated hydrocarbyl, and $R_2'''$ is a $C_1$-$C_{12}$ saturated hydrocarbyl.

7. The thermosetting powder coating composition according to claim 6, wherein B is present in an amount of at least 15 and at most 55 pph of A and B.

8. The thermosetting powder coating composition according to claim 7, wherein the curing agent A is present in an amount of at least 70 pph of B.

9. The thermosetting powder coating composition according to claim 6, wherein the curing agent A is present in an amount of at least 70 pph of B.

10. The thermosetting powder coating composition according to claim 6, wherein K is a ratio of the total mol of the ethylenic unsaturations in B divided by the total mol of the ethylenic unsaturations in A, which is at least 0.60 and at most 3.

11. The thermosetting powder coating composition according to claim 5, wherein B is present in an amount of at least 15 and at most 55 pph of A and B.

12. The thermosetting powder coating composition according to claim 11, wherein the curing agent A is present in an amount of at least 70 pph of B.

13. The thermosetting powder coating composition according to claim 5, wherein the curing agent A is present in an amount of at least 70 pph of B.

14. The thermosetting powder coating composition according to claim 5, wherein K is a ratio of the total mol of the ethylenic unsaturations in B divided by the total mol of the ethylenic unsaturations in A, which is at least 0.60 and at most 3.

15. The thermosetting powder coating composition according to claim 4, wherein the onium compounds of component D are selected from the group consisting of compounds represented by the following formula I-X and compounds represented by the following formula II-X:

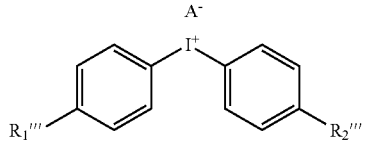

(formula I-X)

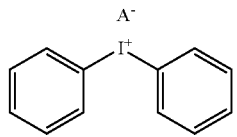

(formula II-X)

wherein
A⁻ is selected from the group consisting of halide anions; and
$R_1'''$ is a $C_1$-$C_{12}$ saturated hydrocarbyl, and $R_2'''$ is a $C_1$-$C_{12}$ saturated hydrocarbyl.

16. The thermosetting powder coating composition according to claim 15, wherein B is present in an amount of at least 15 and at most 55 pph of A and B.

17. The thermosetting powder coating composition according to claim 16, wherein the curing agent A is present in an amount of at least 70 pph of B.

18. The thermosetting powder coating composition according to claim 15, wherein the curing agent A is present in an amount of at least 70 pph of B.

19. The thermosetting powder coating composition according to claim 15, wherein K is a ratio of the total mol of the ethylenic unsaturations in B divided by the total mol of the ethylenic unsaturations in A, which is at least 0.60 and at most 3.

20. The thermosetting powder coating composition according to claim 4, wherein B is present in an amount of at least 15 and at most 55 pph of A and B.

21. The thermosetting powder coating composition according to claim 20, wherein the curing agent A is present in an amount of at least 70 pph of B.

22. The thermosetting powder coating composition according to claim 4, wherein the curing agent A is present in an amount of at least 70 pph of B.

23. The thermosetting powder coating composition according to claim 4, wherein K is a ratio of the total mol of the ethylenic unsaturations in B divided by the total mol of the ethylenic unsaturations in A, which is at least 0.60 and at most 3.

24. The thermosetting powder coating composition according to claim 3, wherein B is present in an amount of at least 15 and at most 55 pph of A and B.

25. The thermosetting powder coating composition according to claim 24, wherein the curing agent A is present in an amount of at least 70 pph of B.

26. The thermosetting powder coating composition according to claim 3, wherein the curing agent A is present in an amount of at least 70 pph of B.

27. The thermosetting powder coating composition according to claim 3, wherein K is a ratio of the total mol of the ethylenic unsaturations in B divided by the total mol of the ethylenic unsaturations in A, which is at least 0.60 and at most 3.

28. The thermosetting powder coating composition according to claim 1, wherein the dilauroyl peroxide is present in an amount of at least 45 mmol/Kg A and B.

29. The thermosetting powder coating composition according to claim 28, wherein the total amount of the component C is at most 250 mmol/Kg A and B.

30. The thermosetting powder coating composition according to claim 29, wherein the total amount of the component C is at most 190 mmol/Kg A and B.

31. The thermosetting powder coating composition according to claim 28, wherein B is present in an amount of at least 15 and at most 55 pph of A and B.

32. The thermosetting powder coating composition according to claim 31, wherein the curing agent A is present in an amount of at least 70 pph of B.

33. The thermosetting powder coating composition according to claim 28, wherein the curing agent A is present in an amount of at least 70 pph of B.

34. The thermosetting powder coating composition according to claim 28, wherein K is a ratio of the total mol of the ethylenic unsaturations in B divided by the total mol of the ethylenic unsaturations in A, which is at least 0.60 and at most 3.

35. The thermosetting powder coating composition according to claim 1, wherein the total amount of the component C is at most 250 mmol/Kg A and B.

36. The thermosetting powder coating composition according to claim 35, wherein B is present in an amount of at least 15 and at most 55 pph of A and B.

37. The thermosetting powder coating composition according to claim 36, wherein the curing agent A is present in an amount of at least 70 pph of B.

38. The thermosetting powder coating composition according to claim 35, wherein the curing agent A is present in an amount of at least 70 pph of B.

39. The thermosetting powder coating composition according to claim 35, wherein K is a ratio of the total mol of the ethylenic unsaturations in B divided by the total mol of the ethylenic unsaturations in A, which is at least 0.60 and at most 3.

40. The thermosetting powder coating composition according to claim 1, wherein the total amount of the component C is at most 190 mmol/Kg A and B.

41. The thermosetting powder coating composition according to claim 1, wherein the onium compounds of component D are selected from the group consisting of compounds represented by the following formula I-X and compounds represented by the following formula II-X:

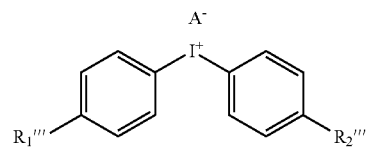
(formula I-X)

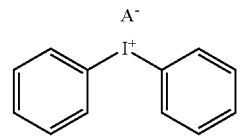
(formula II-X)

wherein $A^-$ is selected from the group consisting of halide anions; and $R_1'''$ is a $C_1$-$C_{12}$ saturated hydrocarbyl, and $R_2'''$ is a $C_1$-$C_{12}$ saturated hydrocarbyl.

42. The thermosetting powder coating composition according to claim 41, wherein B is present in an amount of at least 15 and at most 55 pph of A and B.

43. The thermosetting powder coating composition according to claim 42, wherein the curing agent A is present in an amount of at least 70 pph of B.

44. The thermosetting powder coating composition according to claim 41, wherein the curing agent A is present in an amount of at least 70 pph of B.

45. The thermosetting powder coating composition according to claim 41, wherein K is a ratio of the total mol of the ethylenic unsaturations in B divided by the total mol of the ethylenic unsaturations in A, which is at least 0.60 and at most 3.

46. The thermosetting powder coating composition according to claim 1, wherein B is present in an amount of at least 15 and at most 55 pph of A and B.

47. The thermosetting powder coating composition according to claim 46, wherein K is a ratio of the total mol of the ethylenic unsaturations in B divided by the total mol of the ethylenic unsaturations in A, which is at least 0.60 and at most 3.

48. The thermosetting powder coating composition according to claim 1, wherein the curing agent A is present in an amount of at least 70 pph of B.

49. The thermosetting powder coating composition according to claim 48, wherein K is a ratio of the total mol of the ethylenic unsaturations in B divided by the total mol of the ethylenic unsaturations in A, which is at least 0.60 and at most 3.

50. The thermosetting powder coating composition according to claim 1, wherein the curing agent A is present in an amount of at least 80 pph of B.

51. The thermosetting powder coating composition according to claim 1, wherein K is a ratio of the total mol of the ethylenic unsaturations in B divided by the total mol of the ethylenic unsaturations in A which is at least 0.60 and at most 3.

52. The thermosetting powder coating composition according to claim 1, wherein K is a ratio of the total mol of the ethylenic unsaturations in B divided by the total mol of the ethylenic unsaturations in A which is at least 0.95 and at most 2.5.

53. The thermosetting powder coating composition according to claim 1, wherein the curing agent A has a crystallization temperature ($T_c$) measured by Differential Scanning calorimetry (DSC) of at least 10 and at most 70° C.

54. The thermosetting powder coating composition according to claim 1, wherein the total amount of the component D is at most 150 mmol/Kg A and B.

55. The thermosetting powder coating composition according to claim 1, wherein the thermosetting powder coating composition further comprises:
E: one or more inhibitors selected from the group consisting of phenolic compounds, stable radicals, catechols, phenothiazines, hydroquinones, benzoquinones and mixtures thereof, wherein
the total amount of component E is at least 20 and at most 1500 mg/Kg A and B.

56. The thermosetting powder coating composition according to claim 55, wherein the UR is an unsaturated polyester resin comprising 2-butenedioic acid ethylenic unsaturations.

57. The thermosetting powder coating composition according to claim 56, wherein the unsaturated polyester resin comprising 2-butenedioic acid ethylenic unsaturations has:
a) a number average molecular weight ($M_n$) of at least 1000 and at most 10000 Da, and
b) a glass transition temperature ($T_g$) of at least 40 and at most 75° C., and
c) a weight per unsaturation (WPU) of at least 250 and at most 2200 g/mol, and wherein
the $M_n$ is measured via Gel Permeation Chromatography (GPC),
the $T_g$ is measured via Differential Scanning calorimetry (DSC), and
the WPU is measured via $^1$H-NMR spectroscopy.

58. The thermosetting powder coating composition according to claim 57, wherein the dilauroyl peroxide is present in an amount of at least 40 mmol/Kg A and B.

59. The thermosetting powder coating composition according to claim 57, wherein the total amount of the component C is at most 250 mmol/Kg A and B.

60. The thermosetting powder coating composition according to claim 59, wherein B is present in an amount of at least 15 and at most 55 pph of A and B.

61. The thermosetting powder coating composition according to claim 60, wherein the onium compounds of component D are selected from the group consisting of compounds represented by the following formula I-X and compounds represented by the following formula II-X:

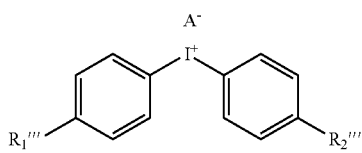
(formula I-X)

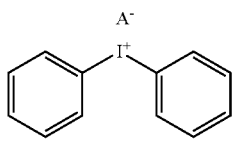
(formula II-X)

wherein
$A^-$ is selected from the group consisting of halide anions; and
$R_1'''$ is a $C_1$-$C_{12}$ saturated hydrocarbyl, and $R_2'''$ is a $C_1$-$C_{12}$ saturated hydrocarbyl.

62. The thermosetting powder coating composition according to claim 61, wherein the curing agent A which is selected from the group consisting of i), ii) and iii):
i) one or more crystalline VU-c each of which is a crystalline vinyl urethane having a melting enthalpy $\Delta H_m \geq 35$ J/g, and one or more melting temperatures ($T_m$) wherein any and all of the $T_m$ of the one or more crystalline VU-c are in the region of from and including 45 up to and including 78° C., and a number average molecular weight ($M_n$) of at least 660 and at most 1200 Da, and
ii) one or more crystalline VFUR-c each of which is a crystalline vinyl functionalized urethane resin having a melting enthalpy $\Delta H_m \geq 35$ J/g, and one or more melting temperatures ($T_m$) wherein any and all of the $T_m$ of the one or more crystalline VFUR-c are in the region of from and including 45 up to and including 78° C., and a number average molecular weight ($M_n$) of at least 660 and at most 1200 Da, and
iii) mixtures of the one or more crystalline VU-c and the one or more crystalline VFUR-c, wherein
the $M_n$ is measured via Gel Permeation Chromatography (GPC).

63. The thermosetting powder coating composition according to claim 62, wherein the curing agent A is one or more crystalline VU-c, and wherein each VU-c is a crystalline VEU-c, wherein VEU-c is a crystalline vinyl ether urethane having a melting enthalpy $\Delta H_m \geq 35$ J/g, and one or more melting temperatures ($T_m$) wherein any and all of the $T_m$ of the crystalline VEU-c are in the region of from and including 30 up to and including 80° C.

64. The thermosetting powder coating composition according to claim 62, wherein the curing agent A is selected from the group consisting of diethylene glycol divinyl ether urethane, triethylene glycol divinyl ether urethane, and mixtures thereof.

65. The thermosetting powder coating composition according to claim 61, wherein the curing agent A is one or more crystalline VU-c, and wherein each VU-c is a crystalline VEU-c, wherein VEU-c is a crystalline vinyl ether urethane having a melting enthalpy $\Delta H_m \geq 35$ J/g, and one or more melting temperatures ($T_m$) wherein any and all of the $T_m$ of the crystalline VEU-c are in the region of from and including 30 up to and including 80° C.

66. The thermosetting powder coating composition according to claim 61, wherein the curing agent A is selected from the group consisting of diethylene glycol divinyl ether urethane, triethylene glycol divinyl ether urethane, and mixtures thereof.

67. The thermosetting powder coating composition according to claim 57, wherein the total amount of the component C is at most 190 mmol/Kg A and B.

68. The thermosetting powder coating composition according to claim 1, wherein the UR is an unsaturated polyester resin comprising 2-butenedioic acid ethylenic unsaturations.

69. The thermosetting powder coating composition according to claim 1, wherein the UR has:
a) a number average molecular weight ($M_n$) of at least 1000 and at most 10000 Da, and
b) a glass transition temperature ($T_g$) of at least 40 and at most 75° C., and c) a weight per unsaturation (WPU) of at least 250 and at most 2200 g/mol, and wherein the $M_n$ is measured via Gel Permeation Chromatography (GPC), the $T_g$ is measured via Differential Scanning calorimetry (DSC), and the WPU is measured via $^1$H-NMR spectroscopy.

70. The thermosetting powder coating composition according to claim 1, wherein the curing agent A which is selected from the group consisting of i), ii) and iii):
   i) one or more crystalline VU-c each of which is a crystalline vinyl urethane having a melting enthalpy $\Delta H_m \geq 35$ J/g, and one or more melting temperatures ($T_m$) wherein any and all of the $T_m$ of the one or more crystalline VU-c are in the region of from and including 45 up to and including 78° C., and a number average molecular weight ($M_n$) of at least 660 and at most 1200 Da, and
   ii) one or more crystalline VFUR-c each of which is a crystalline vinyl functionalized urethane resin having a melting enthalpy $\Delta H_m \geq 35$ J/g, and one or more melting temperatures ($T_m$) wherein any and all of the $T_m$ of the one or more crystalline VFUR-c are in the region of from and including 45 up to and including 78° C., and a number molecular weight weight ($M_n$) of at least 660 and at most 1200 Da, and
   iii) mixtures of the one or more crystalline VU-c and the one or more crystalline VFUR-c, wherein the $M_n$ is measured via Gel Permeation Chromatography (GPC).

71. The thermosetting powder coating composition according to claim 1, wherein the curing agent A is one or more crystalline VEU-c, wherein VEU-c is a crystalline vinyl ether urethane having a melting enthalpy $\Delta H_m \geq 35$ J/g, and one or more melting temperatures ($T_m$) wherein any and all of the $T_m$ of the crystalline VEU-c are in the region of from and including 30 up to and including 80° C.

72. The thermosetting powder coating composition according to claim 1, wherein the curing agent A is selected from the group consisting of diethylene glycol divinyl ether urethane, triethylene glycol divinyl ether urethane, and mixtures thereof.

73. The thermosetting powder coating composition according to claim 1, wherein the thermosetting powder coating composition has a glass transition temperature ($T_g$) of at least 25 and at most 70° C., wherein the $T_g$ is measured via Differential Scanning calorimetry (DSC).

74. The thermosetting powder coating composition according to claim 1, wherein the curing agent A has a $T_c$ which is at most 55° C. lower than the $T_m$ of the curing agent A, or if the curing agent A has more than one $T_m$ then the curing agent A has a $T_c$ which is lower than a highest $T_m$ of the curing agent A.

75. A process for making the thermosetting powder coating composition as defined in claim 1, wherein the process comprises the steps of:
   (a) mixing the components of the thermosetting powder coating composition to obtain a premix;
   (b) heating the premix in an extruder up to and including the decomposition temperature of the component C, to obtain an extrudate;
   (c) cooling down the extrudate to obtain a solidified extrudate; and
   (d) grinding the solidified extrudate into smaller particles to obtain the thermosetting powder coating composition.

76. A thermosetting powder coating composition as defined in claim 1 which is cured.

77. An article having a cured coating thereon, wherein the cured coating comprises the thermosetting powder coating composition as defined in claim 76.

78. An article having coated thereon the thermosetting powder coating composition as defined in claim 1.

79. A process for making a coated article, wherein the process comprises the steps of:
   (a) applying the thermosetting powder coating composition as defined in claim 1 to an article, and
   (b) heating and/or radiating the thermosetting powder coating composition for enough time and at a suitable temperature to cure the thermosetting powder coating composition and thereby obtain the coated article.

* * * * *